US009465890B1

(12) United States Patent
Wilson

(10) Patent No.: US 9,465,890 B1
(45) Date of Patent: Oct. 11, 2016

(54) METHOD AND SYSTEM FOR MANAGING AND SHARING GEOGRAPHICALLY-LINKED CONTENT

(76) Inventor: Donald Jay Wilson, St. Louis, MO (US)

( * ) Notice: Subject to any disclaimer, the term of this patent is extended or adjusted under 35 U.S.C. 154(b) by 1097 days.

(21) Appl. No.: 12/852,983

(22) Filed: Aug. 9, 2010

Related U.S. Application Data

(60) Provisional application No. 61/232,654, filed on Aug. 10, 2009.

(51) Int. Cl.
*G06F 17/30* (2006.01)

(52) U.S. Cl.
CPC ............................... *G06F 17/30991* (2013.01)

(58) Field of Classification Search
CPC ........... G06F 3/0481; G06F 17/30873; G06F 3/04815; G06F 17/30991; G06F 2203/04806; G06F 3/04817; G06F 17/301; G06F 3/048; G06F 3/0488
See application file for complete search history.

(56) References Cited

U.S. PATENT DOCUMENTS

| | | | | |
|---|---|---|---|---|
| 4,865,548 | A | 9/1989 | Snyder | |
| 5,852,810 | A | 12/1998 | Sotiroff et al. | |
| 5,945,985 | A | 8/1999 | Babin et al. | |
| 5,948,040 | A | 9/1999 | DeLorme et al. | |
| 5,990,886 | A | 11/1999 | Serdy et al. | |
| 6,061,688 | A | 5/2000 | Kilpatrick et al. | |
| 6,523,024 | B1 | 2/2003 | Yajima et al. | |
| 6,681,231 | B1 | 1/2004 | Burnett | |
| 6,760,731 | B2 | 7/2004 | Huff | |
| 6,772,213 | B2 | 8/2004 | Glorikian | |
| 6,883,146 | B2 | 4/2005 | Prabhu et al. | |
| 6,906,643 | B2 | 6/2005 | Samadani et al. | |
| 6,956,573 | B1 | 10/2005 | Bergen et al. | |
| 7,007,243 | B2 | 2/2006 | Baldino | |
| 8,249,626 | B2 * | 8/2012 | Huston | 455/456.3 |
| 2002/0023272 | A1 | 2/2002 | Pocock | |
| 2002/0032687 | A1 | 3/2002 | Huff | |
| 2002/0046259 | A1 | 4/2002 | Glorikian | |
| 2002/0078035 | A1 | 6/2002 | Frank et al. | |
| 2002/0111946 | A1 | 8/2002 | Fallon | |
| 2002/0112003 | A1 | 8/2002 | Glorikian | |
| 2002/0156779 | A1 | 10/2002 | Elliott et al. | |
| 2003/0050803 | A1 | 3/2003 | Marchosky | |
| 2003/0155413 | A1 | 8/2003 | Kovesdi et al. | |

(Continued)

FOREIGN PATENT DOCUMENTS

| | | | |
|---|---|---|---|
| EP | 1128284 | A2 | 8/2001 |
| FR | 2849571 | A1 | 7/2004 |
| WO | 02/33955 | A2 | 4/2002 |

OTHER PUBLICATIONS

Boll et al., "Med/Ether: An Event Space for Context-Aware Multimedia Experiences", ETP '03, Nov. 7, 2003, pp. 21-30.

(Continued)

*Primary Examiner* — Angelica Ruiz
(74) *Attorney, Agent, or Firm* — Thompson Coburn LLP

(57) ABSTRACT

This disclosure relates generally to the field of content sharing over a network using geographical tags, particularly multimedia content relating to community, genealogical and historical information. The content that can be shared via preferred embodiments may take many forms, such as images, genealogical data, video, audio, etc. Preferably, the content comprises personalized content (such as family tree information, family photographs, neighborhood photographs, home video, home audio, etc.).

37 Claims, 130 Drawing Sheets

(56) References Cited

U.S. PATENT DOCUMENTS

| | | | | |
|---|---|---|---|---|
| 2003/0200192 | A1 | 10/2003 | Bell et al. | |
| 2004/0054665 | A1 | 3/2004 | Yoo et al. | |
| 2004/0078750 | A1 | 4/2004 | Frank | |
| 2004/0083226 | A1 | 4/2004 | Eaton | |
| 2004/0148282 | A1 | 7/2004 | Gardiner | |
| 2004/0220906 | A1 | 11/2004 | Gargi et al. | |
| 2004/0220965 | A1 | 11/2004 | Harville et al. | |
| 2005/0086227 | A1 | 4/2005 | Sullivan et al. | |
| 2005/0091209 | A1 | 4/2005 | Frank et al. | |
| 2005/0165766 | A1 | 7/2005 | Szabo | |
| 2005/0182770 | A1 | 8/2005 | Rasmussen et al. | |
| 2005/0203821 | A1 | 9/2005 | Petersen et al. | |
| 2005/0267903 | A1 | 12/2005 | Golze | |
| 2005/0289469 | A1 | 12/2005 | Chandler et al. | |
| 2006/0005118 | A1 | 1/2006 | Golze | |
| 2006/0031239 | A1 | 2/2006 | Koenig | |
| 2006/0036588 | A1 | 2/2006 | Frank et al. | |
| 2006/0036662 | A1 | 2/2006 | Cornell | |
| 2006/0037990 | A1 | 2/2006 | Geise | |
| 2007/0296581 | A1* | 12/2007 | Schnee | G06Q 10/08 340/572.1 |
| 2008/0082905 | A1* | 4/2008 | Martinez | G06F 17/30873 715/205 |
| 2008/0091723 | A1* | 4/2008 | Zuckerberg et al. | 707/104.1 |
| 2008/0104227 | A1* | 5/2008 | Birnie et al. | 709/224 |
| 2009/0187537 | A1* | 7/2009 | Yachin et al. | 707/3 |
| 2009/0249189 | A1* | 10/2009 | Jania et al. | 715/234 |
| 2010/0118025 | A1* | 5/2010 | Smith et al. | 345/418 |

OTHER PUBLICATIONS

Jones, “Move Over Magellan”, Conde Nast Traveler, Apr. 2009, 9 pps.

Lim et al., “G-Portal: A Map-Based Digital Library for Distributed Geospatial and Georeferenced Resources”, JCDL ’02, Jul. 13-17, 2002, pp. 351-358.

Naaman et al., “Automatic Organization for Digital Photographs with Geographic Coordinates”, JCDL ’04, Jun. 7-11, 2004, pp. 53-62.

* cited by examiner

Figure 8(c)
Webster Residence - 1935 (Marker Owner: donwil90)

Figure 29(b)
A Trip Down Memory Lane - Our Town - Windows Internet Explorer
A Trip Down Memory Lane - Our Town
People Already Assigned

Figure 31(b)
A Trip Down Memory Lane - Our Town - Windows Internet Explorer provided by Yahoo!
Favorites
A Trip Down Memory Lane - Our Town
Add a person
My Share Groups
View this marker
Kroger Self Service - 1947 (Media Owner: dmwil90)
People Already Assigned

Figure 49(g)
A Trip Down Memory Lane
Home
Search
My Account
About
FAQ
Contact
My People
My GeoCom
Published GeoCom
Logout

Figure 49(h)
Wilson Family Portrait - 1928 (Media Owner: wildon001)
My User Groups
People Already Assigned
Kerry Wilson - Child (2-11)

METHOD AND SYSTEM FOR MANAGING AND SHARING GEOGRAPHICALLY-LINKED CONTENT

CROSS-REFERENCE AND PRIORITY CLAIM TO RELATED PATENT APPLICATION

This patent application claims priority to U.S. provisional patent application 61/232,654, entitled "Method and System for Managing and Sharing Geographically-Linked Content", filed Aug. 10, 2009, the entire disclosure of which is incorporated herein by reference.

SUMMARY OF THE DISCLOSURE

The present invention relates generally to the field of content sharing over a network using geographical tags, particularly multimedia content relating to community, genealogical and historical information.

The content that can be shared via preferred embodiments of the present invention may take many forms, such as images, genealogical data, video, audio, etc. Preferably, the content comprises personalized content (such as family tree information, family photographs, neighborhood photographs, home video, home audio, document images, etc.).

A website is preferably the mechanism through which such content is shared among a plurality of users. A server can be configured to host the website, and a user may access the website through a network such as the Internet via his/her computer.

Content can be stored in a database as a plurality of data structures. These data structures and their data associations can define the who, what, when, where (and even why) of life events for large communities of people. Different types of content can have different data structures. Examples of different data structures that can be supported by the exemplary embodiments described herein are marker data structures, media data structures, people data structures and genealogical data structures. Preferably, these data structures are associated with a geographic location either directly or indirectly (e.g., indirectly via an association with another data structure, where the another data structure is associated with a geographic location) to permit a location-based technique for accessing data structures of interest through the website's graphical user interfaces (GUIs).

The marker data structures associated with geographic locations can be used to identify things such as residences of particular persons, workplaces of particular persons, vacation destinations of particular persons, or even general places of interest, etc. Through exemplary GUIs described herein, users can create such marker data structures and associate them not only with geographic locations but other forms of information, including but not limited to other people and media. Some marker data structures can also be associated with temporal data (e.g., a year or range of years) to identify the time-context in which a particular location is relevant to a user. Such time associations also permit time-based searches for relevant information.

The people data structures are associated with people. Through the website such people data structures can be associated with one or more geographic locations either directly or indirectly (e.g., an indirect association via an association with a marker data structure that identifies a residence of a particular person).

The media data structures can be created for content such as images (e.g., photographs or video), audio, or other such media. Once again, through the website these media data structures can be associated with geographic locations (whether they be municipalities, counties, other geographical-oriented political divisions, addresses, etc.), one or more people data structures and/or one or more marker data structures.

The genealogical data structures are associated with people and/or families. An exemplary genealogical data structure is family tree information such as a Gedcom file, as explained hereinafter. Once again, through the website, genealogical data structures can be associated with locations, people data structures, marker data structures, and/or media data structures.

Leveraging the associations that exist in the database between these different data structures and the associations that the data structures have with other data, a website can be implemented that provides users with a number of GUIs for learning great amounts of information about people and places of interest that would otherwise be virtually unknowable. Through exemplary embodiments disclosed herein, users can be permitted to access any data structure that is accessible to them. If a practitioner chooses to implement an embodiment of the invention such that all data structures are publicly available to all users, then all data structures will be accessible to all users. If a practitioner chooses to implement an embodiment of the invention where data structures will have a user-defined privacy setting, the accessibility of data structures will be a function of a privacy setting relative to the user's status with respect to that privacy setting. Thus, in a regime where data structures can have one of three privacy settings—public, private to user, and private to group, the accessible data structures for a given user would be the public data structures, the private to user data structures that are specific to that given user, and the private to group data structures that are specific to a group of which that given user is a member.

These and other features and advantages of the present invention will be apparent to those having ordinary skill in the art upon a review of the disclosure herein.

BRIEF DESCRIPTION OF THE DRAWINGS

FIG. 8(*c*) illustrates an exemplary GUI through which a user can view marker details after a marker has been created;

FIG. 8(*d*) illustrates an exemplary GUI through which a user can edit the information associated with content corresponding to a marker;

FIG. 9(*c*) illustrates an exemplary website that can be accessed via a marker icon view;

FIG. 21(*d*) illustrates an exemplary GUI through which a user can view the media items submitted by another user on the user's user list;

DETAILED DESCRIPTION OF THE PREFERRED EMBODIMENTS

Figure 1:
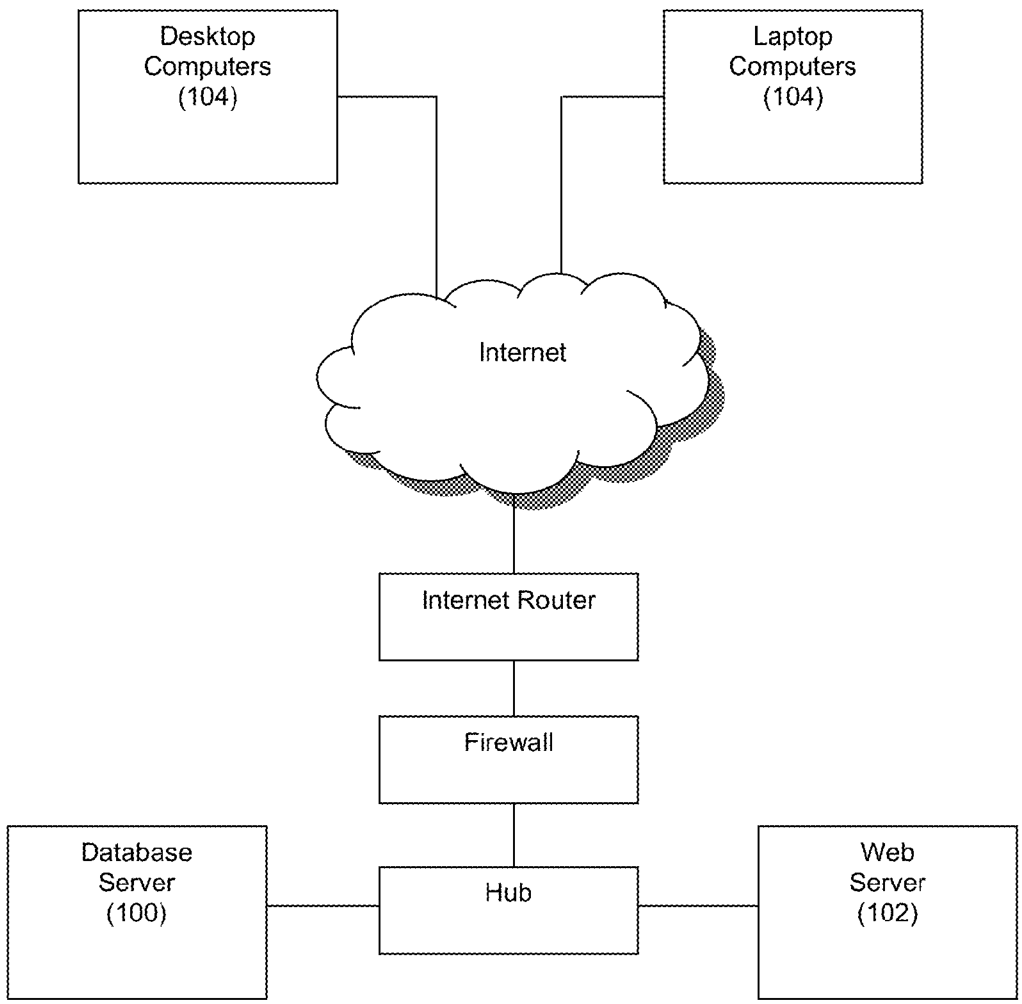
FIG. 1 illustrates a system architecture for an exemplary embodiment.

FIG. 1 illustrates an exemplary system architecture for an embodiment of the present invention. In this architecture, a database 100 implemented in a database server stores geo-indexed content as described herein. A web server 102 can be configured to host a website through which users access the geo-indexed content in database 100. Users can access the web server 100 from their computers 104 (e.g., a laptop or desktop computer) through a network connection (e.g., an Internet connection). Additional components such as an Internet router, firewall and network hub may optionally be used in their conventional manner. It should be understood that the system architecture of FIG. 1 is exemplary only. For example, a practitioner may choose to implement a smaller scale system where a single processor and associated memory configured as a server host a website, effectively consolidating the web server and database server in a single piece of hardware. Further still, in a larger scale system, multiple web servers could be provided for redundancy and load balancing. Similarly, multiple database servers may also optionally be employed.

Server 102 comprises a processor that is configured to execute software to provide the website functions and content access to users as described herein. The software preferably comprises processor-executable code resident on a computer-readable storage medium such as computer memory (e.g., RAM, ROM) or data storage disks. It should be understood that the processor can comprise a plurality of processors, such as distributed processors on separate servers, different processing cores on a multi-processor, etc., if desired. Also, the processor within server 102 can be any processor with sufficient computational power for carrying out the processes described herein. For example, the processors within standard off-the-shelf servers are suitable.

The database 100 can be implemented on any device for storing data, such as the hard drive of a computer, whether the data be stored as files in a file system, as records in a relational database, or the like (or some combination thereof). It should also be understood that the database 100 can, if desired, be distributed across a plurality of memory devices.

The user computers 104 can be devices such as personal computers, workstations, laptop, notebook or tablet computers, mobile telephones (e.g., smart phones, cell phones, etc.) configured with user interface features and network connectivity so long as these devices have sufficient processing power and user interface capabilities to perform the operations described herein in accordance with an exemplary embodiment. For example, a web browser or the like executed on the user computer 104 can be one way by which the user computers 104 access the website hosted by web server 102.

When the user accesses the website, the web server 102 interacts with the database server to retrieve the appropriate content and provides a graphical user interface (GUI) page for display on the user's computer that presents content to the user, preferably through a map interface.

As indicated above and described in greater detail herein, with a preferred embodiment of the present invention, content is preferably stored in the database as a plurality of data structures and indexed by a geographical identifier (such as an address and/or a latitude/longitude coordinate) that corresponds to that content. For example, family photographs of Family A can be indexed by a geographical identifier for the home in which Family A lived when that photograph was taken. When uploading such content to the website, a user preferably tags the content with such geographical identifiers.

Figure 2:
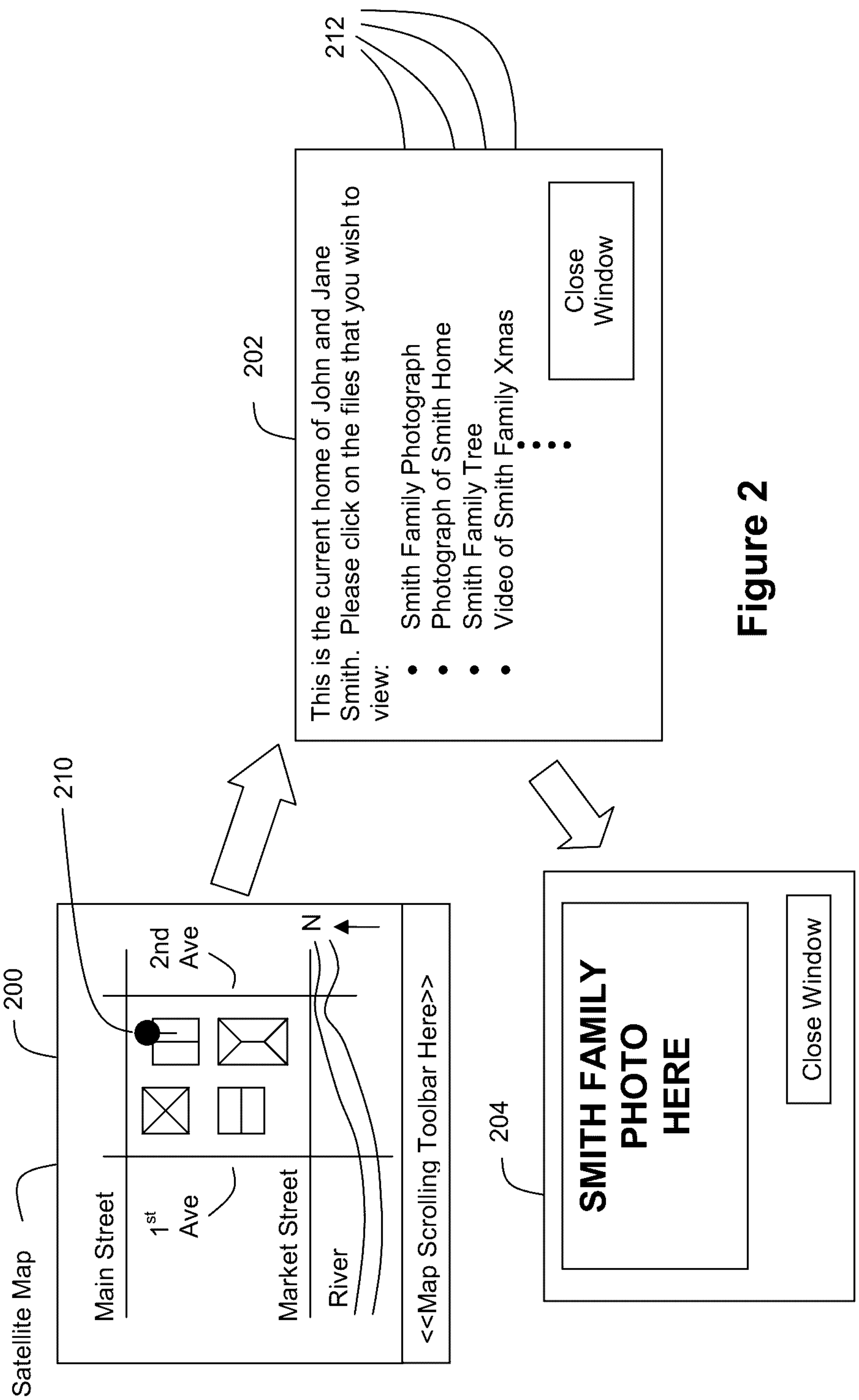
FIG. 2 illustrates a general flow diagram illustrating how geo-indexed content can be accessed through a map graphical user interface (GUI)
Figure 3A:
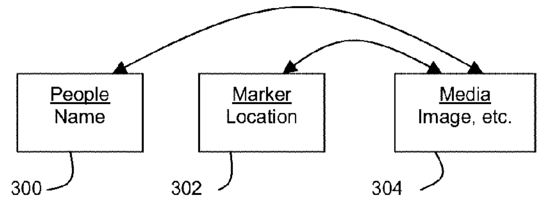
FIGS. 3(*a*)-(*m*) illustrate exemplary data structures that can be employed and accessed to view and create associations therebetween.
Figure 3B:
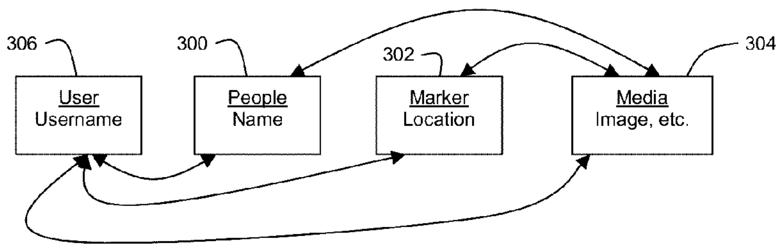
Figure 3C:
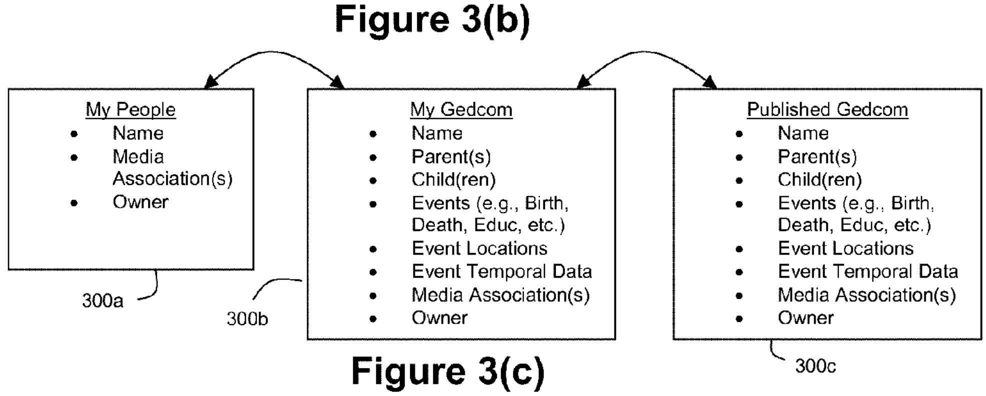
Figure 3D:
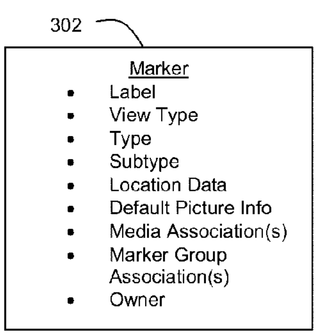
Figure 3E:
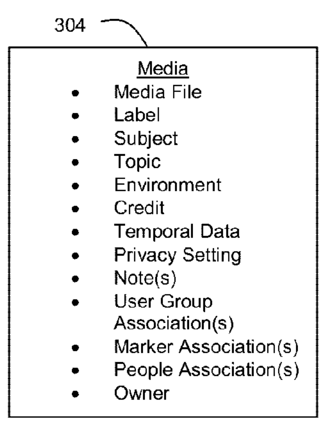
Figure 3F:
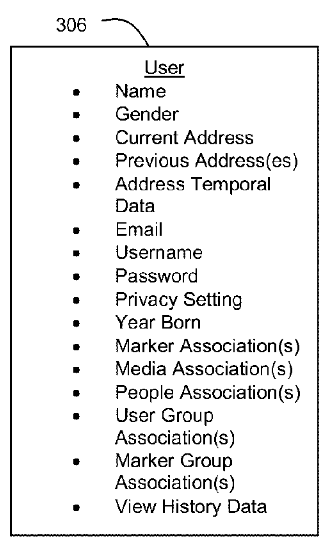
Figure 3G:
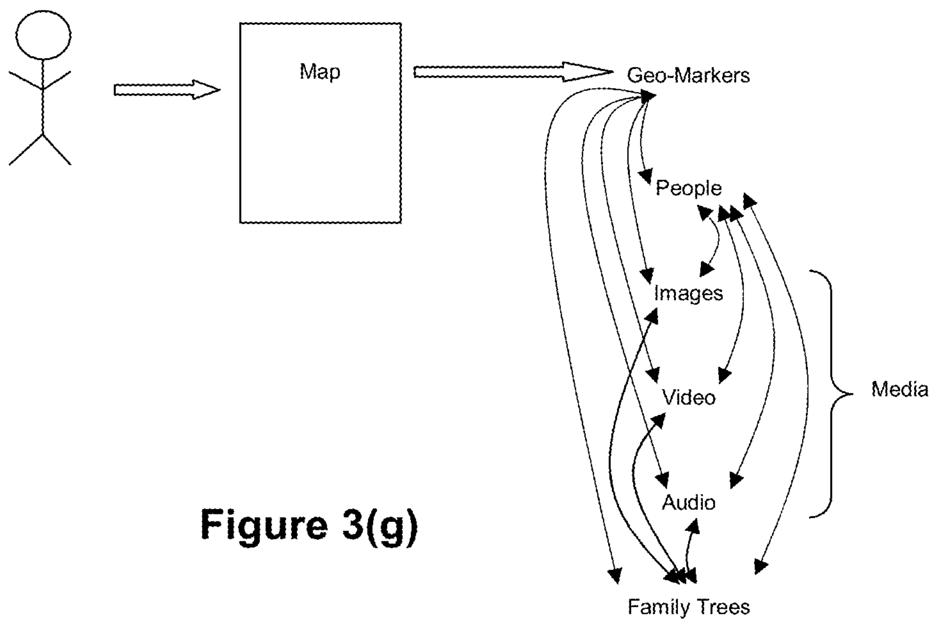
Figure 3H:
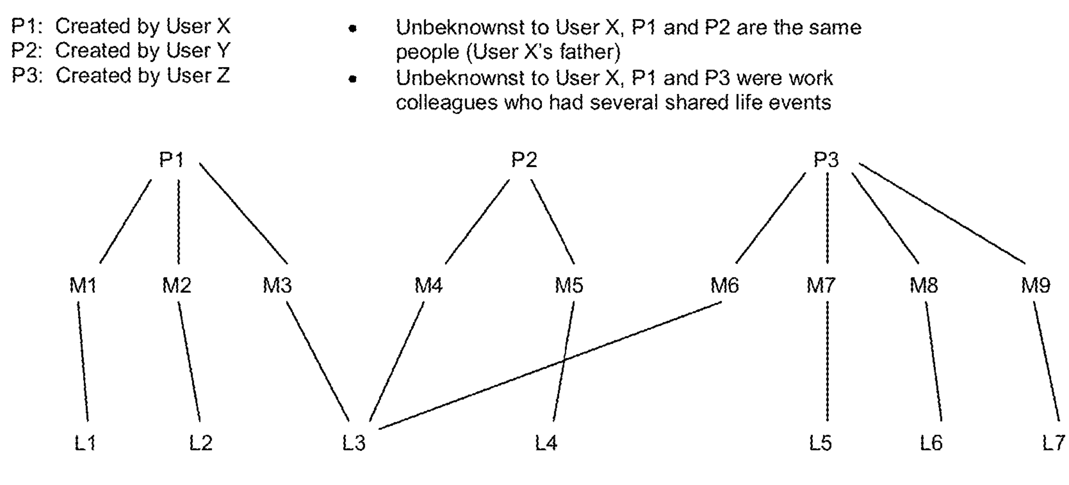
Figure 3I:
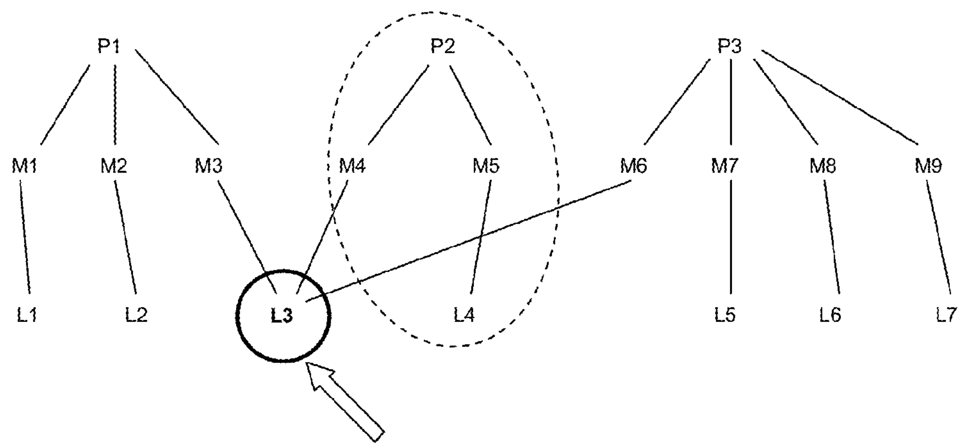
Figure 3J:
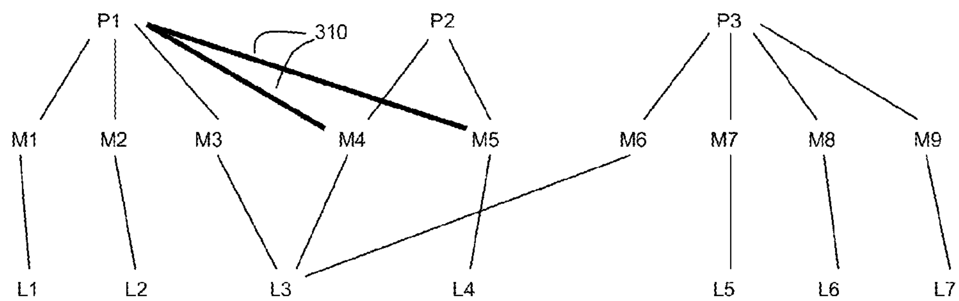
Figure 3K:
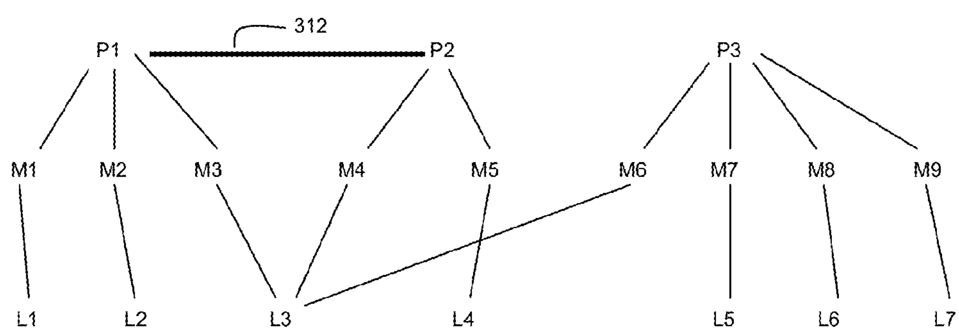
Figure 3L:
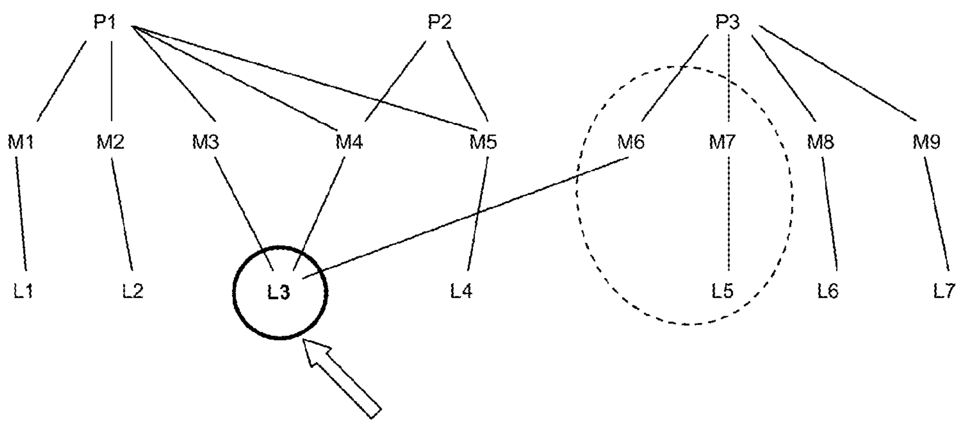
Figure 3M:
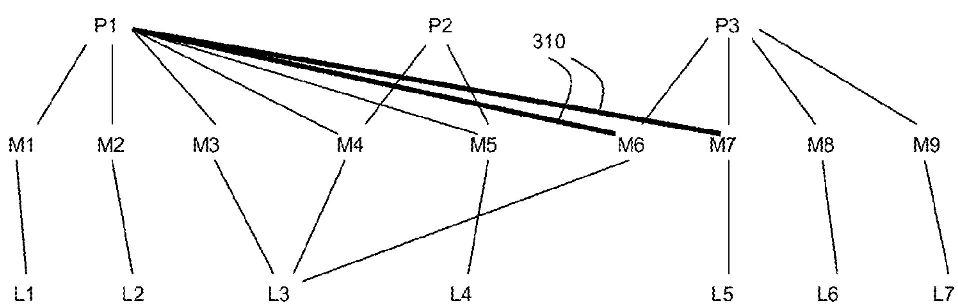

A registered user of the inventive system can then access this database through the website and navigate through its content via a map (optionally a satellite map) that is displayed on the user's computer screen. The map is preferably presented in a GUI page of the website that is accessed via browser software running on the user's computer. Selectable marker icons are displayed on the satellite map at locations corresponding to the geographical identifiers against which content has been indexed (e.g., see pin 210 in FIG. 2). Upon user selection of a marker icon, the content that is indexed by that geographic identifier is then presented to the user, an example of which is shown in FIG. 2. Display 200 illustrates an exemplary map with a marker icon superimposed thereon (see pin 210) to identify the existence of geo-indexed content. In response to user selection of this marker icon, display 202 is presented to the user. Such a display may list the different content associated with that geographic location in the database. In response to user selection of one of the listed content items (see links 212), display 204 can be presented to the user to permit the user to view the desired content.

Figure 6A:
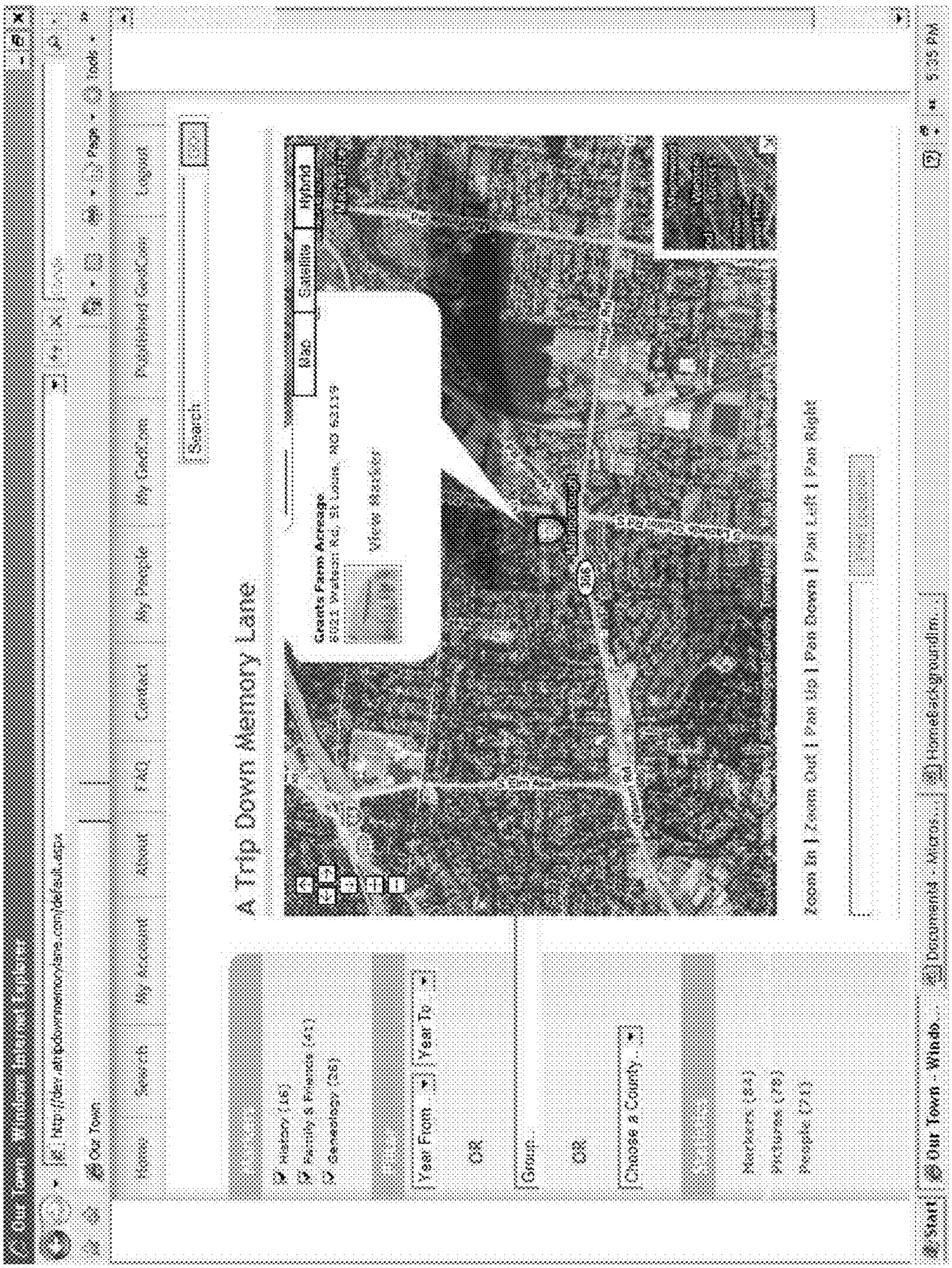
FIGS. 6(*a*) and (*b*) illustrate maps of a geographic area corresponding to different periods of time.
Figure 6B:
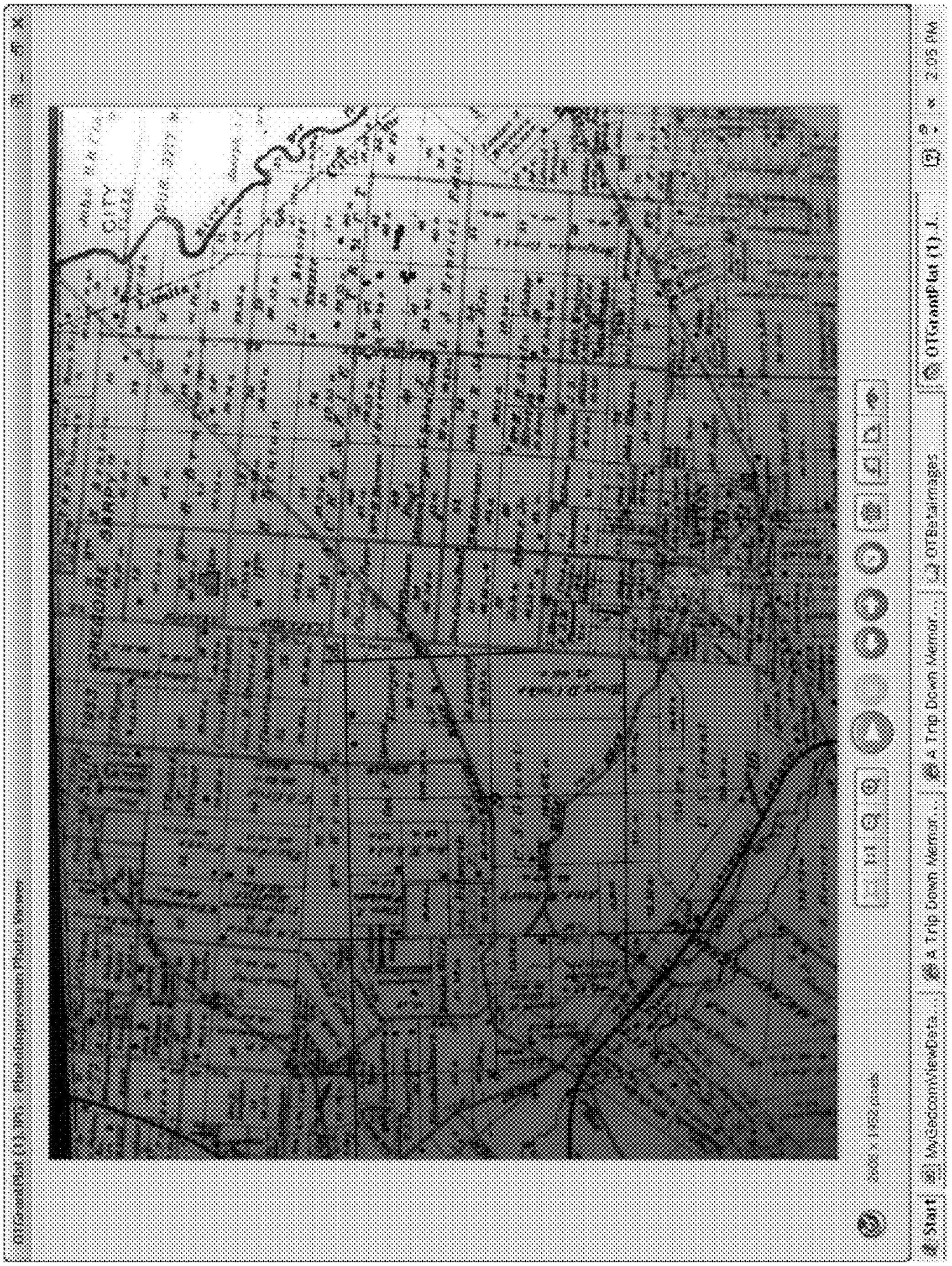

The content files can also be indexed by a date or range of dates. Multiple maps (e.g., satellite maps, road maps, topographical maps, etc.) can then be available for display to users broken down by date (or range of dates). For older dates where certain types of maps are not available (e.g., satellite map imagery) is not available, conventional maps from the dates in question can be used. For example, as shown in FIGS. 6(*a*) and 6(*b*), a user can filter the map view from a current day (FIG. 6(*a*)) to a time in the past for that geographic area (FIG. 6(*b*)). If desired, the older map can display any marker icons associated with that area for the time period in question.

Such older maps can be historical plat maps or the like for geographic areas. Furthermore, these older maps can be geo-referenced and scaled with respect to latitude/longitude coordinates and/or current maps (such as a USGS DOQ aerial map or other UTM or World File geo-referenced maps) using third party software such as ESRI ArcGIS or shareware programs like HyperCube that employs map layers, common points and morphing. Accordingly, a geographical location known for a current map can be tied to a corresponding location on an older map. Thus, a user will not only have the ability to scroll geographically to find geo-referenced content of interest, but the user will also have the ability to scroll through time to find such content. Tabs can be added to each displayed map that would allow the user to scroll back/forward in time to view older/newer maps for a given location. Thus, a user could access a 2009 photograph of the Smith family via a 2009 map of the Smith family's neighborhood/city/region, and to access a 1960 photograph of the Smith family, the user could navigate back to a 1960 map of that neighborhood/city/region. Also, links can be embedded in family tree information or a page such as the second "list" window displayed in the diagram above that would allow the user to trace the Smith family's geographic movements over time, as explained below.

Users of this system will also preferably have the ability to specify who of the other registered users will have access to their stored content. For example, users can designate access to their content by invitation only (such as by allowing other relatives who are registered users to access the content). Likewise, users can allow full public access to their content to all registered users. Such designations can be made on a file-by-file basis such that some of a user's content can be made public while other content will be available by invitation only. By creating groups of users who can access shared content, the website will be accessible to multiple social networks of users, some of which may have overlapping users (i.e., users who are members of more than one group). The website software can further be configured to detect when a user is a member of multiple groups. After detecting such a condition, the website can query group members as to whether their content is to be made available to members of the other group. In the event of receiving user authorizations to link content, the two groups' content files can then be made available across groups. The inventor believes that this feature can be particularly advantageous in connection with building family trees when different branches of a family with a common ancestor are located, thereby allowing families to expand their genealogical information organically. Preferably, the genealogical information is stored by the database in accordance with the well-known GEDCOM format to enable third party genealogy software to process genealogical information and build family trees.

Thus, through a preferred embodiment, the website permits users to build a comprehensive database in which families, neighbors and any other users can exchange personal photographs, video and other content in a new and interesting manner.

FIG. 3(*a*) illustrates exemplary data structures that can be stored in the database in association with each other for access through a map interface. For example, marker data structures 302 can be associated with geographic locations. Media data structures 304 (where the media may take any of a number of forms such as images (e.g., photographs, video, document images, etc.), audio, etc.) can be associated with markers data structures 302, thereby associating the subject media data structure 304 with the location corresponding to the associated marker data structure 302. People data structures 300 identify people and can be associated with media data structures 304, thereby associating the person corresponding to the subject people data structure 300 with not only the media corresponding to the associated media data structure 304 but also the location corresponding to the marker data structure 302 associated with the associated media data structure 304. Through these association chains applied to numerous data structures in the database, users can not only learn vast amounts of information about people and places but also create new associations in response to what was learned in a collaborative manner that truly leverages the power of networks.

It should further be understood that the association chain shown in FIG. 3(*a*) (i.e., location to media to person) is exemplary only. For example, a practitioner may also or choose to further permit direct associations between people data structures 300 and marker data structures 304.

FIG. 3(*b*) illustrates another exemplary embodiment where user data structures 306 are also employed. A user data structure 306 corresponds to a system user (e.g., someone with a username) who creates various people, marker and/or media data structures. As such, a particular user data structure 306 may have associations with any or all of one or more people data structures 300, marker data structures 302 and media data structures 304 (for example, by creating those data structures and adding them to the database 100).

If desired, a practitioner may choose to employ a plurality of different types of people data structures, as exemplified by FIG. 3(*c*). A first type of people data structure 300*a* can include brief summary information about a person (such as the subject person's name, any associations to media data structures, and an identification of the "owner" (i.e., the user who created the subject person data structure 300*a*)). In an exemplary embodiment, the MyPeople data structures 300*a* are accessible to all users of the system. However, this need not be the case. For example, if desired, a MyPeople data structure 300*a* can be associated with a privacy setting that would control whether the subject MyPeople data structure is publicly available to all users, completely private or available to only select other users (e.g., users who are members of a select user group with the owner).

A second type of people data structure 300*b* can include more detailed information about a person, such as information that can be characterized as genealogical information. This second type of people data structure 300*b* can thus also be referred to as a genealogical data structure. To identify this genealogical significance, such people data structures 300*b* can be referred to as "MyGedcom" data structures, where Gedcom refers to the well-known Genealogical Data Communication standard for exchanging genealogical information between different software applications. While Gedcom is described herein as a preferred standard for formatting genealogy information in a data structure, it should be understood that other formatting standards could be employed if desired. Furthermore, the MyGedcom data structure 300*b* may also employ more data fields and associations than would be employed by a conventional Gedcom record, as explained herein.

A MyGedcom data structure 300*b* can be associated with data such as the subject person's name, identifiers/links for any parents and children (preferably links to other MyGedcom data structures for those parents and children, where in the aggregate these links serve to create a family tree), data for various life events (e.g., births, deaths, education, etc.), location identifiers for these life events, temporal data that identifies when various ones of these life events occurred, one or more media data structures, and the "owner" for the MyGedcom data structure 300*b*. Moreover, in an exemplary embodiment, a given MyGedcom data structure 300*b* need not have data for all of these associations depicted in FIG. 3(*c*) as there may be many holes in a MyGedcom data structure in situations where the owner does not know enough information about the subject person.

In an exemplary embodiment, the MyGedcom data structures 300*b* are only accessible to the owner or to other users selected by the owner (e.g., users who are members of a select user group with the owner). However, this need not be the case. For example, if desired, a MyGedcom data structure 300*b* can be associated with a privacy setting that would control whether the subject MyGedcom data structure is publicly available to all users, completely private or available to only select other users.

A practitioner can also choose to employ a third type of people data structure 300*c*. In the example of FIG. 3(*c*), in an embodiment where the MyGedcom data structures 300*b* are limited access data structures, this third type of people data structure 300*c* can be a MyGedcom data structure that has been made publicly available. Such a data structure 300*c* can be referred to as a "Published Gedcom" data structure. The general data associations for a Published Gedcom data structure 300*c* are generally the same as those for the MyGedcom data structure 300*b*, once again with the different in this exemplary embodiment being that the Published Gedcom data structure 300*c* is accessible to all users of the system. As such, this third type of people data structure 300*c* can also be referred to as genealogical data structure.

Any of, a number of criteria could be employed to govern when a MyGedcom data structure 300*b* is also made into (or converted into) a Published Gedcom data structure 300*c*. For example, the website can automatically convert a MyGedcom data structure 300*b* into a Published Gedcom data structure 300*c* if one or more conditions are met. As an example, the system can automatically perform such a conversion if the subject MyGedcom data structure 300*b* has (1) an associated birth event date, (2) an associated death event date, (3) an associated death event location, and (4) there is at least one media data structure associated with the subject MyGedcom data structure 300*b*. However, the system could employ more, fewer or different criteria for automatically converting MyGedcom data structures into Published Gedcom data structures. For example, if desired, the system can permit the owner to convert a MyGedcom data structure 300*b* into a Published Gedcom data structure 300*c* on request by the owner if desired.

As shown in FIG. 3(*c*), users can create associations between MyPeople data structures 300*a* and MyGedcom data structures 300*b* if desired, as explained below. Users can further create associations between MyGedcom data structures 300*b* and Published Gedcom data structures 300*c* if desired, as explained below. Further still, if desired, the system could also be configured to permit users to create direct associations between MyPeople and Published Gedcom data structures 300*a* and 300*c*.

FIG. 3(*d*) depicts an exemplary marker data structure 302. The marker data structure preferably comprises associations with a label (for display on a marker icon when viewing the marker on a map), various type classifications (e.g., a view type, type and subtype which correspond to progressively narrower classifications for the marker), location data that defines a geographic location for the marker, information relating to a default picture (which can be displayed in a bubble/balloon or the like when a user hovers over a marker on the map), associations with other media data structures, associations with one or more groups of markers, and an owner. The location data used to define the marker's geographic location can be varied depending upon the desires of a practitioner. For example, the location data can be one or more of the following: an address, a zip code, a latitude/longitude coordinate, a city, municipality or other geopolitical division, a county, etc. The system can determine this geographic location from user input directly (e.g., the user enters an address or the like for a marker) or indirectly (e.g., the user clicks on a particular location displayed on a map, and where software translates the particular location to an address or latitude/longitude coordinate).

FIG. 3(*e*) depicts an exemplary media data structure 304. The media data structure preferably comprises a media file. This media file may represent any of a number of media types. For example, the media can be image data (whether the image take the form of photographs, document images, video, etc.) in any of a number of file formats (e.g., jpegs, pdfs, gifs, bitmaps, mpegs, etc.), audio data in any of a number of file formats, etc. The media data structures 304 also preferably comprise associations with a label (for display on a full view, thumbnail or the like when viewing a summarization or other display of the media data structure on the website), various type classifications that describe the media file (e.g., a subject and topic which correspond to progressively narrower classifications for the subject media file as well as an environment identifier that further describes what is depicted by the media file), credit data that identifies who should be credited with creating the media file, temporal data which identifies a time frame with respect to the media file (e.g., a year that media file was created, a range of years corresponding to the media file), a privacy setting (which governs who may discover and access the media data structure), one or more user notes that may provide additional information relating to the media file, associations with one or more user groups, associations with one or more groups of markers, and associations with one or more people data structures, and an owner. It should be understood that the temporal data can be represented in any of a number of ways, whether it be only years, a month and year, a particular date and year, or ranges thereof, etc.

FIG. 3(*f*) depicts an exemplary user data structure 306. The user data structure preferably comprises data that identifies a particular user's name, gender, current address, any previous address(es), temporal data for the current and previous addresses (e.g., User X lived at Address Z from 1975 through 1978), an email address for the user, a username and password for the user, a privacy setting that controls to what extent other users can discover or communicate with the user through the website, a birth year for the user, etc. The user data structure may further comprise associations with one or marker data structures for which the user is an owner, associations with one or more media data structures for which the user is an owner, associations with one or more people data structures for which the user is an owner, associations with one or more groups of users, associations with one or more groups of markers, and view history data (e.g., a history of marker views, media views, people views by the user).

It should be understood that the components of the marker data structures 302, media data structures 304 and user data structures 306 shown in FIGS. 3(*d*)-(*f*) are exemplary only and a practitioner may choose to design such data structures with more, fewer or different data components. Moreover, not all data structures of a particular type need to have the same data type components. For example, some marker data structures may comprise only a label and location data, some media data structures may not have an classification data, some user data structures may not have any address information, etc.

FIG. 3(*g*) illustrates an exemplary embodiment where a user is able to access a multitude of information in the database through a map interface that permits the user to access various geo-markers (e.g., marker data structures with an associated geographic location). Through these geo-markers and their associations (direct and indirect) with other data structures, users can discover vast amounts of information about people and places of which they were previously unaware, as described herein. In the FIG. 3(*g*) depiction, it can be seen that the geo-markers accessed through the map interface provide the user with access to associated people data structures, family tree data structures (e.g., the genealogical data structures of FIG. 3(*c*)) and various media data structures.

FIG. 3(*h*) provides an example of the content discovery capability of embodiments described herein. In this example, it can be seen that people data structure P1 is associated with media data structures M1, M2 and M3. Furthermore, people data structure P2 is associated with media data structures M4 and M5 while people data structure P3 is associated with media data structures M6, M7, M8 and M9. Also, M1 is associated with location L1 (e.g., through a marker data structure), M2 is associated with location L2, M3, M4 and M6 are associated with location L3, M5 is associated with location L4, M7 is associated with location L5, M8 is associated with location L6 and M9 is associated with location L7. Further still, in this example, P1 is owned by User X, P2 is owned by User Y and P3 is owned by User Z. Unbeknownst to User X and User Y, P1 and P2 correspond to the same person. This may arise in any of a number of situations. For example, in one scenario, P1 is User's X's father, but User Y only knew this person (P2 from User Y's perspective) as "Bob" who was a co-worker with User Y's father. Moreover, for this example, P1 and P3 will be two people who once worked together in an office (unbeknownst to User X).

FIGS. 3(*i*)-(*j*) illustrate a case study that provides a user with the following capabilities. With reference to these figures:

- Through selection of a marker at L3 via a map interface (the location of this father's workplace from 1985-1990), User X searches through all media associated with L3 and notices that his father appears in M4.
- Seeing that M4 labels his father as P2, User X searches for all media associated with P2 and also notices his father appears in M5.
- Recognizing that P1 and P2 are the same person, User X creates an association that ties P1 with both M4 and M5 (or ties P1 with P2), thereby tying his father to more media than User X was previously aware of.

That is, FIG. 3(*i*) depicts a case study for the exemplary website described herein where User X selects, via a map interface, a marker data structure for L3 (which User X knows to be his father's (P1's) old workplace). In response to this marker selection, User X is accesses all accessible media data structures associated with L3. This includes M3, M4 and M6 (possibly as well as others not shown). Upon accessing M4 which is an old photograph submitted by User Y to the database, User X notices that his father (P1) is depicted in that old photograph. User X further sees through the website that M4 has been tagged with an association to "Bob" (P2), which happens to be his father's first name. At this point, User X can access website functionality (examples of which are described below) to search the database for all media associated with P2. This search further yields M5, which also depicts User X's father as "Bob". From this information, User X deduces that "Bob" is in fact his father, thus P1 and P2 are referring the same person. In response to this deduction, User X can employ website functionality that either (1) creates an association that ties P1 with M4 and M5 (see FIG. 3(*j*) which shows new data association links 310 tying P1 with M4 and M5), or (2) creates an association that ties P1 with P2 (see FIG. 3(*k*) which shows a new people association link 312). By making these associations, User X is able to further bring new media (M4 and M5) into association with the people data structure P1 he has created for this father.

FIGS. 3(*l*) and (*m*) illustrate another case study that provides a user with the following capabilities. With reference to these figures:

- Through selection of marker at L3 via the map interface, User X searches through all media associated with L3 and notices that his father also appears untagged in M6.
- User X tags M6 to create an association between P1 and M6.
- Seeing that M6 is associated with P3, User X wonders if P3 has any other connections with his father and searches for all media associated with P3. Doing so, User X notices his father appears in M7 (but not M8 or M9).
- User X tags M7 to create an association between P1 and M7.
- User X thus further leverages L3 to and its data associations to discover not only two media items with his father that were previously unbeknownst to him, but also learns that his father was a work colleague of P3 and that his father has a connection with L5.

That is, FIG. 3(*l*) depicts a further case study for this exemplary data set. Through the L3 selection, User X also gains access to M6. M6 is a photograph of three people standing in front of an office building. Only one person is identified in the photo through the website, and this person (P3) is unknown to User X. However, User X does recognize that his father appears in the photograph as an unidentified person. In response to this recognition, User X can use the website to tag M6 with an association to P1. Furthermore, using the website, User X can further investigate any other connections P3 may have had to his father by searching the database for all media data structures associated with P3. In response to this search, User X is able to access M7, M8 and M9. In reviewing these media data structures, User X also recognizes his father as an unidentified person in a photograph for M7. Accordingly, User X can also tag M6 with an association to P1 via the website. In doing so, User X is able to further associate his father's people data structure P1 with two more media data structures (M6 and M7) of which he was previously unaware as well as learn that his father had a connection with location L5 of which he was previously unaware (see FIG. 3(*m*) showing new data association links 310 tying P1 with M6 and M7). Should User X wish, he could further investigate his father's trail through the website, for example by searching for all media data structures associated with L5 (which may yield more media depicting his father).

Therefore, the examples of FIGS. 3(*h*)-(*m*) demonstrate the power of information discovery provided by the data structure associations of an exemplary embodiment of the invention. Through a location-based investigation of L3, User X was able to discover and bring at least 4 new media data structures and one new marker data structure (for L5) pertaining to his father into association with his father's people data structure. However, it should be understood that this case study is exemplary only and many other flexible investigation techniques can be employed by users to discover more information about people and places of interest, as described below.

Exemplary Website Design:

Turning to an exemplary website that a practitioner may employ to provide users with access to database 100, a number of GUIs for such a website will be described.

Figure 4A:
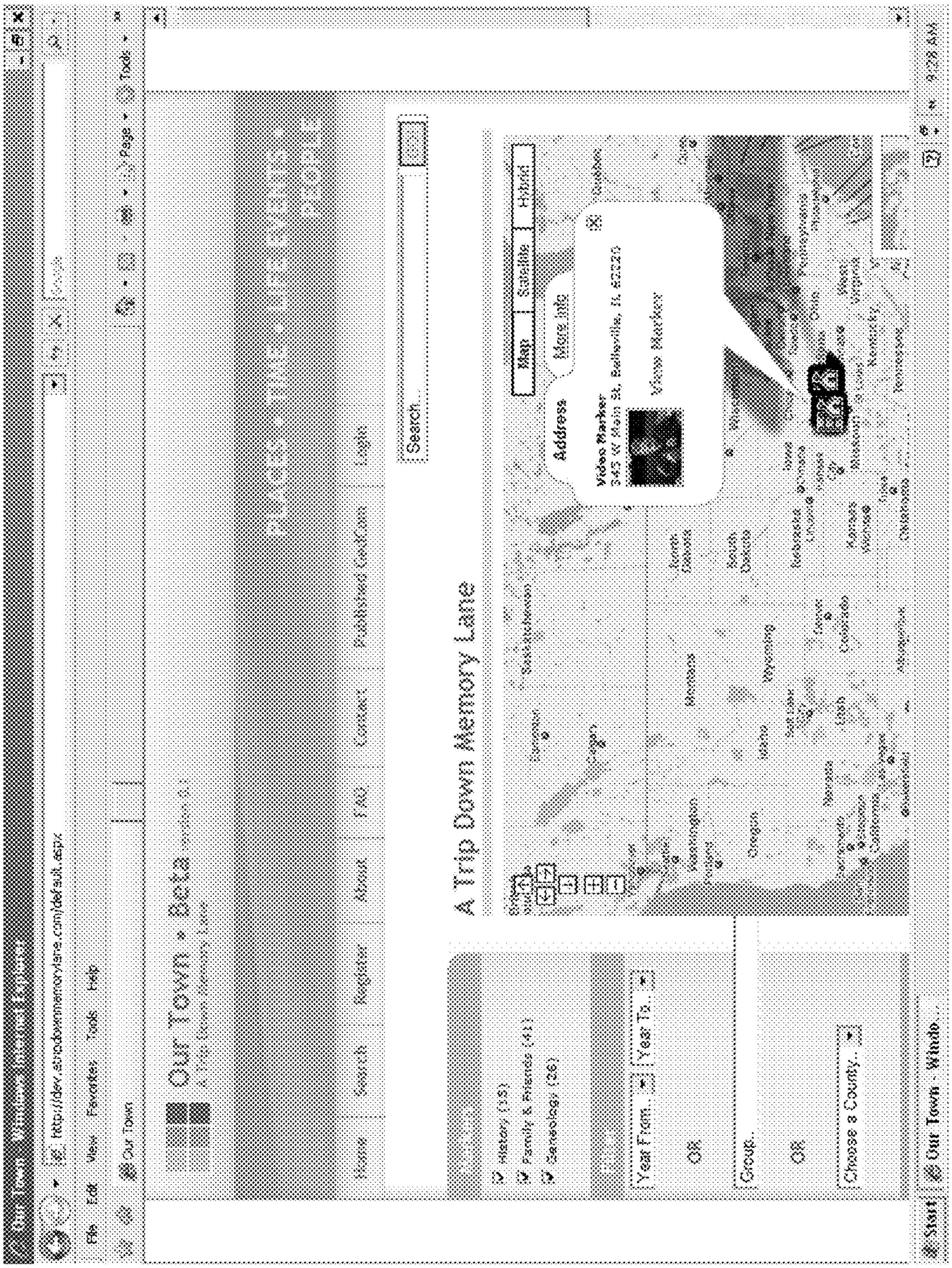
FIGS. 4(*a*) and (*b*) illustrate an exemplary home page GUI.
Figure 4B:
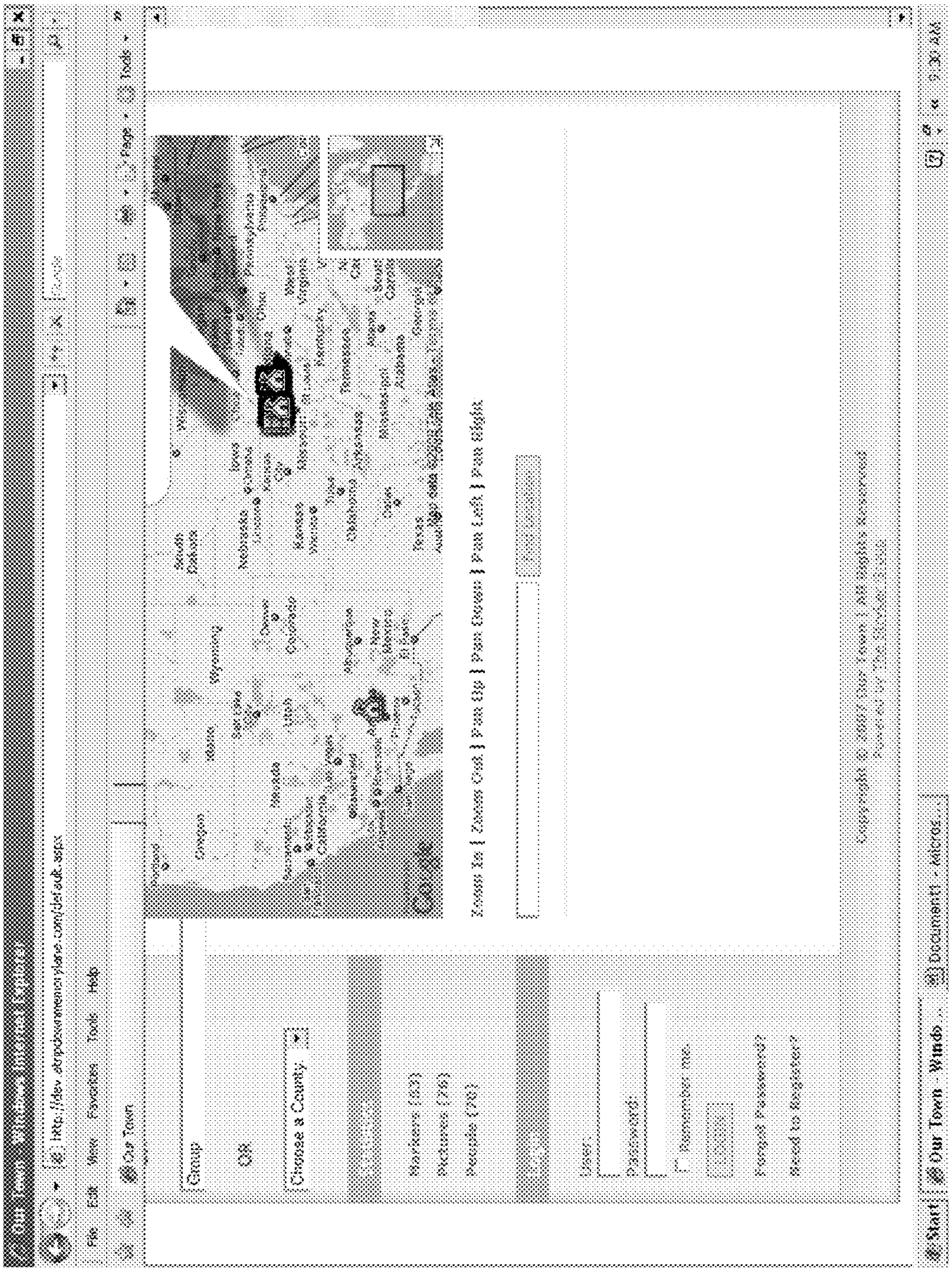

FIGS. 4(*a*) and (*b*) illustrate an exemplary home page GUI for an exemplary embodiment. The home page GUI includes a map with various well-known zooming and scrolling features. Mapping functions can be provided by interfaces to well-known mapping application programming interfaces (APIs) such as those relating to the Google Maps service and the Bing Maps service. To the left of the map display, the GUI of FIGS. 4(*a*) and (*b*) includes a section for user input. Through this section, the user can define the type of content to be accessed via the map display. For example, the user can constrain the map to display only certain types of marker icons (e.g., marker icons having a view type corresponding to history-related content, family and friends-related content, genealogy content, etc.). Furthermore, the user has the option of filtering the map display by year (or a range of years). Furthermore, the user can also be given the option to filter content to only the content associated with one or more user-defined marker or media groups. Further still, the user can be given the option to filter content by particular geographic regions (e.g., by county, zip code, or other regional identifier).

The GUI also preferably includes a section through which a user can either log-in to the website or create a user registration with the website. Standard techniques for user log-in and registration can be employed, including the use of cookies to recognize returning registered users so as to obviate the need for a user to key in a user name and password each time he/she accesses the website.

Figure 5A:
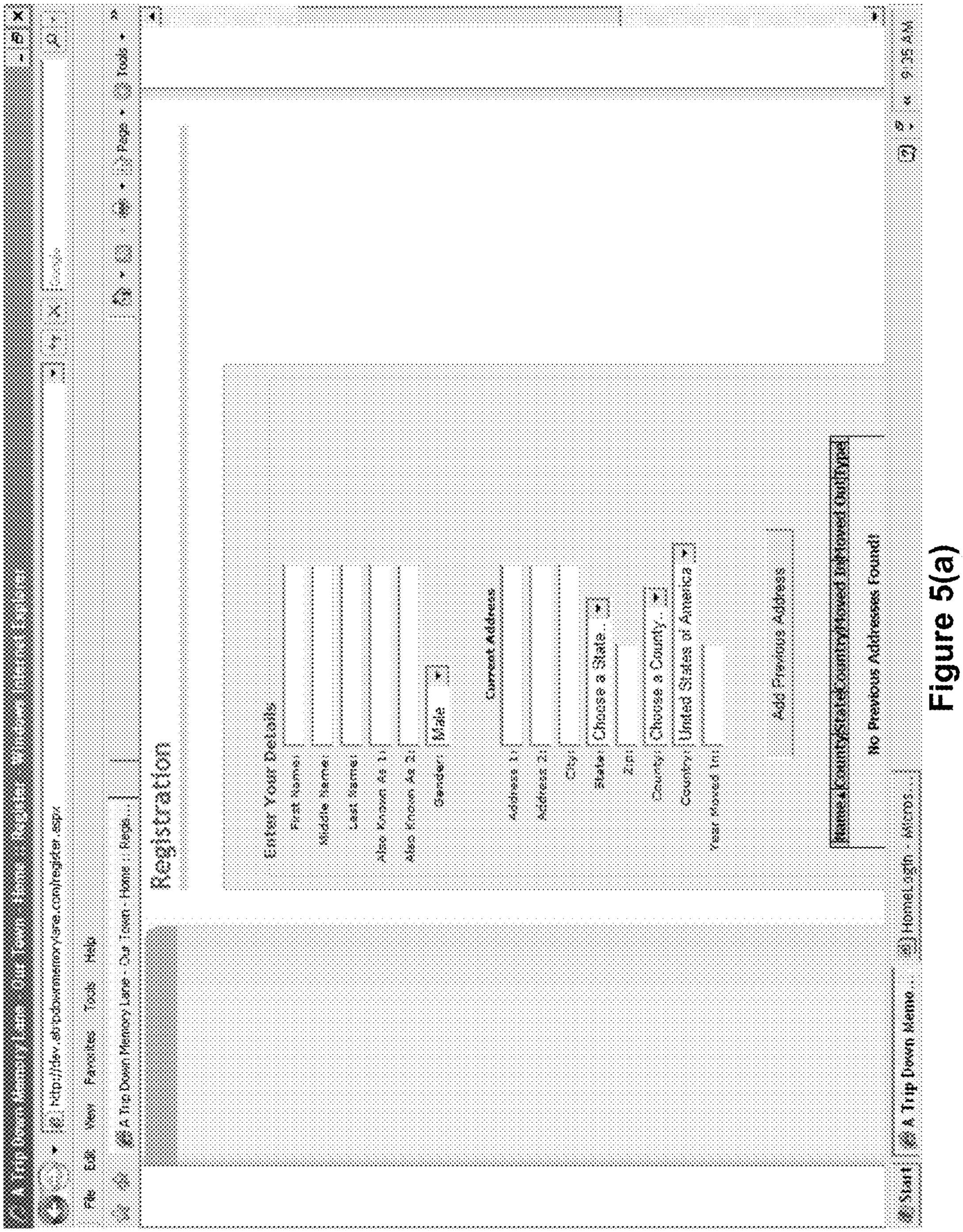
FIGS. 5(*a*) and (*b*) illustrate an exemplary user registration and profile GUI.
Figure 5B:
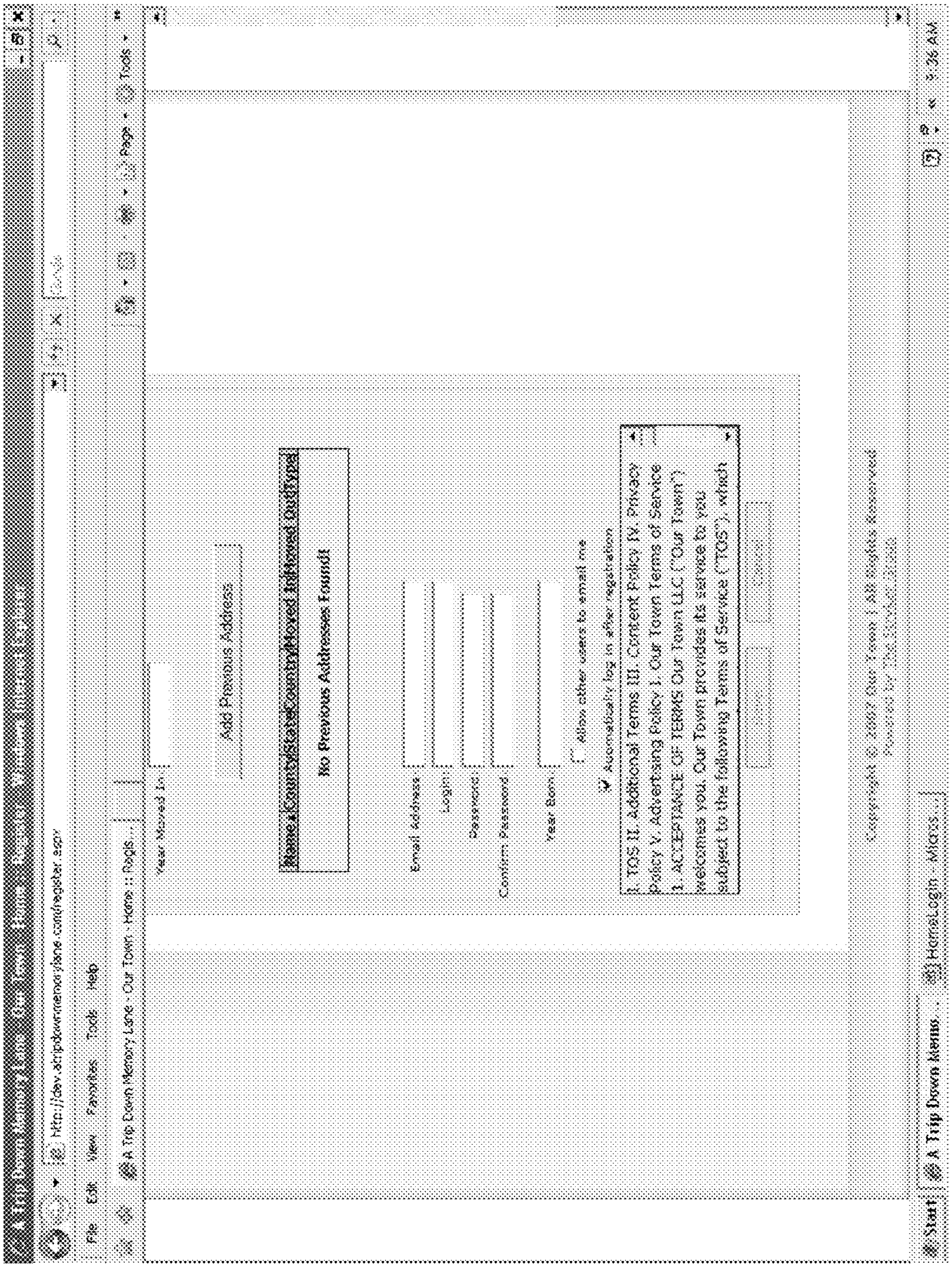

FIGS. 5(*a*) and (*b*) illustrate an exemplary GUI through which a user can register with the website. Preferably the user provides information such as those data fields shown in FIGS. 5(*a*) and (*b*) to register with the website (see also the user data structure 306 shown in FIG. 3(*f*)). A practitioner may choose to require more, fewer or different pieces of information from a user to complete a registration. As can be seen, these input fields generally correspond to several of the components of a user data structure 306 as shown in FIG. 3(*f*).

Figure 7:
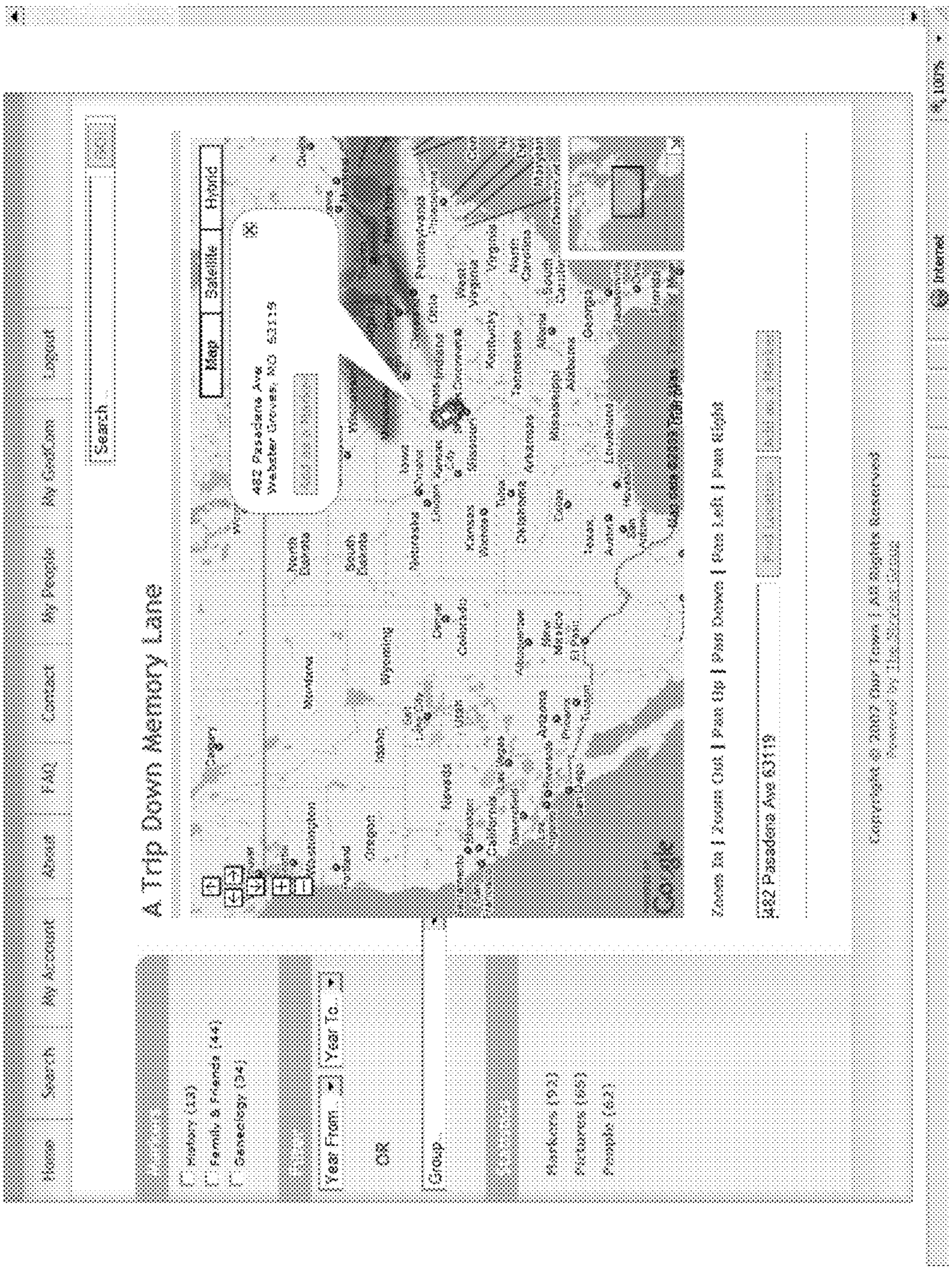
FIG. 7 illustrates an exemplary GUI through which a user can initiate the addition of a marker to the database.
Figure 8A:
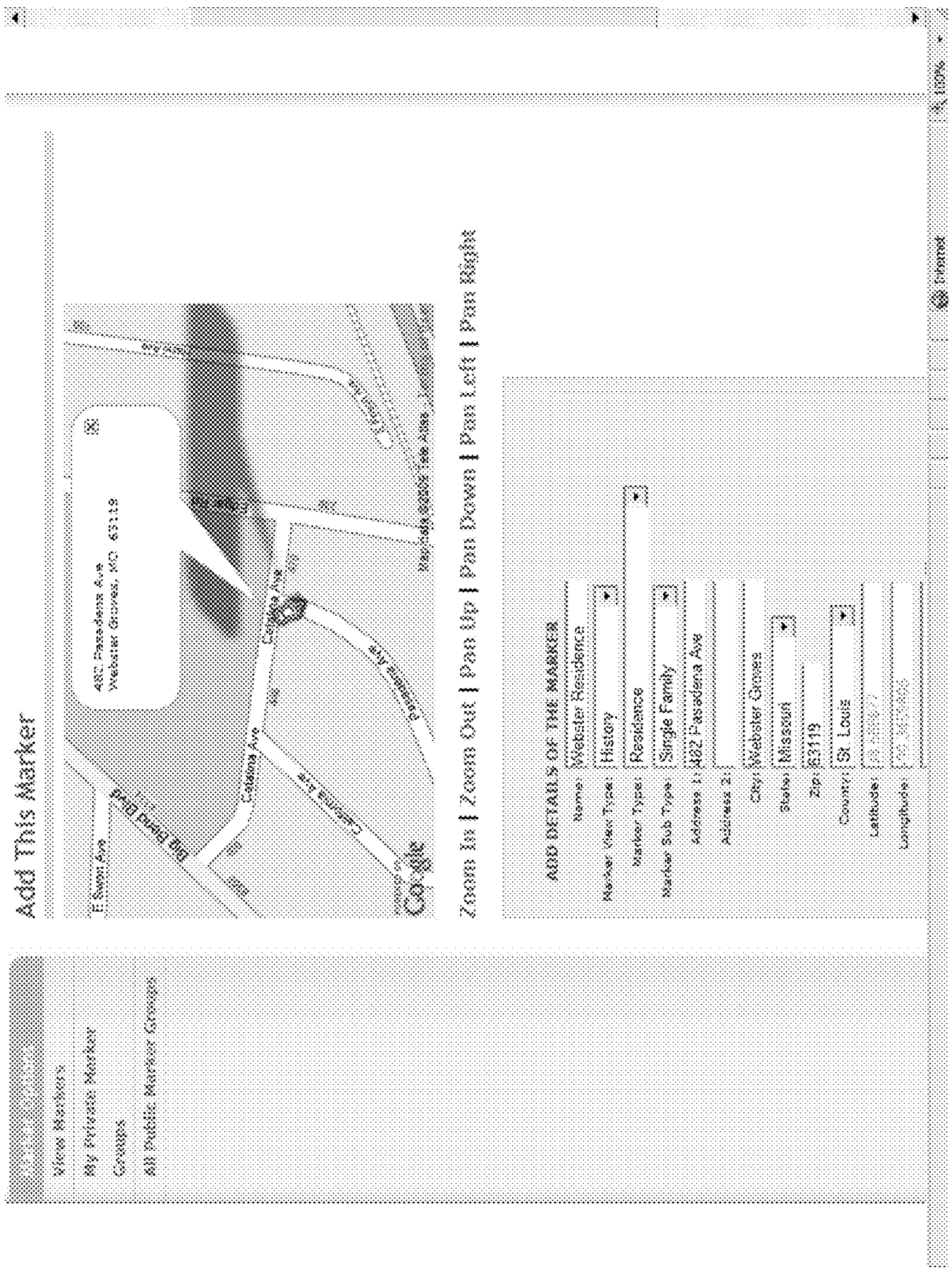
FIGS. 8(*a*) and (*b*) illustrate an exemplary GUI through which the user can tag the marker with various pieces of information.
Figure 8B:
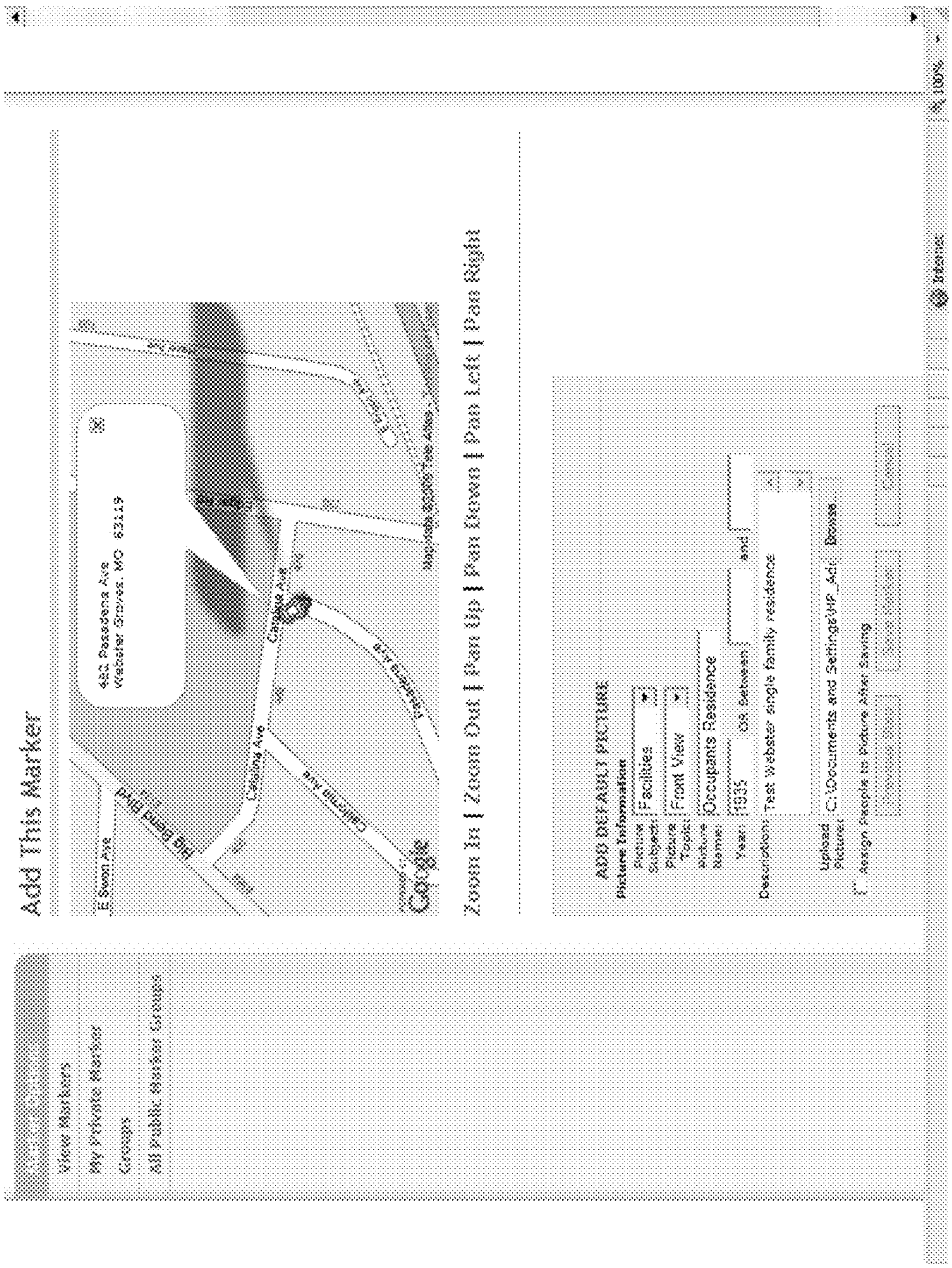
Figure 8C:
Figure 8D:
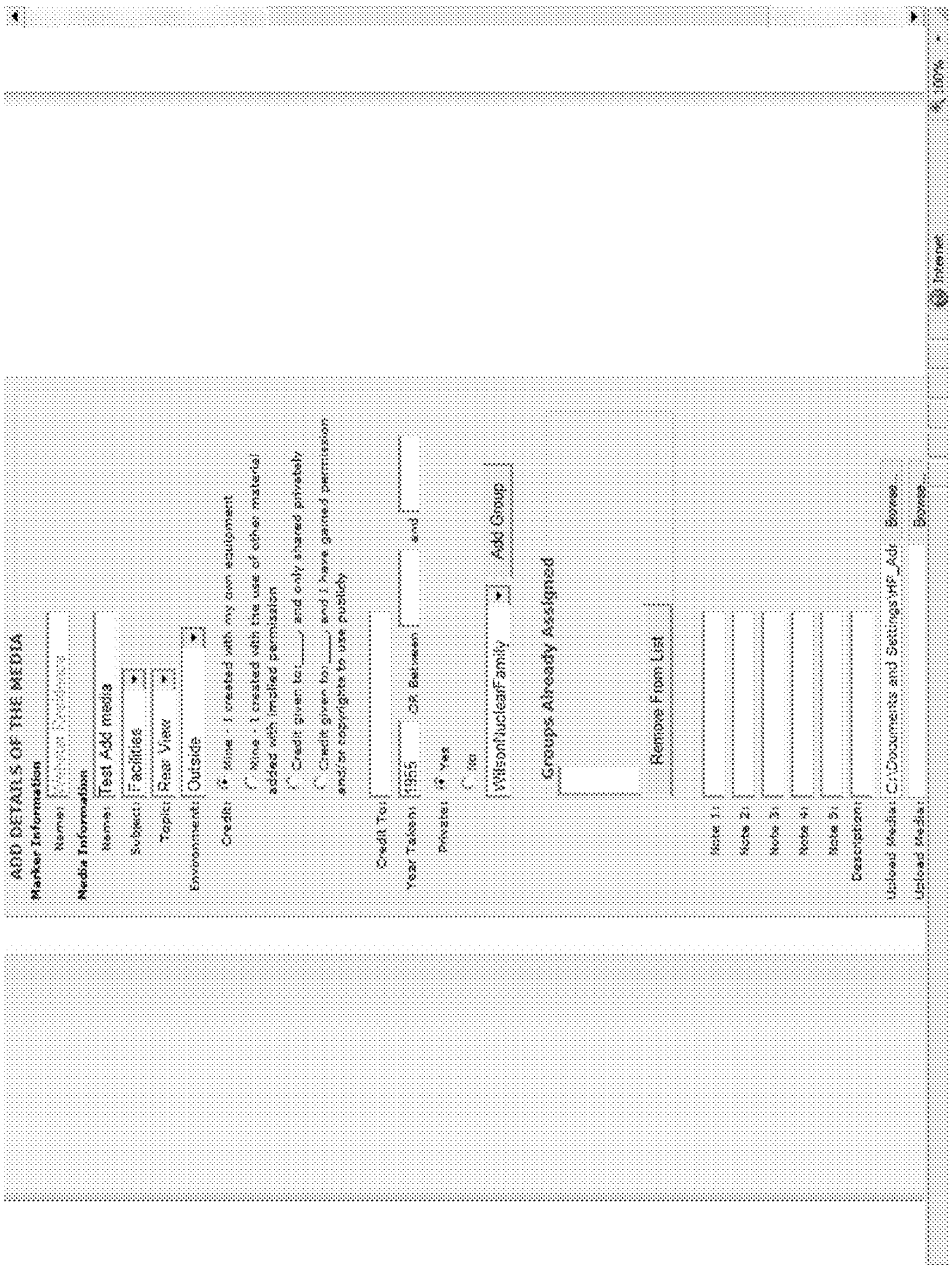

FIG. 7 illustrates an exemplary GUI through which a user can initiate the addition of marker content to the database 100. This GUI is similar to the home page GUI of FIG. 4 and can serve as the home page for a registered user. Relative to FIG. 4, it can be seen that the GUI of FIG. 7 includes more user-selectable options in a navigation bar at the top of the page (e.g., user-selectable options relating to "My Account", "My People", "My Gedcom" and "Published Gedcom" as explained below. A user can enter location data such as an address in a data entry field on the GUI to define a geographic location. By selecting an “Add as a Marker” button, the system can begin the process of adding a marker associated with the defined geographic location to the database. It should be understood that location data other than addresses can be used to define geographic locations as previously discussed. For example, the user can specify street intersections in a particular city or zip code. Further still, rather than keying in the location data, the user could define the geographic location using the map (for example, by zooming the map down to the general area of interest and performing a system-recognized click action to identify a particular location as the defined geographic location).

In response to user selection of the “Add as a Marker” button, the exemplary GUI of FIGS. 8(*a*) and (*b*) is preferably displayed. This GUI may optionally display the defined geographic location for the marker on a map to permit the user to confirm that the marker is properly positioned. Furthermore, the GUI of FIGS. 8(*a*) and (*b*) is preferably configured to permit the user to tag the marker with various pieces of information. That is, through the exemplary GUI, the system receives data from the user to be associated with the marker. The user can specify a name for the marker. The user can also specify a view type for the marker (preferably via a drop down menu of pre-existing view type choices). Exemplary classifications for view type include (1) history, (2) family and friends, and (3) genealogy. However, it should be understood that more, fewer or different view types can be employed. By associating markers with view types, the user can control what markers are presented on a map via input from the home page or similar GUI where the user can filter the marker displays by view type criteria (see the history, family/friends, genealogy options in FIGS. 4 and 7).

Other user input fields in FIGS. 8(*a*) and (*b*) may generally correspond to the data components of the marker data structure 302 shown in FIG. 3(*d*). Preferably, the user is able to populate these data fields with selections from a list of pre-determined options for those data fields via drop-down menus or the like. Examples of predetermined options for these fields are listed in the exemplary administrative GUIs discussed below and shown in the figures. However, if desired, the GUI could also be configured to permit the user to enter a free-form description of fields such as the marker type.

If the user defined the geographic location by address input in FIG. 7, the address fields for the marker in FIG. 8(*a*) are preferably pre-filled based on the user-specified address. However, if the user specified the geographic location by other means, the address fields can be left blank for the user to fill in if known. Preferably address fields are street address, city, state, zip code and county. The latitude and longitude fields are preferably pre-filled based on the location data input via FIG. 7. Conventional mapping techniques can be employed to determine the latitude and longitude coordinates for a specified location.

The portion of the GUI shown in FIG. 8(*b*) permits the user to associate a media file such as a photograph with a marker to be the default visual representation of the marker in a thumbnail view or the like. The photograph can be uploaded to the database for later access by a user of the website. Through the GUI, the user can associate various data with the photograph. For example, the user can associate a subject and topic with the photograph (preferably via a drop-down menu of pre-existing subjects and topics, options for which are listed and shown below in connection with the administrative GUIs).

Further still, the user can specify a name for the photograph and further tag the photograph with a year (or range of years). The GUI can also be configured to receive free-form user input that describes the photograph. If the photograph includes any people, and the user wants to identify the people in the photograph, the user can check the “Assign People to Picture After Saving” option to initiate a tagging process described below in connection with FIGS. 31(*a*)-(*d*).

To identify the photograph to be uploaded and associated with the marker and with the data entered in the GUI of FIG. 8(*b*), the user can specify the file path and file name for the photograph. If these are not known, the user can select the “Browse” button to look within the computer’s file system for the photograph.

After completing the desired data inputs in the GUI of FIGS. 8(*a*) and (*b*), the user can add the marker data structure (including any associated data such as the default photograph) to the database. If a default picture was tied to the marker data structure, the data corresponding to this default picture can be stored in the database as a media data structure associated with the subject marker data structure.

FIG. 8(*c*) illustrates an exemplary GUI through which a user can view details for an added marker data structure. This GUI preferably provides a thumbnail view and a larger view of the default photograph associated with the marker. The enlarged view preferably displays the name for the photograph together with its associated year. The display may also identify the “owner” of the photograph, which shall refer to the user who submitted the photograph to the database 100.

The GUI of FIG. 8(*c*) also preferably includes a lower section that presents all other media data structures that are associated with the subject marker data structure. This presentation can be organized in any of a number of ways (e.g., thumbnail views of each media data structure, larger views of same, list views of same, etc.). In the example of FIG. 8(*c*), the user can switch between different views by selectable tabs as shown. An “Overview” tab can be selected to display a list of associated media in summary form below the tab. An “All Media” tab can be selected to display an enlarged view of all associated media below the tab as shown in FIG. 8(*c*). Further still, for media data structures having associated temporal data (such as a year or year range), a selectable tab can be provided for each year found in the associated media data structures. Upon selection of a tab corresponding to a particular year, the GUI presents an enlarged view of each media file corresponding to that year. This ability to filter media views by year can be effective in permitting users to quickly hone in on time periods of interest they may have with respect to a particular location.

Through a click action on a listed or displayed media item (e.g., by right-clicking on an enlarged view of a media file), or through a selectable “Edit Media” link like the one shown in FIG. 8(*c*), the GUI of FIG. 8(*d*) can be displayed. As can be seen, through this GUI, a user can add further data for association with a particular media data structure. This GUI preferably displays the name for the marker data structure associated with the subject media item in a read-only field. Furthermore, as can be seen in FIG. 8(*d*), the GUI permits the user to add/edit the exemplary fields for a media data structure shown in FIG. 3(*e*). Once again, drop-down menus can be used to provide users with a list of pre-determined options for various ones of these data fields (see the administrative GUIs shown in the figures and described below for exemplary options in this regard).

As indicated, the GUI of FIG. 8(*d*) permits the user to specify a privacy setting for the media item. This privacy setting will control how the media item can be viewed by other users of the website. If marked as private, the media item will be viewable only by the user. Optionally, this setting may also permit the media item to be viewed by other users who share a common user group with the "owner" for that media item. If marked as public (or non-private), the content item will be viewable by all users of the website. Optionally, the system may provide for three privacy settings, a first private level where only the "owner" has permission to view, a second private level where only the users who share a user group with the "owner" have permission to view (optionally set on a user group-by-user group basis), and a public level where all users have permission to view.

The GUI of FIG. 8(*d*) can also be configured to receive user input that associates the media item with a user group. As explained below, a user group is a collection of users who share certain media items. In the example of FIG. 8(*d*), the media item is to be associated with the "WilsonNuclear-Family" user group. A drop down menu can be used to list the user group options that are available for user selection. Preferably, this list is limited to user groups of which the user is a member, but this need not be the case. If the user wants to add the specified user group to the associations for the content item, he/she can select the "Add Group" button. The GUI can also list any user groups with which the content item is already associated. Each such listed user group can be selected by the user for de-association with respect to the content item via the "Remove From List" button.

If the user has any other information that he/she wishes to associate with the media item, a plurality of note fields for free-form user entry can be provided. For example, if the user wants to associate a website with a media item, the user can enter the Uniform Resource Locator (URL) for the website in one of the note fields. The website can be configured to include certain notes in a balloon summary of a marker data structure associated with the media item when the user hovers a cursor over the associated marker display, as discussed below in connection with FIGS. 9(*b*) and (*c*). Furthermore, the website can be configured to treat user entries in other note items as a user-defined "view type" or other classification for the associated marker data structure. This view type could then be added to the user's options of view type marker filtering on the map interface.

Lastly, the GUI of FIG. 8(*d*) can permit the user to specify the file name of the media item for the media data structure, a general function described above in connection with FIG. 8(*b*) and adding a default media item to a marker data structure.

Figure 9A:
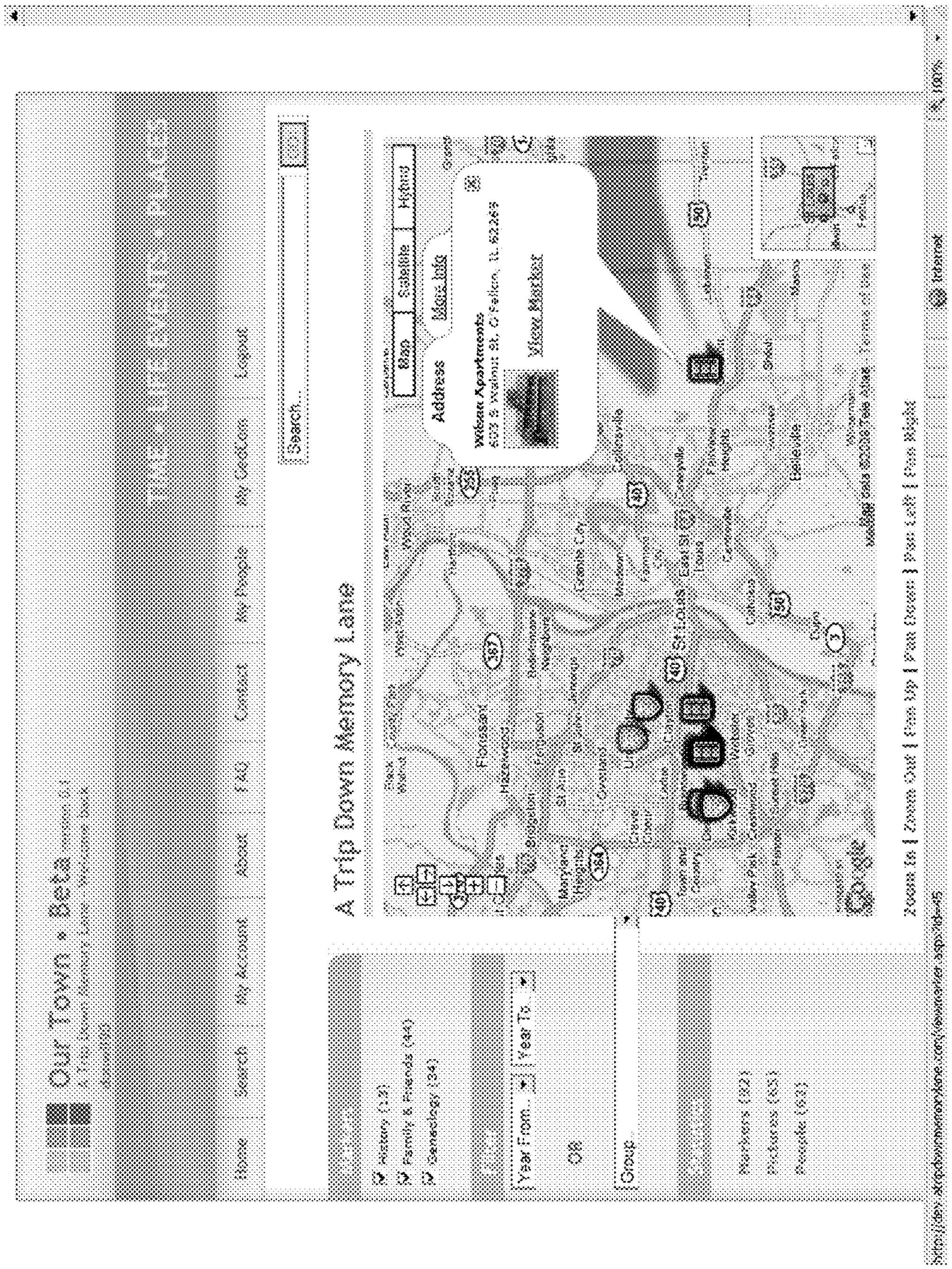
FIGS. 9(*a*) and (*b*) illustrate various exemplary views of marker icons that can be superimposed over maps.
Figure 9B:
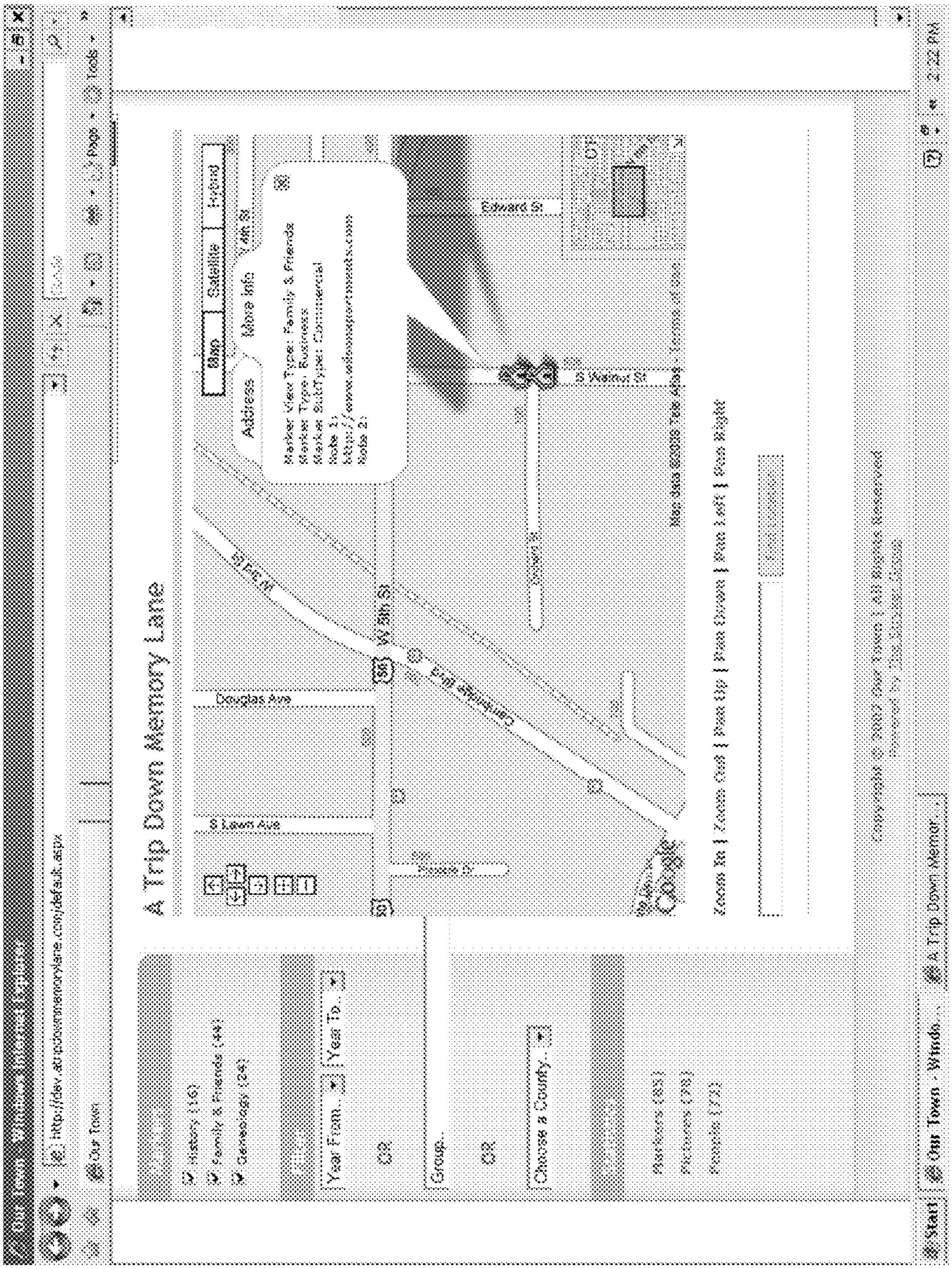
Figure 9C:
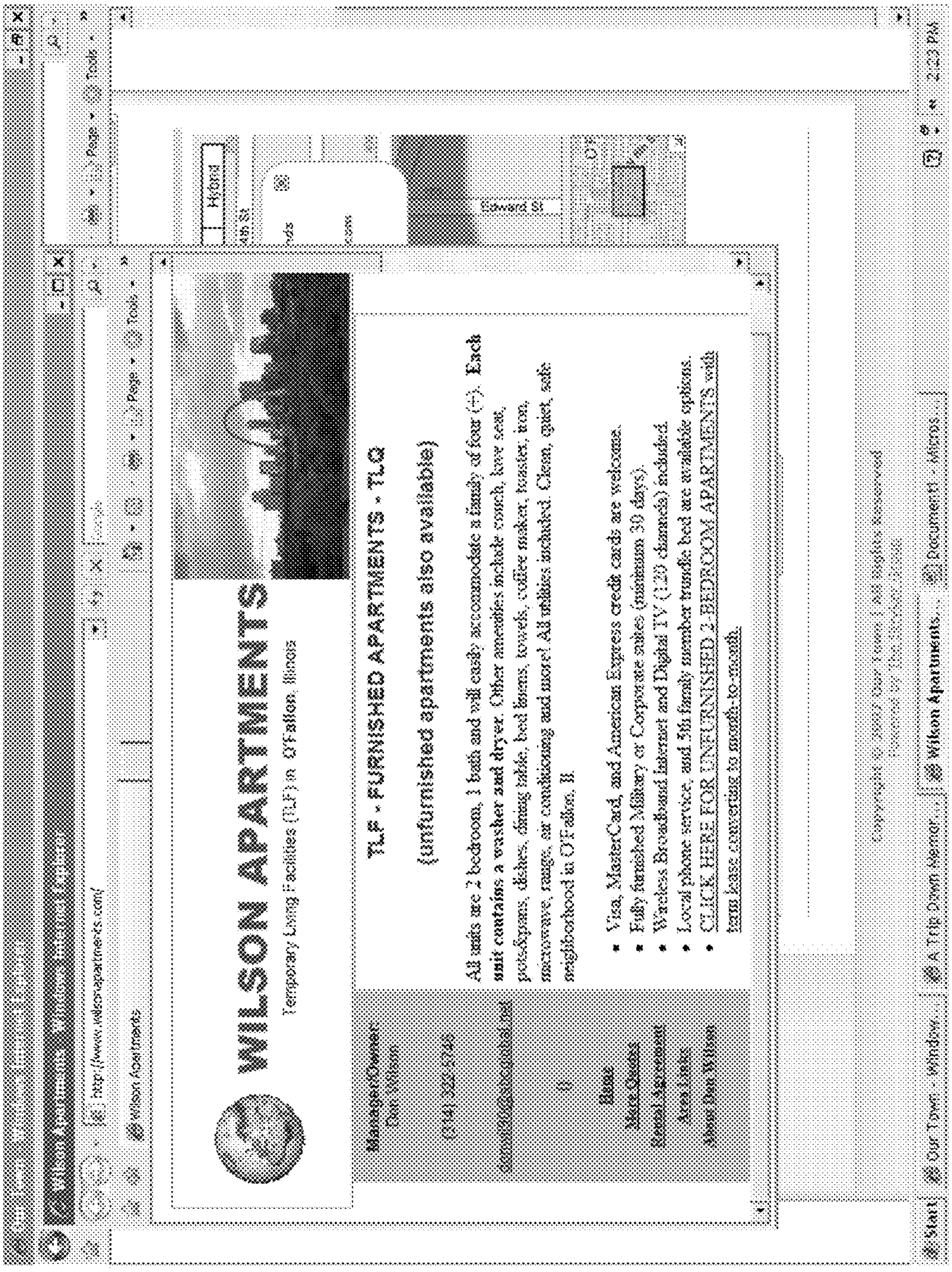

After a marker data structure has been created, the user can view an icon corresponding to that marker data structure via a map display. FIG. 9(*a*) depicts an example of this. Marker icons are displayed on the map at locations having an association with a marker. In response to the user clicking on a marker icon or hovering the cursor near a marker icon, a pop-up balloon can be displayed near the subject marker icon that provides additional information about the subject marker icon. This balloon preferably includes a thumbnail view of any media item associated with the marker and a user-selectable link to view fuller details about the marker and its associated media item(s). A similar example can be seen in FIG. 9(*b*) after a user has zoomed-in to a lower level of map detail. In this example, the marker has an associated website, for which a user-selectable link is included in the balloon. As indicated above, a user can add this website link to the marker icon display by identifying the website Uniform Resource Locator (URL) in a select note field of a media data structure associated with the subject marker (for example Note 1). Should a user select the website link, a popup window such as that shown in FIG. 9(*c*) can be displayed for the user to access the website corresponding to the website link. This can be a useful tool for users to drive business to a desired website and/or provide users with access to websites that may have additional information of interest to users (such as a website through which genealogy information may be accessed, as discussed below).

Figure 10:
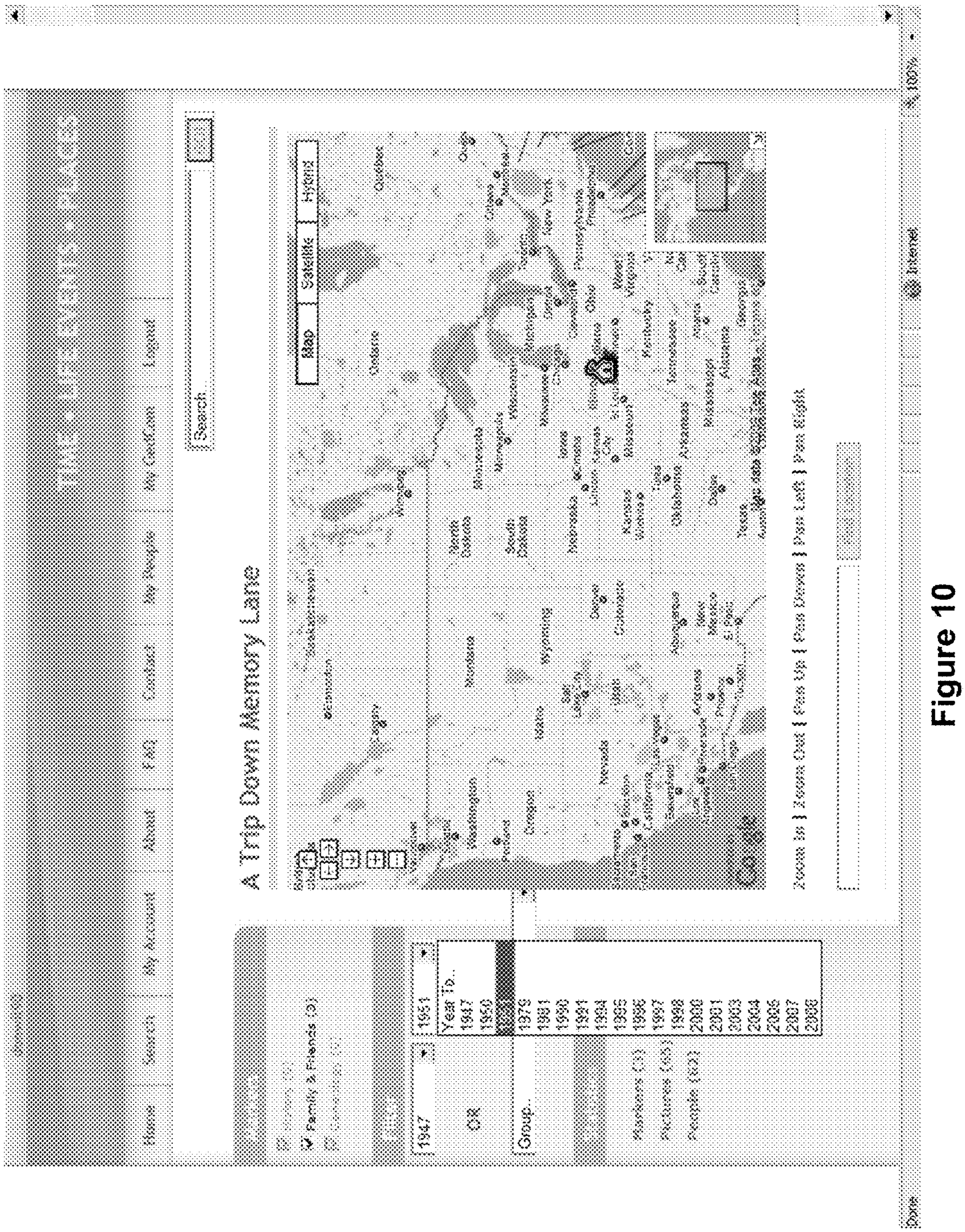
FIG. 10 illustrates an exemplary GUI that permits the user to filter marker and media views by year (or by a range of years)
Figure 11:
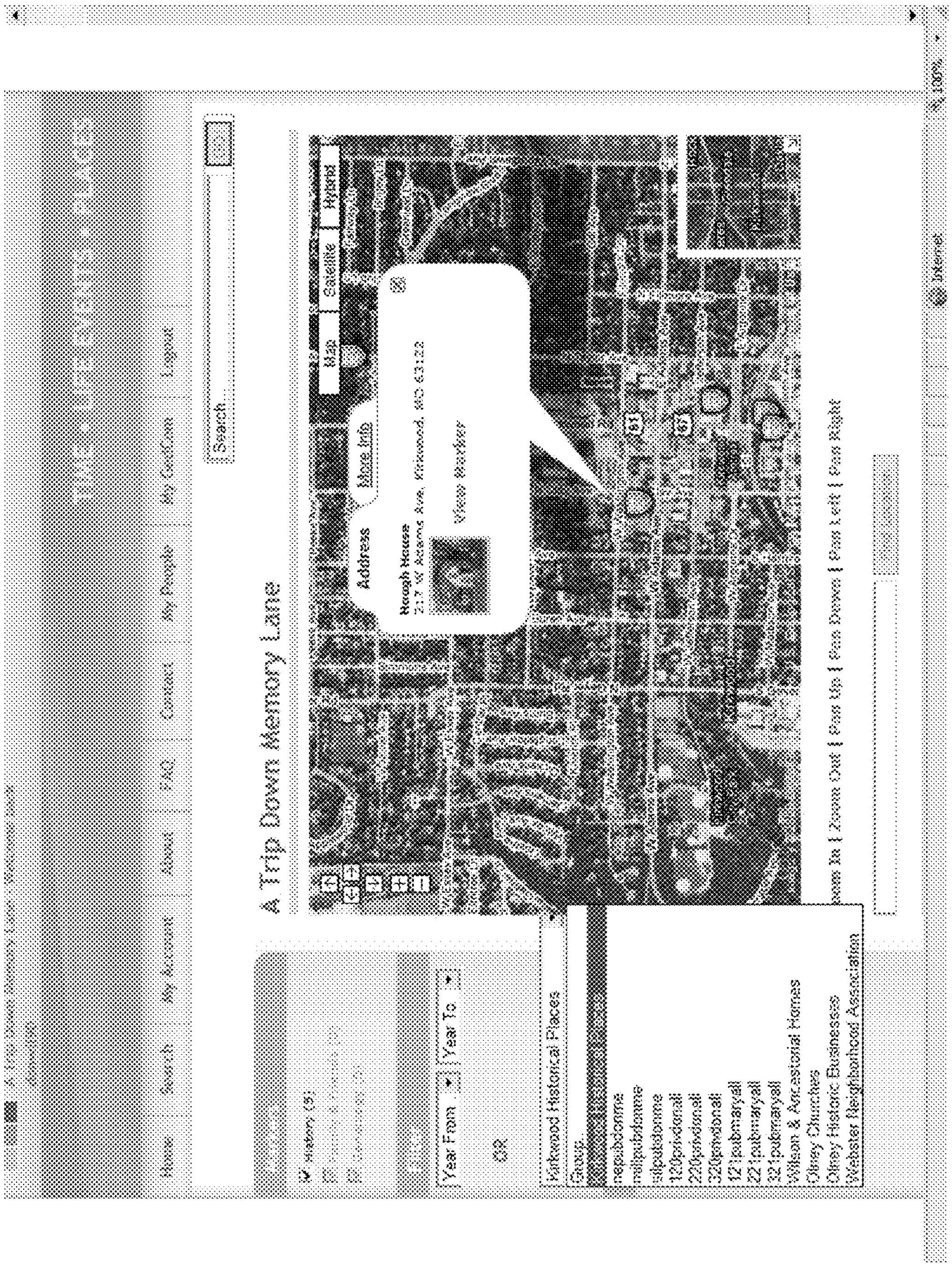
FIG. 11 illustrates an exemplary GUI that permits the user to filter marker views by group.
Figure 12A:
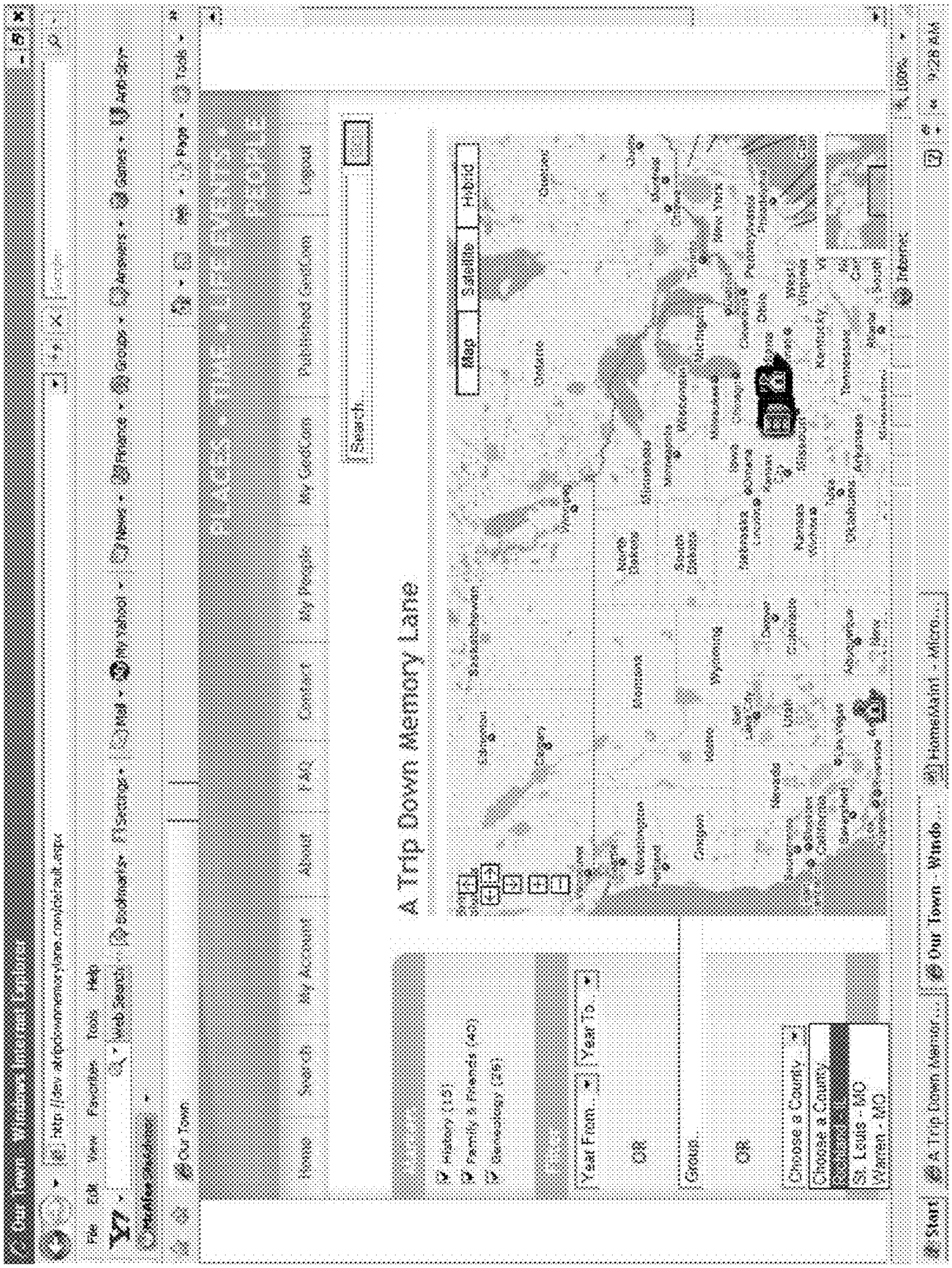
FIGS. 12(*a*) and (*b*) illustrate exemplary GUIs that permit the user to filter marker views by county.
Figure 12B:
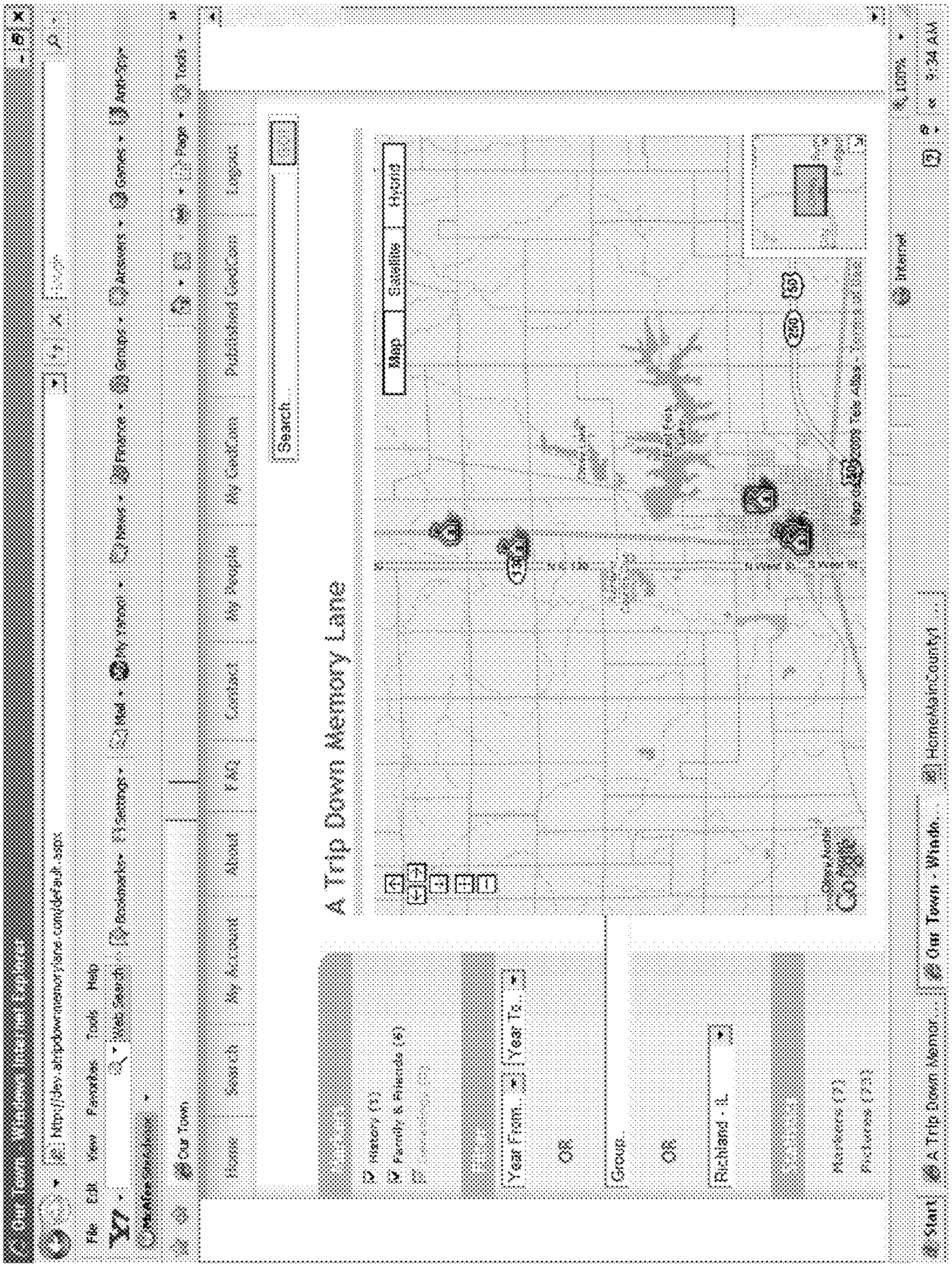

Thus, when a user accesses the website, he/she can view marker icons that are positioned on maps at positions corresponding to their associated geographic locations. The user has a number of options for filtering the views of markers that are presented on the map interface. FIGS. 10, 11, 12(*a*) and (*b*) depicts exemplary embodiments of such view filtering capabilities.

FIG. 10 depicts an exemplary GUI configured to filter the marker views on the map interface by a date (or range of dates). In the example shown, the dates are years. The GUI is configured to receive user input that defines a year (or range of years). Based on this input, the software retrieves markers associated with the specified year (or range of years) and displays only those markers on the map at their corresponding geographic locations. The software can determine whether a marker data structure is associated with the year(s) in question by checking to see which marker data structures are associated with media data structures associated with the subject year(s). Should a practitioner choose to directly associate marker data structures with temporal data, this operation could directly search the marker data structures rather than determine the time-appropriate marker data structures through a search of associated media data structures. Optionally, the map that is displayed in response to such input is also associated with the year (or range of years in question). Such a map optionally can be displayed in response to the user selecting a map zoom level of a predetermined amount (e.g., a low level scale that depicts street level details of an area). For example, a map such as the one shown in FIG. 6(*b*) can be displayed in response to the user zooming into the level shown in FIG. 6(*b*) and filtering the marker view to a year corresponding to the year for that map.

FIG. 11 depicts an exemplary GUI configured to filter the marker views on the map interface by a marker group. In the example shown, a drop down menu provides the user with predetermined marker group options. The GUI is configured to receive user input that selects a marker group from among these options. Based on this input, the software retrieves markers associated with the specified marker group and displays only those markers on the map at their corresponding geographic locations. The system can be configured to populate the drop-down menu with all public marker groups and all marker groups of which the subject user is a member. However, it should be understood that only the marker groups of which the subject user is a member could be included as options if desired.

FIGS. 12(*a*) and (*b*) depict an exemplary GUI configured to filter the marker views on the map interface by a geographic area. In the example shown, the geographic area is a county. However, it should be understood that this filtering operation can be performed using other geographic areas if desired. The GUI is configured to receive user input that defines a county. Based on this input, the software retrieves markers associated with the specified county and displays only those markers on the map at their corresponding geographic locations. Preferably, the map that is displayed in response to such input is also zoomed into a level and position roughly corresponding to the specified county. One option for receiving user input that defines the county is shown in FIG. 12(*a*). In this example, a drop down menu is populated with the counties that are associated with media data structures in the database. This can be a direct association where the media data structure identifies the subject county but could also be an indirect association where the software is able to map a latitude/longitude coordinate or other location identifier for a media data structure to a county. In response to selecting a county from this list (e.g., Richland County in Illinois), the resultant map display (see FIG. 12(*b*)) is positioned around that county and the markers associated with the county are included on the map. Another options is to permit the user to select a county by first specifying a state via a drop down menu and then selecting the county via another drop down menu that is pre-populated with all of the counties that are within the specified state. Further still, in embodiments where the database stores content in association with locations in multiple countries, a country identifier could also be added to the filter.

Figure 13A:
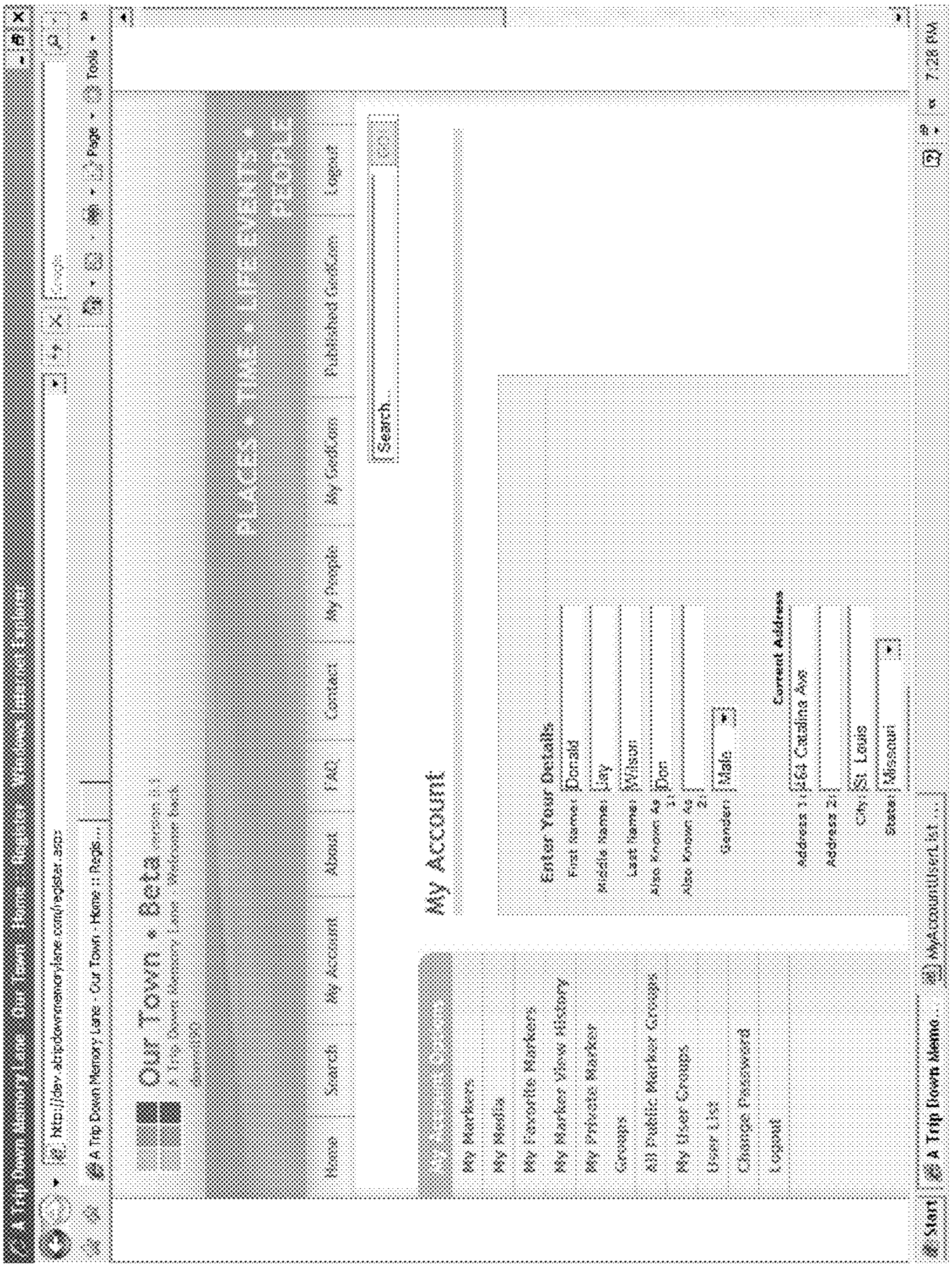
FIGS. 13(*a*) and (*b*) illustrate an exemplary GUI through which a user can edit his/her account.
Figure 13B:
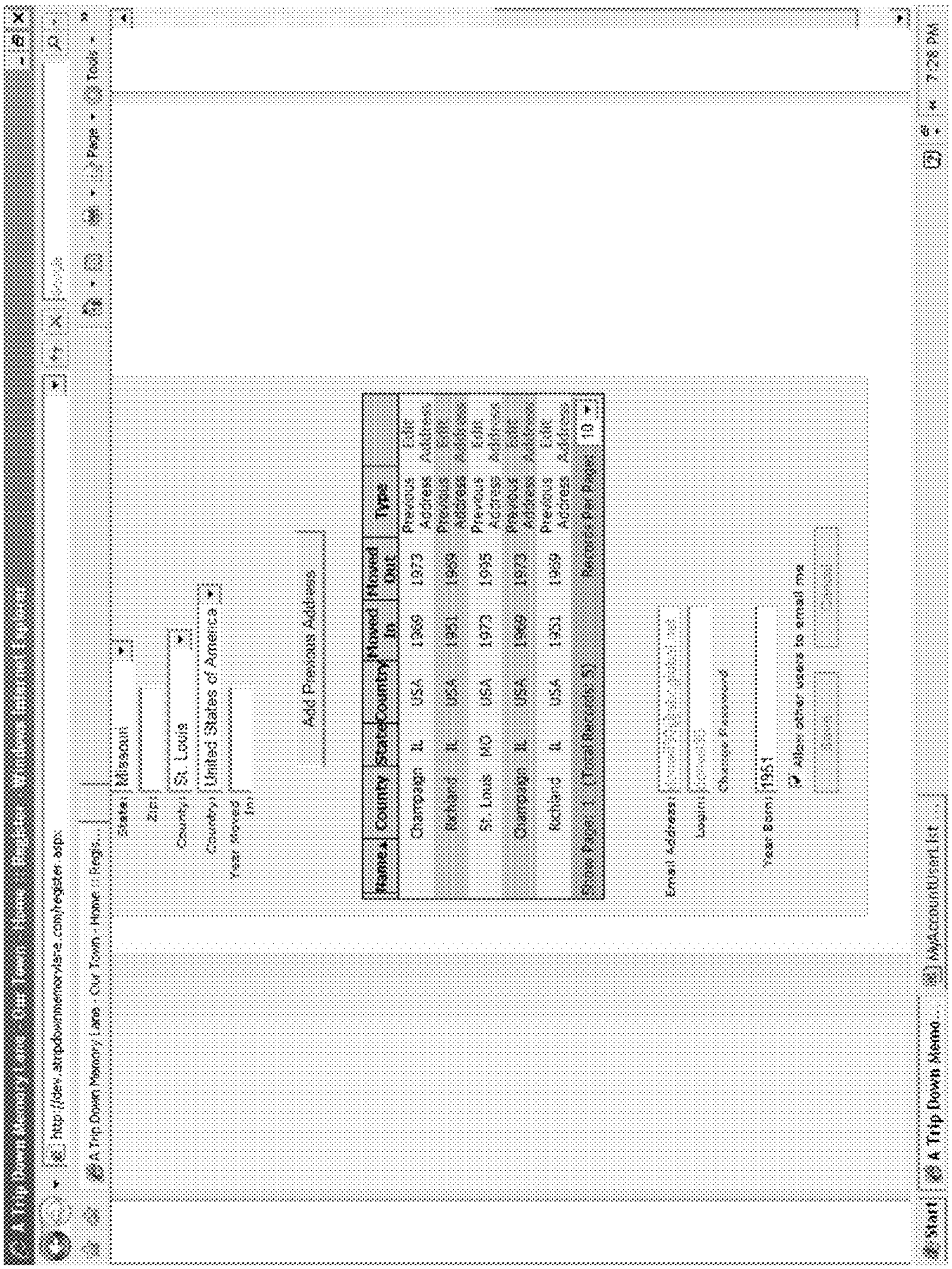

The website also provides the users with GUIs for viewing and editing their user accounts. To access the GUI(s) for doing so, the user can select the "My Account" tab shown in the exemplary GUIs in many of the figures. In response to selection of such a "My Account" tab, the exemplary GUI of FIGS. 13(*a*) and (*b*) is presented to the user. As shown in FIGS. 13(*a*) and (*b*), this GUI permits the user to edit his/her biographical information that was previously submitted during the registration process. Should the user have entered a number of previous addresses, these previous addresses can be displayed in a table or the like as shown in FIG. 13(*b*). Should the user want to make any changes to the information that he/she provided at registration, the user can do so via the GUI of FIGS. 13(*a*) and (*b*).

Figure 14:
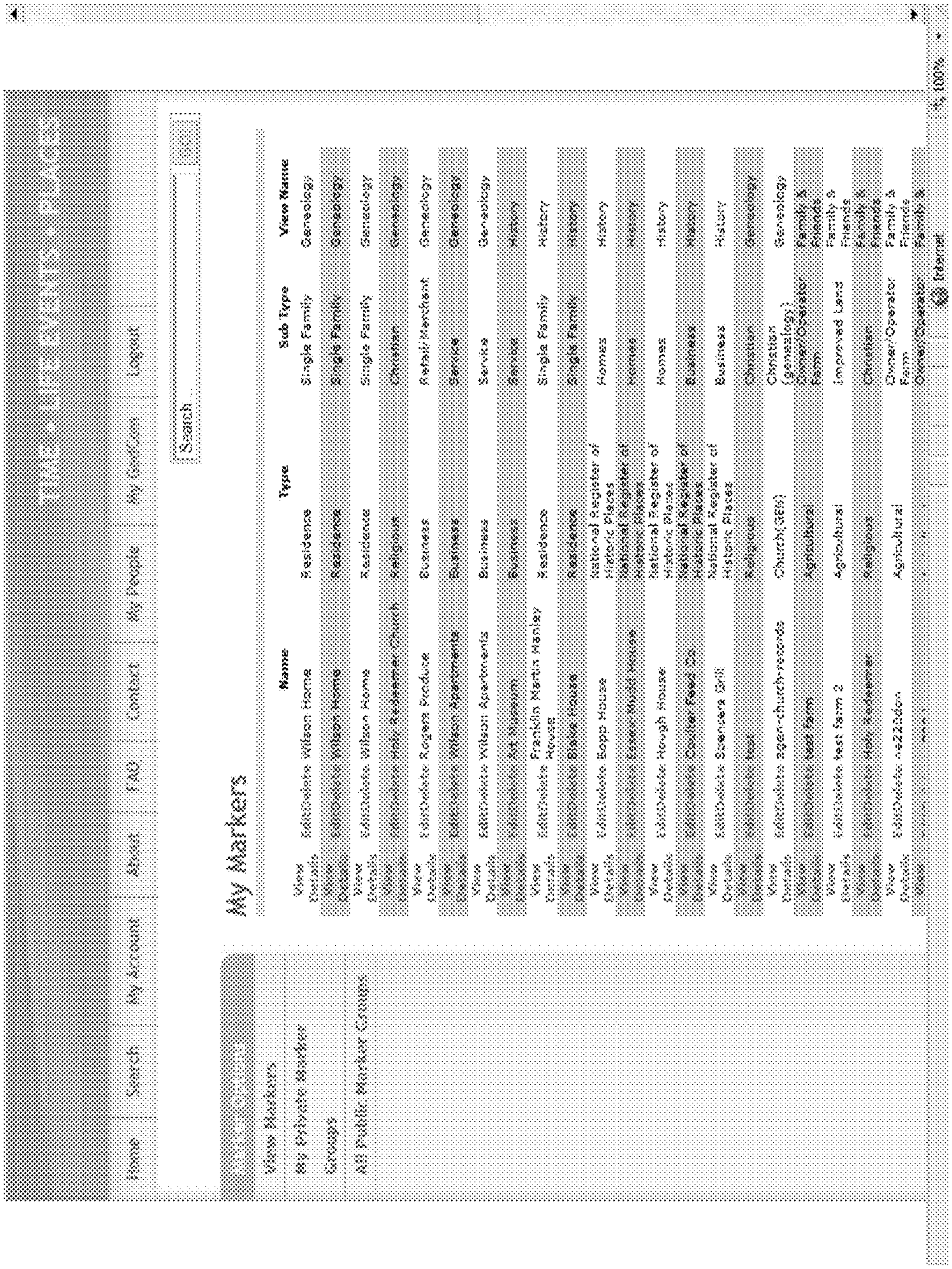
FIG. 14 illustrates an exemplary GUI through which a user can view the markers he/she created.

Should the user want to review the markers he/she has created, the user can select the "My Markers" link shown in the left portion of FIG. 13(*a*). In response to the selection of the "My Markers" link, the exemplary GUI of FIG. 14 can be presented to the user. FIG. 14 displays a list of all markers that the user has created. Each marker is preferably presented on the list with selectable links to (1) view additional details about the marker, (2) edit marker details, and (3) delete the marker. Additionally, the list preferably identifies each marker by name, type, subtype and view type to permit the user to more readily identify what each listed marker corresponds to.

Figure 15:
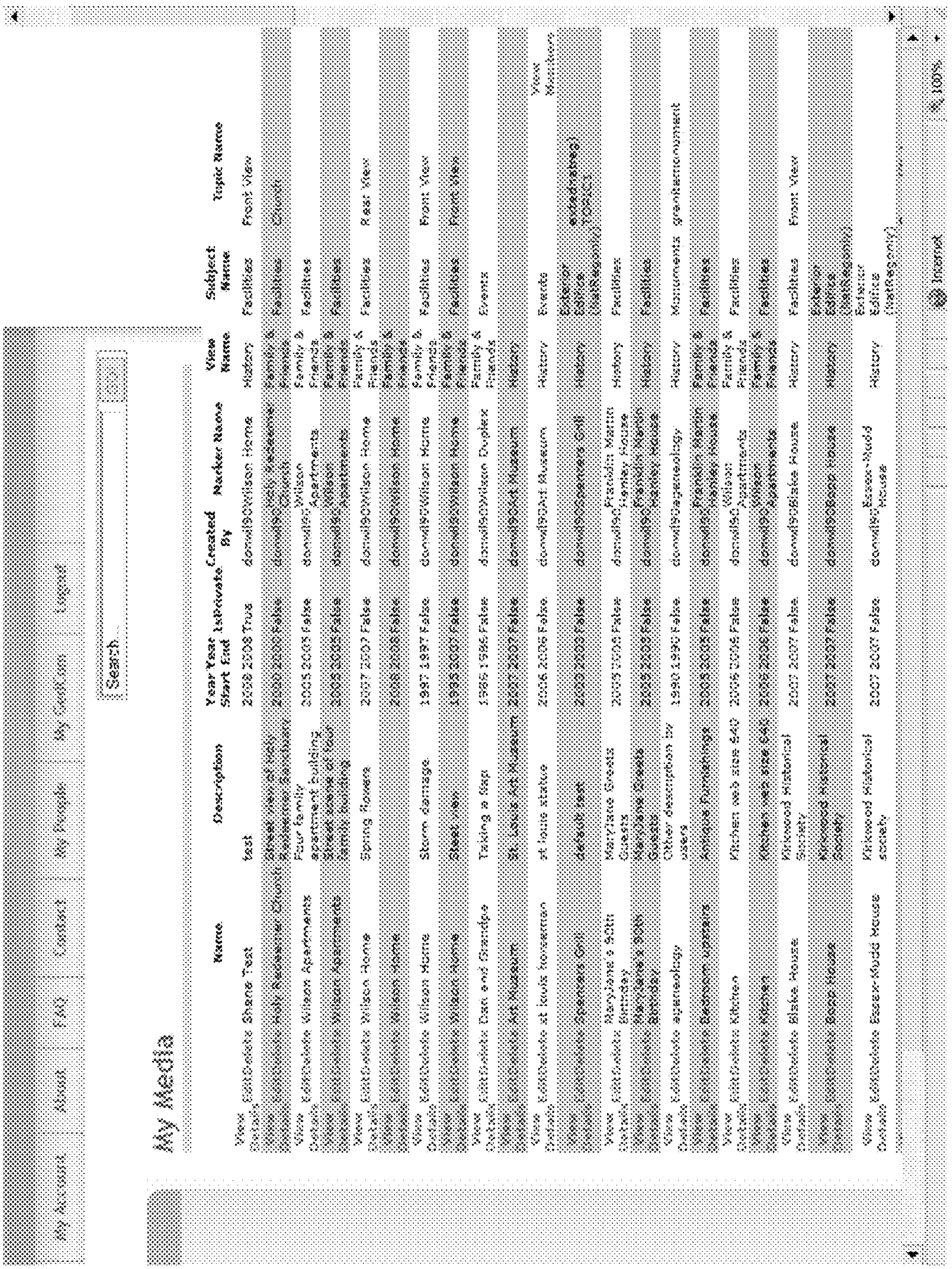
FIG. 15 illustrates an exemplary GUI through which a user can view the content items he/she has added to the database.

Should the user want to review the media items he/she has added to the database, the user can select the "My Media" link shown in the left portion of FIG. 13(*a*). In response to the selection of the "My Media" link, the exemplary GUI of FIG. 15 can be presented to the user. FIG. 15 displays a list of all media items that the user has added to the database. Each media item is preferably presented on the list with selectable links to (1) view additional details about the media item, (2) edit media item details, and (3) delete the media item. Additionally, the list preferably identifies each media item by name, description, date ranges, privacy setting, creator, its corresponding marker name, its view type, subject and topic to permit the user to more readily identify what each listed media item corresponds to.

Figure 16:
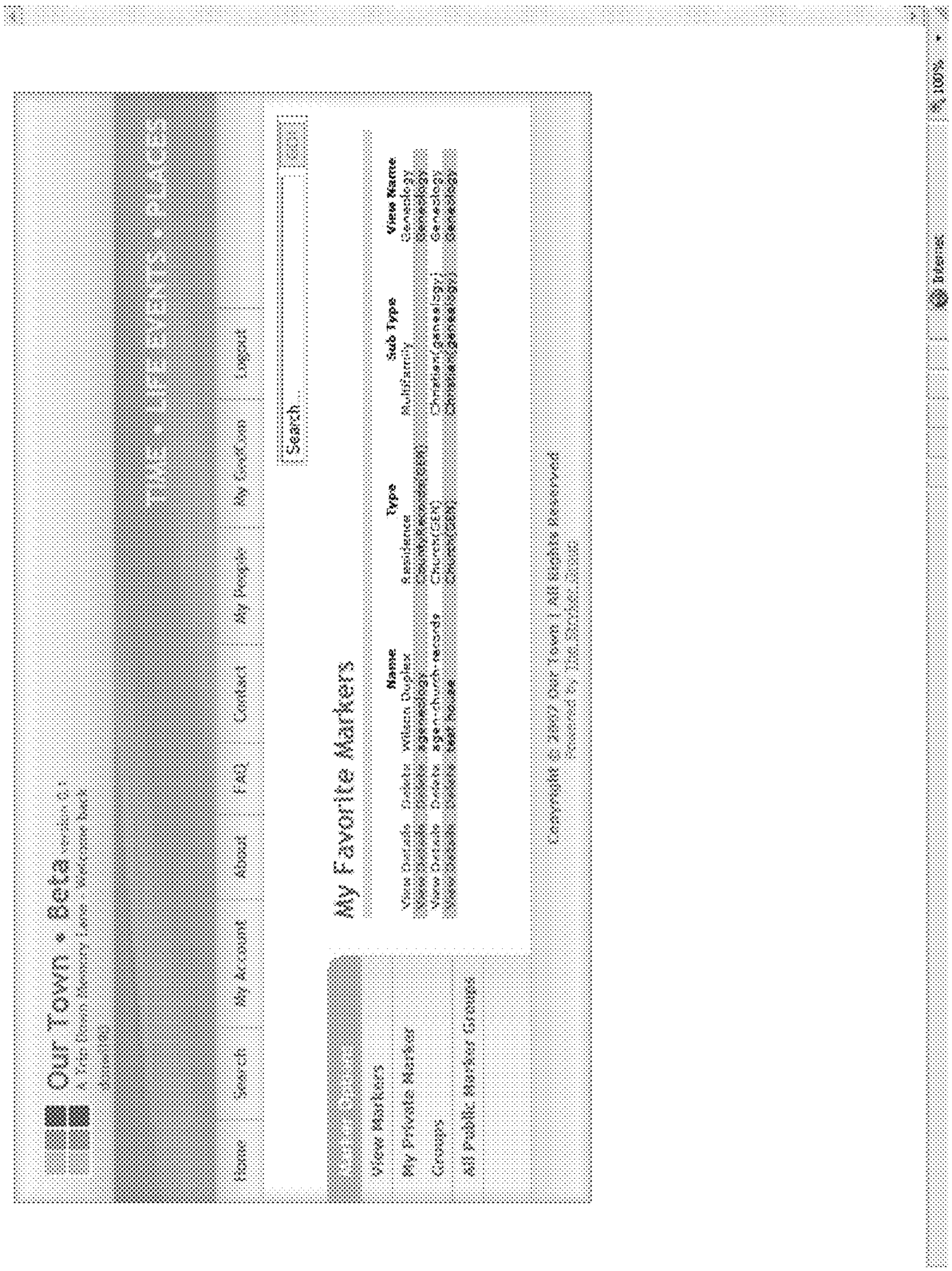
FIG. 16 illustrates an exemplary GUI through which a user can view the "favorite" markers he/she created.

Should the user want to review the "favorite" markers he/she has created, the user can select the "My Favorite Markers" link shown in the left portion of FIG. 13(*a*). In response to the selection of the "My Favorite Markers" link, the exemplary GUI of FIG. 16 can be presented to the user. FIG. 16 displays a list of the "favorite" markers associated with the user. A criteria that can be used to classify a marker as a "favorite" marker can be based on the number of times that the viewer has viewed the marker. If the number of views exceeds a predetermined threshold, then the marker can be deemed a "favorite". Additionally (or alternately), "favorite" markers can be defined in response to user input (e.g., a user could be given the option to select a link or input a click action that would register a subject marker as one of the user's "favorite" markers). Each marker is preferably presented on the list in a manner similar to the marker list shown in FIG. 14. It should further be understood that markers that can qualify as "favorite" markers for a user are preferably not limited to the user's own markers and may include any marker data structure accessible to the user. Further still, to define markers which qualify as "favorites", the system could be configured to employ a process whereby users vote or rank the markers they review, and where the system processes and quantifies such votes/rankings to determine a "best of class" or the like concerning various quality, user interest or other qualifiers for markers or their associated media to decide which markers qualify as "favorites".

Figure 17:
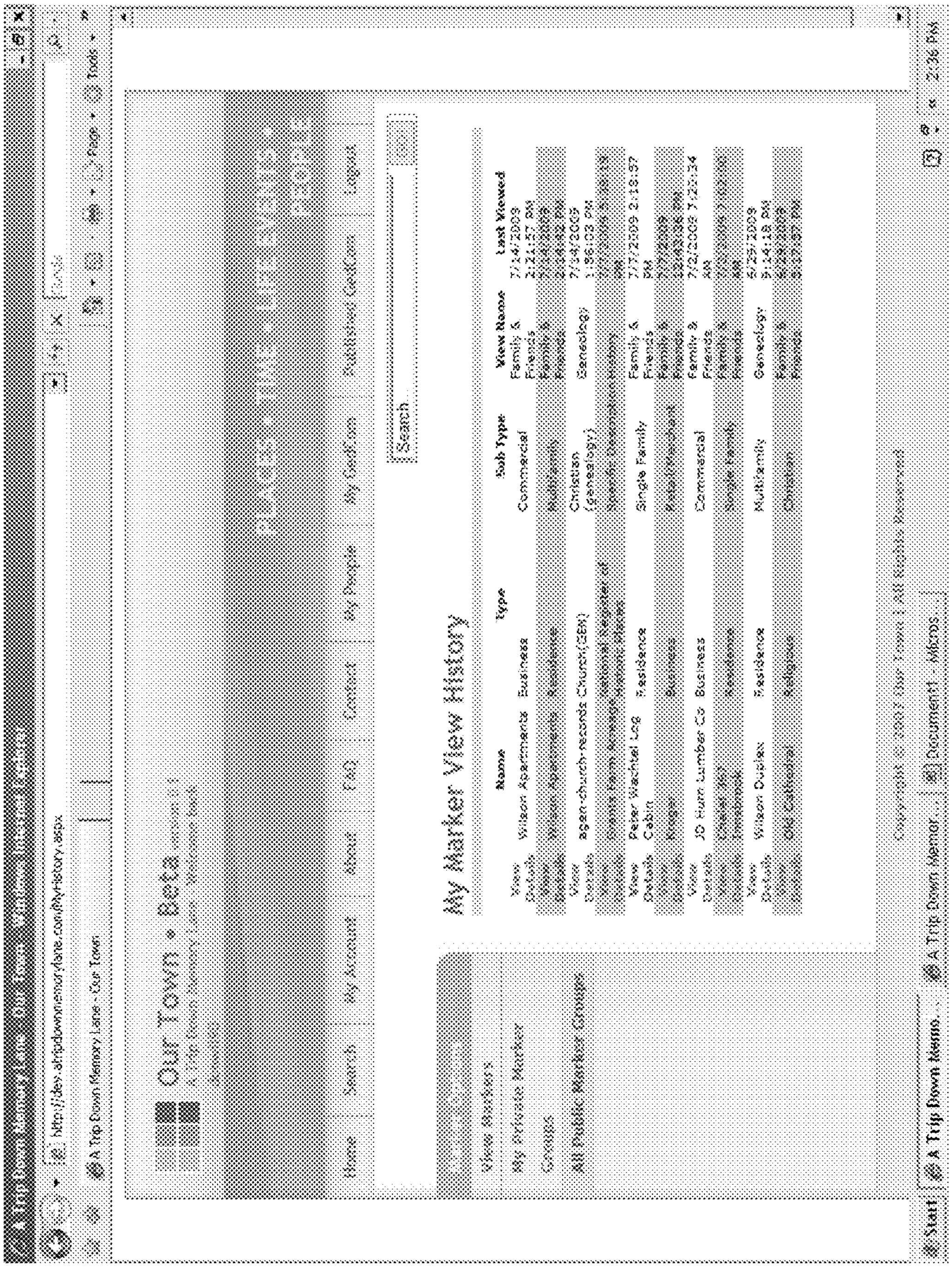
FIG. 17 illustrates an exemplary GUI through which a user can view his/her view history with respect to markers.

Should the user want to review his/her viewing history with respect to markers, the user can select the "My Marker View History" link shown in the left portion of FIG. 13(*a*). In response to the selection of the "My Marker View History" link, the exemplary GUI of FIG. 17 can be presented to the user. FIG. 17 displays a list of all markers that the user had clicked on over a specified time period. The system can define this time period is a view history over the past week, month, year or other time period (e.g., since user registration). Each marker is preferably presented on the list with a selectable link to view additional details about the marker. Additionally, the list preferably identifies each marker by name, type, subtype, view type and the date/time the marker was last viewed by the user to permit the user to more readily identify what each listed marker corresponds to.

Figure 18:
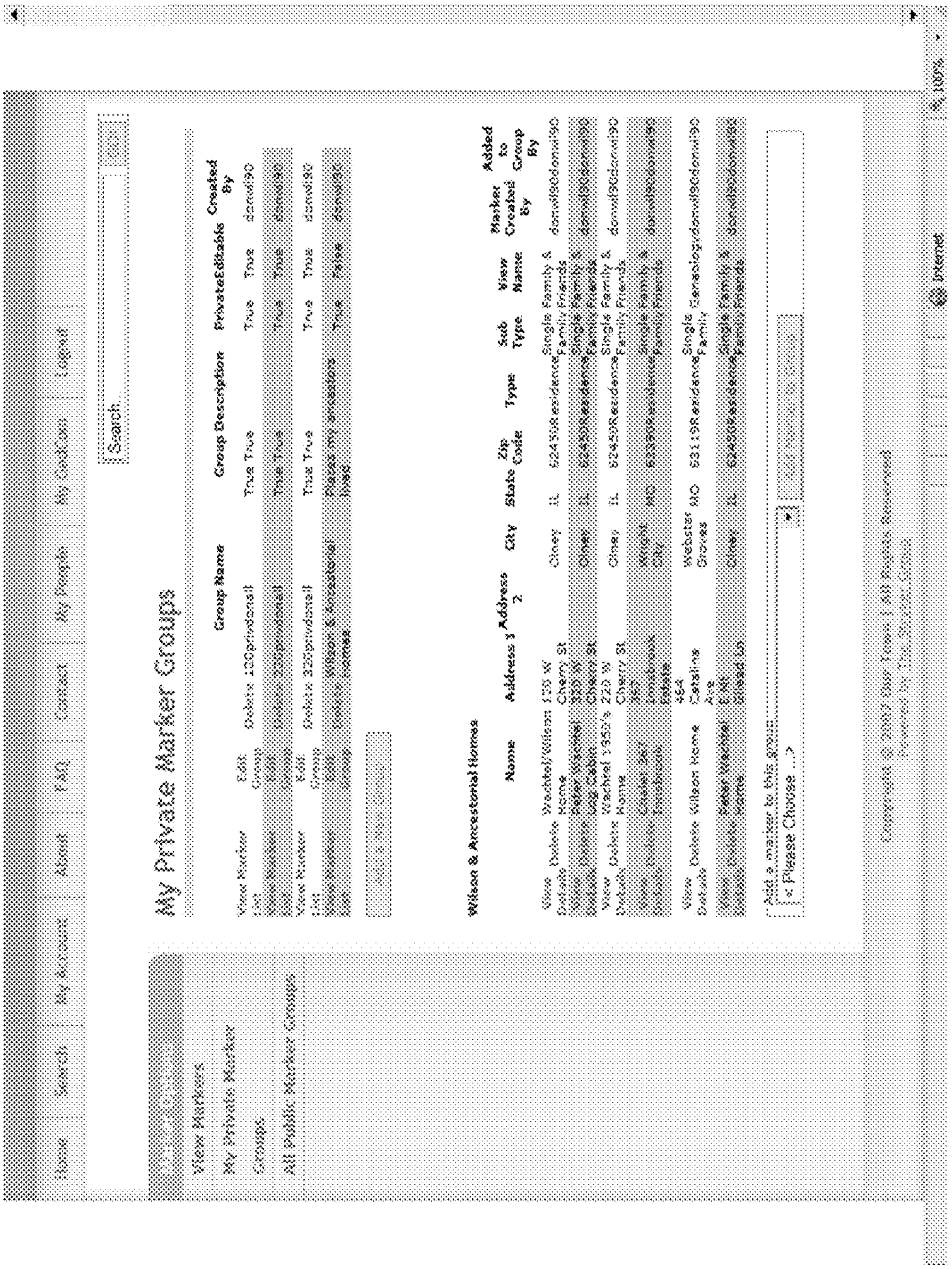
FIG. 18 illustrates an exemplary GUI through which a user can view the markers he/she has associated with one or more private user groups.

Should the user want to review markers associated with the private marker groups of which he/she is a member, the user can select the "My Private Marker Groups" link shown in the left portion of FIG. 13(*a*). In response to the selection of the "My Private Marker Groups" link, the exemplary GUI of FIG. 18 can be presented to the user. FIG. 18 displays a list of all private marker groups of which the user is a member. This list preferably includes selectable links to (1) display the marker list associated with each marker group, (2) edit each marker group, and (3) delete each marker group. Additionally, this list preferably identifies the name for each marker group, identifies the privacy setting for each marker group, identifies whether the marker group is editable, and identifies the creator for the marker group. The creator of a particular marker group can control through user input whether the subject marker group is "public" or "private". Optionally, the GUI can include a user-selectable button that is effective to initiate the process of adding a new marker group to the system.

Should the user select the "View Marker List" link for a listed marker group, the GUI preferably also displays a list of the markers associated with that marker group in another section of the GUI, an example of this is shown in FIG. 18 (where the markers for the "Wilson & Ancestorial Homes" group are listed). This marker list preferably includes fields similar to those shown in the marker lists of FIG. 14, but may also include fields that identify the creator for the marker and the user who added the marker to the user group. Optionally, the GUI may also include a field for user input to associate another marker with the marker group. This user input field may take the form of a drop down menu that is populated with the user's other markers (or optionally, all accessible markers in the database). In response to user selection of a marker from among these options, the system can add the marker to the marker group if the user selects the "Add Marker to Group" button. It should be noted that the software can be configured to restrict the ability of adding markers to a marker group to only the marker group creator if desired.

Figure 19:
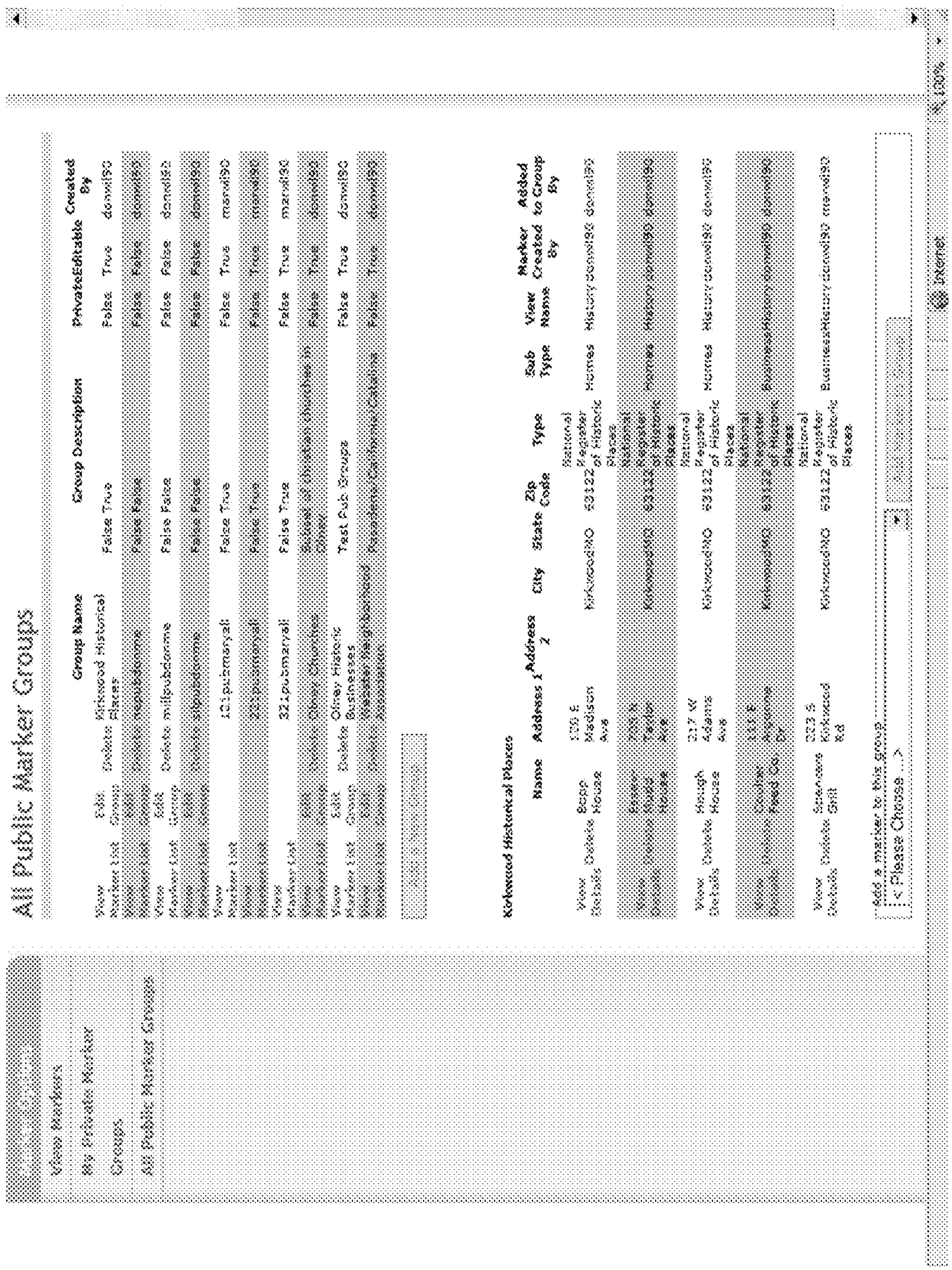
FIG. 19 illustrates an exemplary GUI through which a user can view the markers he/she has associated with one or more public user groups.
Figure 20A:
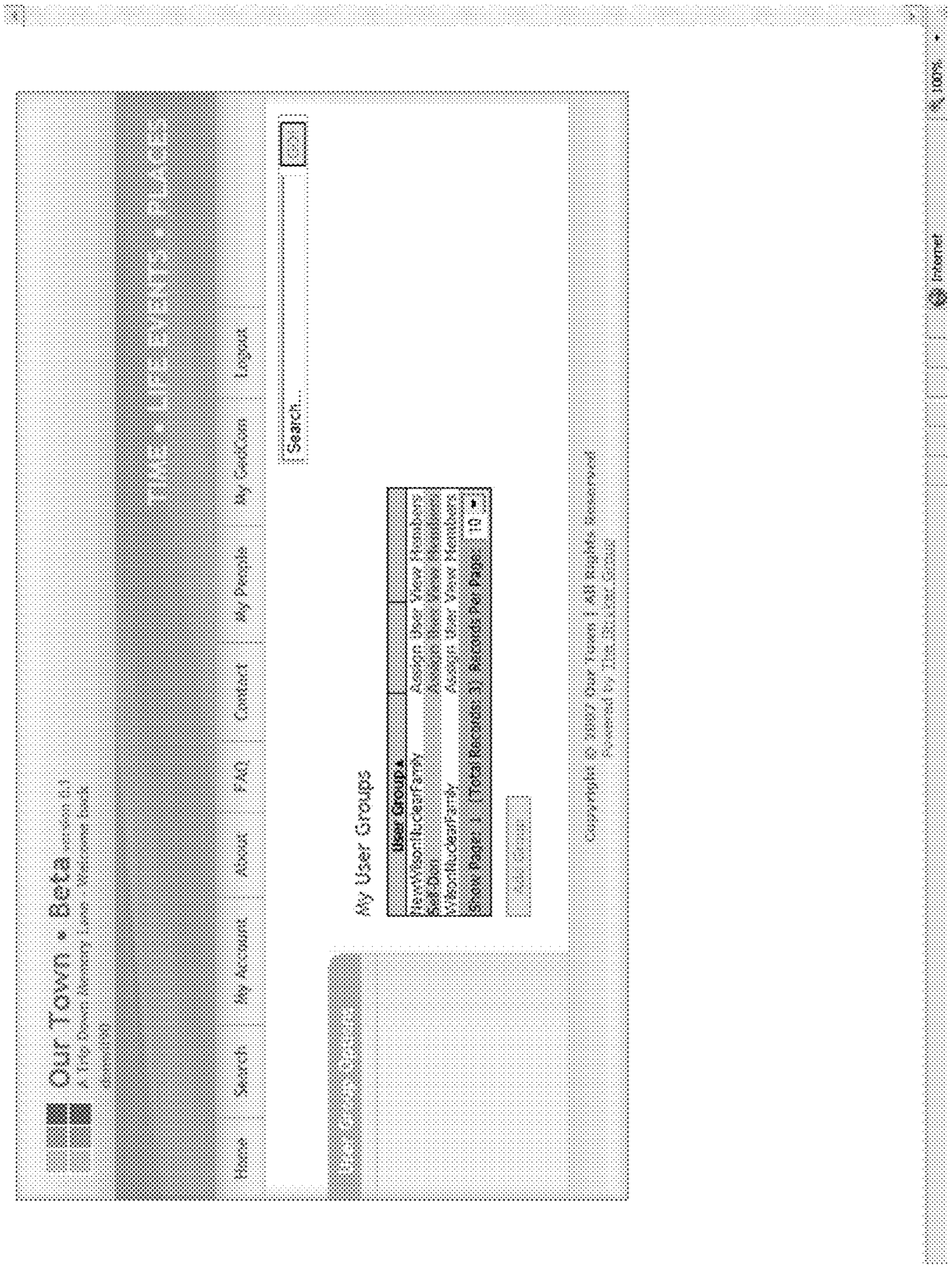
FIGS. 20(*a*)-(*d*) illustrate exemplary GUIs through which a user can view and create user groups.
Figure 20B:
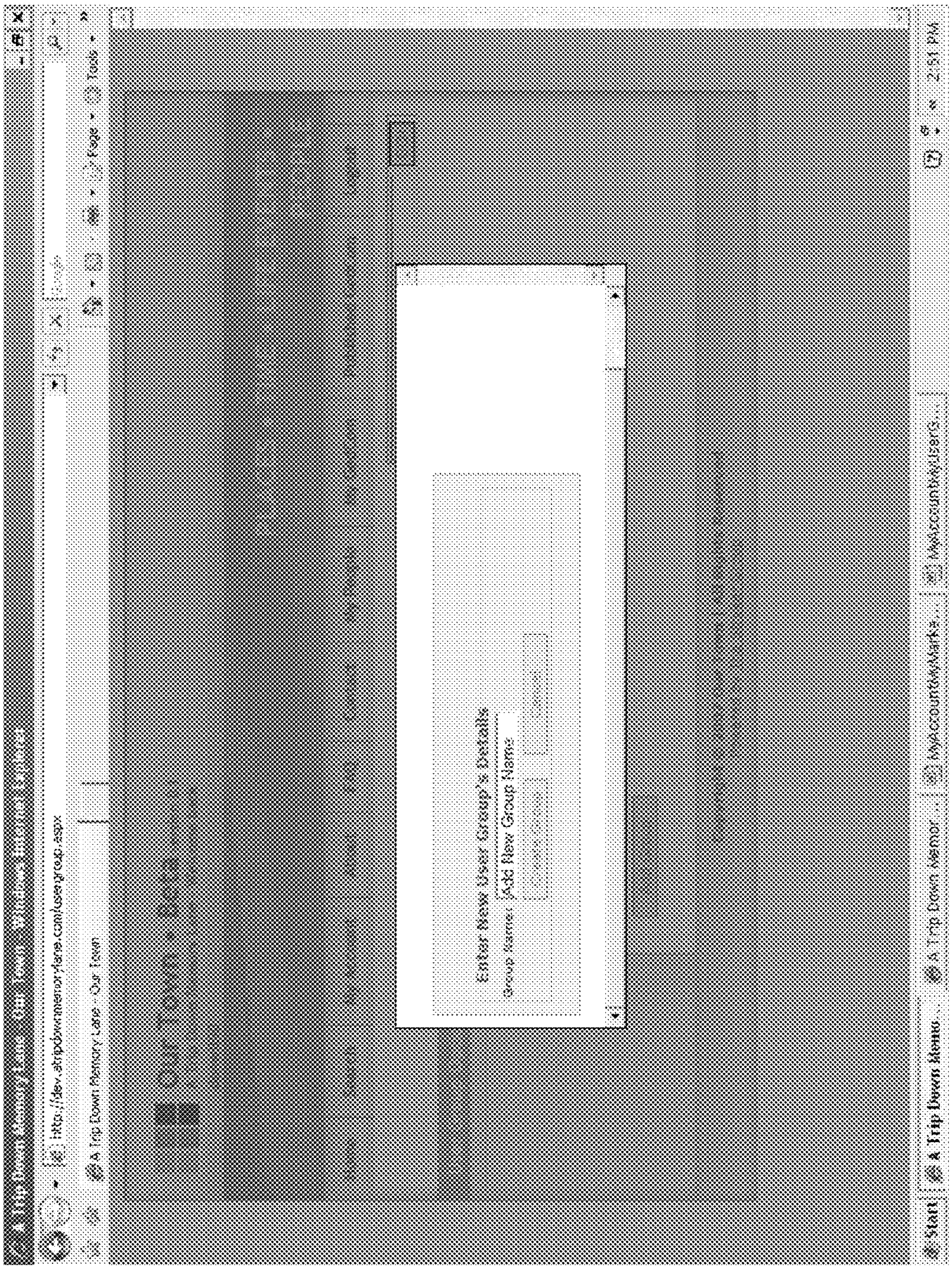
Figure 20C:
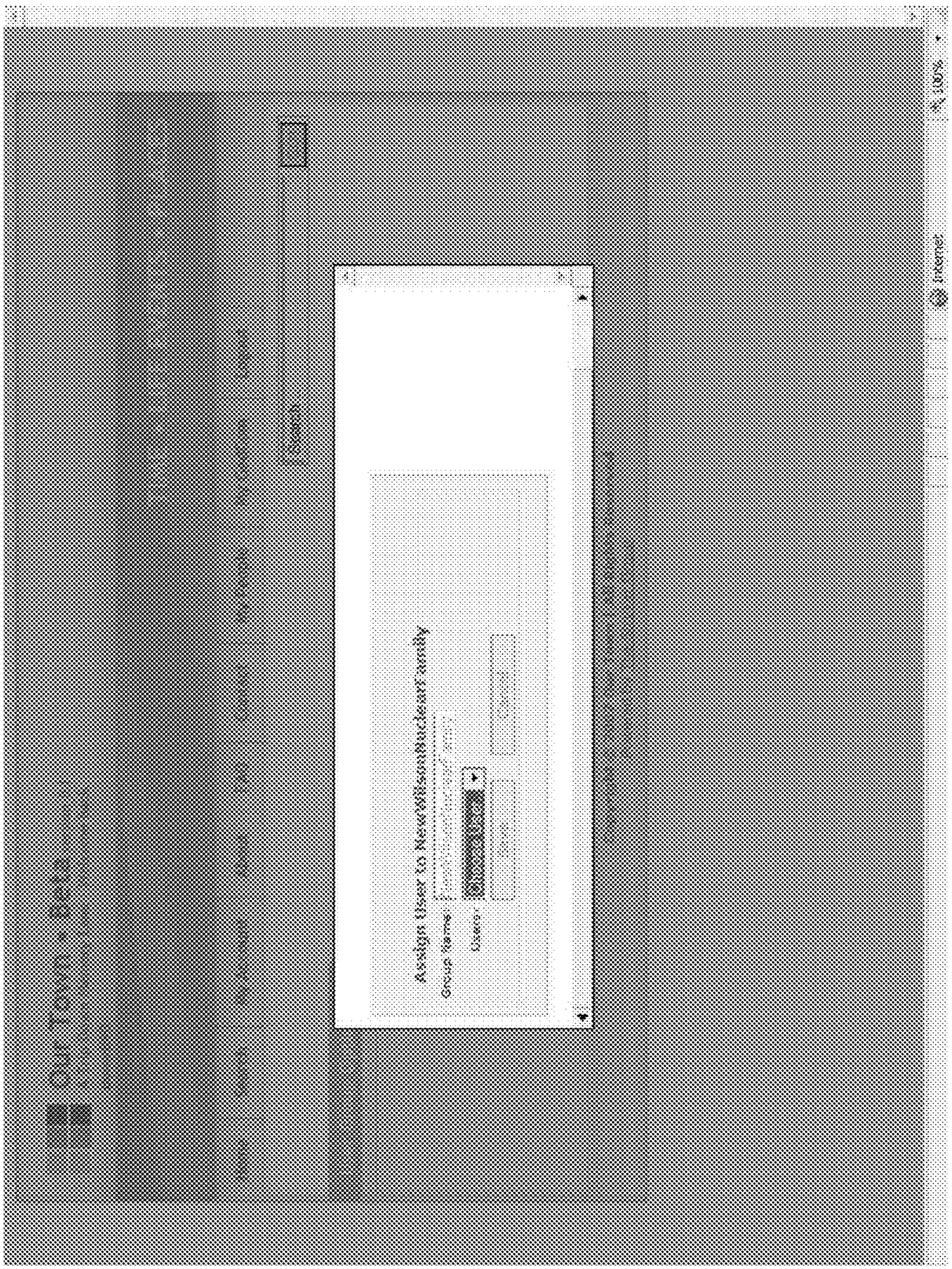
Figure 20D:
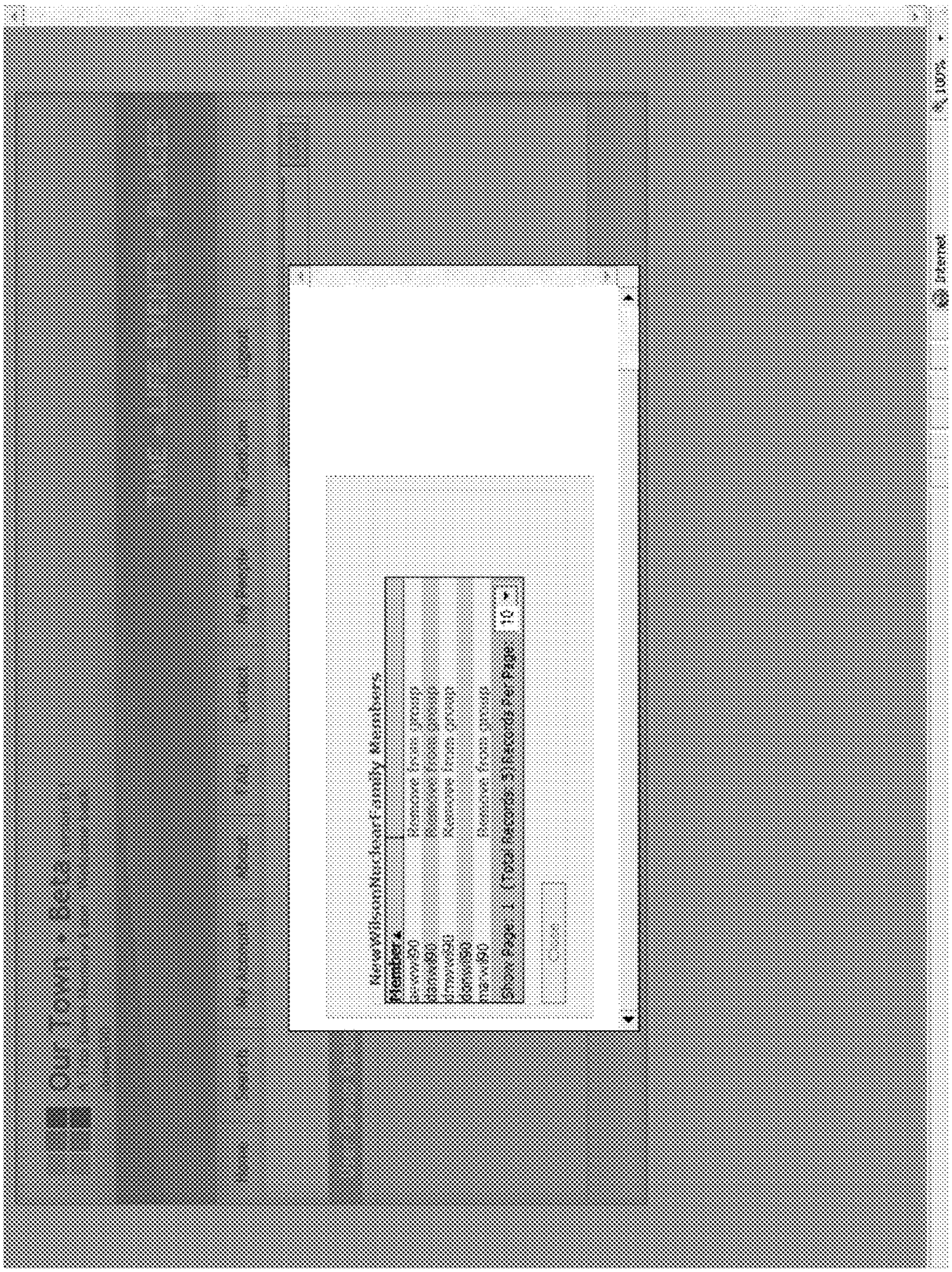
Figure 21A:
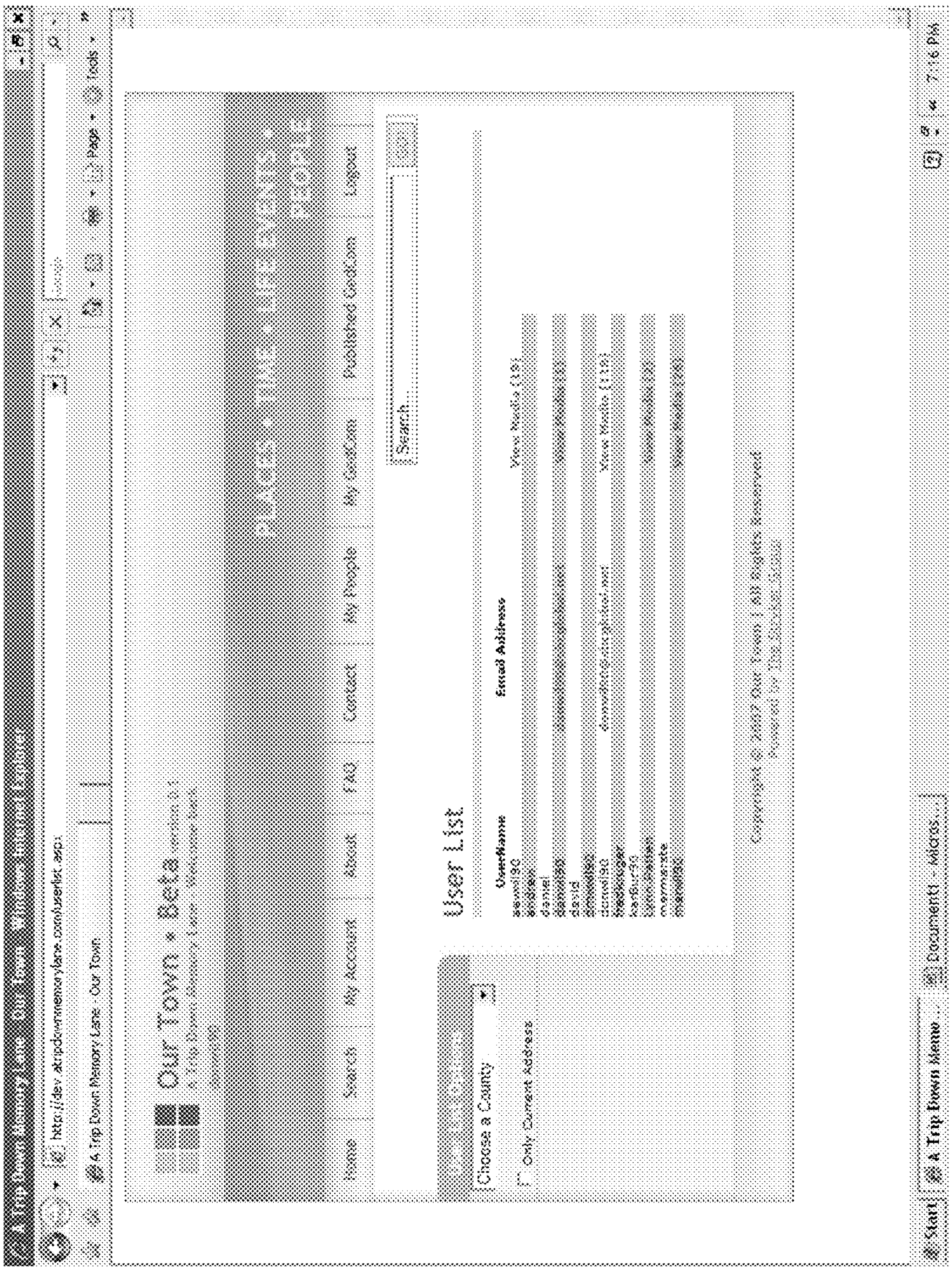
FIGS. 21(*a*)-(*c*) illustrate exemplary GUIs through which a user can view a list of system users.
Figure 21B:
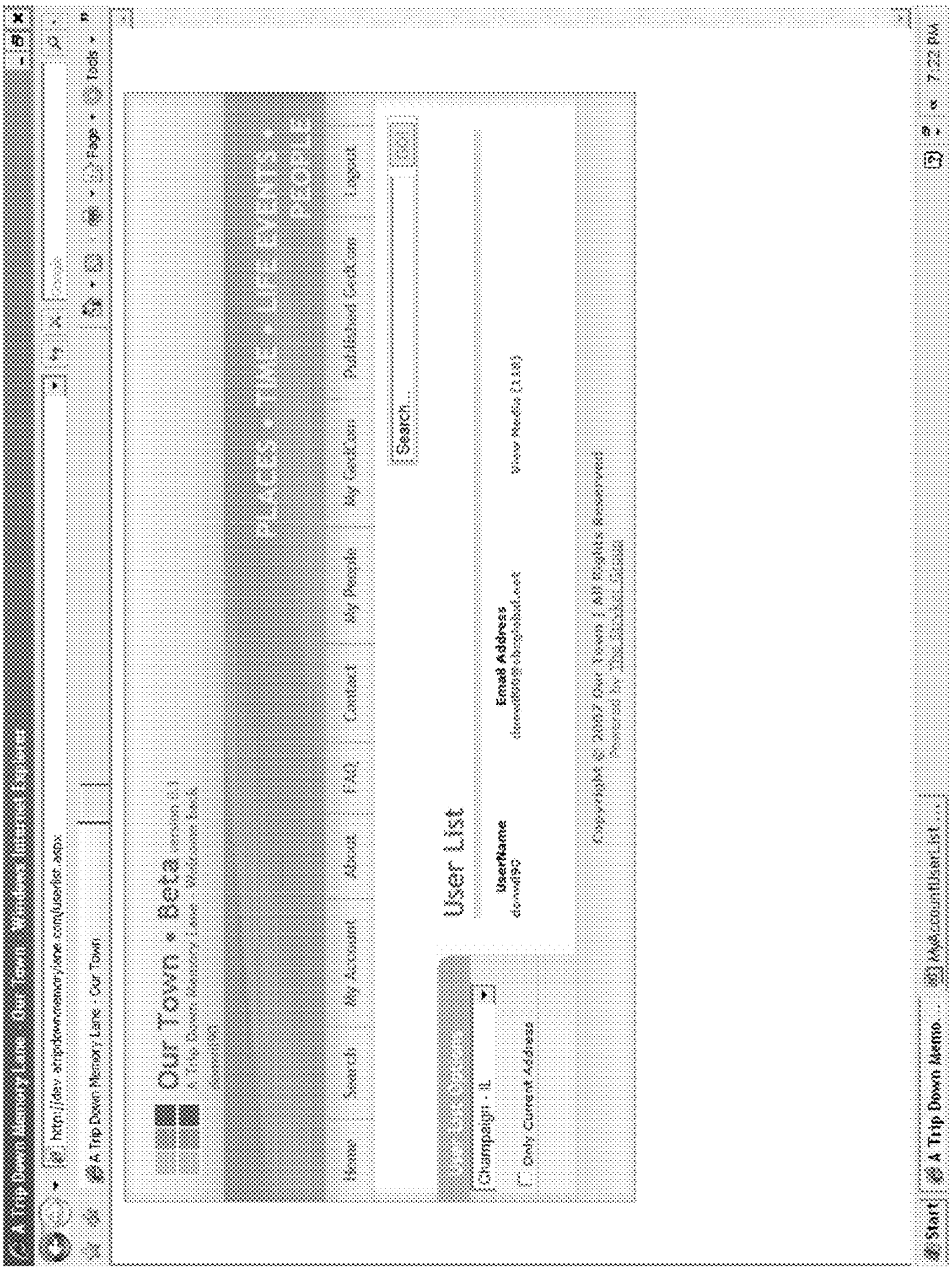
Figure 21C:
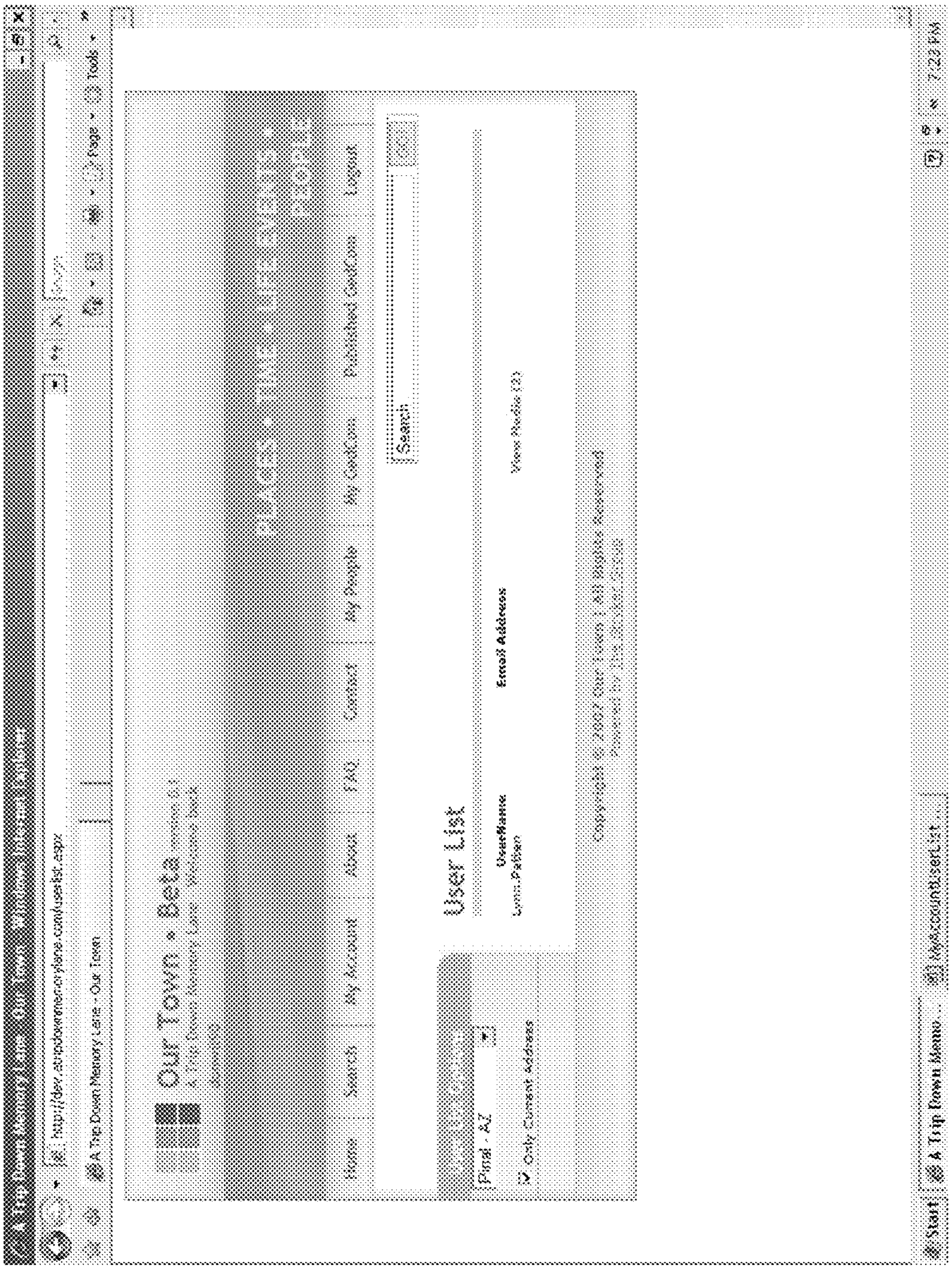
Figure 21D:
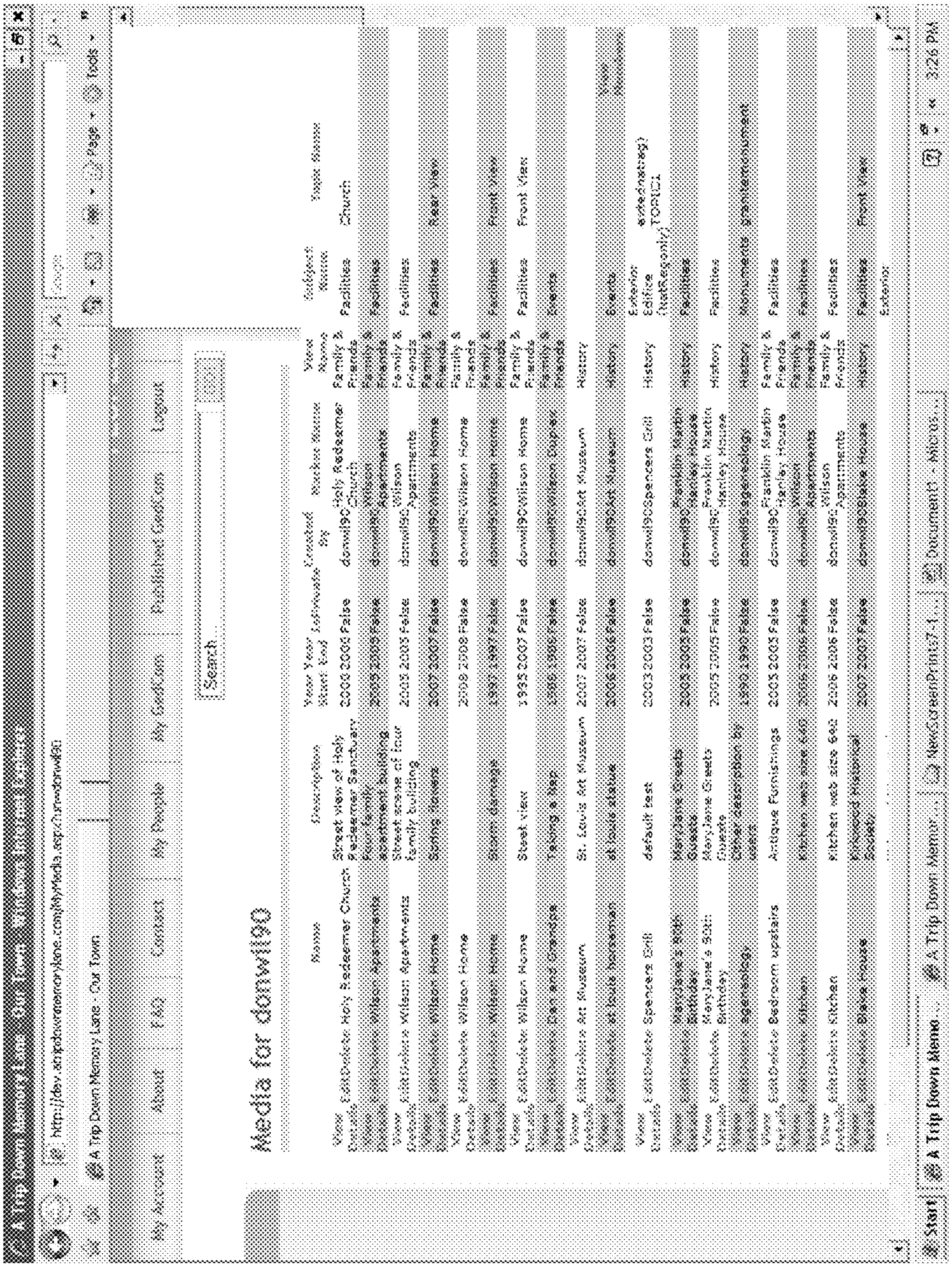

Should the user want to review markers associated with any of the public marker groups in the database (or optionally any of the public marker groups of which the user is a member), the user can select the "My Public Marker Groups" link shown in the left portion of FIG. 13(*a*). In response to the selection of the "My Public Marker Groups" link, the exemplary GUI of FIG. 19 can be presented to the user. FIG. 19 is similar to FIG. 18, albeit the marker groups that are listed are the public marker groups stored in the database.

Should the user want to review the user groups of which he/she is a member, the user can select the "My User Groups" link shown in the left portion of FIG. 13(*a*). In response to the selection of the "My User Groups" link, the exemplary GUI of FIG. 20(*a*) can be presented to the user. FIG. 20(*a*) lists each user group of which the user is a member. Preferably these groups are listed by name and include user-selectable links for the user to assign users to the group and view the members of the group. The assignment of users to a group can be implemented where a user such as the group creator has the ability to add a user to a group regardless of whether the user consents to joining the group. In such an embodiment, by virtue of being a member of User X's user group, a member user would be entitled to access User X's private media. Alternatively, the system be configured where the user's action of assigning a member to a group results in an invitation being sent to the assigned user, whereupon actual membership in the group for the assigned user is contingent upon that user's acceptance of the invitation. Optionally, the GUI may include an "Add Group" button or the like that is user-selectable to initiate the process of creating a new user group.

If the user select the "Add Group" button shown in FIG. 20(*a*) (or any of the "Add a New Group" buttons shown in FIGS. 18 and 19), the exemplary GUI of FIG. 20(*b*) can be presented to the user. Through the GUI of FIG. 20(*b*), the user can define a name for the new user group. After defining the name for the new user group, the exemplary GUI of FIG. 20(*c*) is presented to the user. Through this GUI, the user can assign users to the new user group. A drop down menu can be populated with all users registered with the system, and the user can then select from among these listed users when deciding who to include in the user group. As mentioned above, this assignment process can be implemented on a consensual or nonconsensual basis. This process of assigning users to the group can be repeated until the user has assigned all users who he/she desires to be members of the new user group. The exemplary GUI of FIG. 20(*d*) shows a list of the assigned members of the new user group.

Should the user want to review a list of the other users who are registered with the system, the user can select the "User List" link shown in the left portion of FIG. 13(*a*). In response to the selection of the "User List" link, the exemplary GUI of FIG. 21(*a*) can be presented to the user, which lists each registered user. Preferably each user is listed by their user name, email address (if public) and a selectable link to view a list of all media added to the database by that user. A GUI such as the one shown in FIG. 21(*d*) can be presented to the user in response to user selection of the selectable "View Media" link for a particular user on the user list. As can be seen from FIG. 21(*d*), this GUI can list all of the media items submitted by the subject user. The GUI of FIG. 21(*d*) can be similar to that of FIG. 15, albeit for the media items submitted by a different user rather than the media items submitted by the user himself/herself.

The GUI of FIG. 21(*a*) also preferably permits the user to filter the listed users by geographic area. That is, each user is preferably associated with geographic area such as a city, state, county and/or zip code by virtue of the information submitted at the time of registration for their current and/or former addresses. The exemplary GUI of FIG. 21(*a*) can be configured to permit the user to filter the list of users by each user's associated geographic area to provide more effective management of the user list in situations where a user has a large user list. In the examples of FIGS. 21(*b*) and (*c*), the geographic area filter is a county filter. Furthermore, the filter can be configured to filter using only the users' current address information or both the current and former addresses of the users. For example, FIG. 21(*b*) depicts an exemplary user list that has been filtered to show only those users whose current or former addresses of record fall within Champaign County in Illinois. FIG. 21(*c*) depicts an exemplary user list that has been filtered to show only those users whose current addresses are associated with Pinal County in Arizona.

Figure 22A:
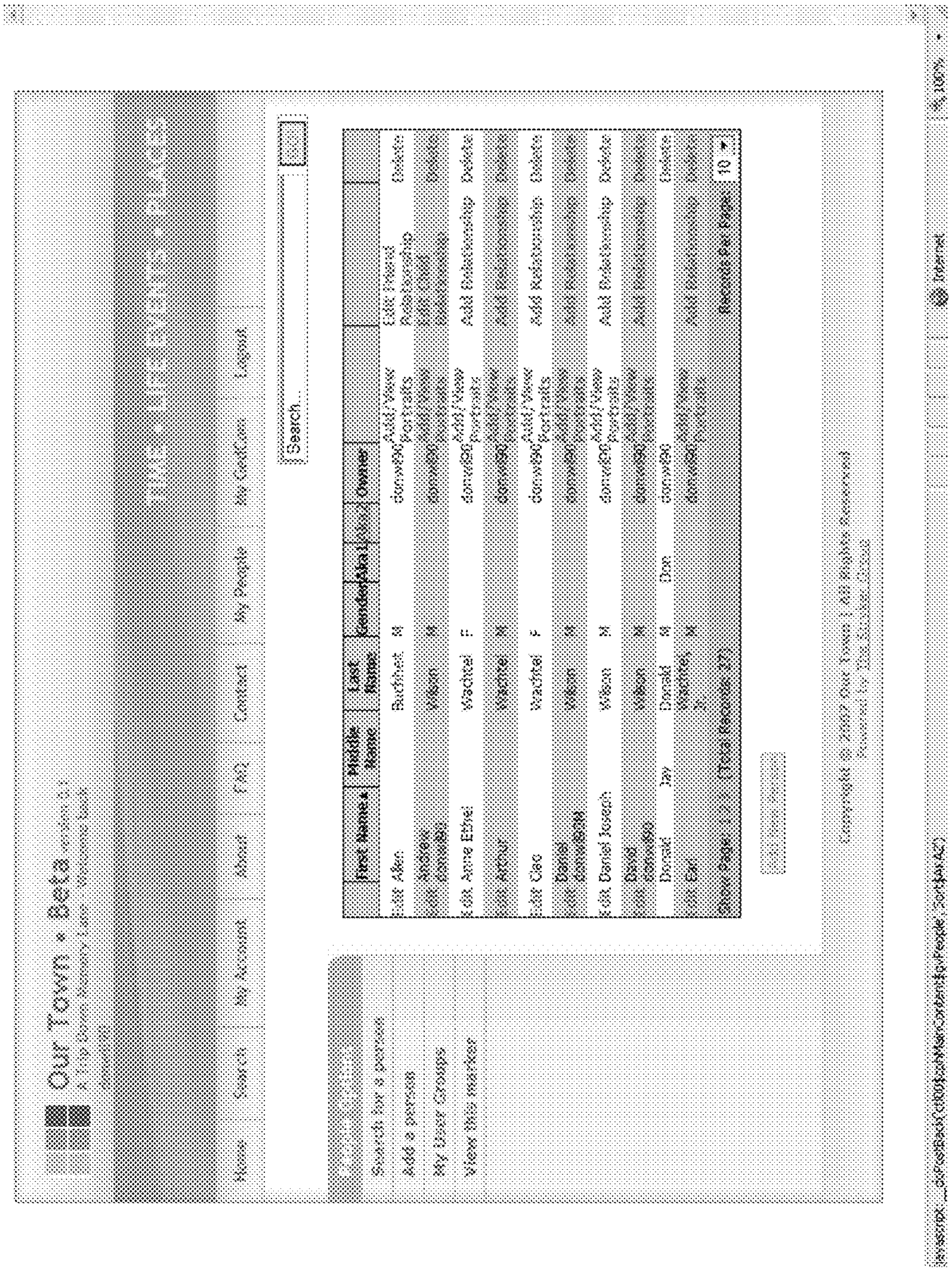
FIGS. 22(*a*) and (*b*) illustrate exemplary GUIs through which a user can view, add and edit people content.
Figure 22B:
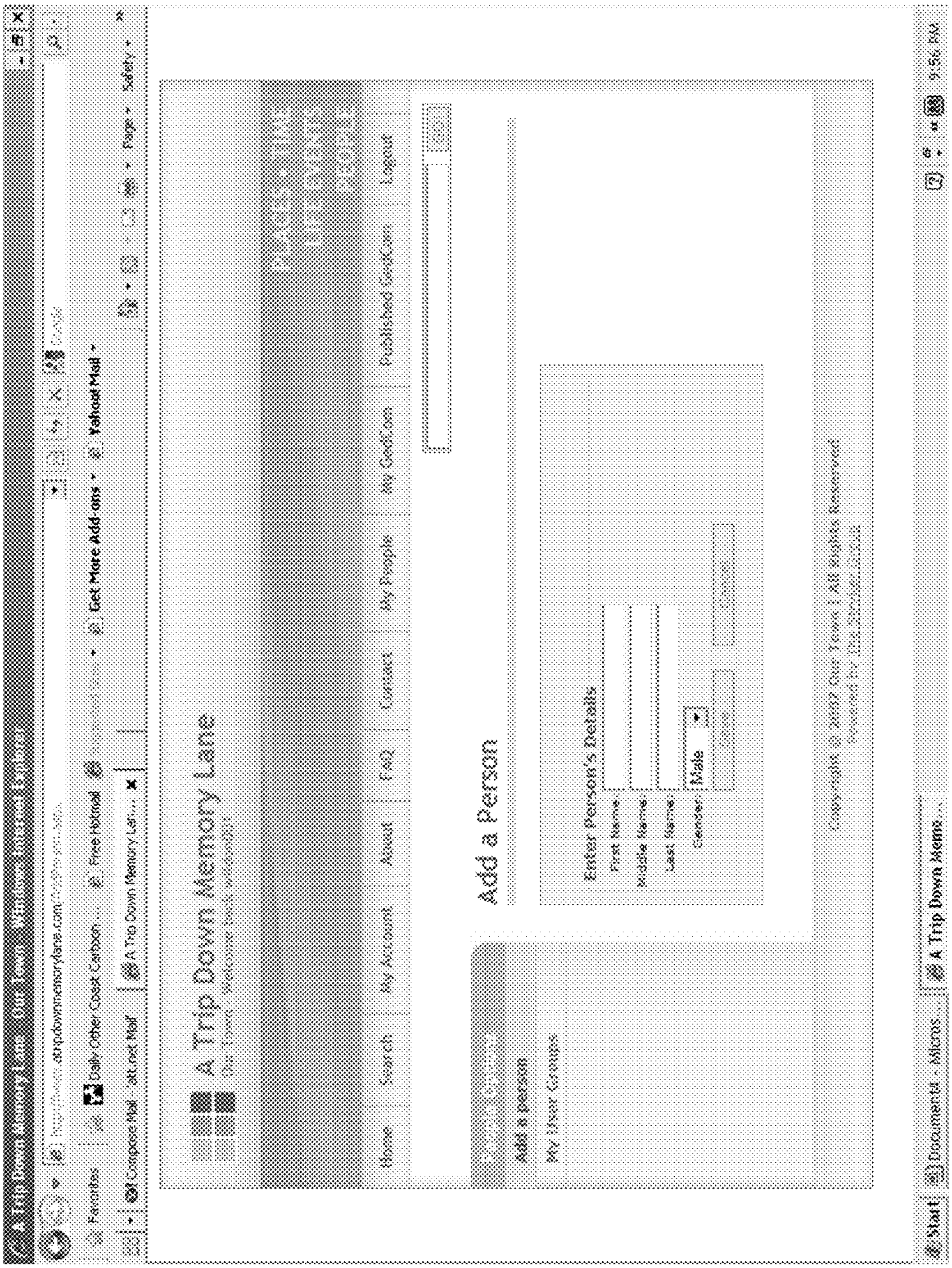

A user can also view and edit the people content with which he/she is associated. To access the GUI(s) for doing so, the user can select the "My People" tab shown in the exemplary GUIs in many of the figures. In response to selection of such a "My People" tab, the exemplary GUI of FIG. 22(*a*) is presented to the user. As shown in FIG. 22(*a*), this GUI permits the user to view the people data structures for which the user is the owner. Each person is preferably listed by name (first, middle and last), gender, aliases or nicknames, and an "owner" (the user who added the person to the database). Each person is also preferably listed with user-selectable links for (1) editing the stored information for that person, (2) adding/viewing a photograph for that person, (3) identifying/editing relationship information for that person, and (4) deleting that person from the database.

Should a user want to add a people data structure to the database 100, the user can select the "Add a person" link shown in FIG. 22(*a*). In response to selection of this link, a GUI such as the one shown in FIG. 22(*b*) can be presented to the user. Through this GUI, the user can enter information for creating a people data structure (e.g., first, middle and last names and a gender). Optionally, the GUI can include additional user input fields for identifying one or more nicknames/aliases for the subject person and for identifying a relationship with the owner (e.g., friend, son/daughter, father/mother, brother/sister, etc.).

Figure 23:
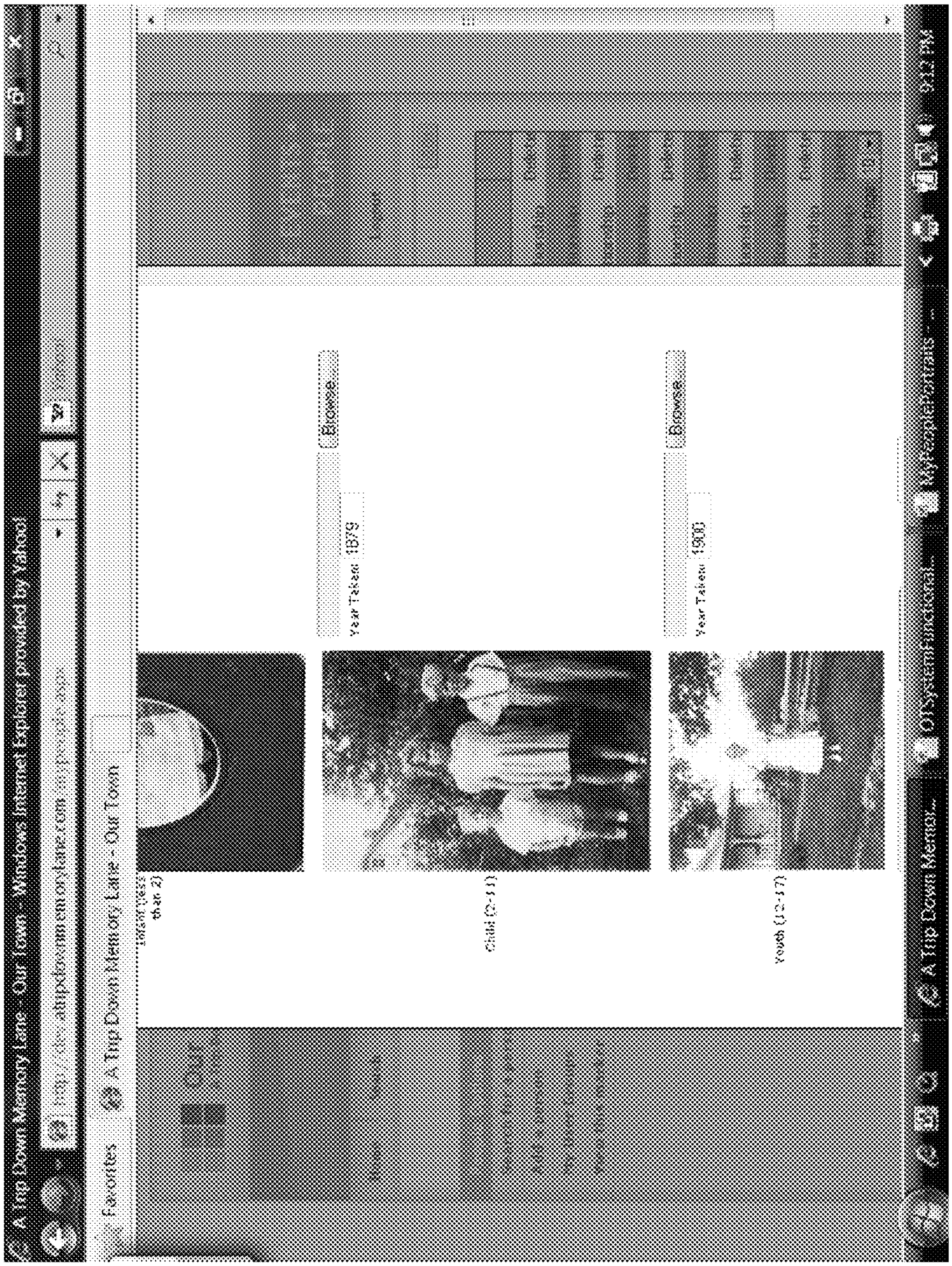
FIG. 23 illustrates an exemplary GUIs for viewing and editing photographic information in connection with people content.

Should a user wish to add or view a photograph associated with a listed person, the user can select the "Add/View Portraits" link for that person to cause the display of the exemplary GUI shown in FIG. 23. This GUI displays all photographs in the database that are associated with the person in question. Preferably, the photographs are displayed in ascending or descending order with respect to the time data associated with the photograph in the database. In this way, a user can view photographs of that person over time, e.g., from infancy through childhood and adulthood.

Each photograph is preferably displayed with caption data (if the database stores associated caption data for the photograph) and a year that the photograph was believed to have been taken (if the database stores associated year information for the photograph). If the person also has birth year data associated therewith, the GUI can automatically categorize the photographs with respect to age ranges for the person (e.g., infancy for photographs corresponding to when the person was 2 years old or younger, childhood for photographs corresponding to when the person was between ages 2 and 11, youth for photographs corresponding to when the person was between ages 12-17, etc.).

By identifying an age range for a person appearing in a media item, users may be able to contribute additional information about the media they are viewing. For example, the owner of the media item may only have known a relatively small amount of information about the tagged person (e.g., the media item shows "Earl Wachtel" as a child in the year 1925). However, another user who is the self-appointed genealogist for the family may know that the depicted "Earl Wachtel" was actually Earl Wachtel, Jr., the child of Earl Wachtel, Sr. and the parent of Earl Wachtel, III. This another user may then be able to use the year and age range data in the displayed media item to properly identify which Earl Wachtel is shown and then leverage this knowledge to create an association between the media data structure for that media item and the genealogy data structure for "Earl Wachtel, Jr.".

If the user wants to add/edit any caption data or year data for the photographs, the user can do so via the GUI of FIG. 23. Optionally, the system may restrict editing capabilities on the basis of user status. For example, the system may permit a user to edit photographic information only if the user is the "owner" of the person or photograph, or within a user group that shares access to the person or photograph. If a user wants to add a photograph for association with the person in question, the GUI can include fields for doing so similar to the add media GUIs discussed herein.

Figure 24:
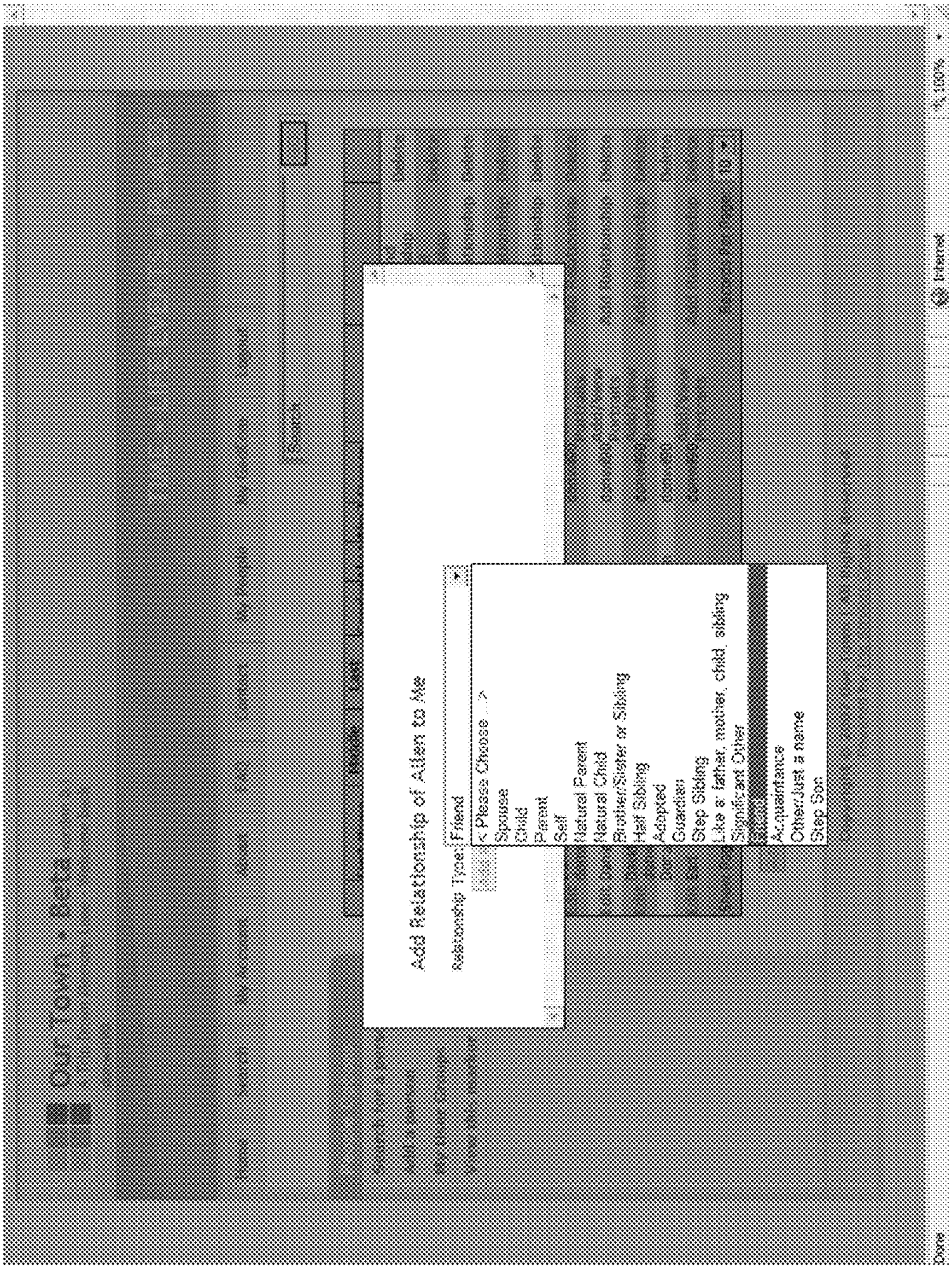
FIG. 24 illustrates an exemplary GUI through which a user can specify a relationship between himself/herself and the people identified by the people content.

Should a user wish to add or edit relationship information between himself/herself and a person on the list of FIG. 22, the user can select one of the relationship links shown in FIG. 22 for that person (e.g., the "Edit Friend Relationship" link, the "Edit Child Relationship" link, the "Add Relationship" links, etc.). In response to user selection of one of these links, an exemplary GUI such as the one shown in FIG. 24 can be presented to the user. This GUI permits the user to selection a relationship type from among a plurality of available relationship types via a drop down menu. In response to the user's selection from among these options, the database can store data that defines a relationship for the subject person to the user (or vice versa) (e.g., spouse, child, friend, parent, etc.) in association with both the subject person and the user.

Figure 25:
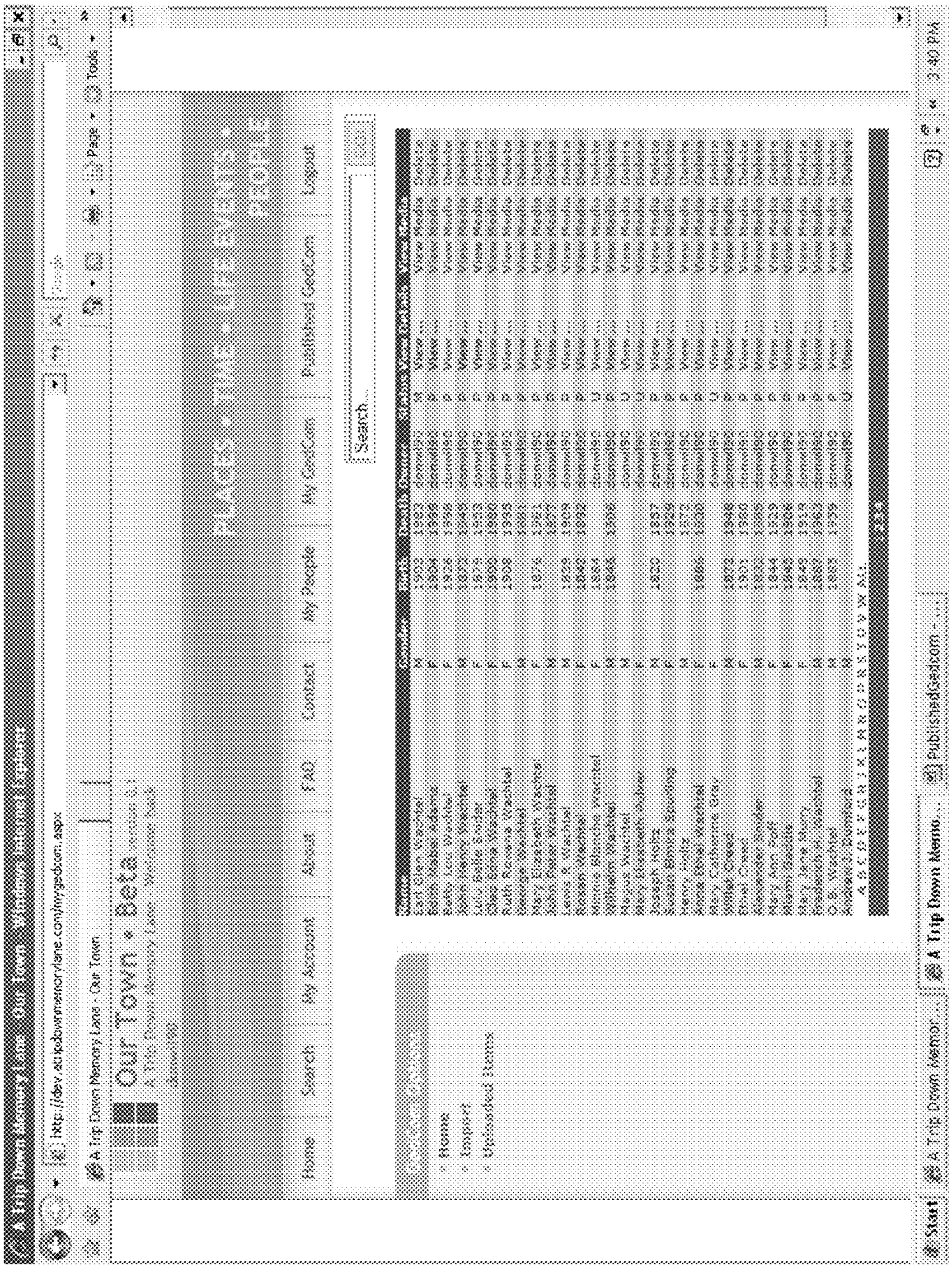
FIG. 25 illustrates an exemplary GUI through which a user can view family tree information.

After a user has registered himself/herself with the website, the user can also add, view and edit the genealogical data structures for which he/she is the owner. To access the GUI(s) for doing so, the user can select the "My Gedcom" tab shown in the exemplary GUIs in many of the figures. In response to selection of such a "My Gedcom" tab, the exemplary GUI of FIG. 25 is presented to the user which lists all MyGedcom data structures 300*b* for which the user is the owner. Each person is preferably listed by name (first, middle and last), gender, birth year, death year, "owner" and a status. The status identifier can be used to identify the extent of information contained within the MyGedcom data structures and their relationships with other genealogy data structures. For example, the status code P can be used to identify a MyGedcom data structure that contains sufficient information for it to qualify as a Published Gedcom data structure. The status code L can be used to identify a MyGedcom data structure that has been linked to a master Published Gedcom data structure. The status code U can be used to identify an unpublished MyGedcom data structure (i.e., one that is not publicly accessible). The status code M can be used to identify a master Published Gedcom data structure that has other genealogy data structures subordinated to it.

Each person in a MyGedcom data structure can also be listed with user-selectable links for (1) viewing additional details for that person, (2) viewing all media items associated with that person and (3) deleting that person from the database.

Figure 26:
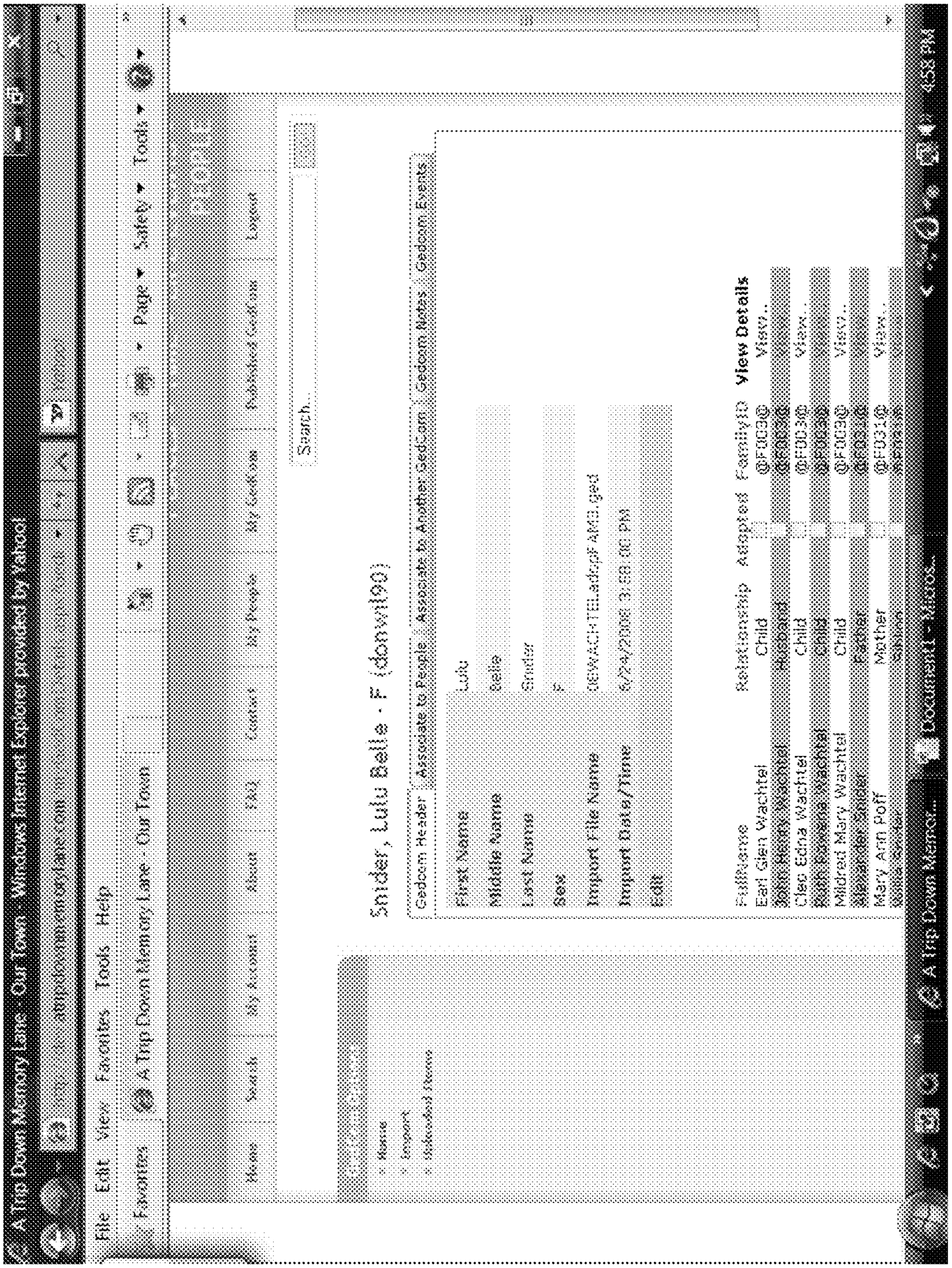
FIG. 26 illustrates an exemplary GUI through which a user can view family tree detail information.

Should the user wish to view additional details for a person listed in FIG. 25, the user can select the "View . . . " link in the View Details column for that person. In response to selection of this link, an exemplary GUI such as the one shown in FIG. 26 can be presented to the user. As shown in FIG. 26, the GUI preferably identifies the subject person (as well as the owner of record for that person in the database). With respect to this person, the user can view and edit data relating to that person in a number of ways. First, as shown in FIG. 26, the person's Gedcom header information can be reviewed. Also, that person's immediate family as known from the family tree data for that person is shown. An exemplary criteria for classification as immediate family can be parent, child and sibling relations.

Figure 27A:
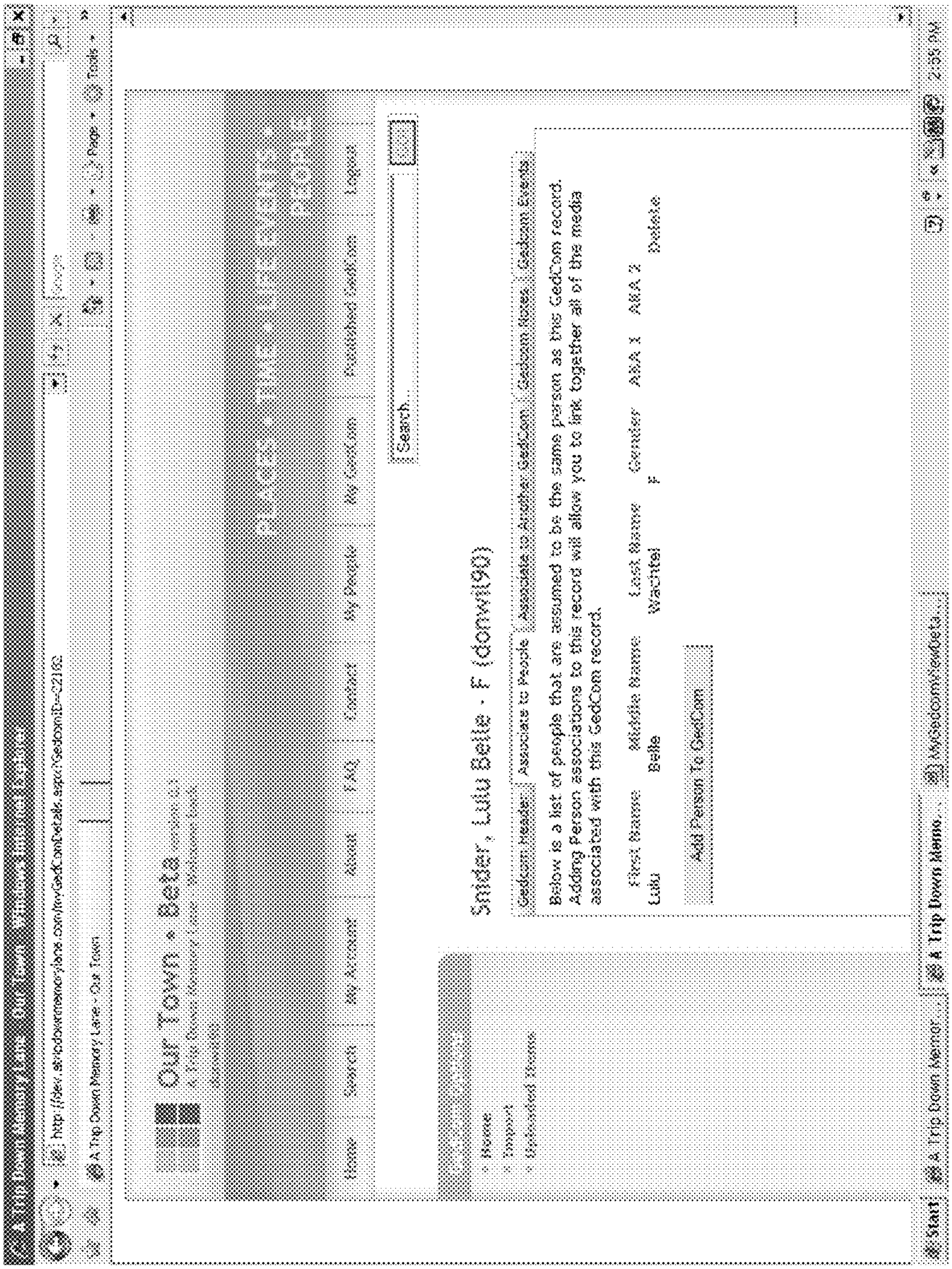
FIGS. 27(*a*) and (*b*) illustrate exemplary GUIs through which a user can associate a family tree member with additional people assigned to content.
Figure 27B:
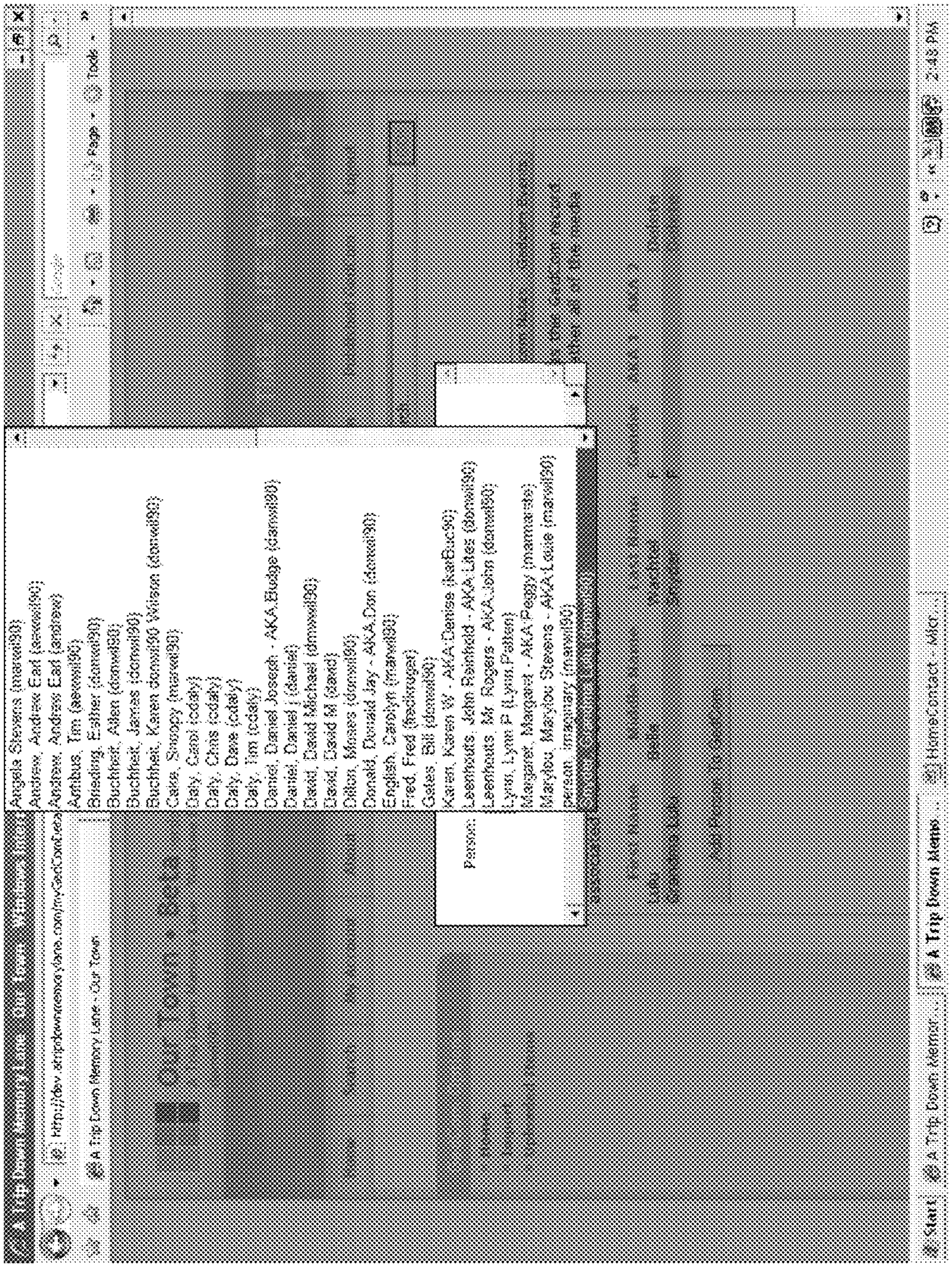
Figure 28A:
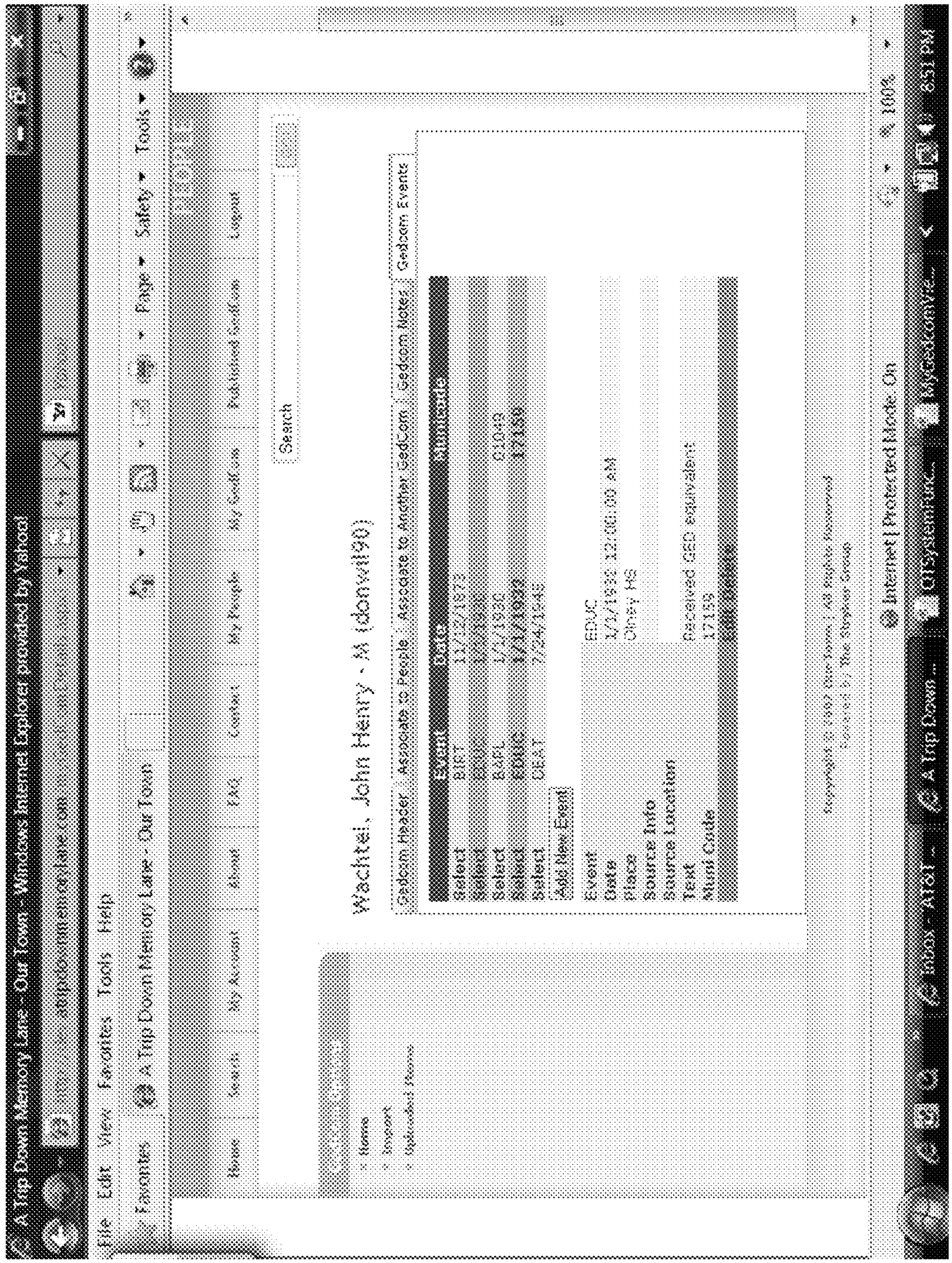
FIGS. 28(*a*)-(*d*) illustrate exemplary GUIs through which a user can add event information to a family tree.
Figure 28B:
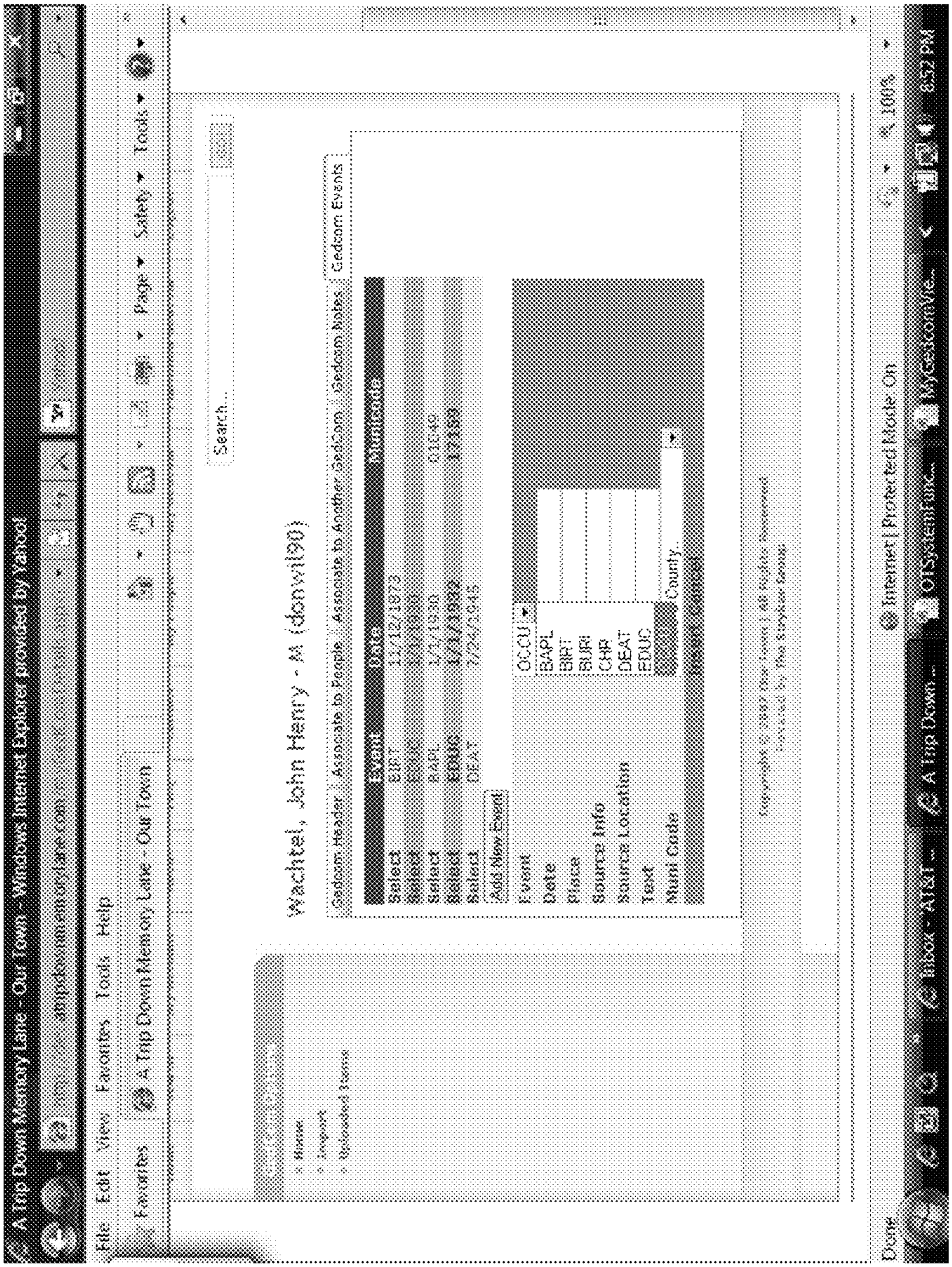
Figure 28C:
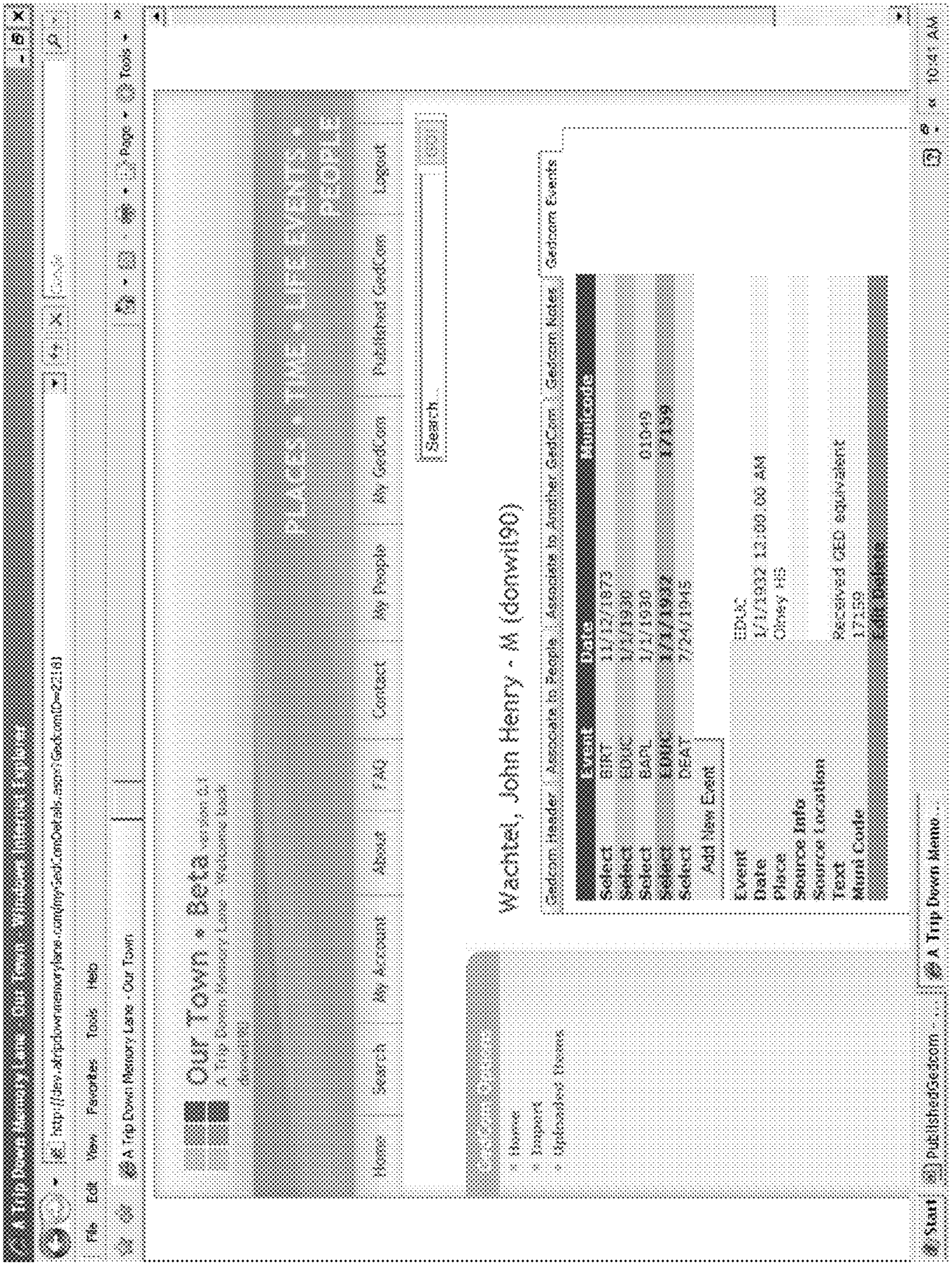
Figure 28D:
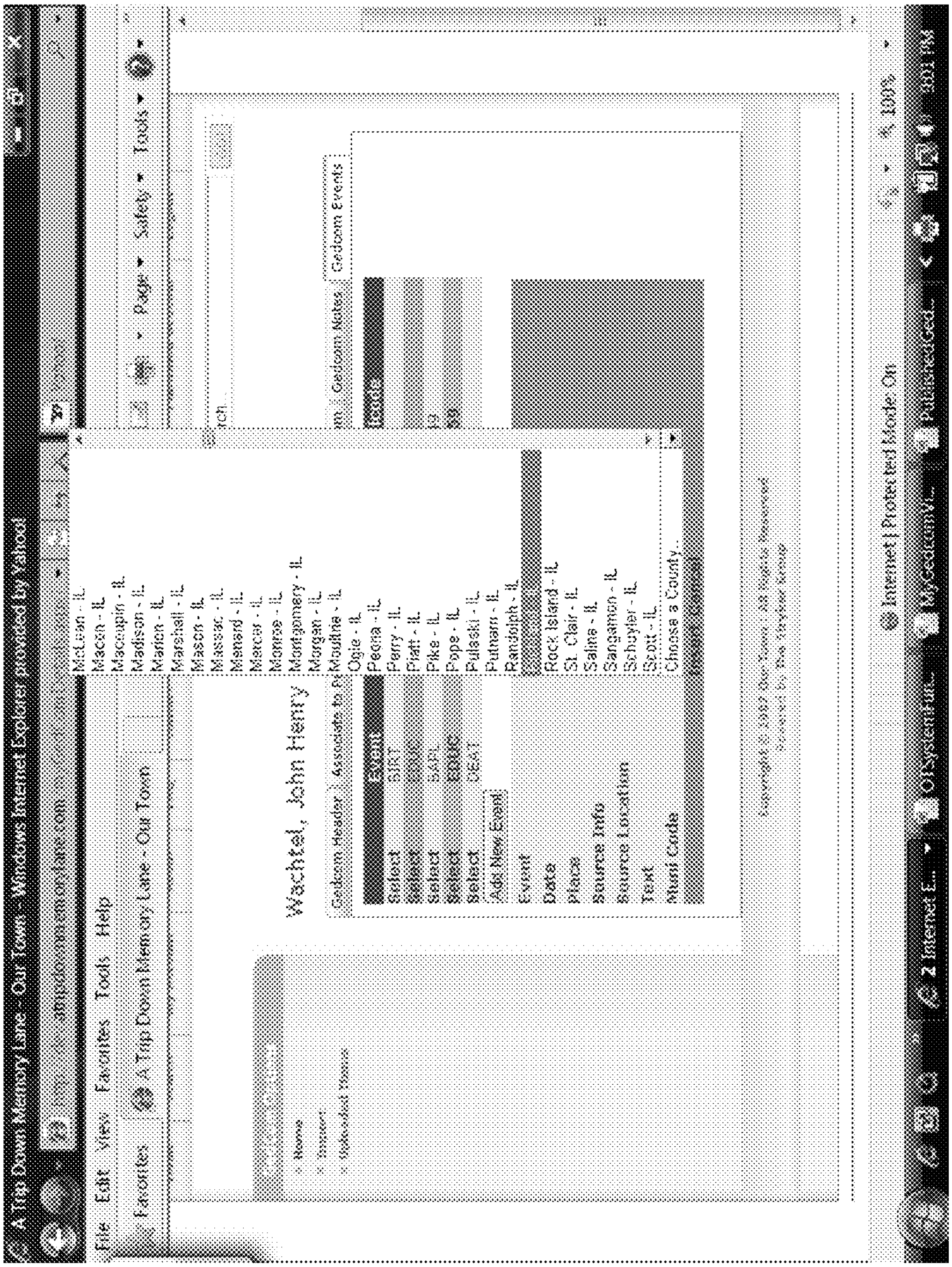

It may be the case that the subject person on the family tree is already represented in the database as another record (e.g., another people data structure), whether under the same name or a different name. In such a situation, the user may want to effectively associate the two records such that the genealogy data structure is augmented by the media data structures associated with that people data structure in the database. Should the user want to associate the subject person with another people data structure in the database, the user can select the "Associate to People" tab shown in FIG. 26. In response to user selection of this tab, the exemplary GUI of FIG. 27(*a*) can be presented to the user. The user can select the "Add Person to Gedcom" to display a list of people data structures in the database (see FIG. 28(*b*)). Preferably, this system populates this list with all accessible people data structures in the database with respect to the user. Optionally, each list person can be paired with the owner for the subject people data structure. If there is a person on this list that the user believes to be the same person as the subject person in the MyGedcom record, the user can select this person from the list. In this example, it can be seen that the user has chosen to associate the MyGedcom record for "Lulu Belle Snider" with the people data structure for Lulu Belle Wachtel (while FIG. 27(*b*) shows the GUI being used to further associate Lulu Belle Snider's MyGedcom data structure with the people data structure for "Grandma Lulu Snyder"). After a user has created this association, all media items with which the people data structure for "Lulu Belle Wachtel" (and the people data structure for "Grandma Lulu Snyder") become associated with the MyGedcom data structure for "Lulu Belle Snider". In doing so, a family historian or genealogist can leverage the multi-user networked power of the data associations present in the database to gain additional knowledge about family members.

The user can also view, add or edit life events to the Gedcom record for the subject person. In response to a selection of the "Gedcom Events" tab, a GUI such as the one shown in FIG. 28(*a*) can be presented to the user. FIG. 28(*a*) lists the known life events (e.g., birth, education, death, etc.) for the subject person that are present in the Gedcom data structure. Each of these events can have associated location data to specify where the event took place. This location data can be specified by municode or other geographic identifier. If the user wants to add a life event to the subject person's Gedcom record, he/she can select the "Add New Event" button. After such a selection, the user can define the type of life event by making a selection from the drop down menu as shown in the exemplary GUI of FIG. 28(*b*). From there, the user can enter data in the "date", "place", "source info", "source location" and "text" fields as desired (see FIG. 28(*c*)). To tie the life event to a geographic location, the user can provide a geographic identifier for the life event such as a county identification. FIG. 28(*d*) illustrates how the user can select a county for the life event via a drop down menu. This county selection can then be translated to a municode using known associations between counties and municodes.

Figure 29A:
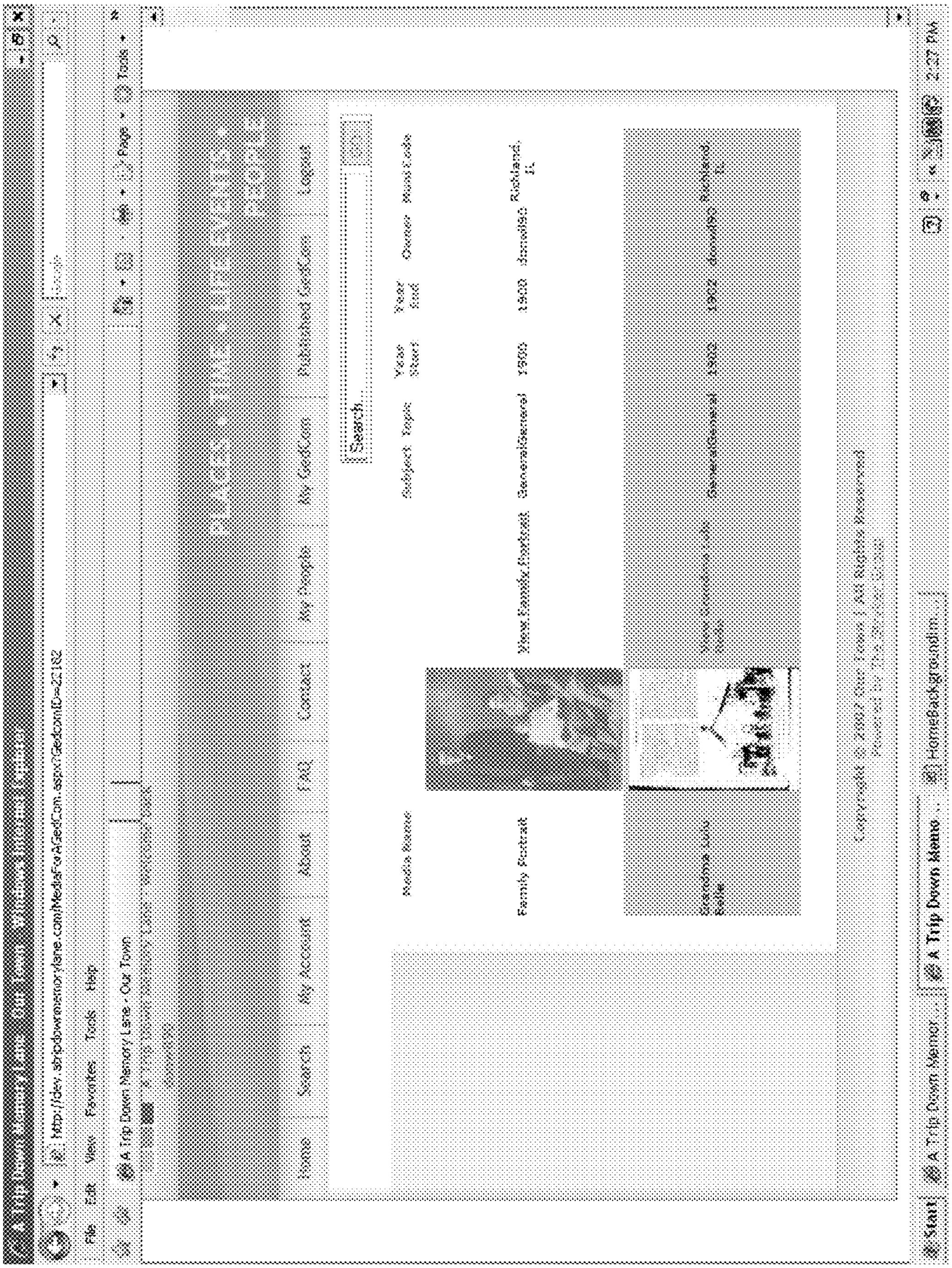
FIGS. 29(*a*) and (*b*) illustrate exemplary GUIs through which a user can view media associated with people on a family tree.
Figure 29B:
Figure 30A:
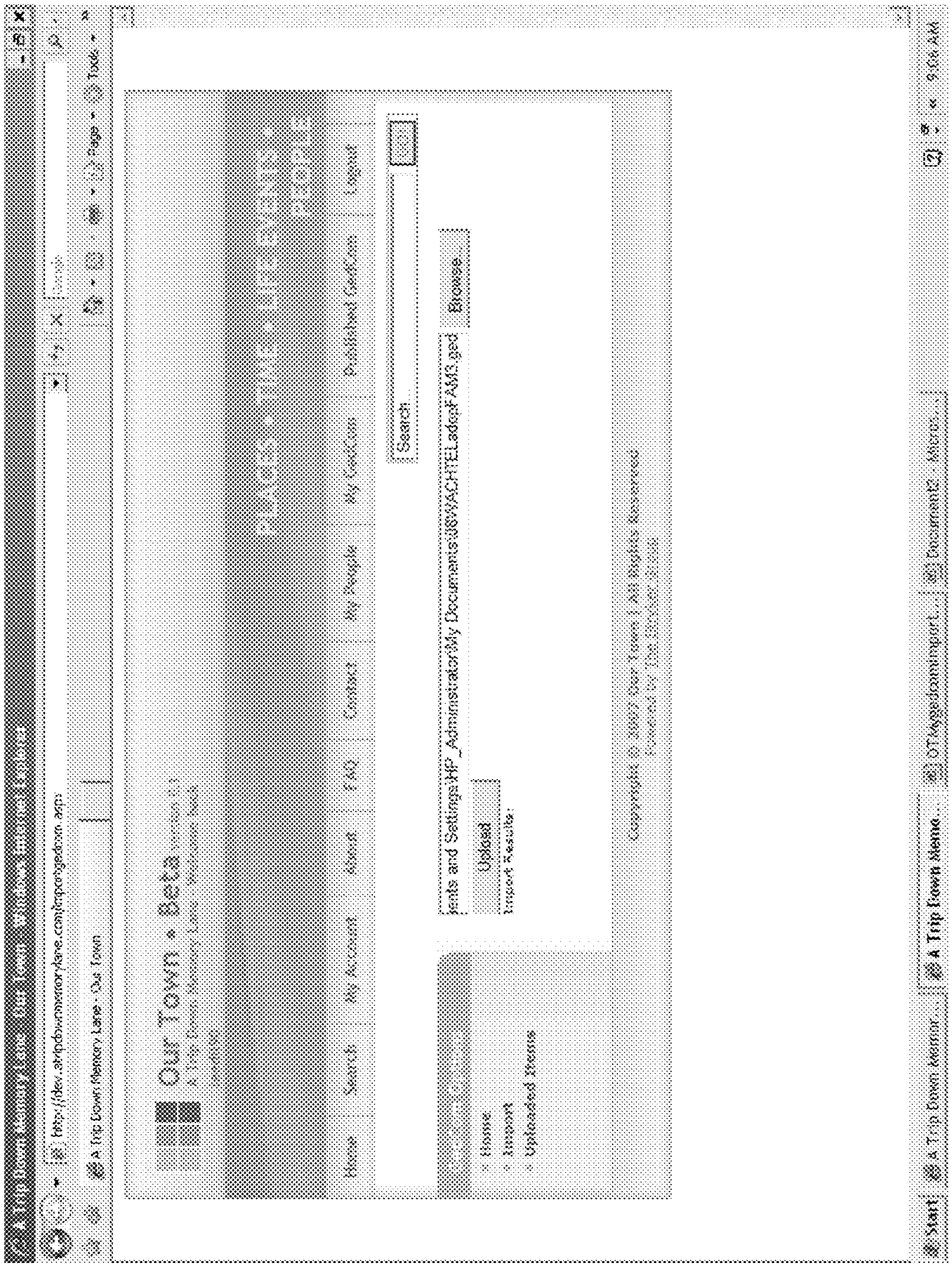
FIGS. 30(*a*)-(*i*) illustrate exemplary GUIs through which a user can upload family tree information to the database.
Figure 30B:
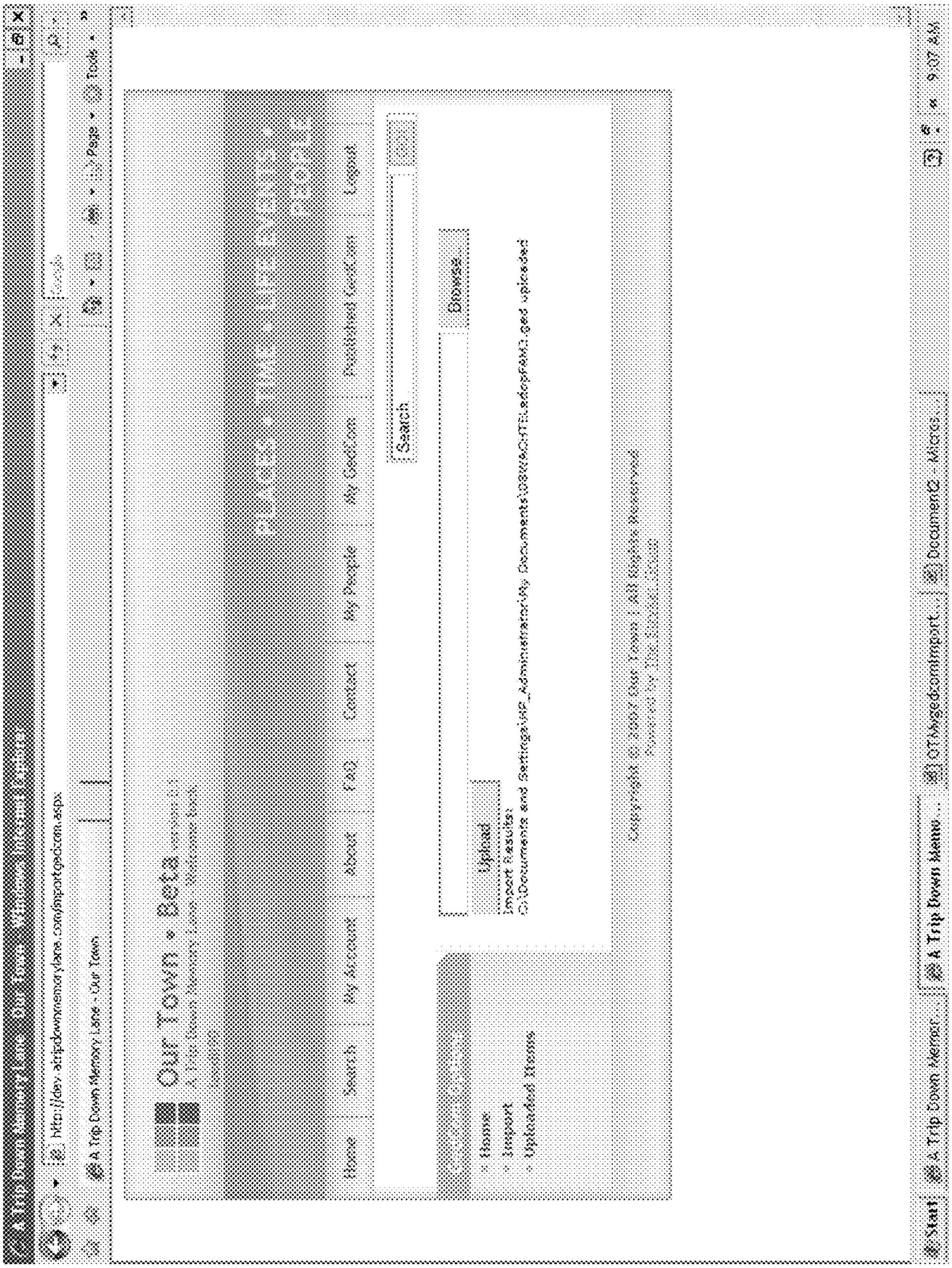
Figure 30C:
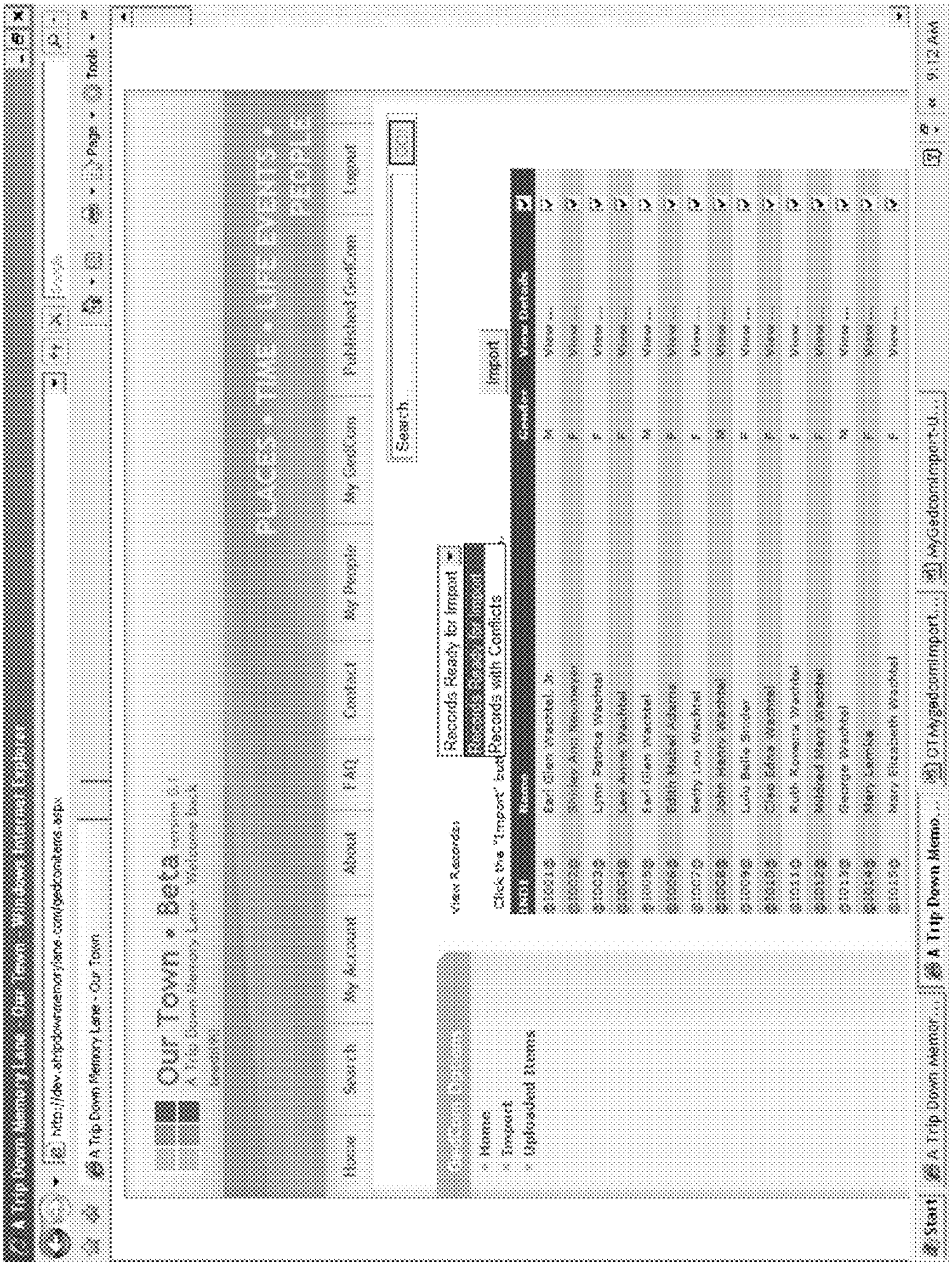
Figure 30D:
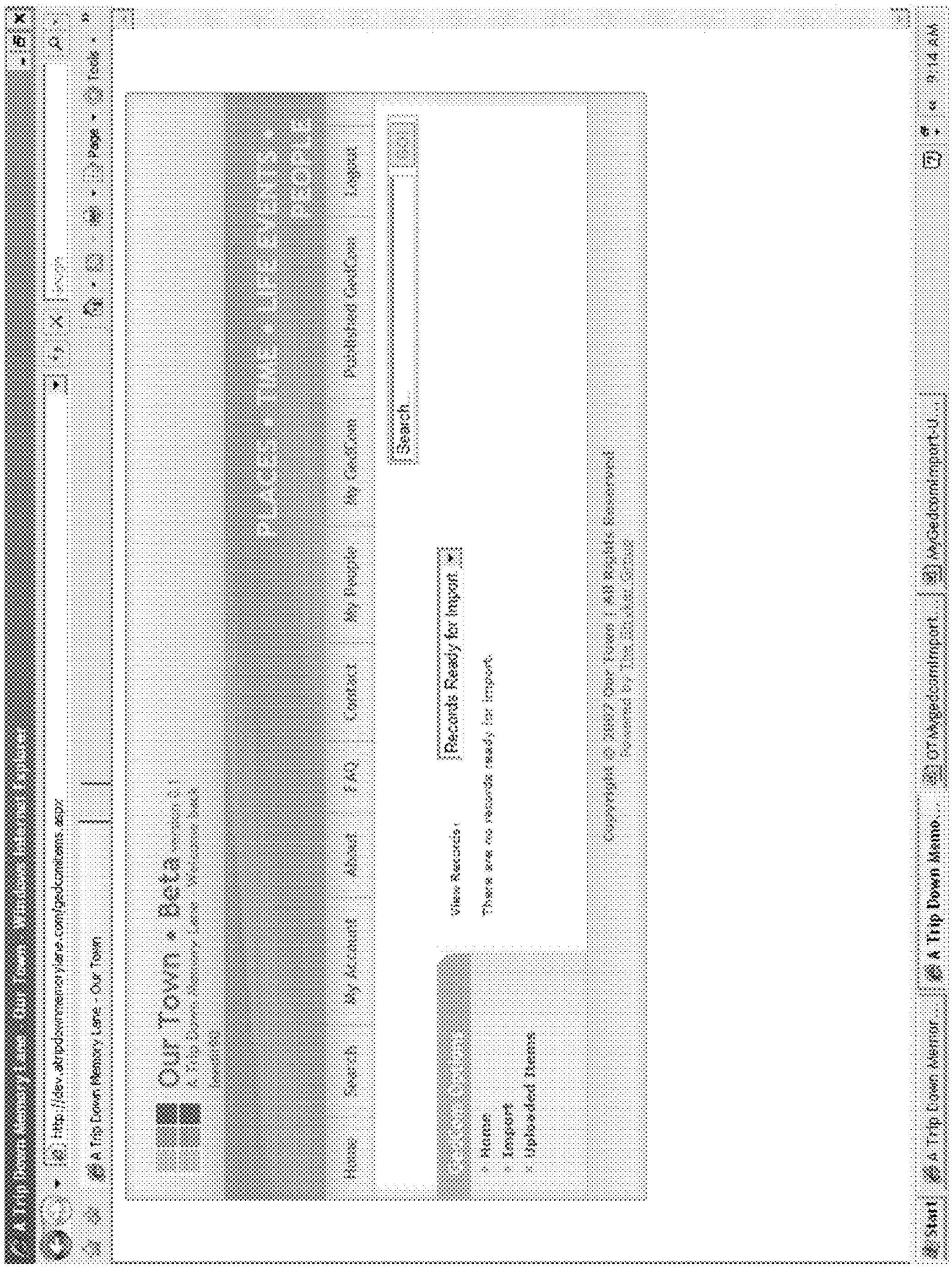
Figure 30E:
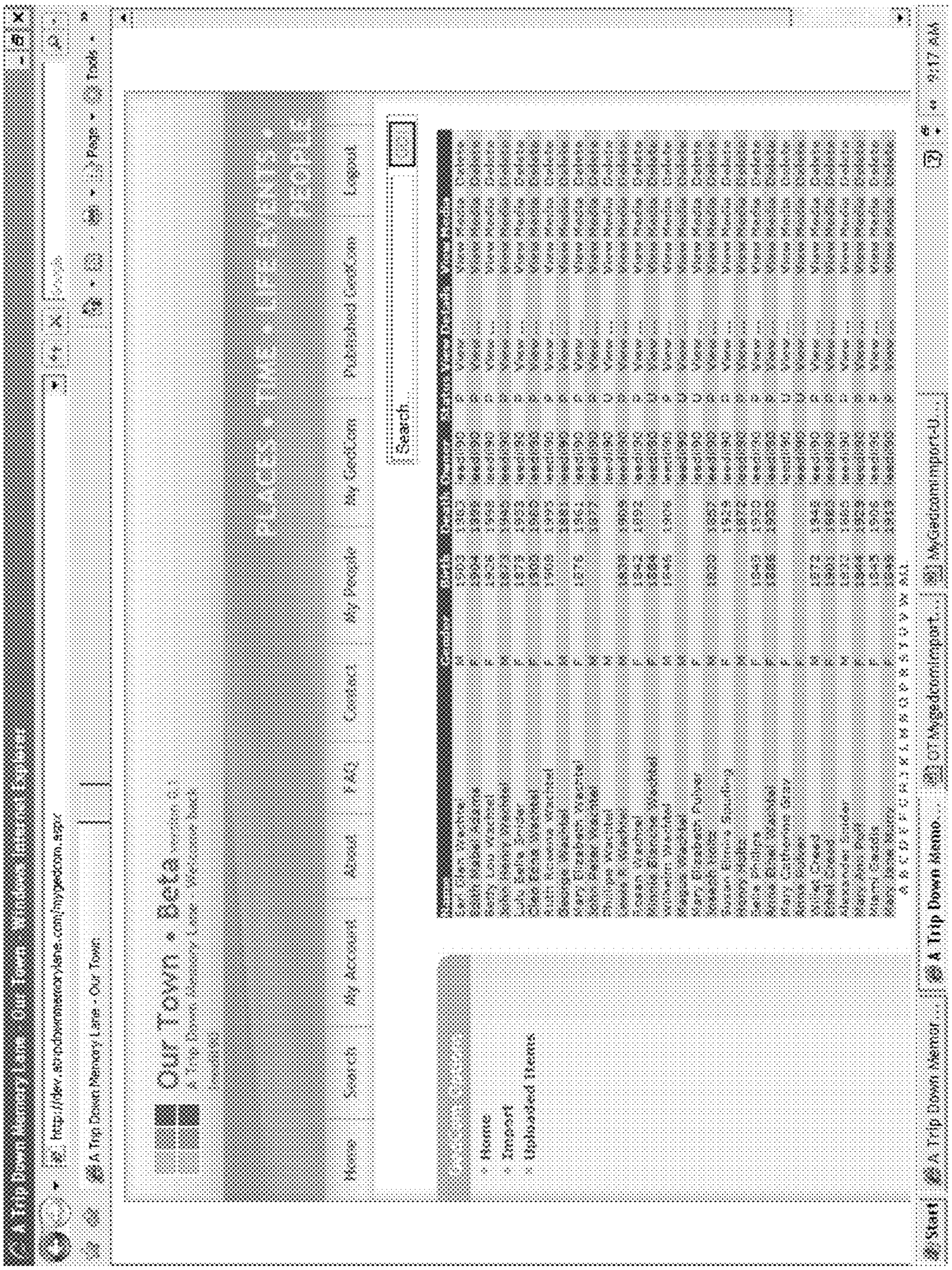
Figure 30F:
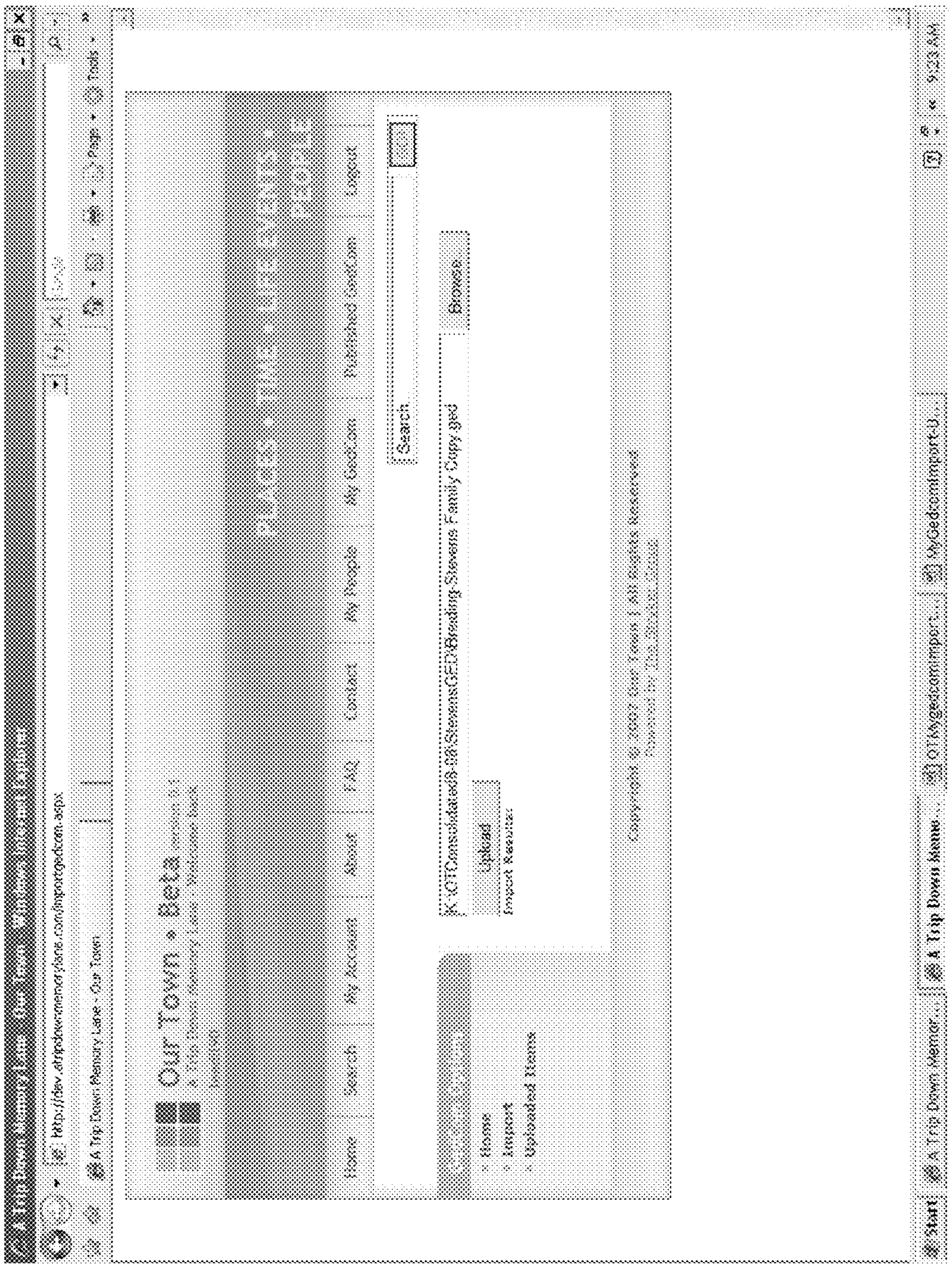
Figure 30G:
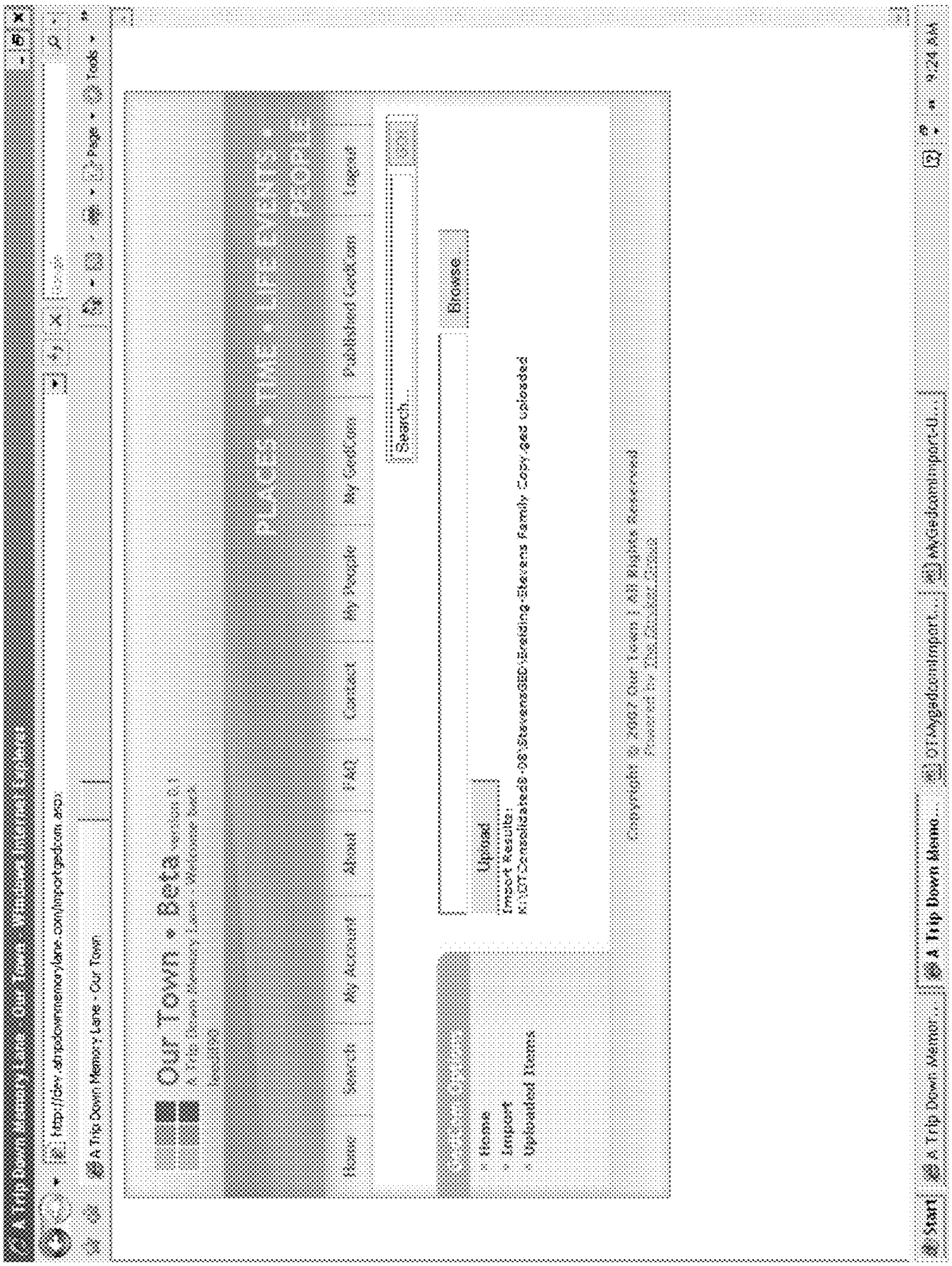
Figure 30H:
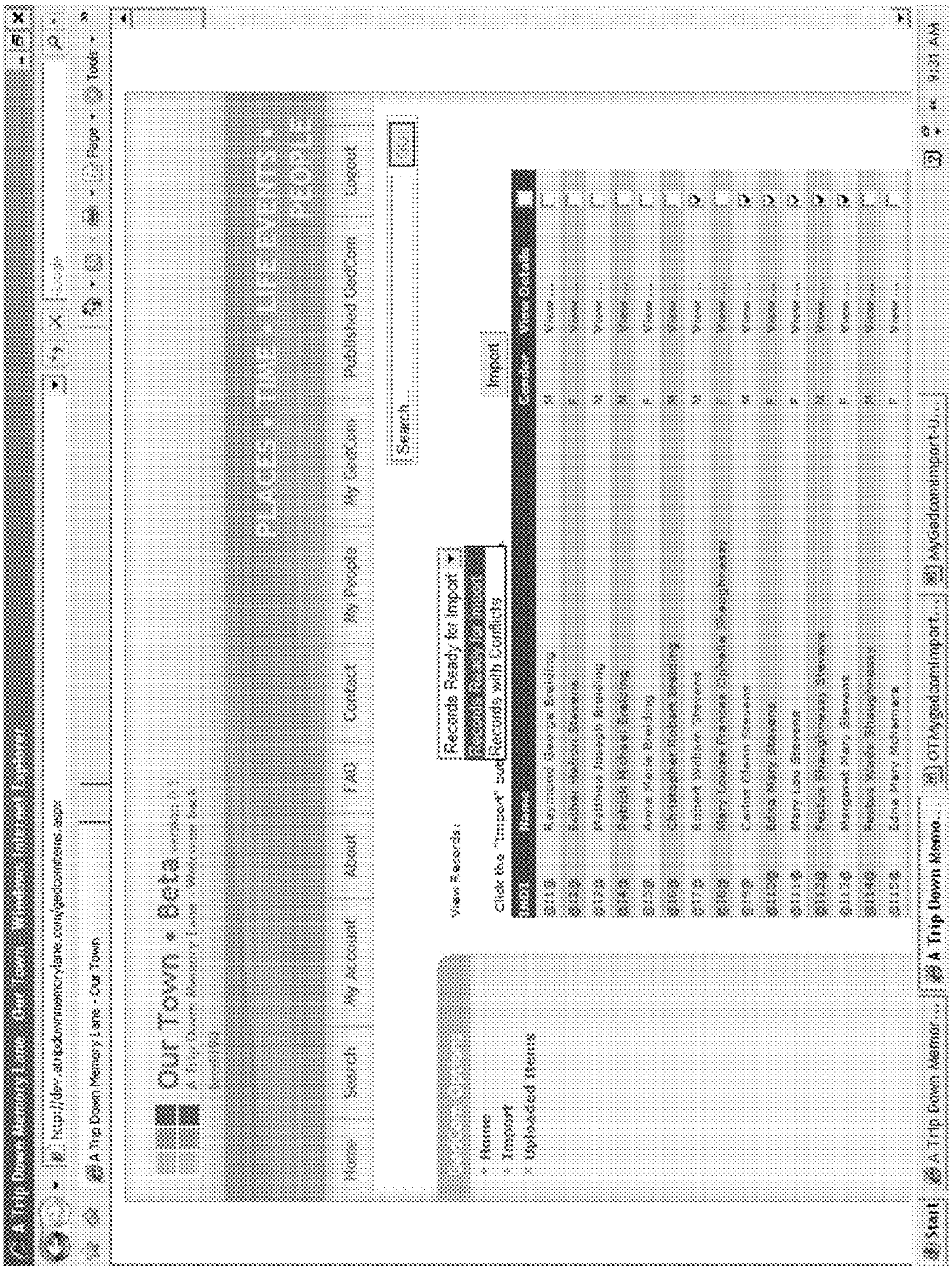
Figure 30I:
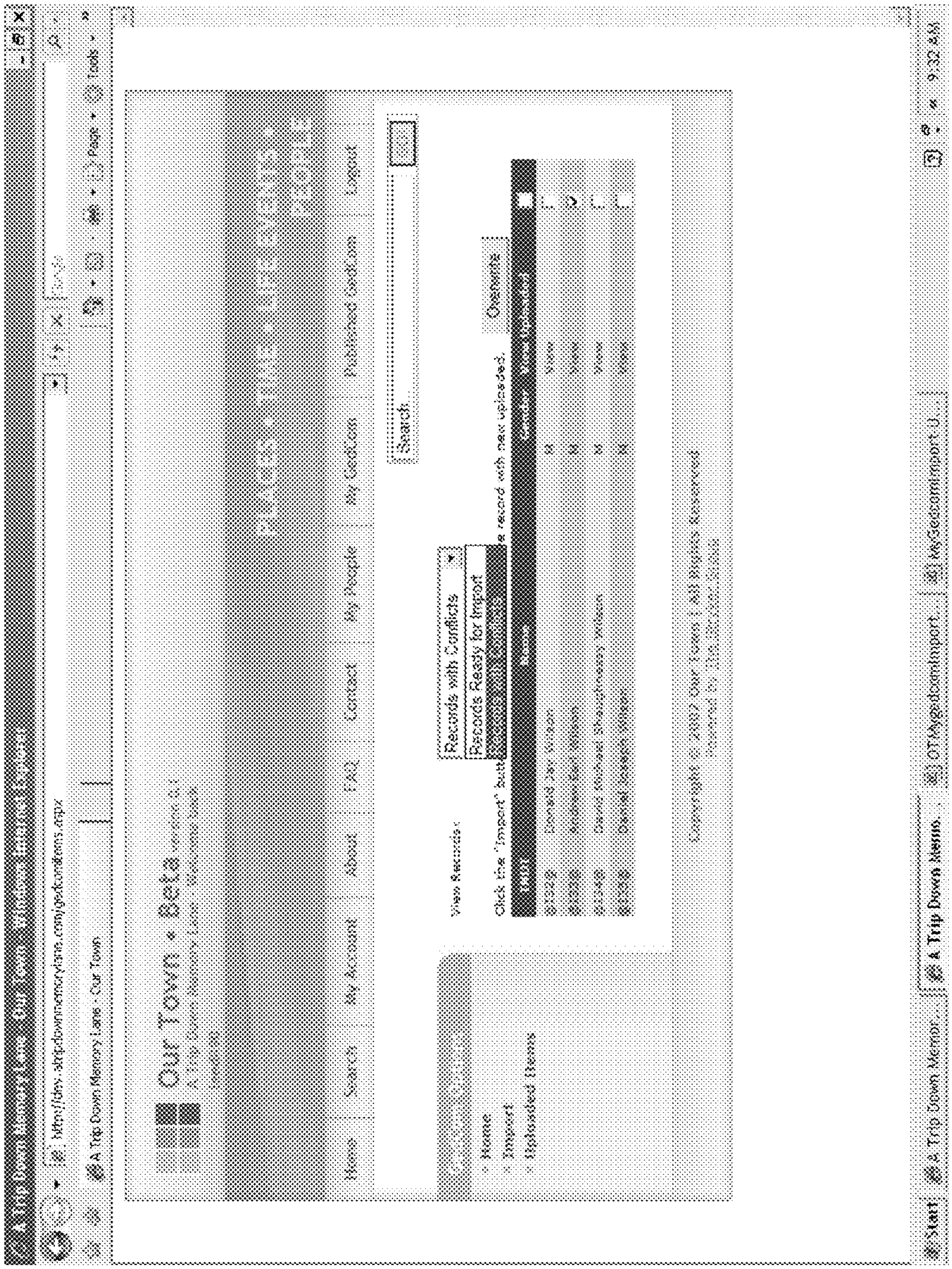
Figure 31A:
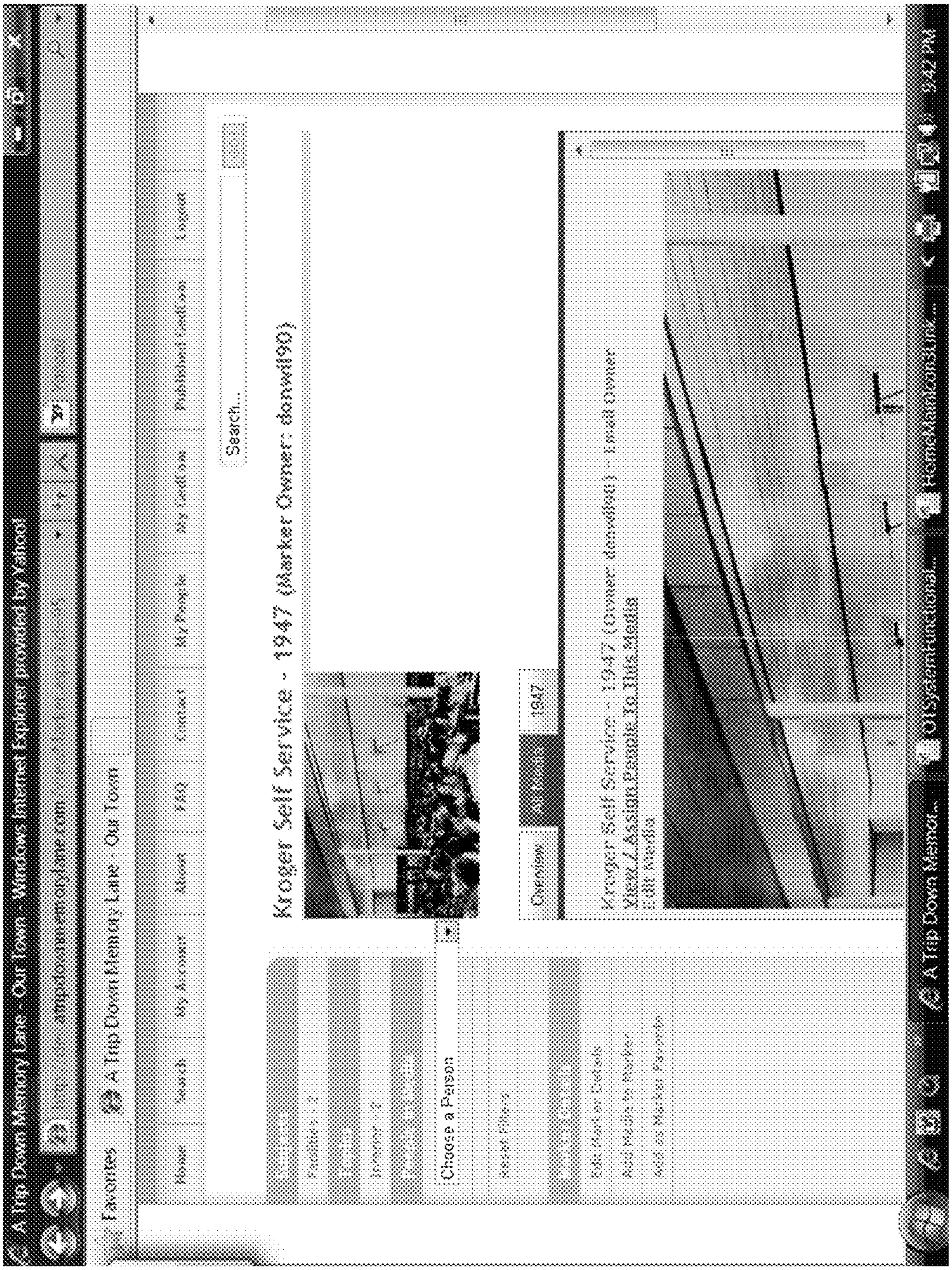
FIGS. 31(*a*)-(*d*) illustrate exemplary GUIs through which a user can assign people to media items.
Figure 31B:
Figure 31C:
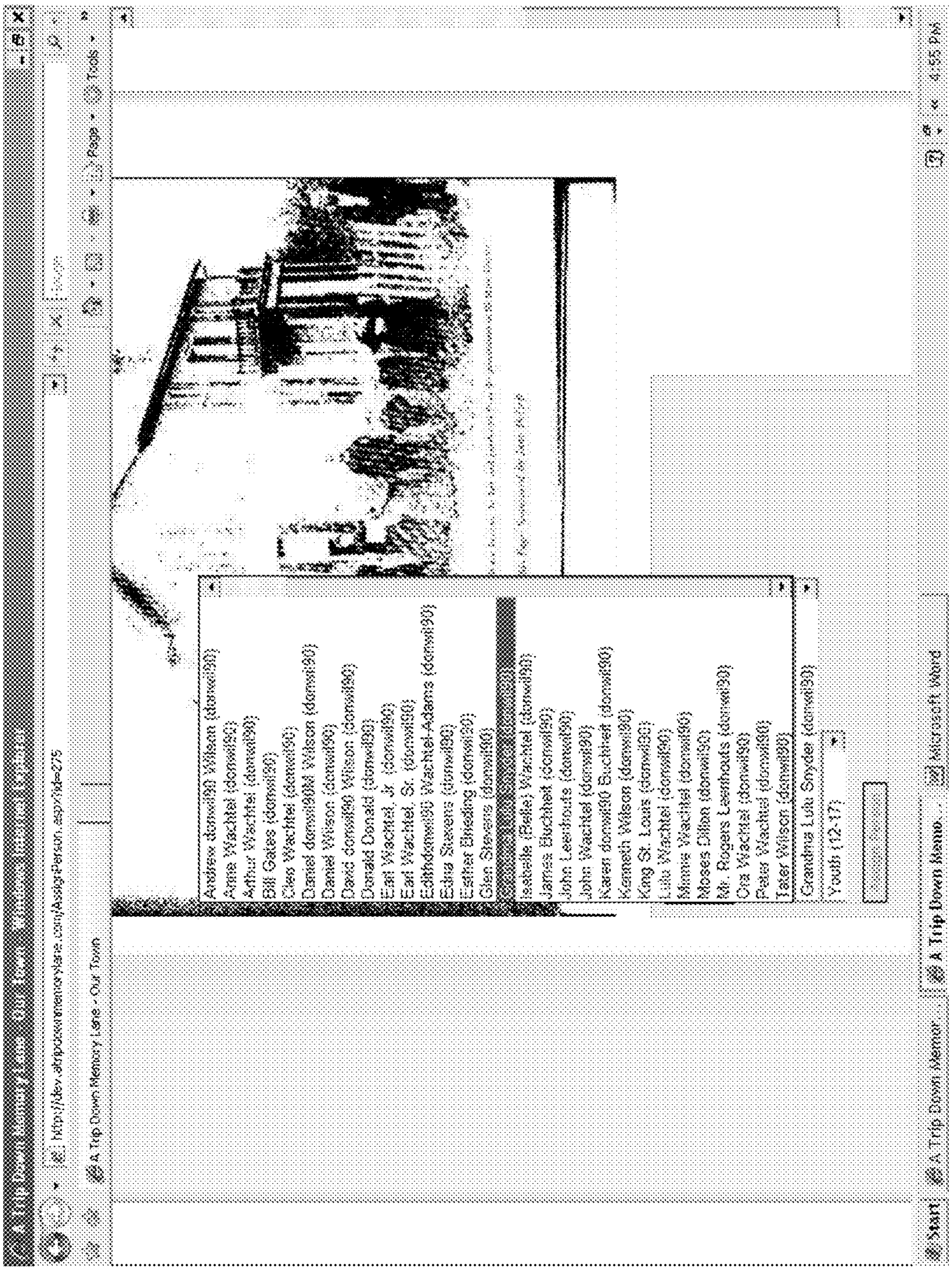
Figure 31D:
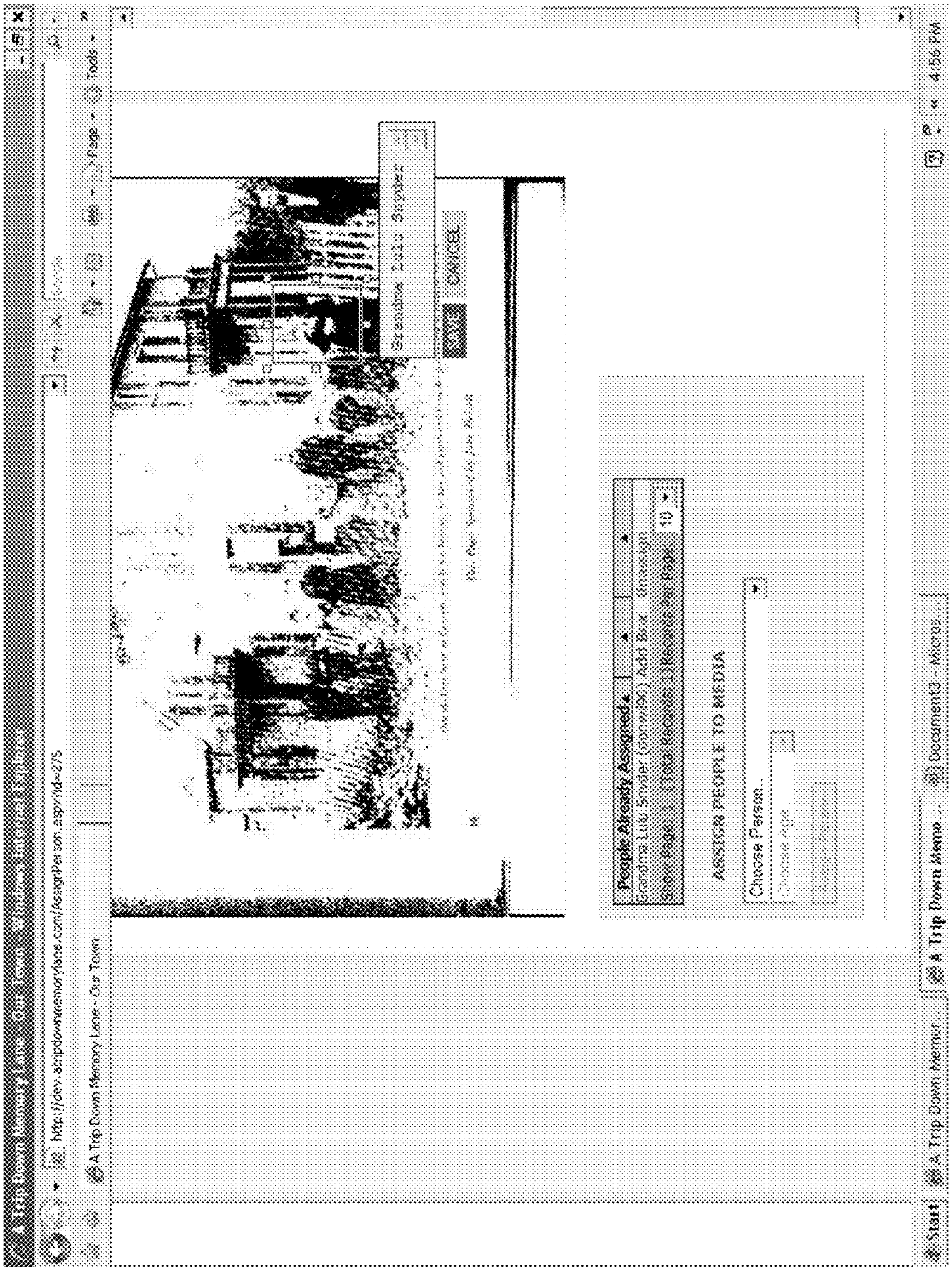

Should the user wish to view additional all media items associated with a person listed in FIG. 25, the user can select the "View Media" link in the View Media column for that person. In response to selection of this link, an exemplary GUI such as the one shown in FIG. 29(*a*) can be presented to the user. As shown in FIG. 29(*a*), the GUI preferably lists all of the media items associated with the subject MyGedcom data structure. Each media item can be listed by a name, a thumbnail (if appropriate), its subject, topic, applicable year(s), "owner" and geographic identifier. The list can also include a selectable link for each media item to access an enlarged view of that media item. FIG. 29(*b*) depicts an exemplary enlarged view of a media item from the list. If the media item is a photograph and people have been tagged in that photograph (see discussions below in connection with FIGS. 31(*a*)-(*d*)), the photograph display can display a border around the known people together with a label to identify the person, as shown in FIG. 29(*b*). A table below the photograph can list all of the people who have been tagged within the photograph.

Should the user want to import a MyGedcom data structure to the database, the user can select the "Import" link shown in FIG. 25 (see also FIG. 26 and other figures). Following selection of the "Import" link, FIGS. 30(*a*)-(*i*) depict exemplary GUIs through which the user can import a MyGedcom data structure to the database. FIG. 30(*a*) depicts an exemplary GUI through which the user can browse for a Gedcom-compliant file to upload to the database. If the upload is successful, a GUI such as the one shown in FIG. 30(*b*) can be displayed.

Upon successful upload, the exemplary GUI of FIG. 30(*c*) includes a display that lists each person record in the uploaded Gedcom-compliant file. Each person is preferably listed by name and gender. Each person can also be listed by a selectable "View . . . " link for viewing the genealogical information present in the person's record from the uploaded Gedcom-compliant file. Each person can also be listed by a selectable box for controlling whether a MyGedcom data structure is to be created from the person's genealogy information present in the uploaded Gedcom-compliant file.

It may be the case that the database 100 already has a genealogy data structure for a person who has a record in the uploaded Gedcom-compliant file. To alert the user to such situations, the GUI can include view options corresponding to "Records Ready for Import" and "Records with Conflicts". In response to selection of the "Records Ready for Import" option, the GUI will list the people records in the uploaded Gedcom-compliant file for which a name match was not found with respect to a genealogy data structure of the user's in the database. The FIG. 30(*c*) GUI illustrates such a list.

In response to user selection of the "Import" button on the GUI, the system will create genealogy data structures for storage in the database with respect to the listed people who have been checked off. These genealogy data structures will be populated with the genealogy information for the subject person from the uploaded Gedcom-compliant file. After such an import operation, there will be no more people records to view on the GUI, as shown in the example of FIG. 30(*d*). However, there will be new MyGedcom data structures that the user can view if the user selects the "My Gedcom" tab (see FIG. 30(*e*)).

If the user wants to upload another Gedcom-compliant file to the website, he/she can do so using the same "Import" procedure identified under the "Gedcom Options" display. An example of this is shown in connection with FIGS. 30(*f*) and (*g*). FIG. 30(*h*) illustrates the newly imported people records from the uploaded Gedcom-compliant file identified in FIG. 30(*f*) that qualify as "Records Ready for Import". If the user switches the view to "Records with Conflicts", the resultant GUI list of FIG. 30(*i*) can be displayed. The people records listed in FIG. 30(*i*) will be those people records from the newly-uploaded Gedcom-compliant file for which there was a name match with respect to one of the user's genealogy data structures. If the user wishes to continue with an import of the genealogy information for the subject person, the user can check that person's corresponding box in the GUI. Then, upon selection of the "Overwrite" button, the system will overwrite the pre-existing genealogy data structure for the subject person with the new genealogy information.

It should be understood that the system can employ a number of metrics for identifying when conflicts exist between newly uploaded genealogy information and pre-existing genealogy data structures. For example, in addition to (or alternatively to) name matching operations, the system can perform matching operations against birth date, death date, parent/children information, etc. to make a decision regarding whether a conflict may exist. Furthermore, to provide users with an ability to better evaluate whether the pre-existing data structure should be overwritten, the system can be configured to provide the user with a GUI that comparatively displays the information present in the two possibly-conflicting records. For example, in response to selecting a "View Conflict" link or the like, a GUI can be presented that lists in a side-by-side fashion or the like the information in the two-conflicting records. From this GUI, the user can decide which record to keep. Further still, the GUI could be configured to selectively merge different fields of genealogy information from either of the two conflicting records into a resultant merged genealogy data structure.

FIGS. 31(*a*)-(*d*) depict exemplary GUIs through which users can assign people to media items. Such functionality can be accessed through other GUIs such as described above in connection with FIGS. 8(*b*) and 29(*b*) or in response to selecting a marker icon displayed on a map interface. The exemplary GUI of FIG. 31(*a*) shows an exemplary media display for a selected marker icon. This GUI depicts not only the default picture associated with the subject marker data structure but also all other media items associated with the selected marker icon in a GUI similar to that described above in connection with FIG. 8(*c*). A practitioner may also choose to include a user-selectable "My Media" option or the like that the user can select to display a list of all media items that the user has added to the database. If there are numerous media items shown in the GUI, the user has the option to filter the media display by various criteria such as any of the following media subject, media topic, assigned people, etc. as indicated in the left portion of FIG. 31(*a*).

As shown in FIG. 31(*b*), the GUI preferably identifies all of the people data structures that have been assigned to a subject media item. If the user wants to tag a media item with one or more additional persons, the user can select the "View/Assign People to this Media" link. After selecting this link, the user can use his/her mouse or other input device to draw a box around or otherwise identify a person in the photograph. The user can then create a label for this identification that provides a name for the person (possibly in conjunction with a caption (see FIG. 31(*b*)). FIG. 31(*c*) depicts another example of tagging a photograph with person identifiers. After a person has been isolated in the photograph, the user can access a drop down menu that is populated with all of the people data structures in the database (or if desired by a practitioner all of the people data structures for which the user is the owner). If the person in the photograph is on this list, the user can select that name from the list to thereby associate the people data structure for that person with the photograph as well as specifically identify where that person appears in the photograph. Furthermore, the user can identify an age range for the assigned person as shown in the media item. This data can then be used by the system to categorize the media item when displaying a chronological order of all media items for a particular person. After the media item is tagged with a person, as can be seen in FIG. 31(*d*), the GUI table for identifying people assigned to the media item can then be updated with the newly assigned person.

Figure 32:
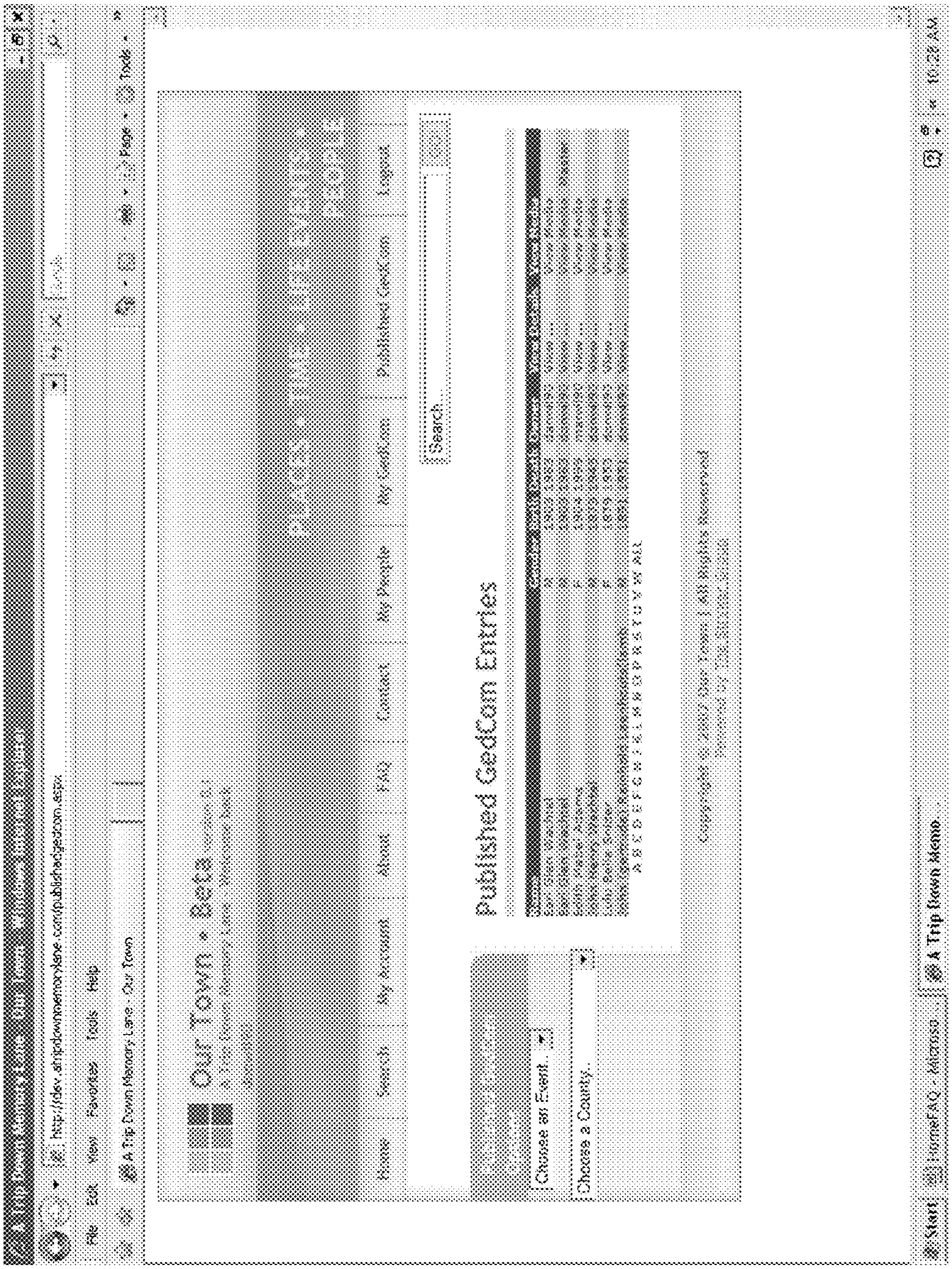
FIG. 32 illustrates an exemplary GUI through which a user can view published family tree information.

After a user has registered himself/herself with the website, the user can also view and edit the Published Gedcom data structures accessible in the database. As mentioned above, preferably Published Gedcom data structures are available to all users of the system. To access the GUI(s) for doing so, the user can select the "Published Gedcom" tab shown in the exemplary GUIs in many of the figures. In response to selection of such a "Published Gedcom" tab, the exemplary GUI of FIG. 32 is presented to the user. The FIG. 32 GUI is preferably similar to the GUI of FIG. 25, albeit for Published Gedcom data structures rather than MyGedcom data structures.

Figure 33:
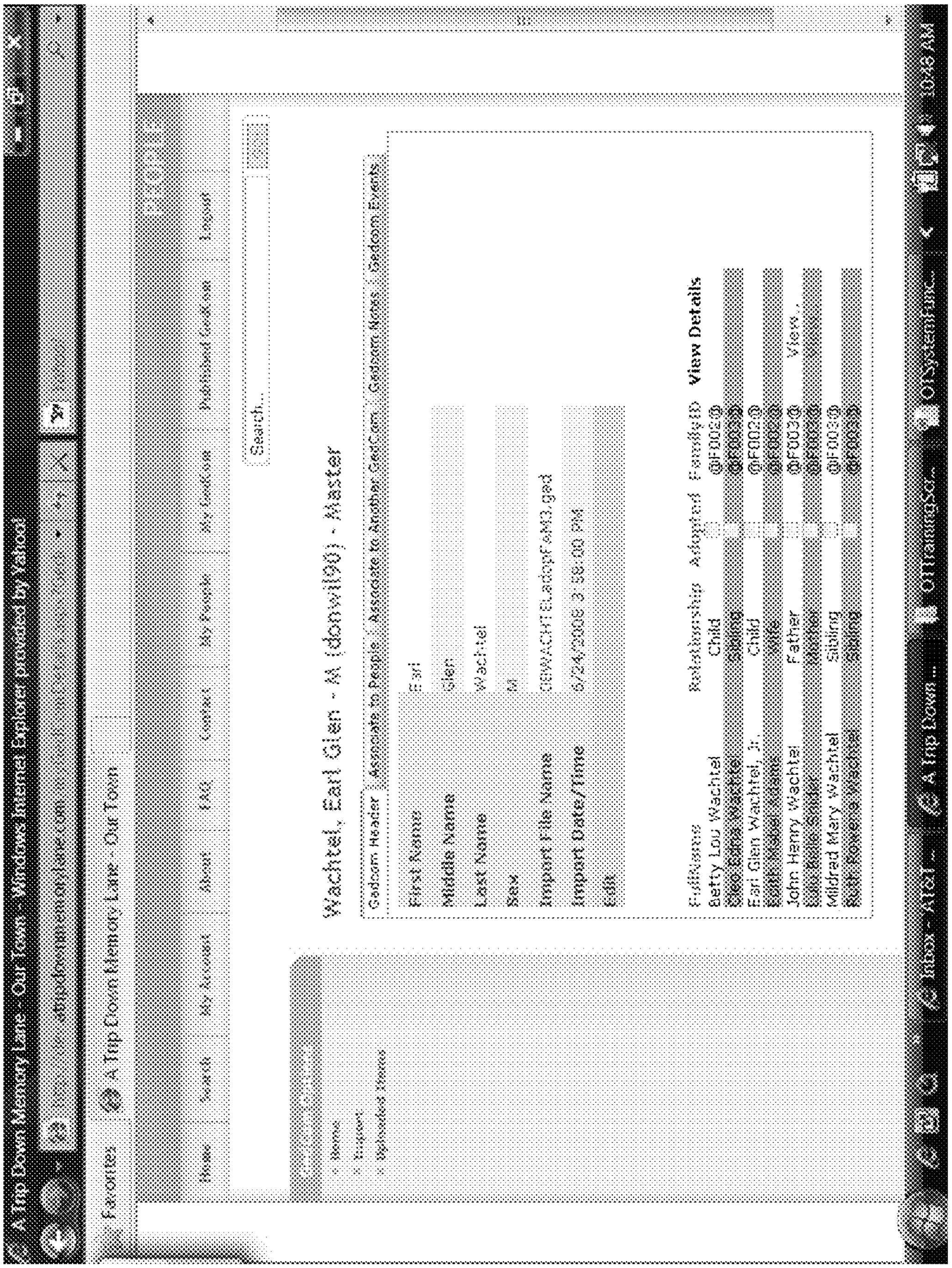
FIG. 33 illustrates an exemplary GUI through which a user can view published family tree detail information.

In response to the user selecting a "View . . . " link in the "View Details column of FIG. 32 for a person listed among the Published Gedcom data structures, the exemplary GUI of FIG. 33 can be presented to the user. This GUI is preferably similar to the GUI of FIG. 26, albeit for published Gedcom records. However, it is worth noting that the listed Published Gedcom data structures may optionally be listed with a user-selectable "Copy to MyGedcom" link or the like which is effective upon user selection to create a copy of a Published Gedcom data structure as a MyGedcom data structure for which the user is the owner. Such a feature would permit a user to create his/her own version of someone else's published Gedcom data structure, and in doing so, the user could associate media with the newly created MyGedcom data structure.

Figure 34A:
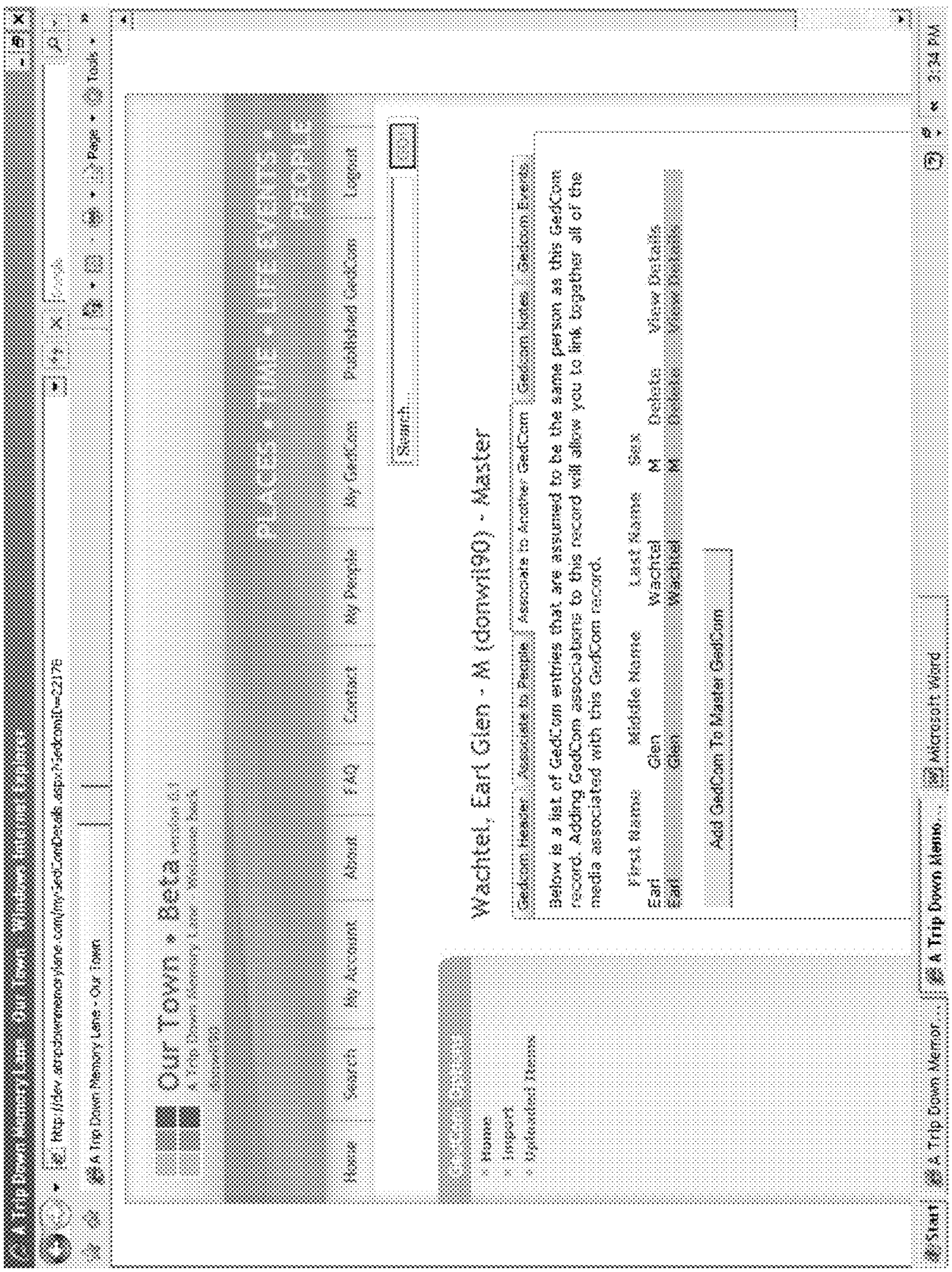
FIGS. 34(*a*) and (*b*) illustrate exemplary GUIs through which a user can associate family trees with each other.
Figure 34B:
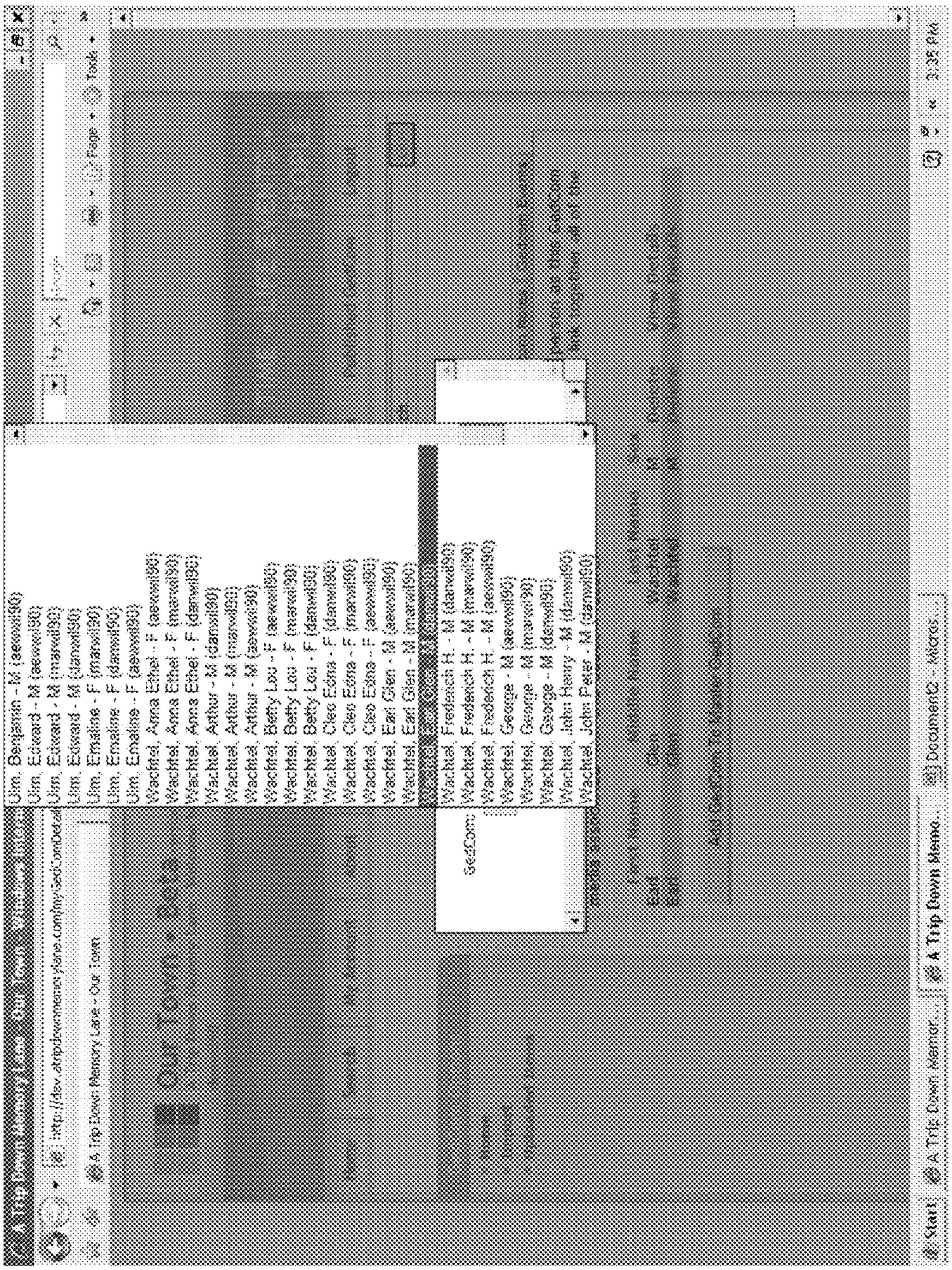

It may be the case that the user believes that two different published Gedcom data structures describe the same person. If this is the case, the user may want to associate the two published Gedcom data structures to enlarge the potential knowledge base with respect the subject person and family. That is, through a common family member, two previous separate family trees can be linked. To initiate such a process, the user can select the "Associate to Another Gedcom" tab to cause the display of the exemplary GUI of FIG. 34(*a*). Through this interface, a user will have the ability to create an association between a published Gedcom data structure for which he/she is the "master" (e.g., the owner or designated master of a user group having control over the subject Published Gedcom data structure) and another Published Gedcom data structure. To associate the published Gedcom data structure for "Earl Glen Wachtel" with another published Gedcom data structure, the user can select the "Add Gedcom to Master Gedcom" data structure. This will cause the exemplary GUI of FIG. 34(*b*) to be displayed which is a list populated with all Published Gedcom data structures in the database (preferably identified by name and the associated owner). If the user wishes to associate a target Published Gedcom data structure on this list with the subject master Published Gedcom data structure, the user can select the listed person. In response to this selection, the system creates an association between the two Published Gedcom data structures, thereby bringing any media associated with the target Published Gedcom data structure under the umbrella of the user's master Published Gedcom data structure for that person.

Figure 35A:
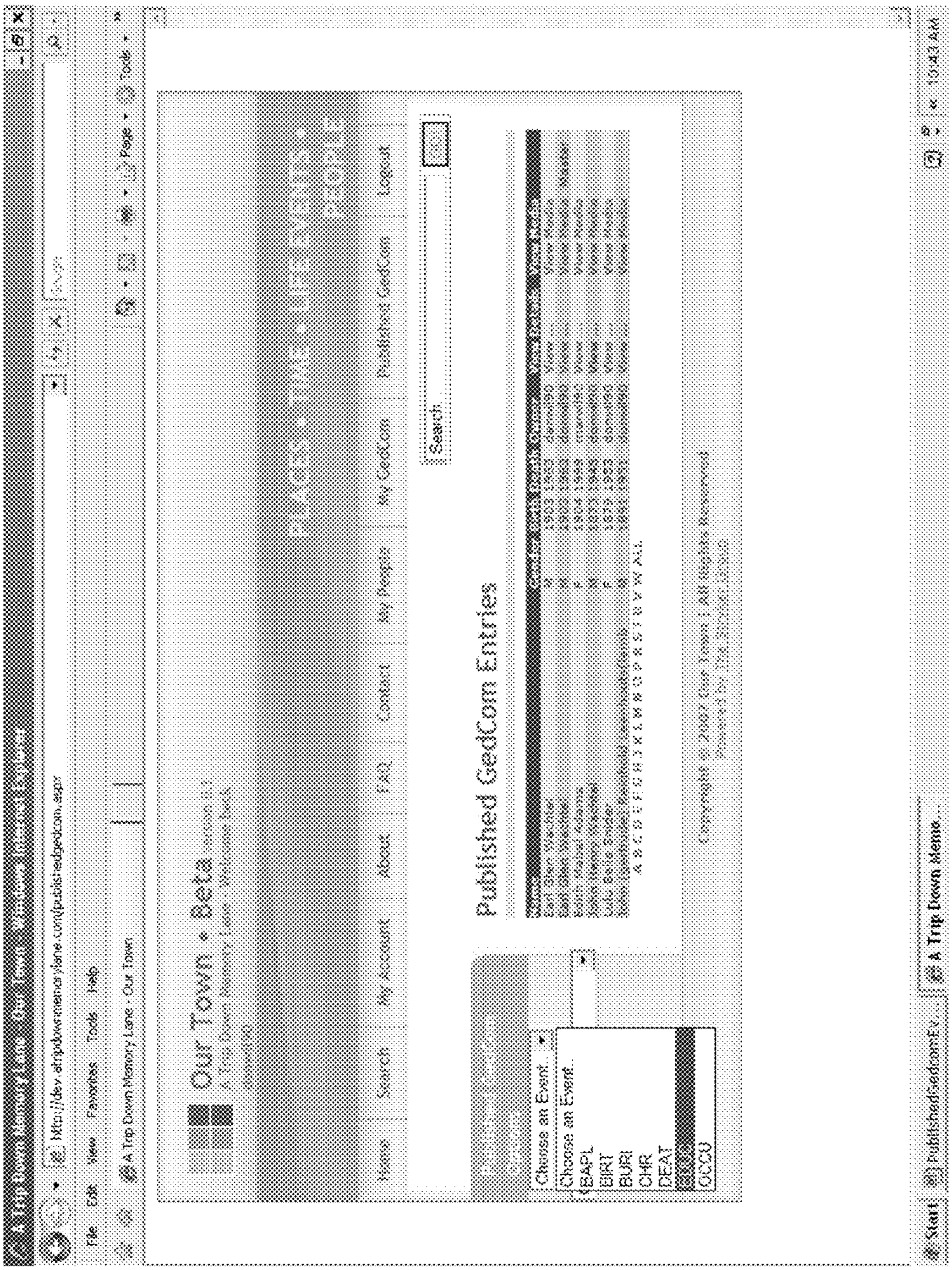
FIGS. 35(*a*) and (*b*) illustrate exemplary GUIs through which a user can filtered published family tree information.
Figure 35B:
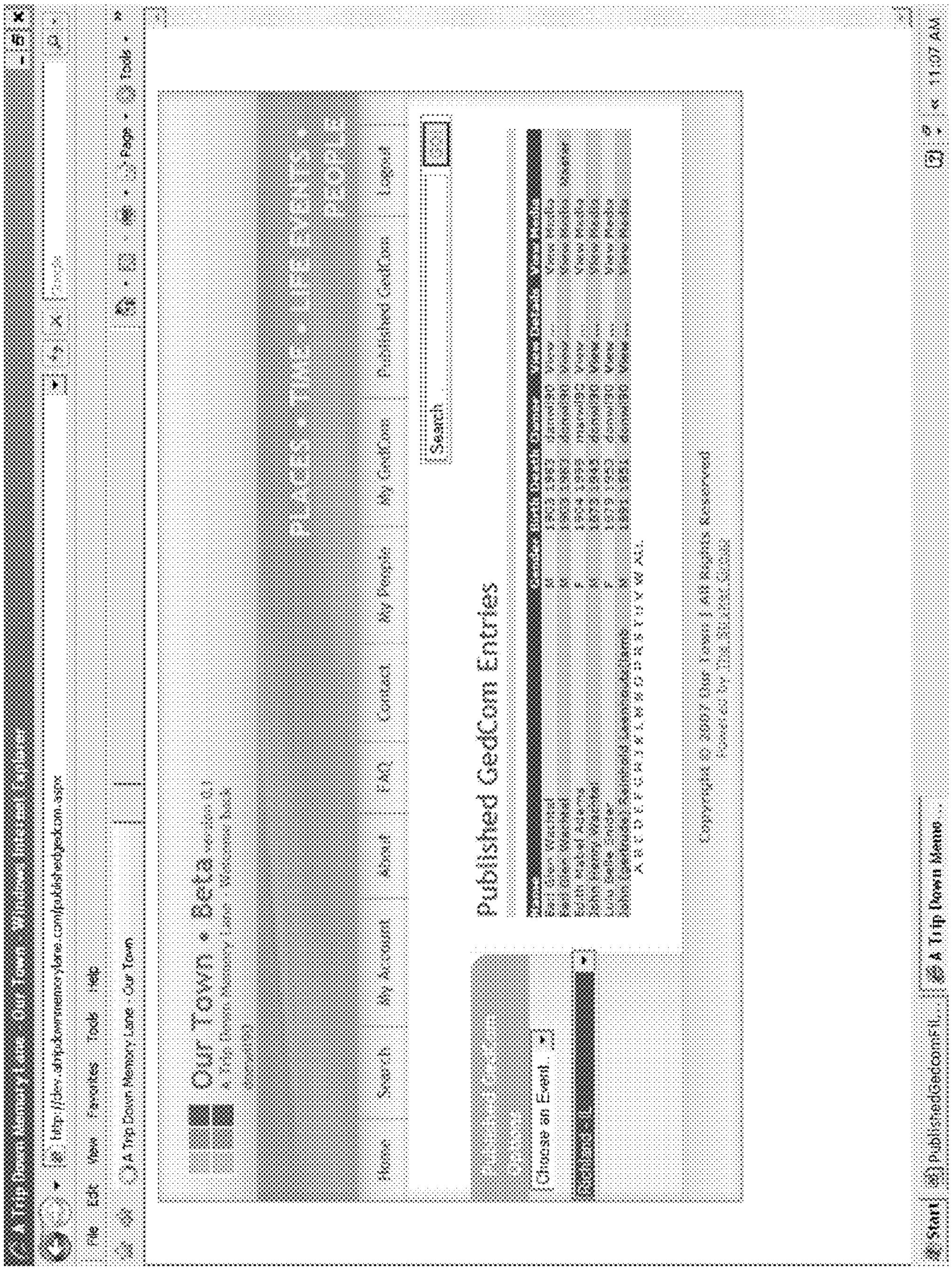

It may also be the case that the GUI that lists all published Gedcom data structures displays a large number of published Gedcom data structures. To facilitate the user's interactions with this list, the GUI can be configured to provide the user with filtering capabilities. FIGS. 35(*a*) and (*b*) show exemplary GUIs that provide filtering functions. In the example of FIG. 35(*a*), the user can filter the listed published Gedcom entries by life events. In this way, only the Gedcom entries having an association with the user-specified life event will be displayed. In the example of FIG. 35(*b*), the user can filter the listed published Gedcom entries by a geographic identifier (e.g., a county as explained above).

Figure 36:
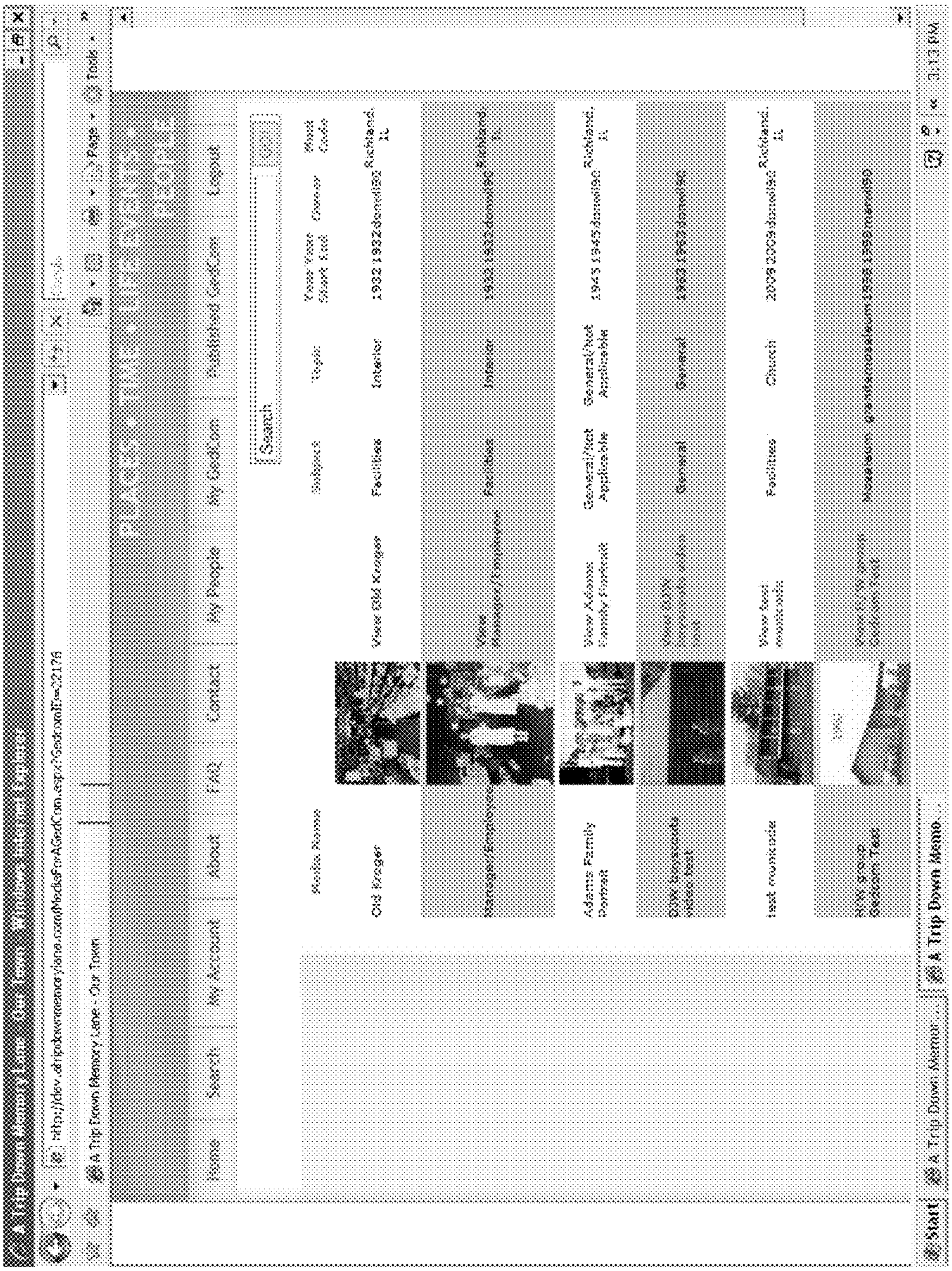
FIG. 36 illustrates an exemplary GUI through which a user can view media items associated with a published family tree record.

FIG. 36 shows an exemplary GUI that lists the media items associated with a published Gedcom data structure. The exemplary GUI of FIG. 36 can be displayed in response to user selection of a "View Media" link for a listed Published Gedcom data structure from the list of FIG. 32 (see also FIGS. 35(*a*) and (*b*)). This can be a powerful way for users to view all media items associated in the database with a person on a family tree.

Figure 37A:
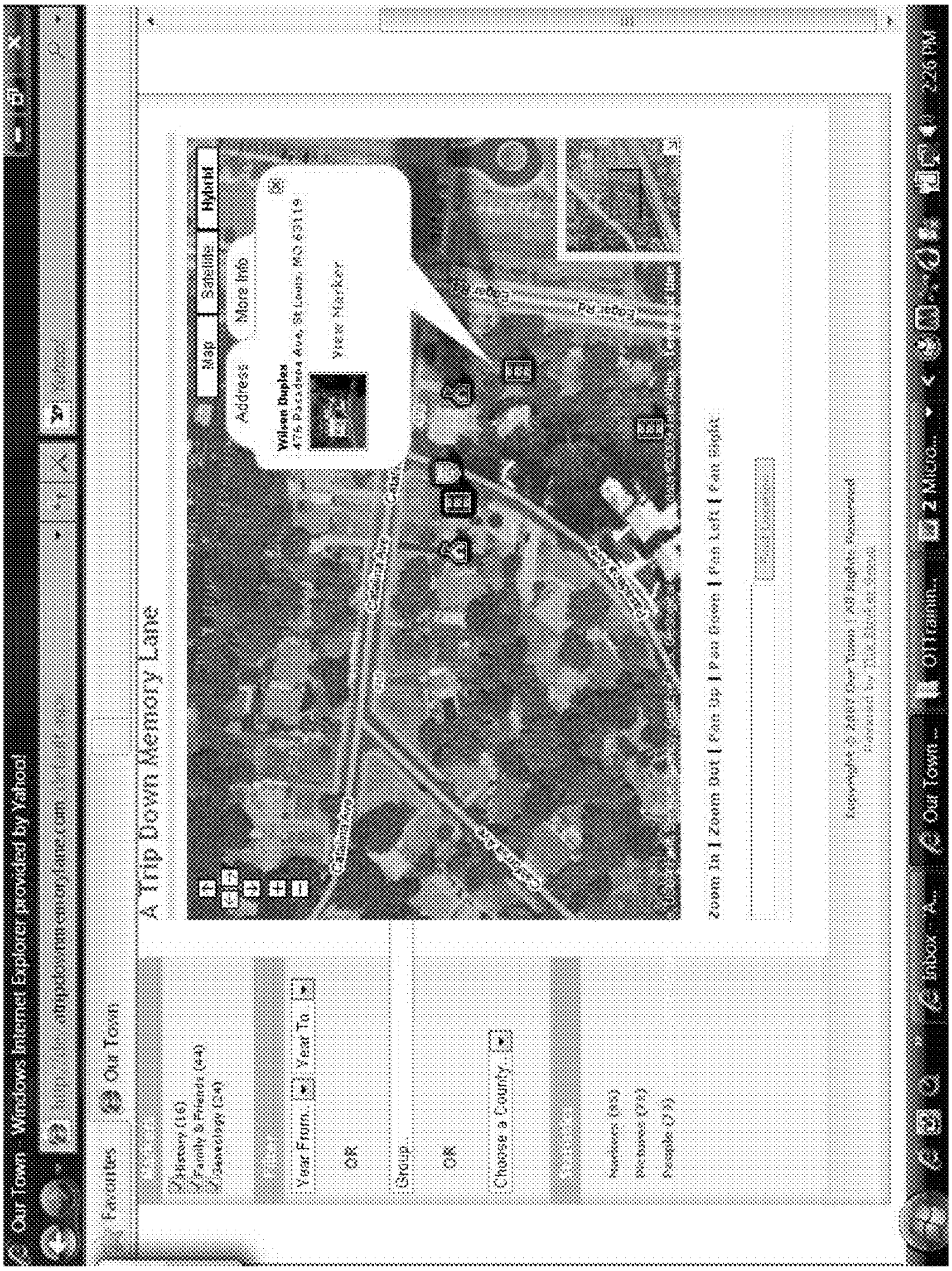
FIGS. 37(*a*) and (*b*) illustrate exemplary GUIs for viewing media items associated with a particular geographic location via a marker icon displayed on a map.
Figure 37B:
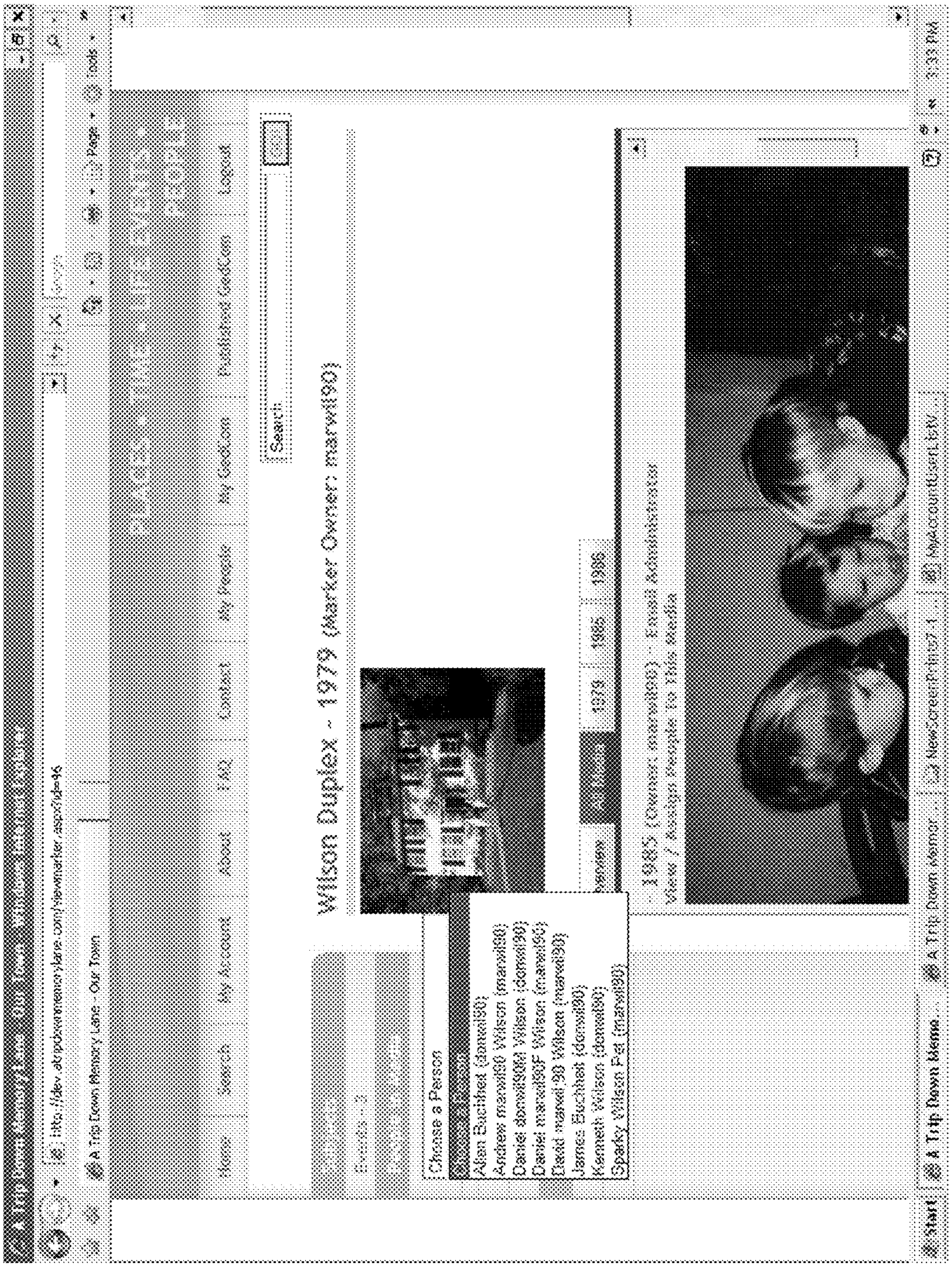

Returning to the primary map interface exemplified by the GUI of FIG. 37(*a*), a marker corresponding to the "Wilson Duplex" associated with the user is displayed on the map at a position corresponding to its geographic location. The balloon associated with the marker identifies the address for the marker and includes a thumbnail view of the media item associated with that marker. If the user were to select the "View Marker" link in this balloon, the exemplary GUI of FIG. 37(*b*) would be presented to the user. This GUI is similar in nature to the GUI of FIG. 8(*c*). Through the GUI of FIG. 37(*b*), the user can view all of the media items associated with the geographic location corresponding to the marker. By selecting the "All Media" tab in FIG. 37(*b*), all such media items will be displayed in the lower portion of the GUI. Alternatively, separate tabs can be provided for each year that has a media item corresponding to the marker's geographic location. This, if the user wants to view a media item associated with the year 1979 for the marker, the user can select the "1979" tab and so on for the other displayed years. This feature permits a user to scroll through time to view events corresponding to a particular location. Furthermore, if the user wants to filter the listed media items based on the people assigned to individual ones of the media items, the user can use the people filter shown on the left side of FIG. 37(*b*). The people filter can include a drop down menu populated with a list of all people who are assigned to any of the media items associated with the subject marker. In response to selection of a person from this list, the system can display only those media items associated with the subject person and the subject marker.

Figure 38:
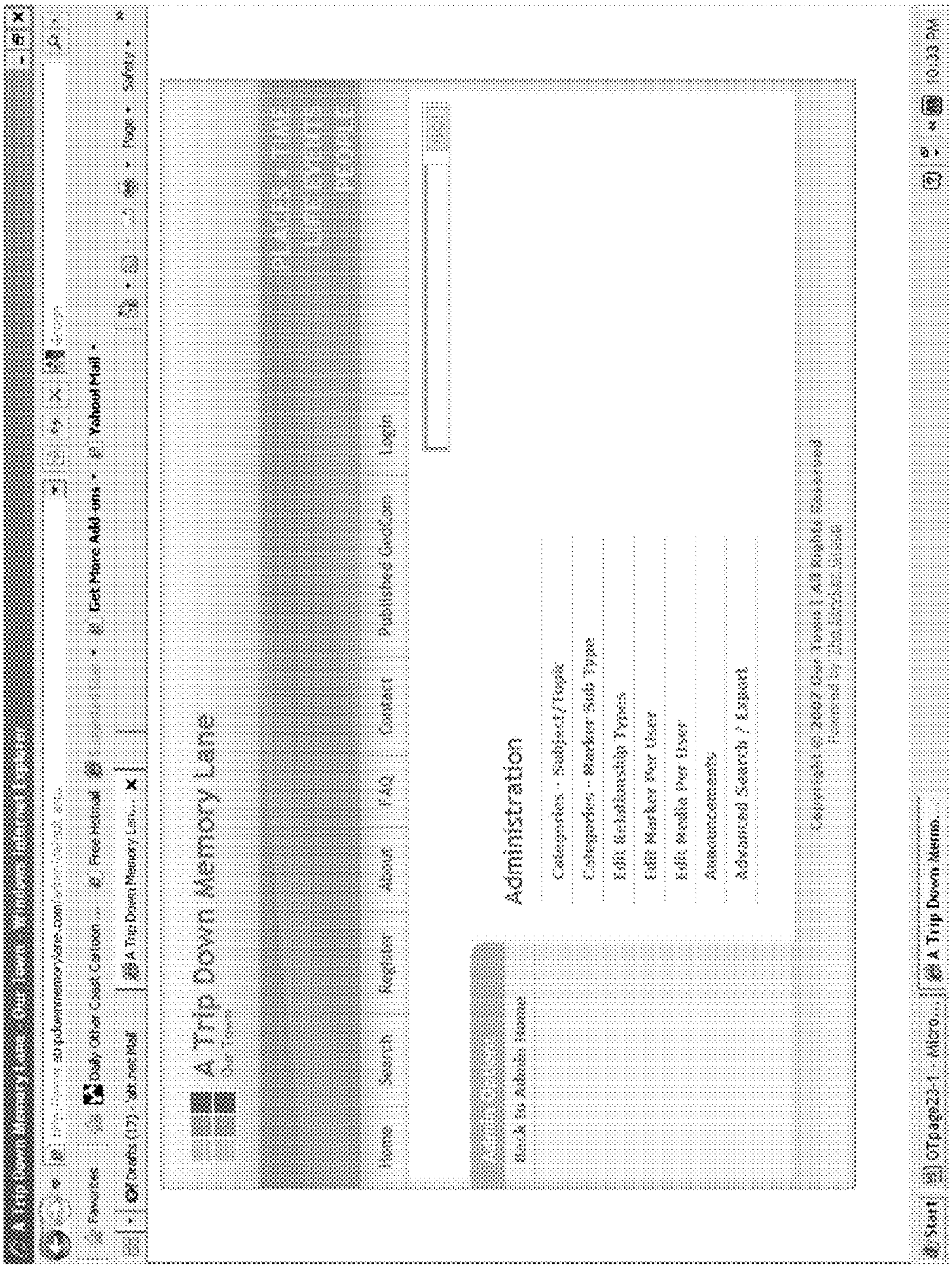
FIGS. 38-48(*d*) illustrate exemplary administrative GUIs for the website embodiment described herein.

FIGS. 38-48(*d*) illustrate exemplary administrative GUIs for the website embodiment described herein. GUIs such as these are for access by an authorized system administrator. FIG. 38 illustrates an administrative home page, with various administrator-selectable options.

Figure 43A:
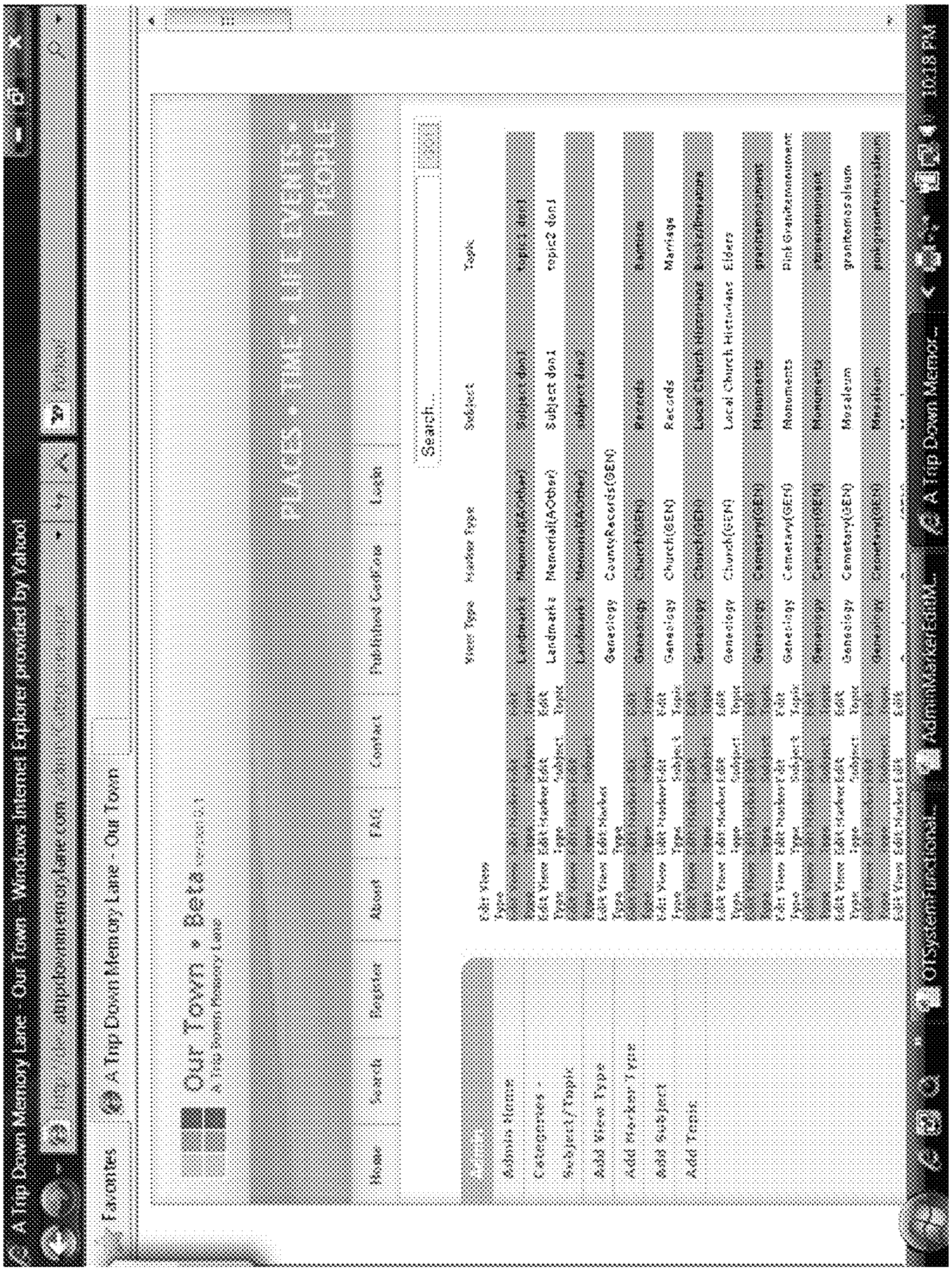
Figure 43B:
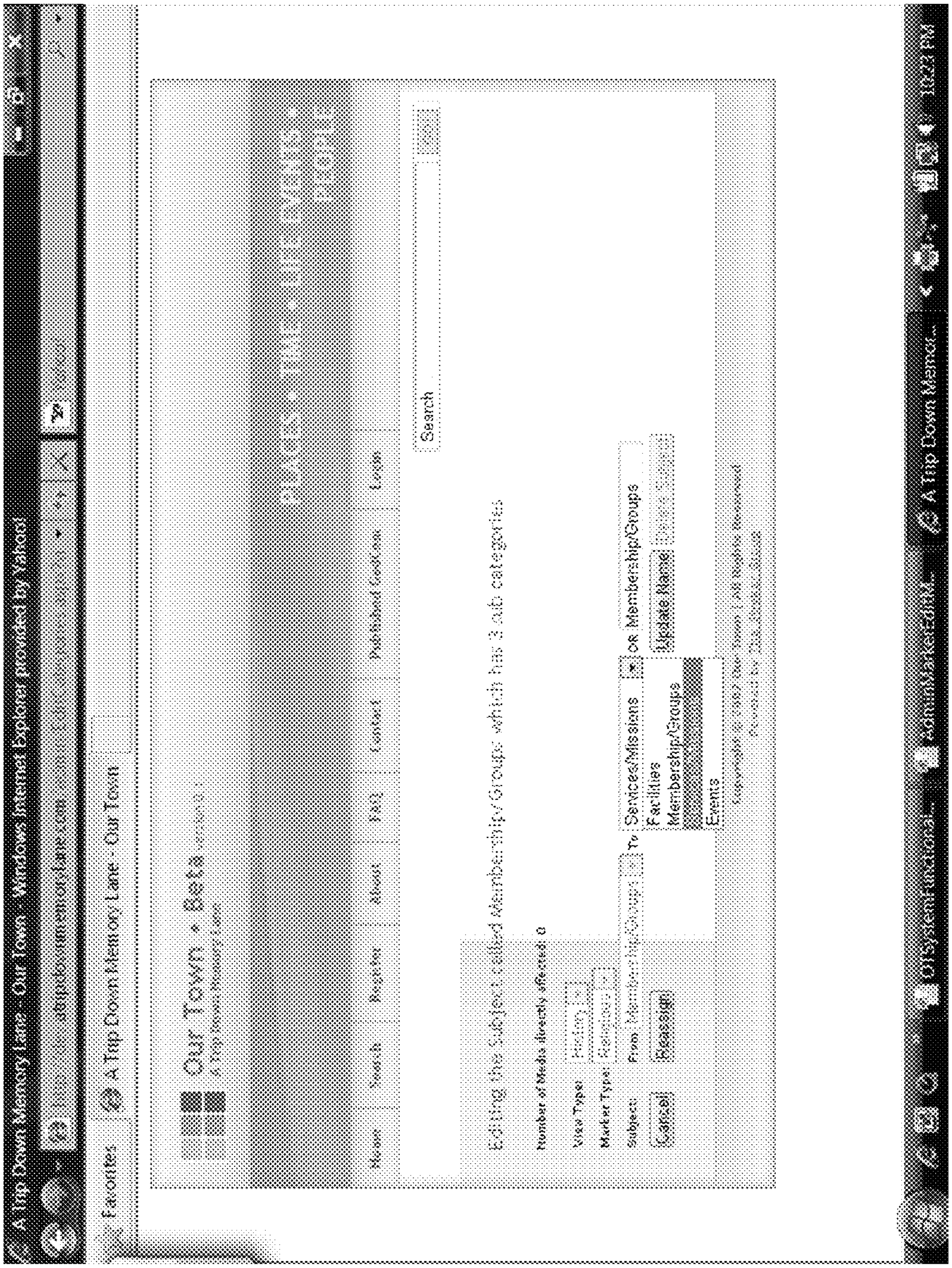
Figure 44A:
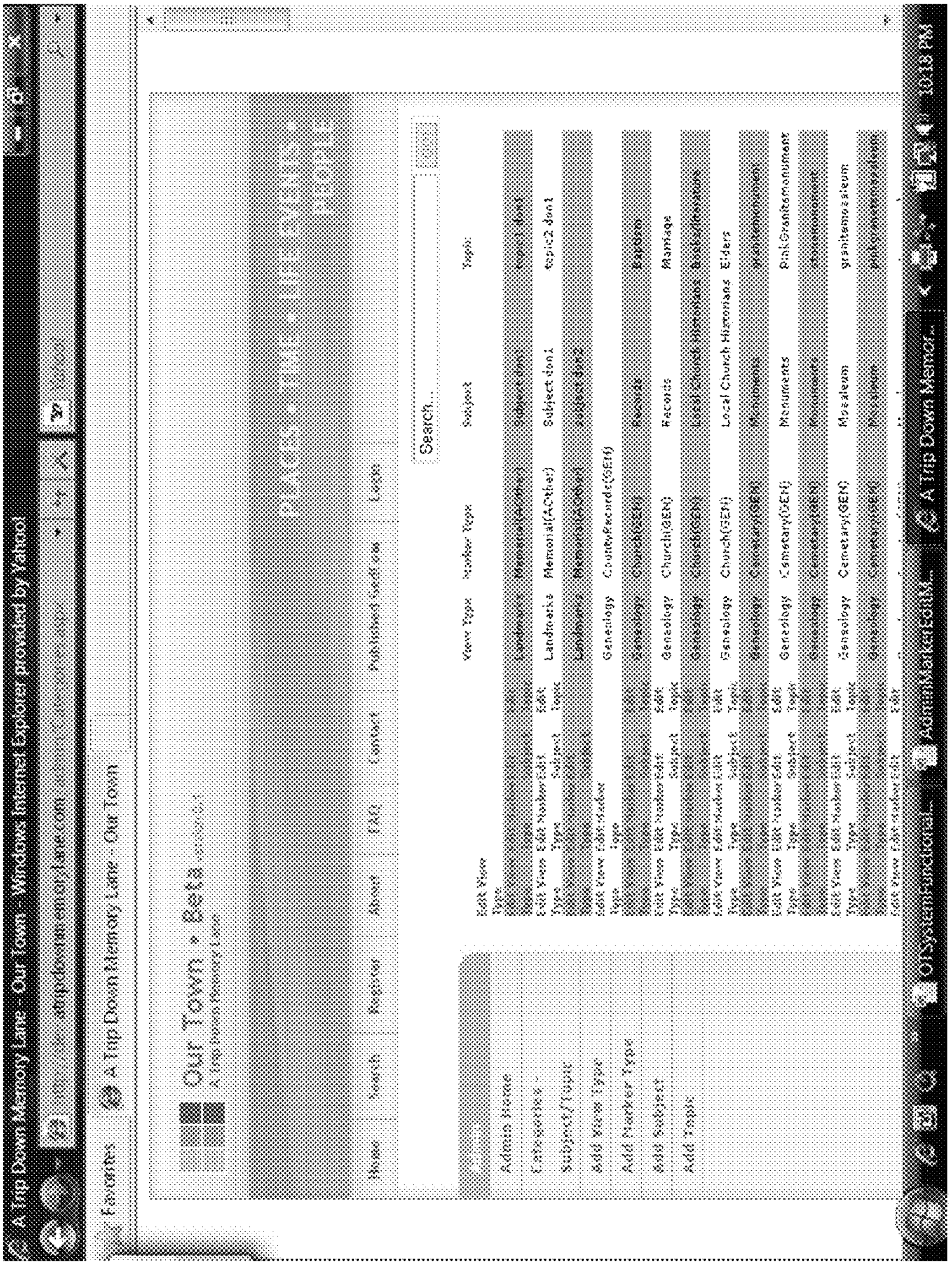
Figure 44B:
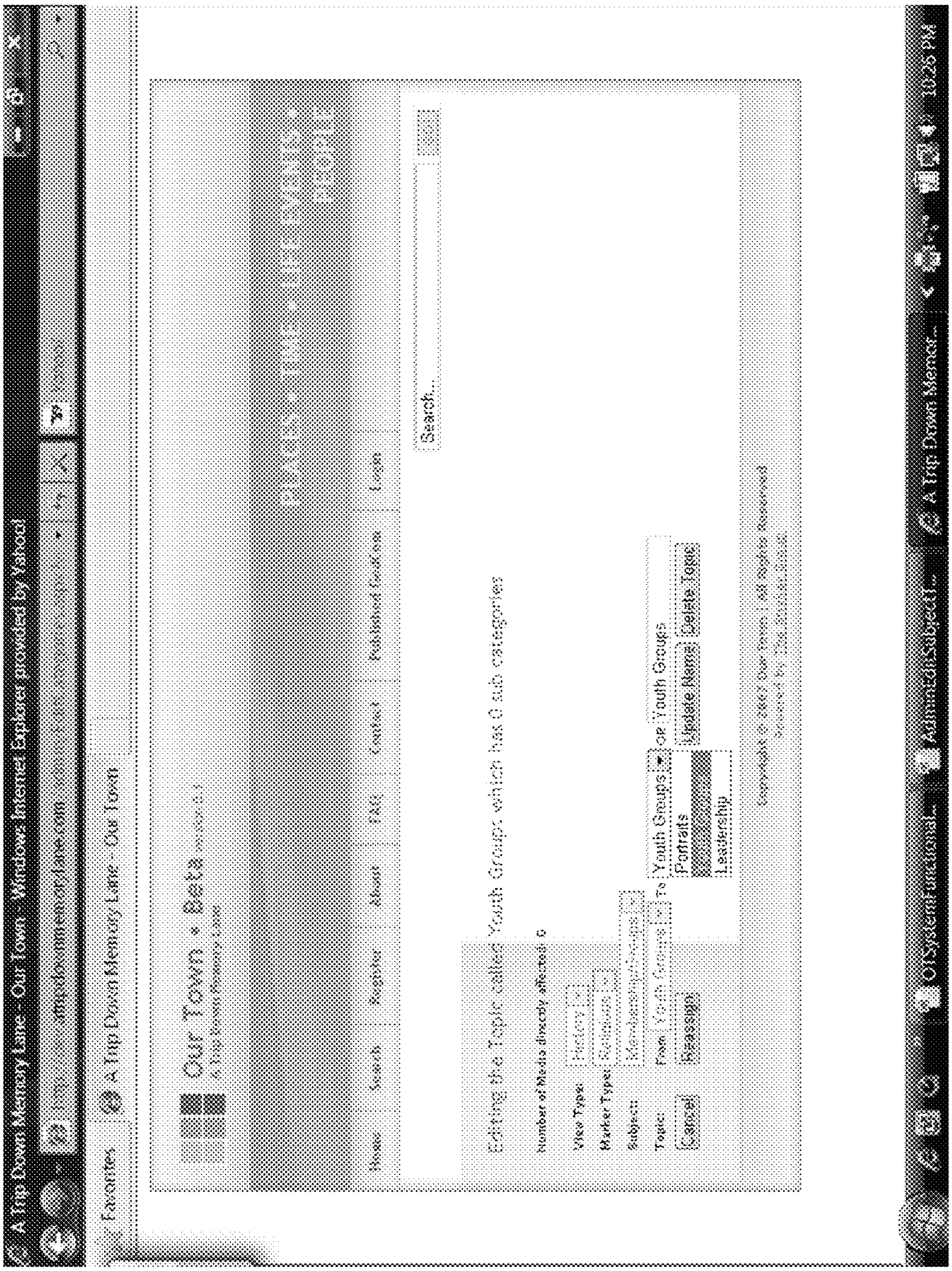

In response to administrator selection of the "Categories—Subject/Topic" link, the administrator can initiate the process of adding or editing various data classifications such as the subjects and topic fields that data in the database is associated with. FIGS. 43(*a*) and (*b*) illustrate exemplary GUIs for editing subject classifications. FIGS. 44(*a*) and (*b*) illustrate exemplary GUIs for editing topic classifications.

Figure 39A:
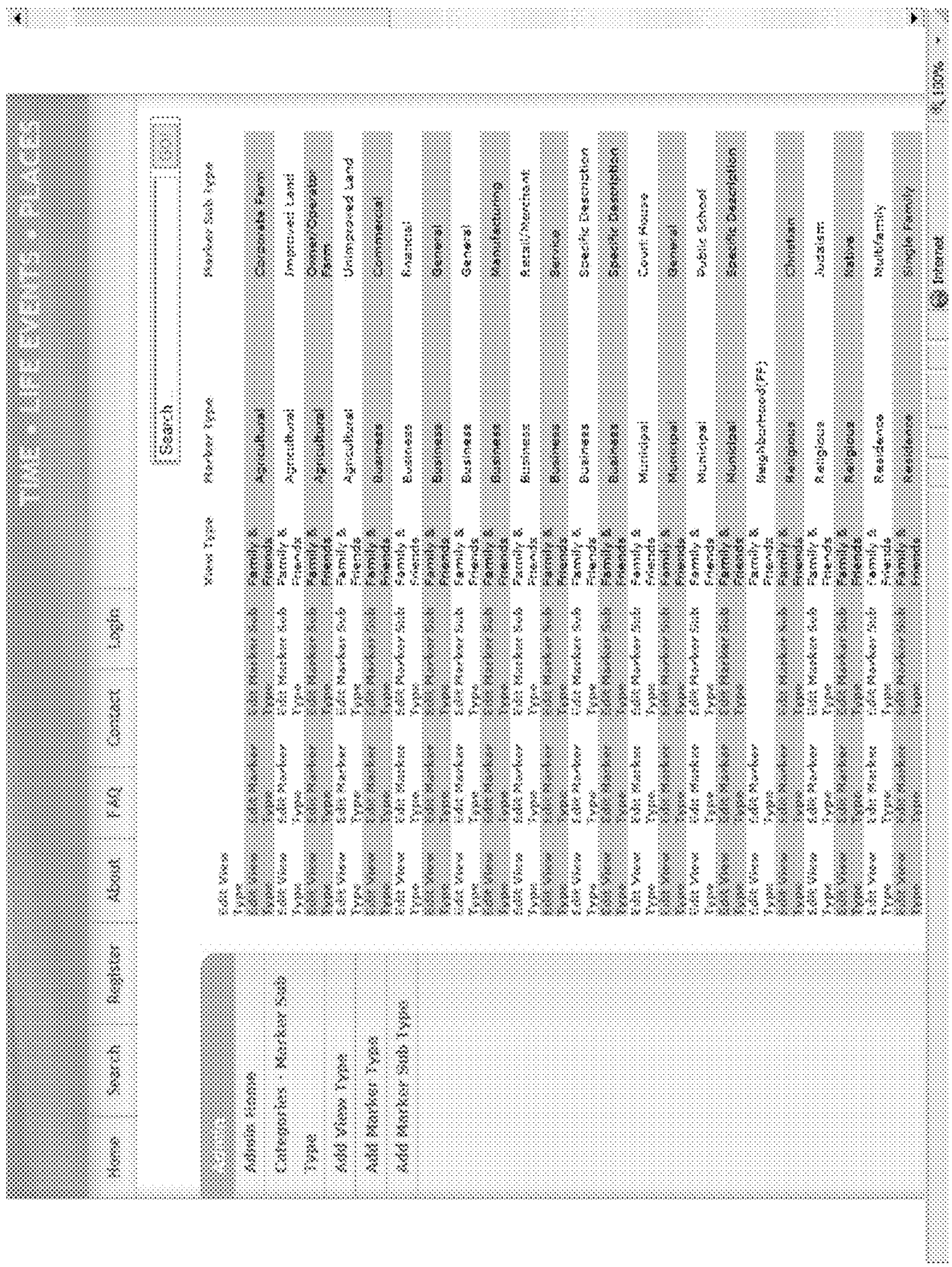
Figure 39B:
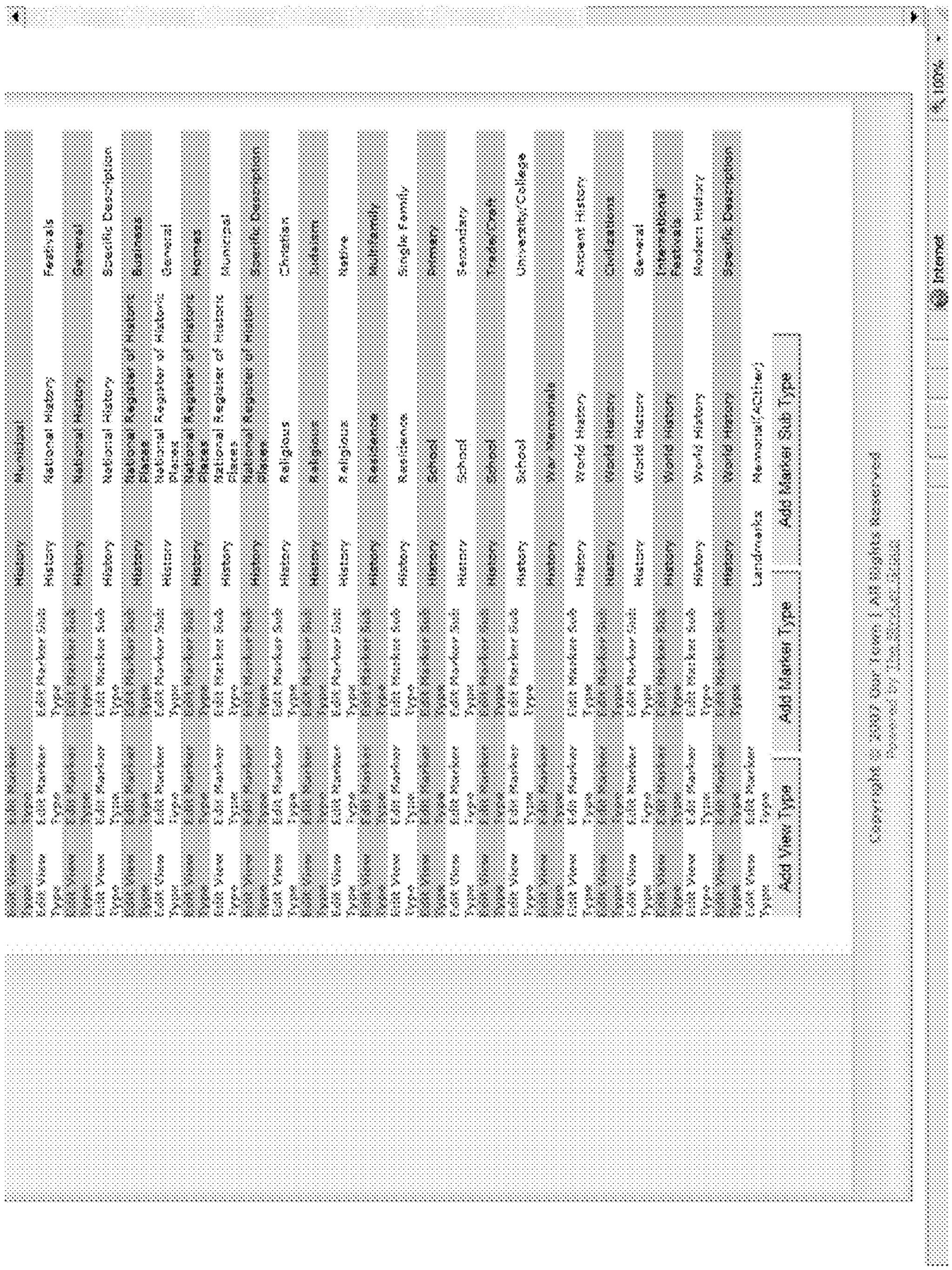
Figure 40A:
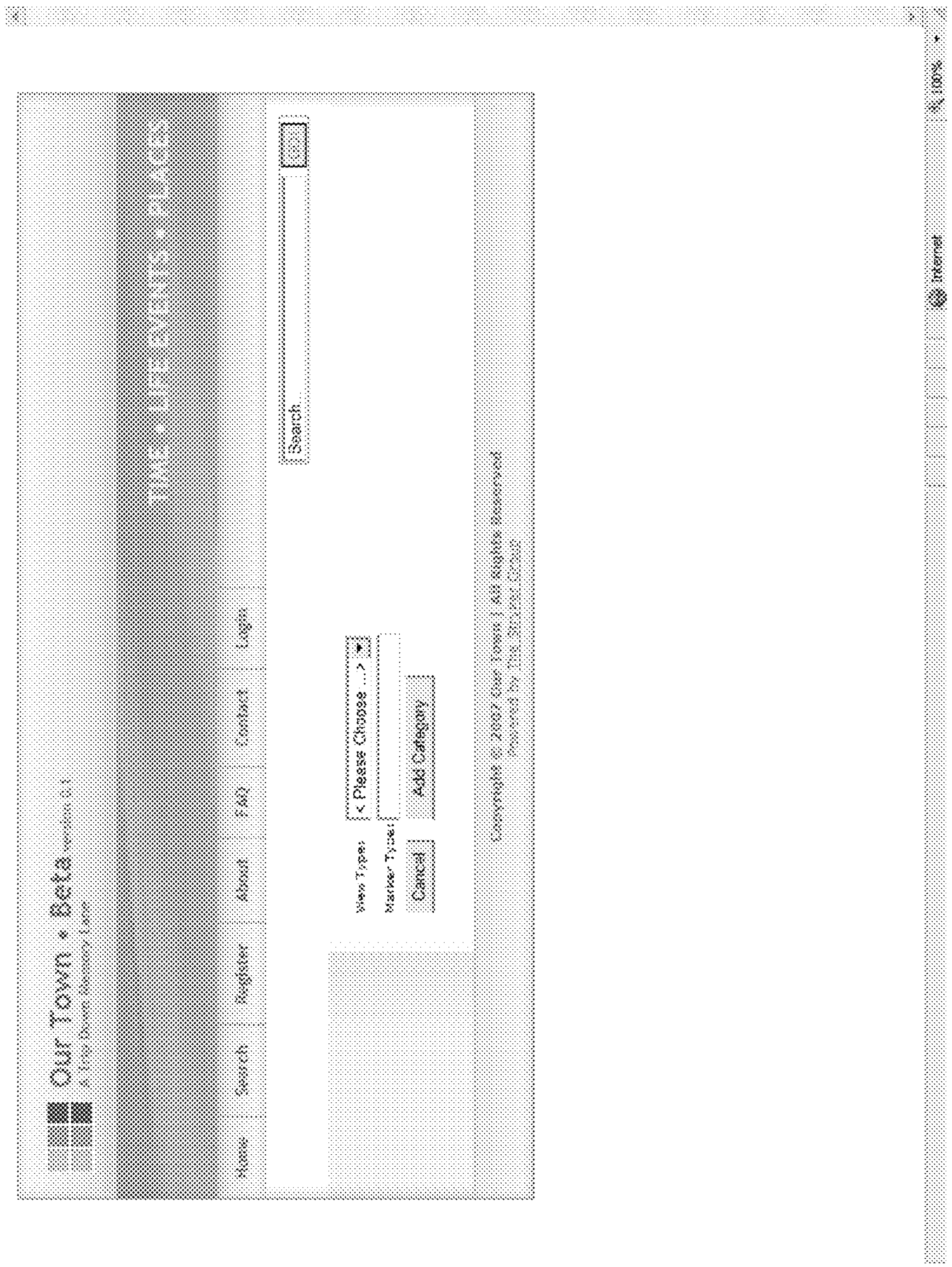
Figure 40B:
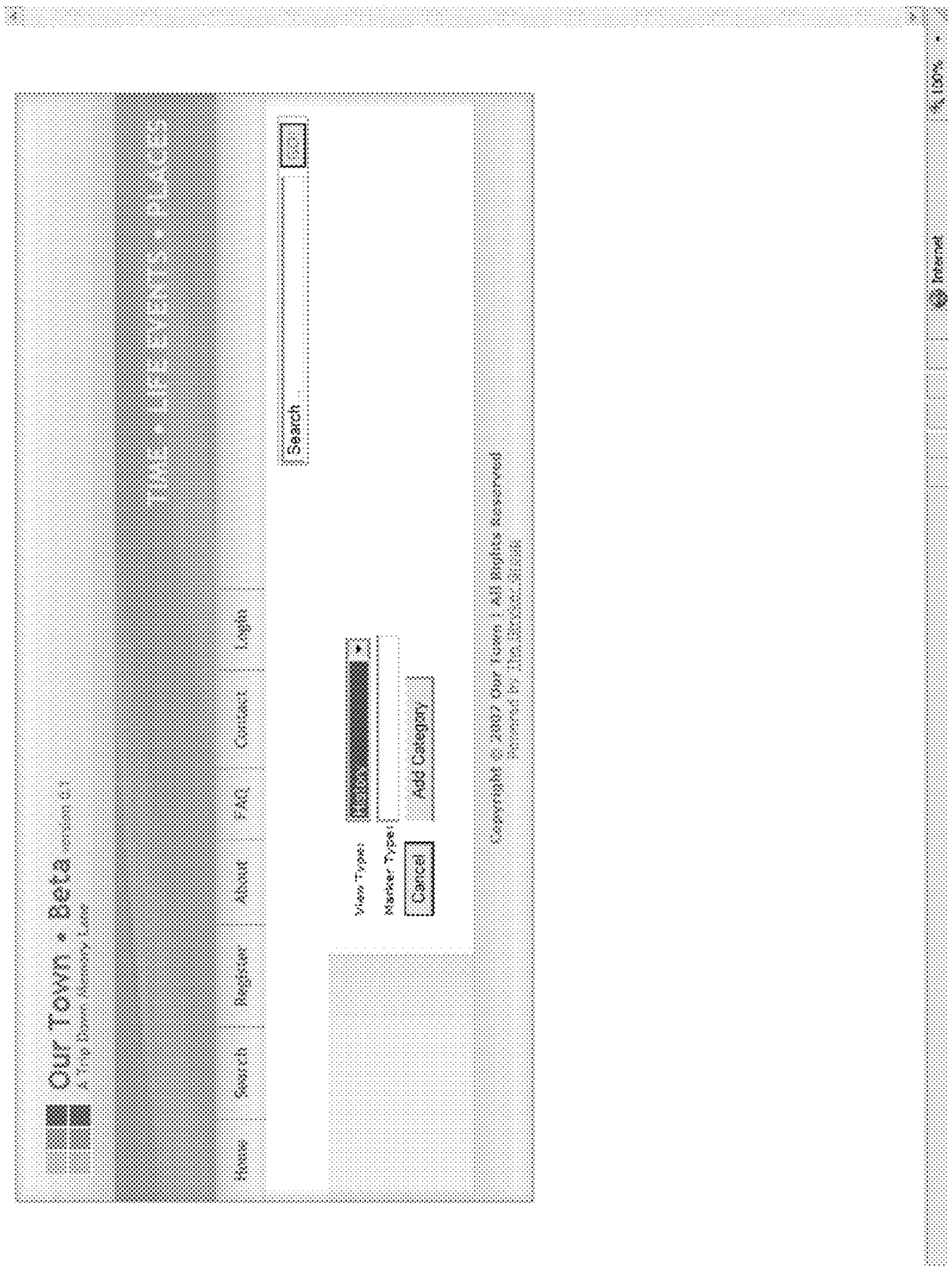
Figure 41A:
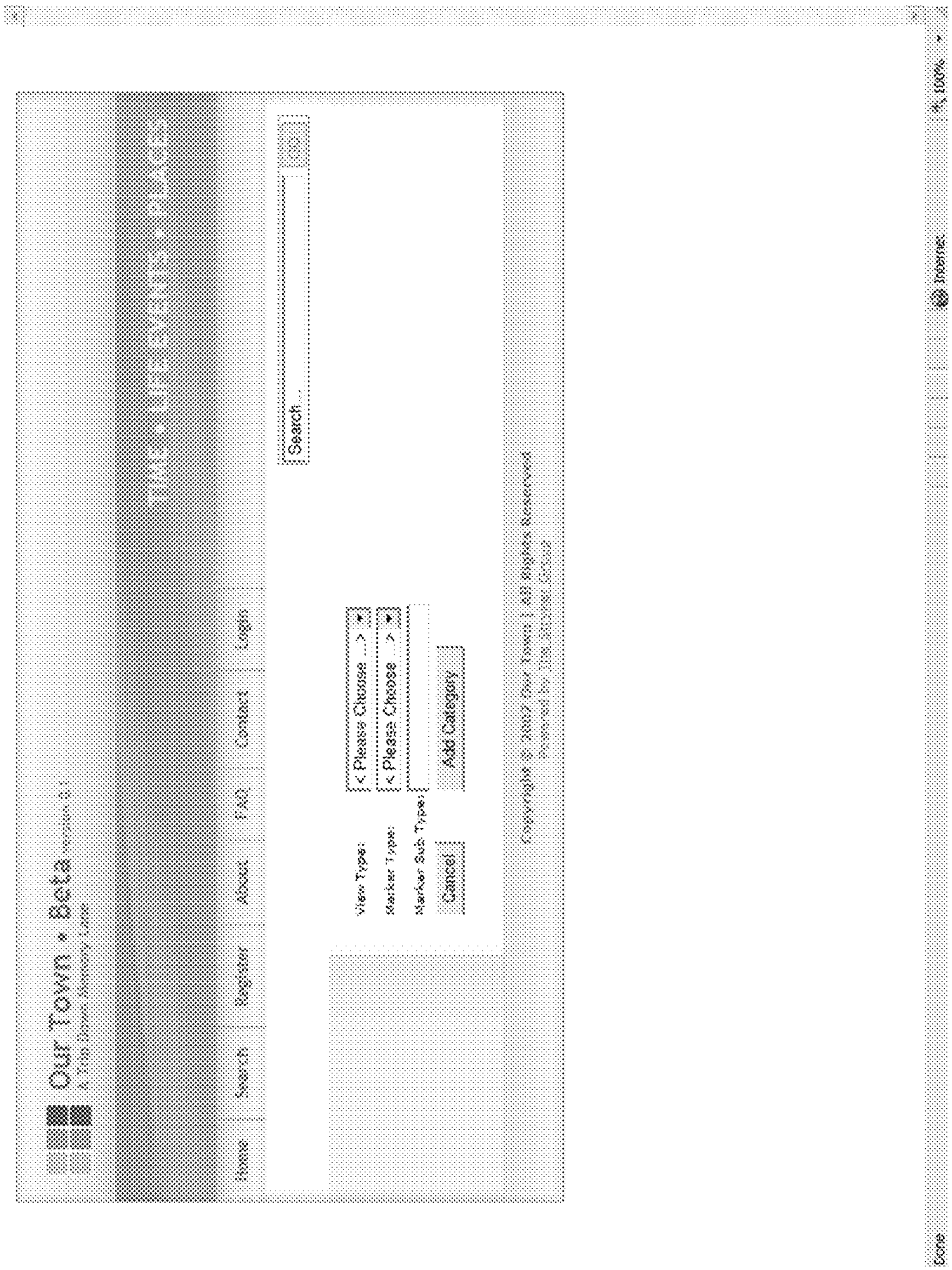
Figure 41B:
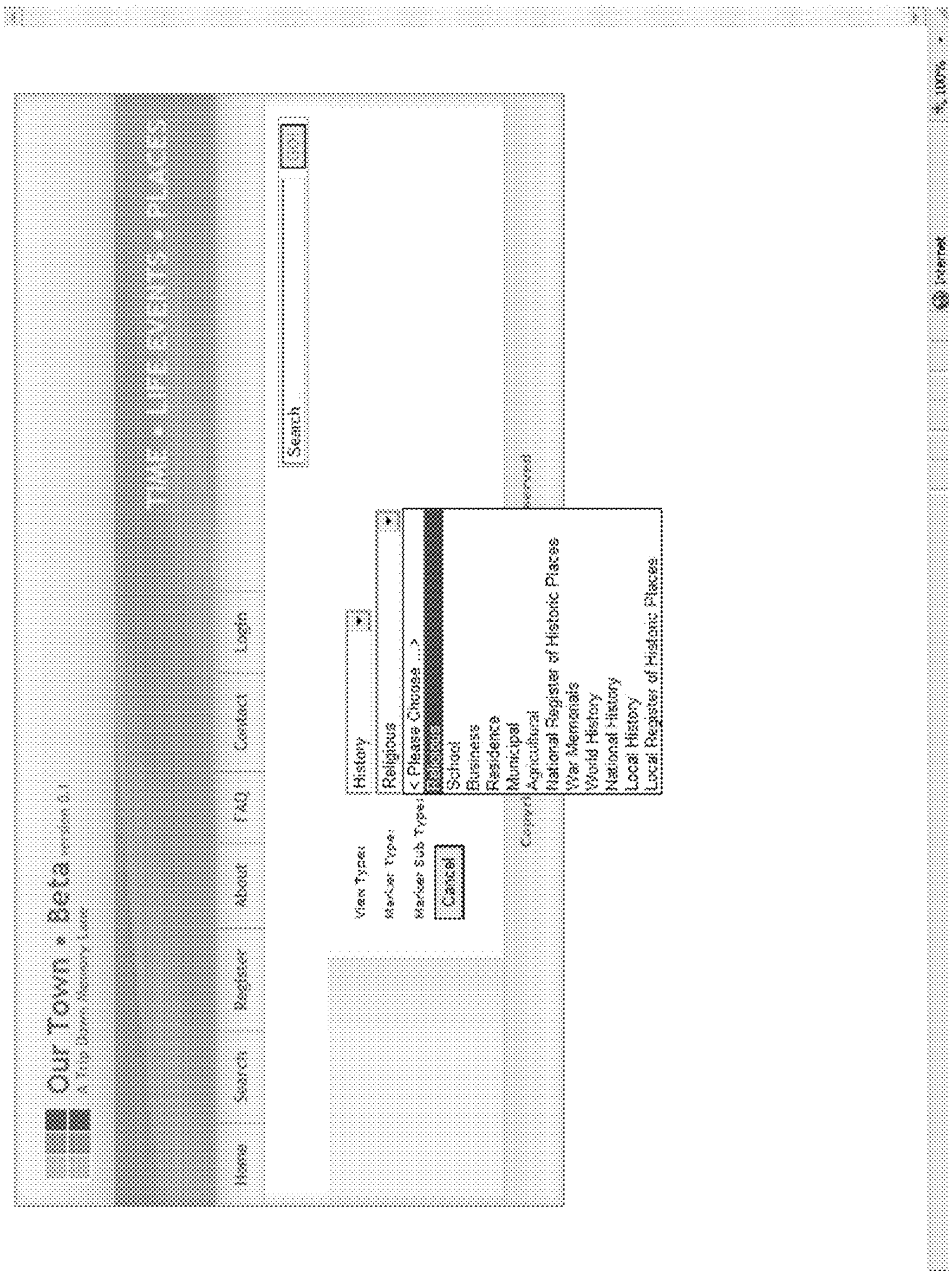
Figure 42:
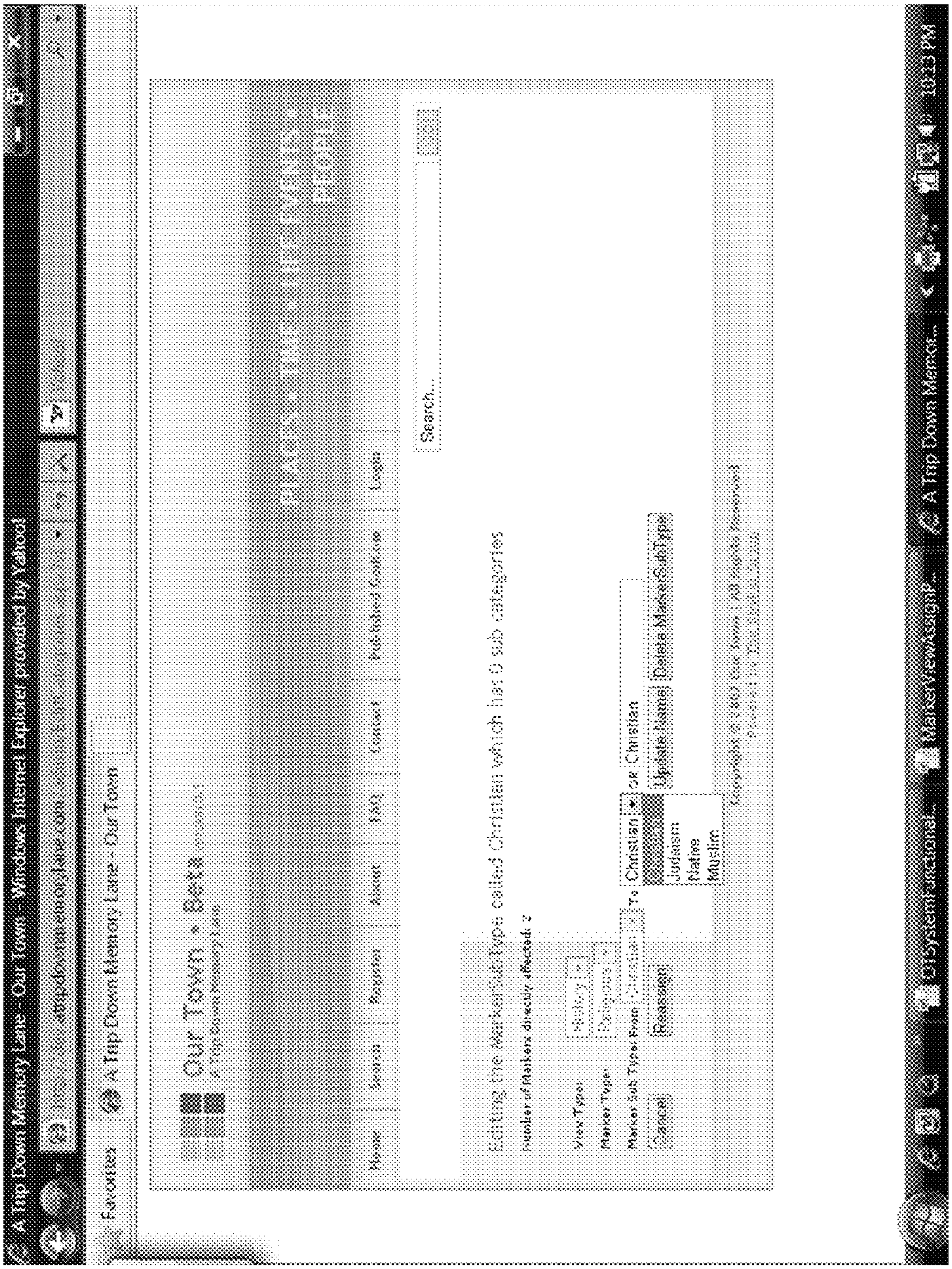

In response to administrator selection of the "Categories—Marker Sub Type" link, the administrator can initiate the process of adding or editing various data classifications such as the type and subtype fields that data in the database is associated with. FIGS. 39(*a*) and (*b*) illustrate exemplary GUIs that list existing subjects and topics in the database. FIGS. 40(*a*) and (*b*) illustrate exemplary GUIs for adding marker types to the database. FIGS. 41(*a*) and (*b*) illustrate exemplary GUIs for adding marker subtypes to the database. FIG. 42 illustrates an exemplary GUI for editing marker subtypes in the database.

Figure 45:
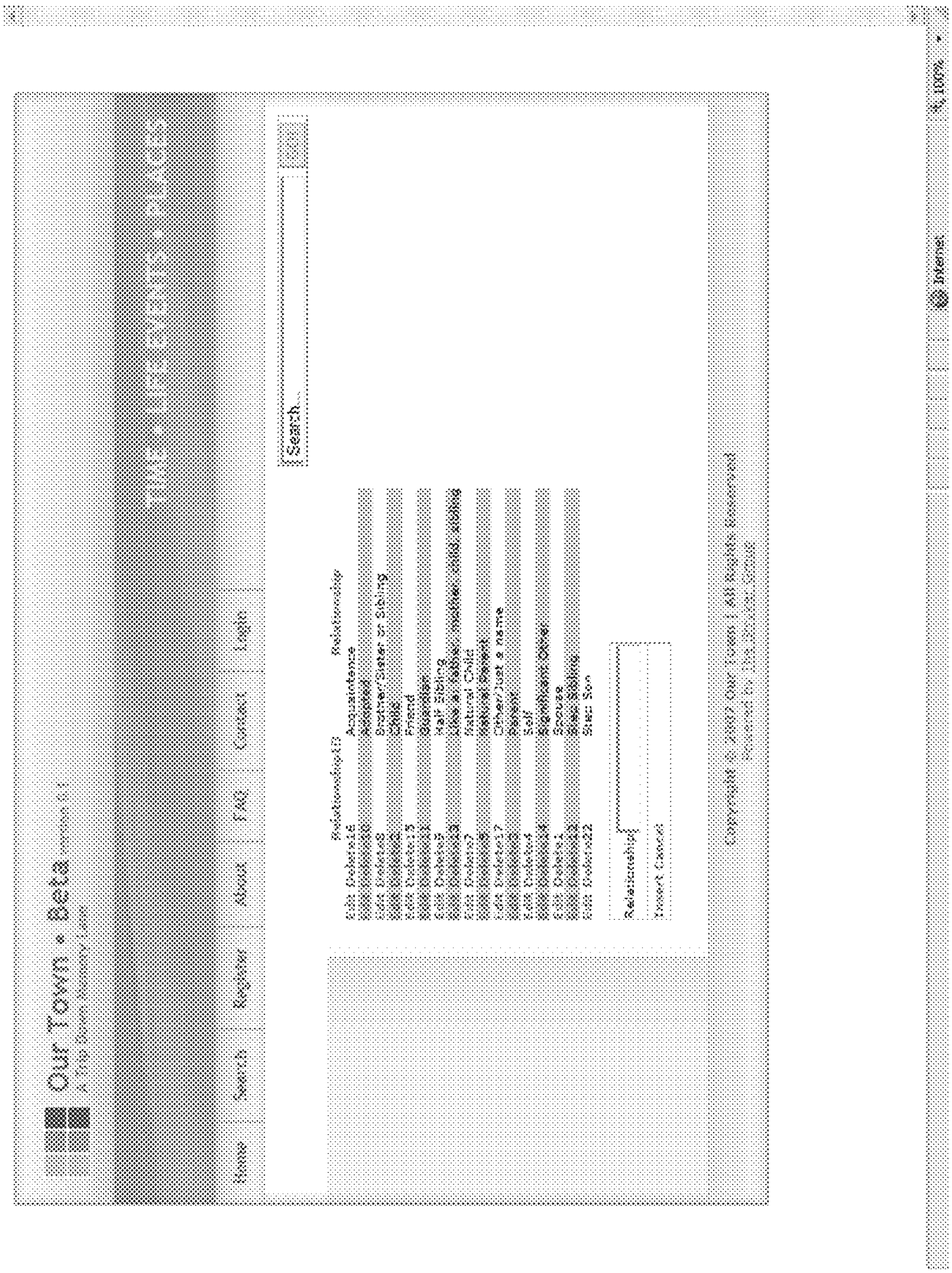

In response to administrator selection of the "Edit Relationship Types" link, the administrator can initiate the process of adding or editing various relationship types that data in the database is associated with. FIG. 45 illustrates an exemplary GUIs for editing a relationship type.

Figure 46:
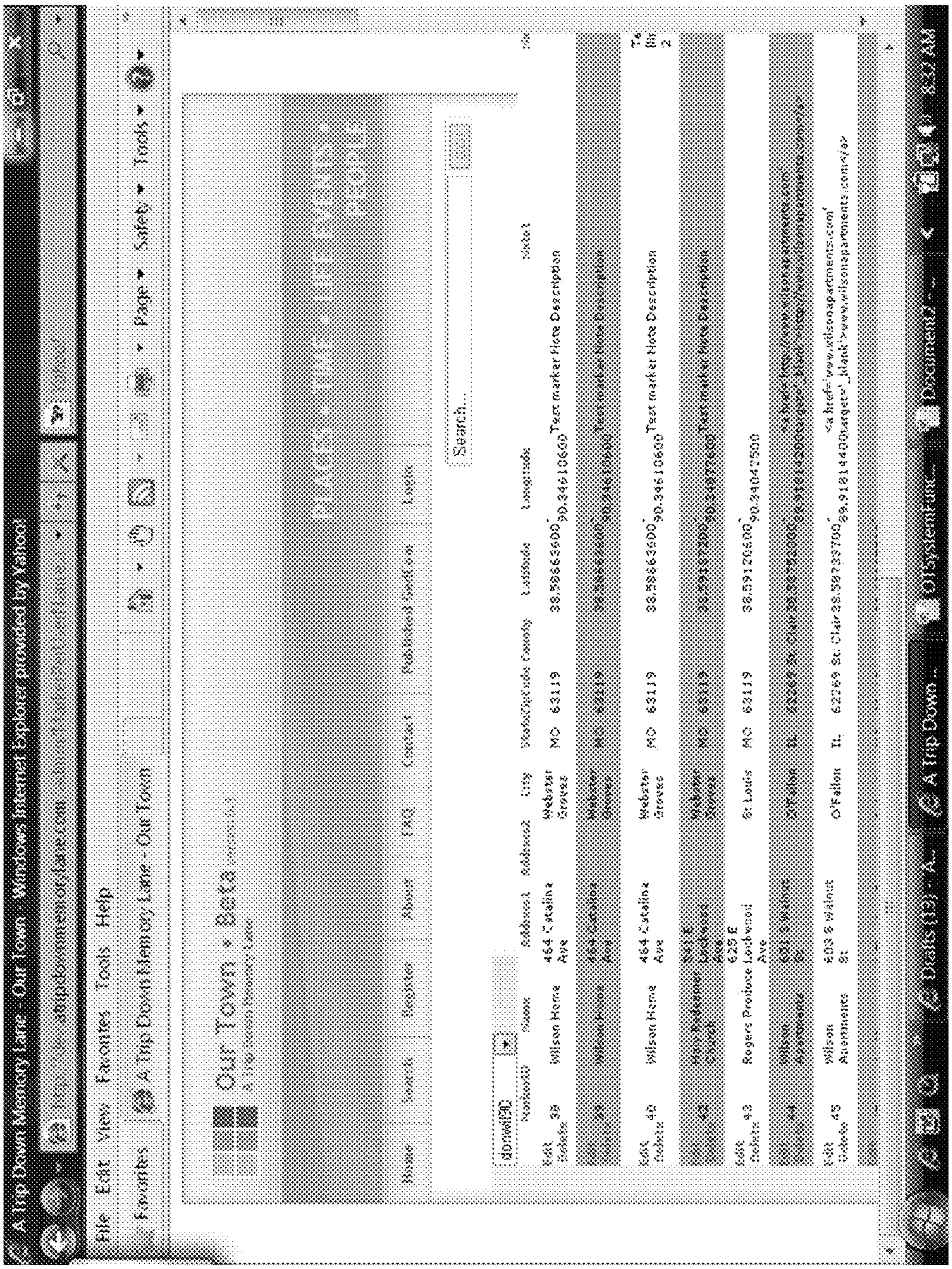

In response to administrator selection of the "Edit Marker Per User" link, the administrator can initiate the process of editing the markers associated with a particular user. FIG. 46 illustrates an exemplary GUI for editing markers on a per user basis. The administrator can select the particular user from a drop down menu to cause that user's markers to be listed. From there, the administrator can make edits to that user's markers as desired.

Figure 47A:
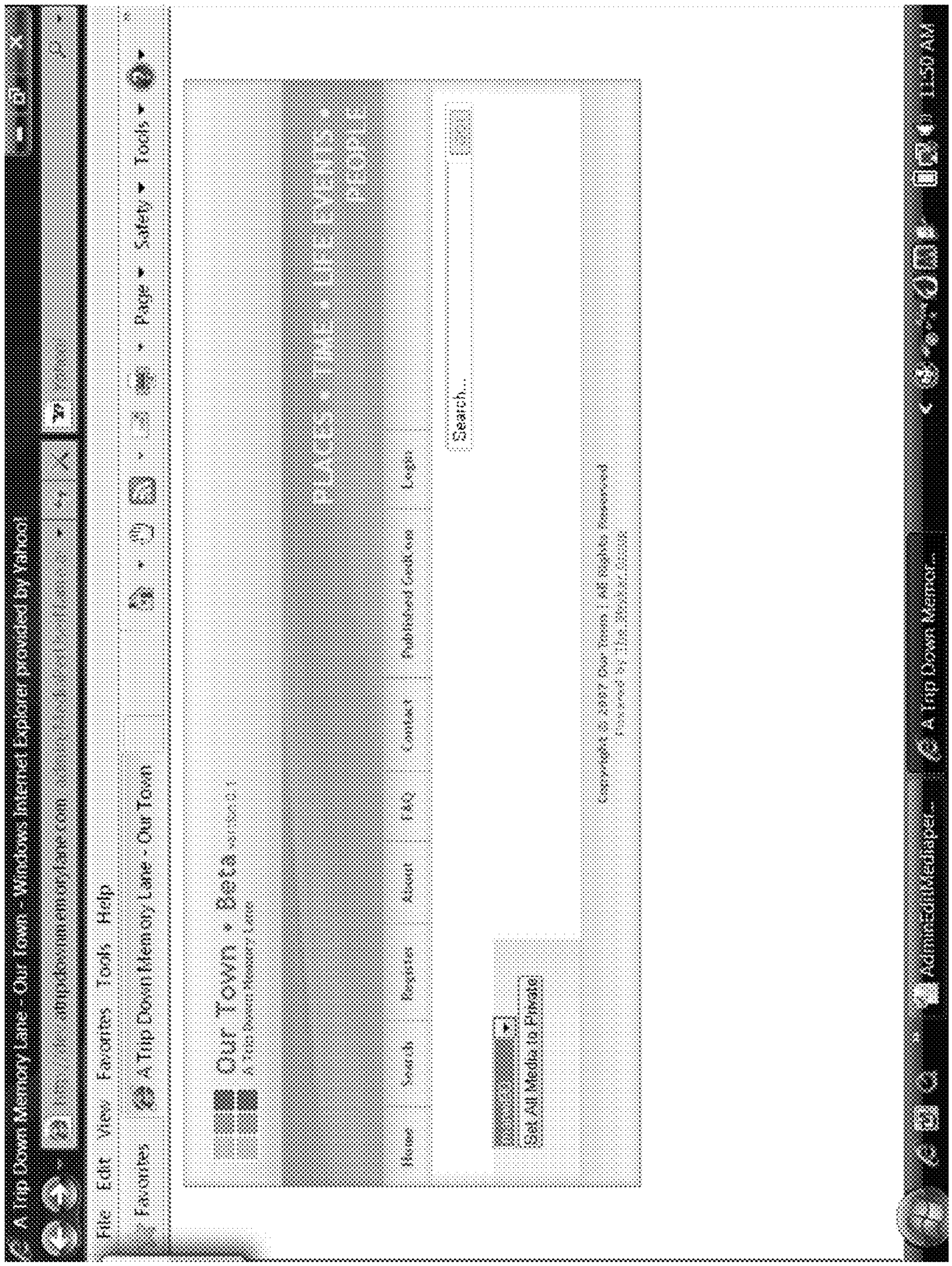
Figure 47B:
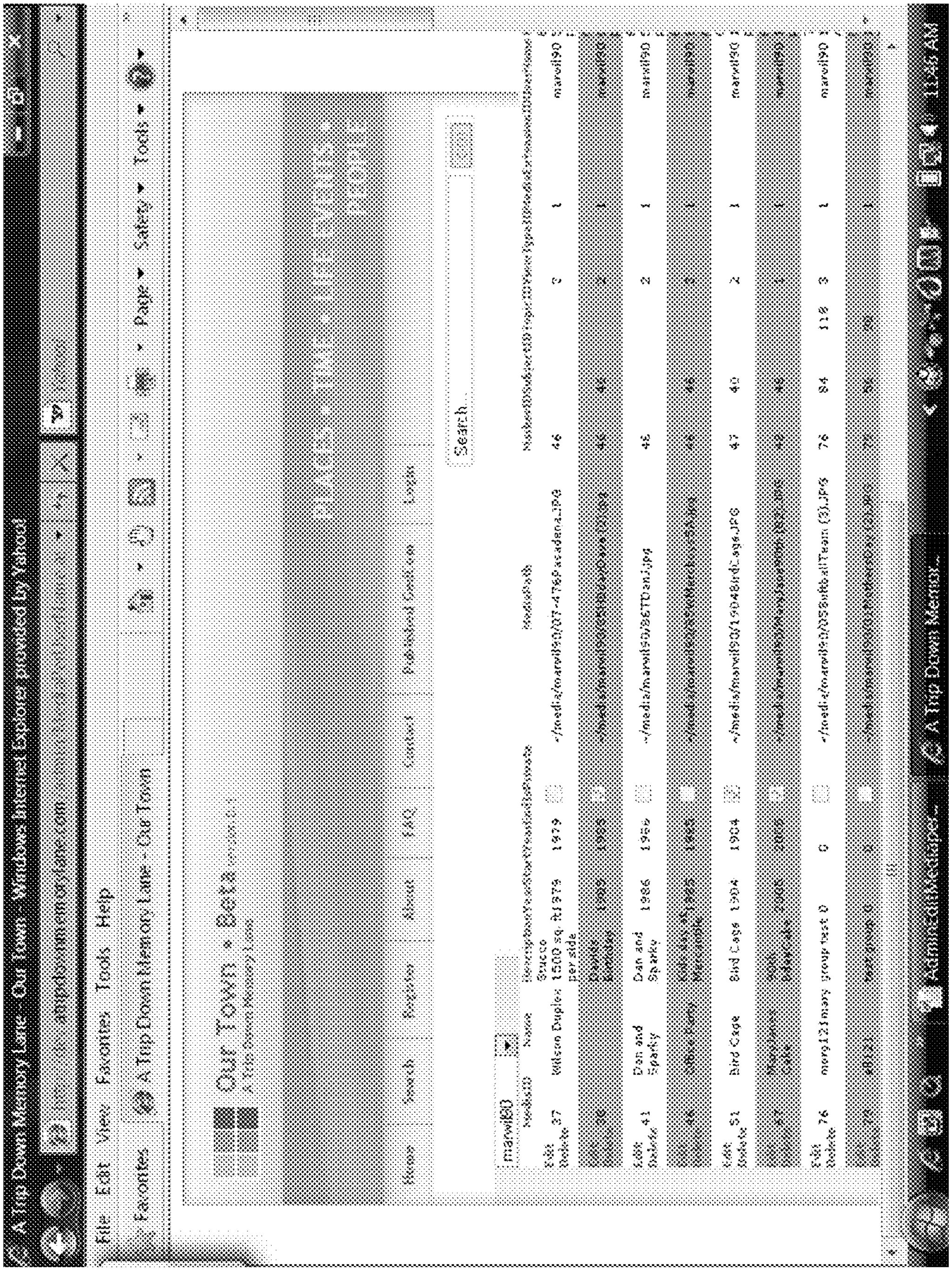
Figure 48A:
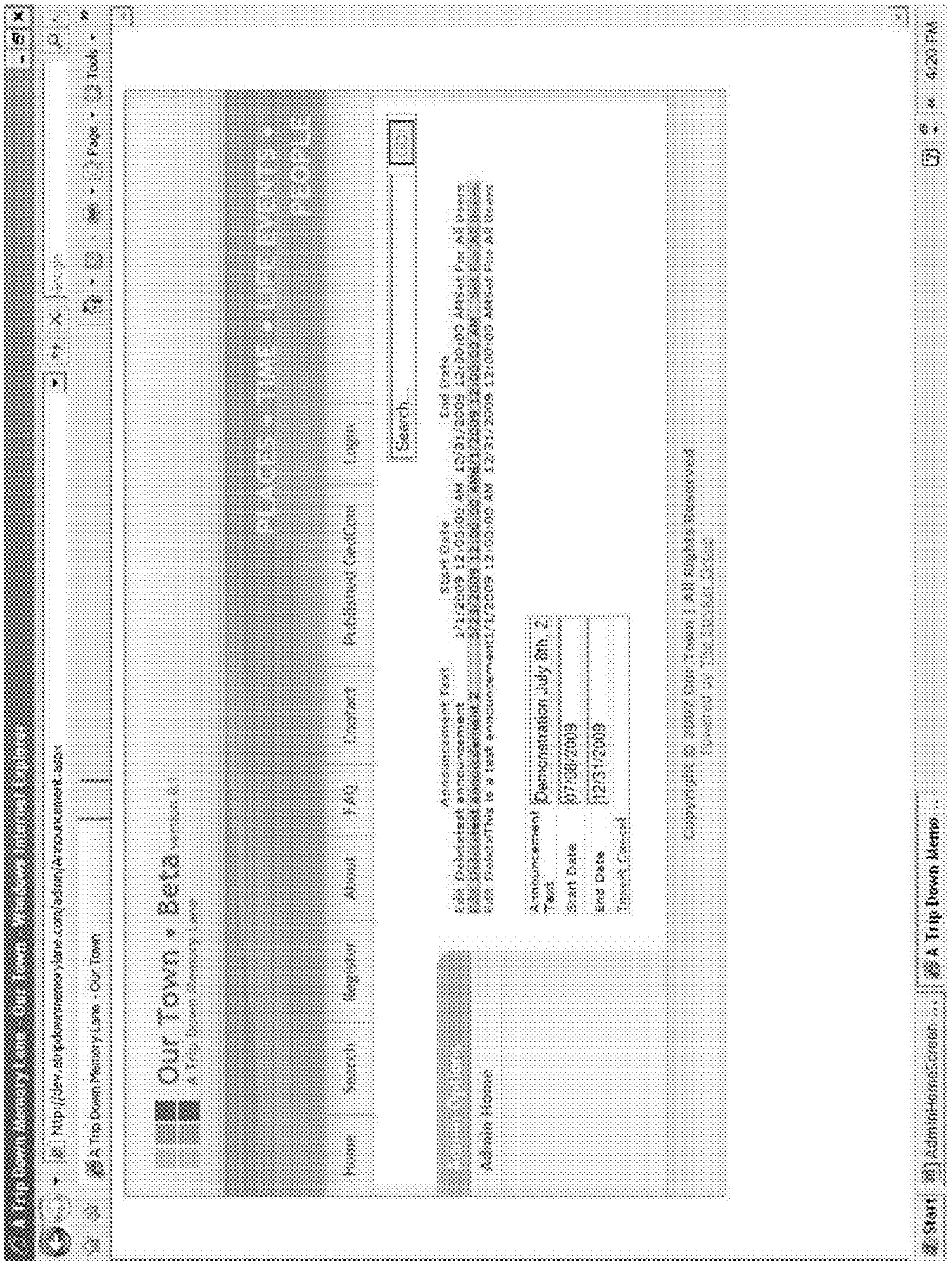
Figure 48B:
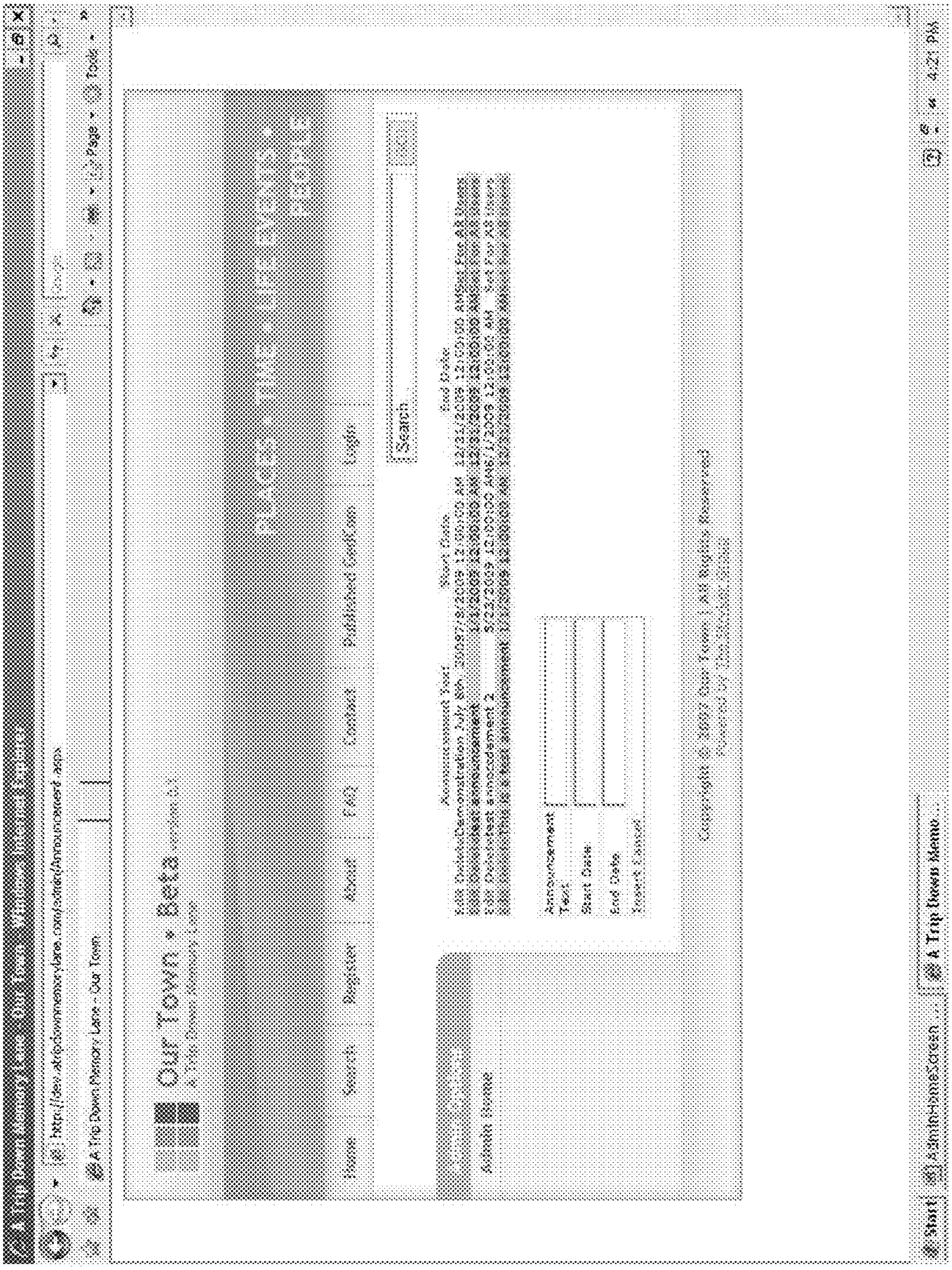
Figure 48C:
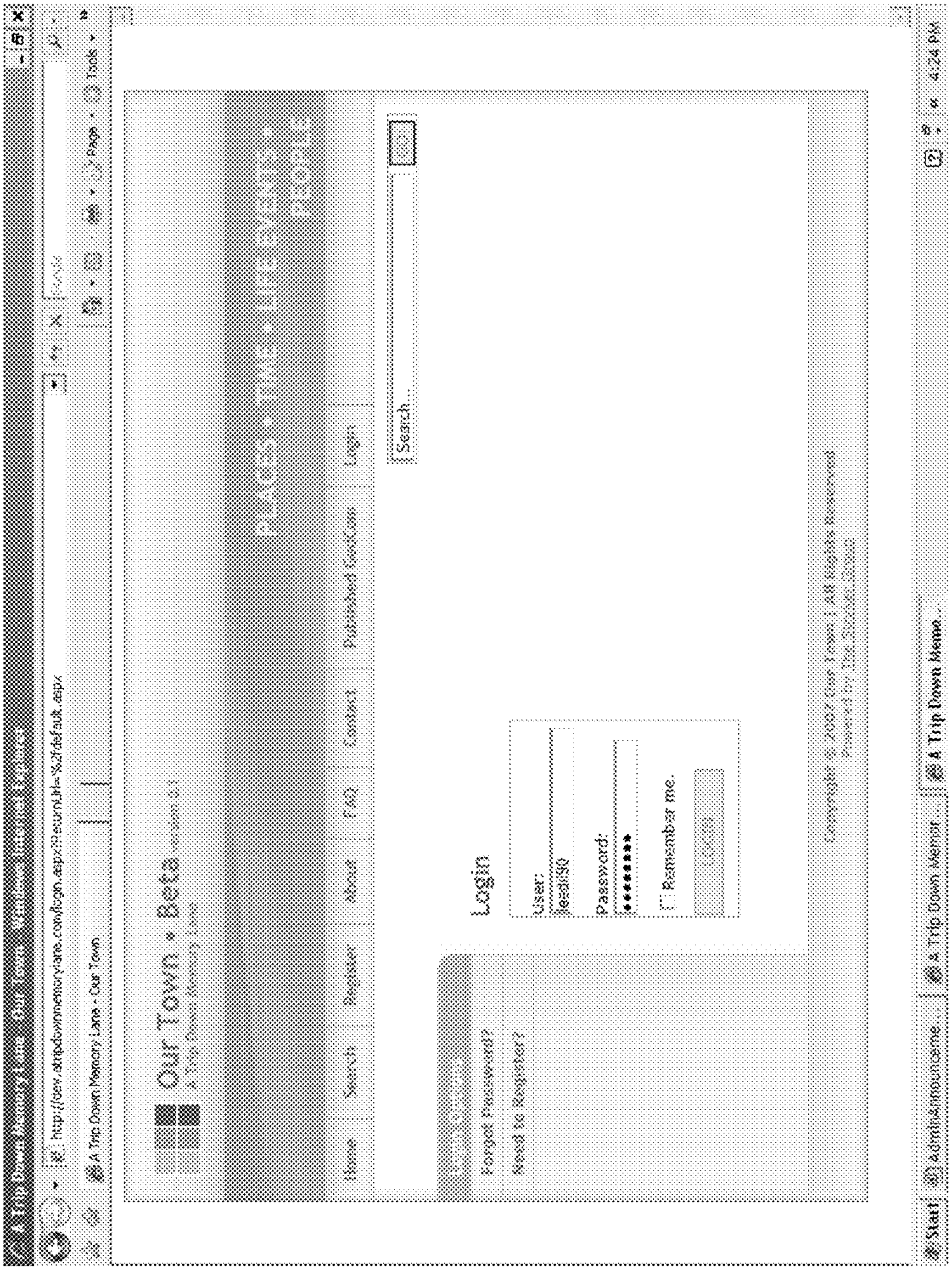
Figure 48D:
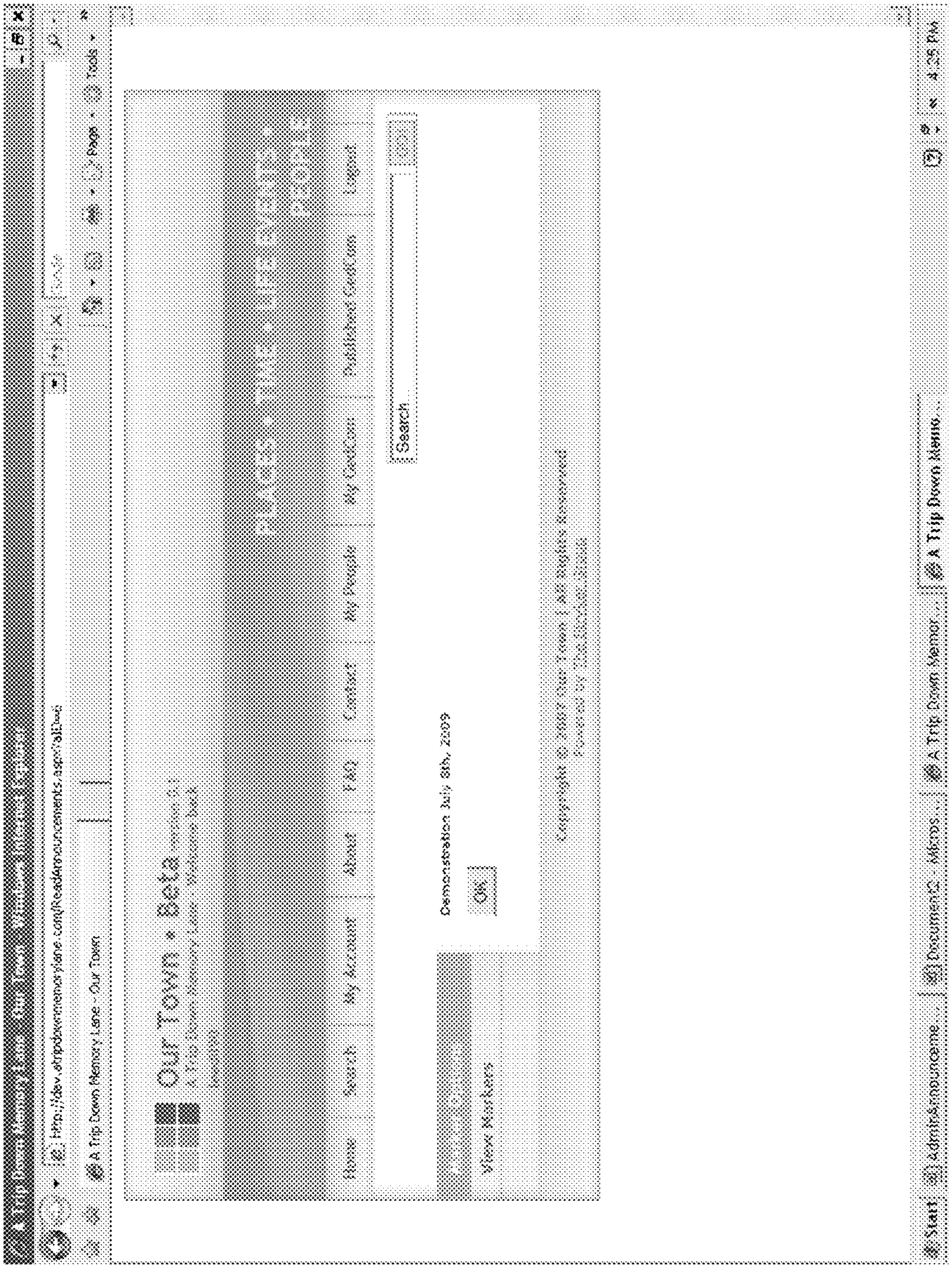
Figure 49A:
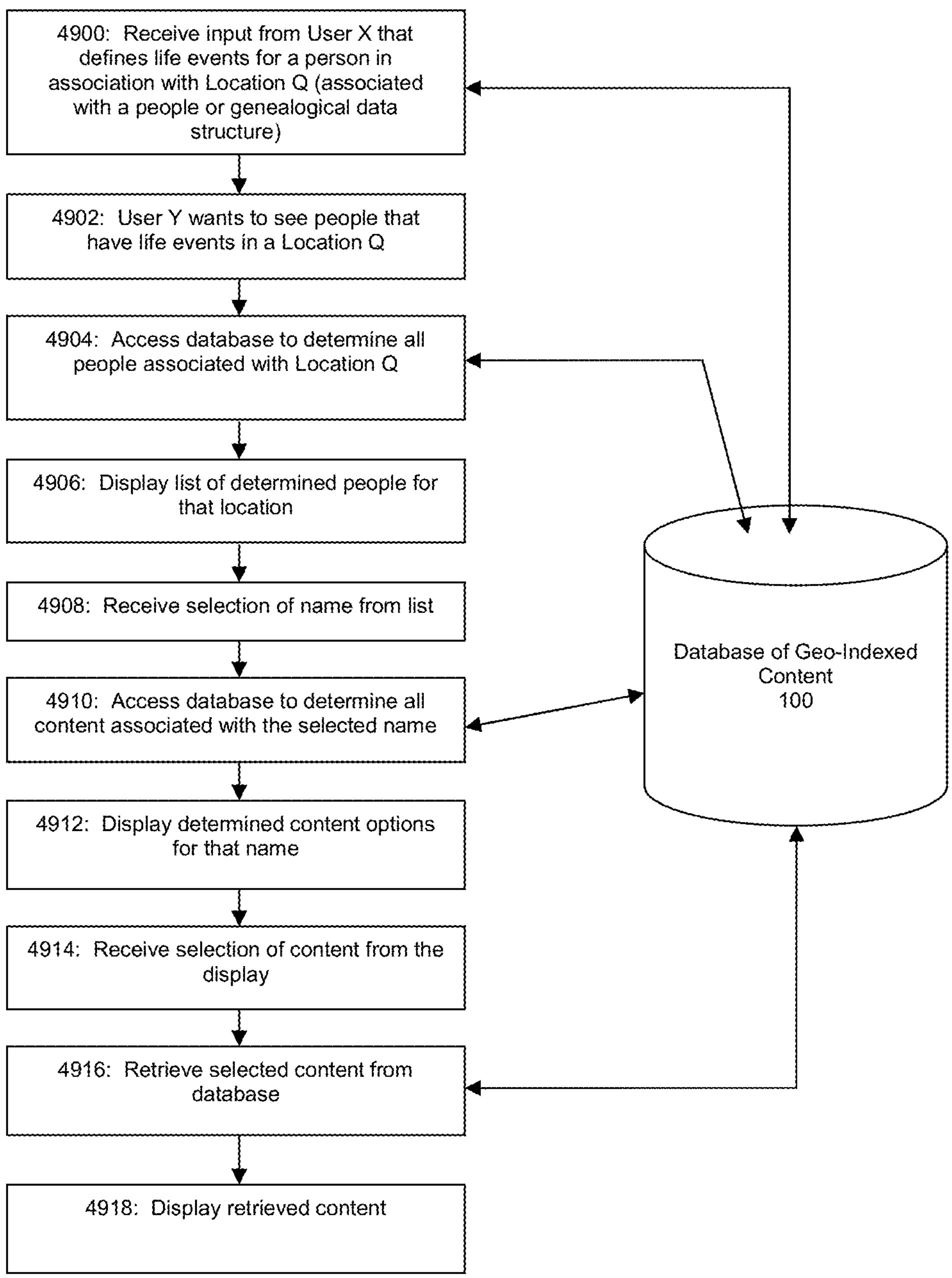
FIGS. 49(*a*)-(*h*) illustrate an exemplary process flow and associated screenshots for finding all people in the database associated with a location.
Figure 49B:
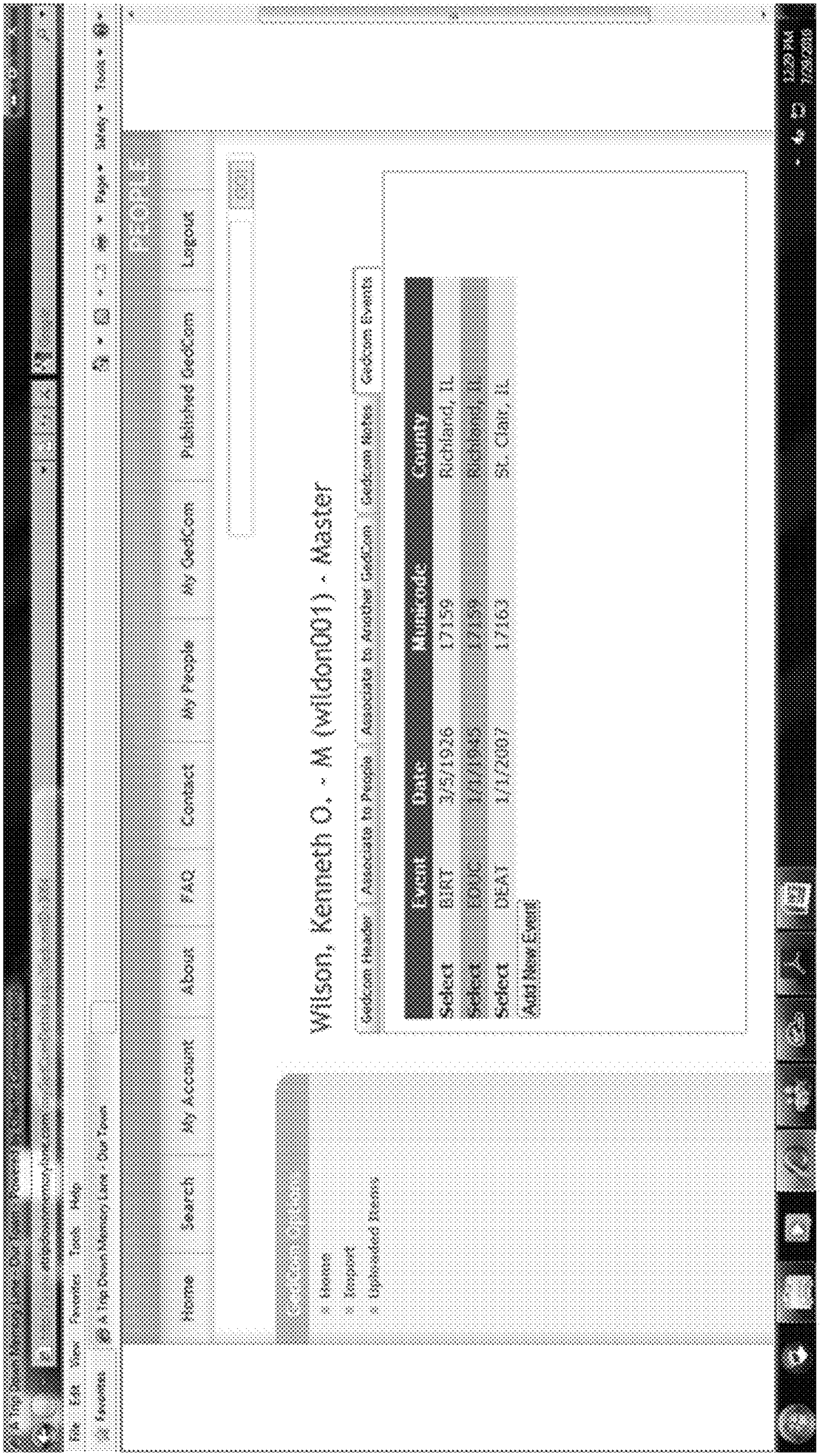
Figure 49C:
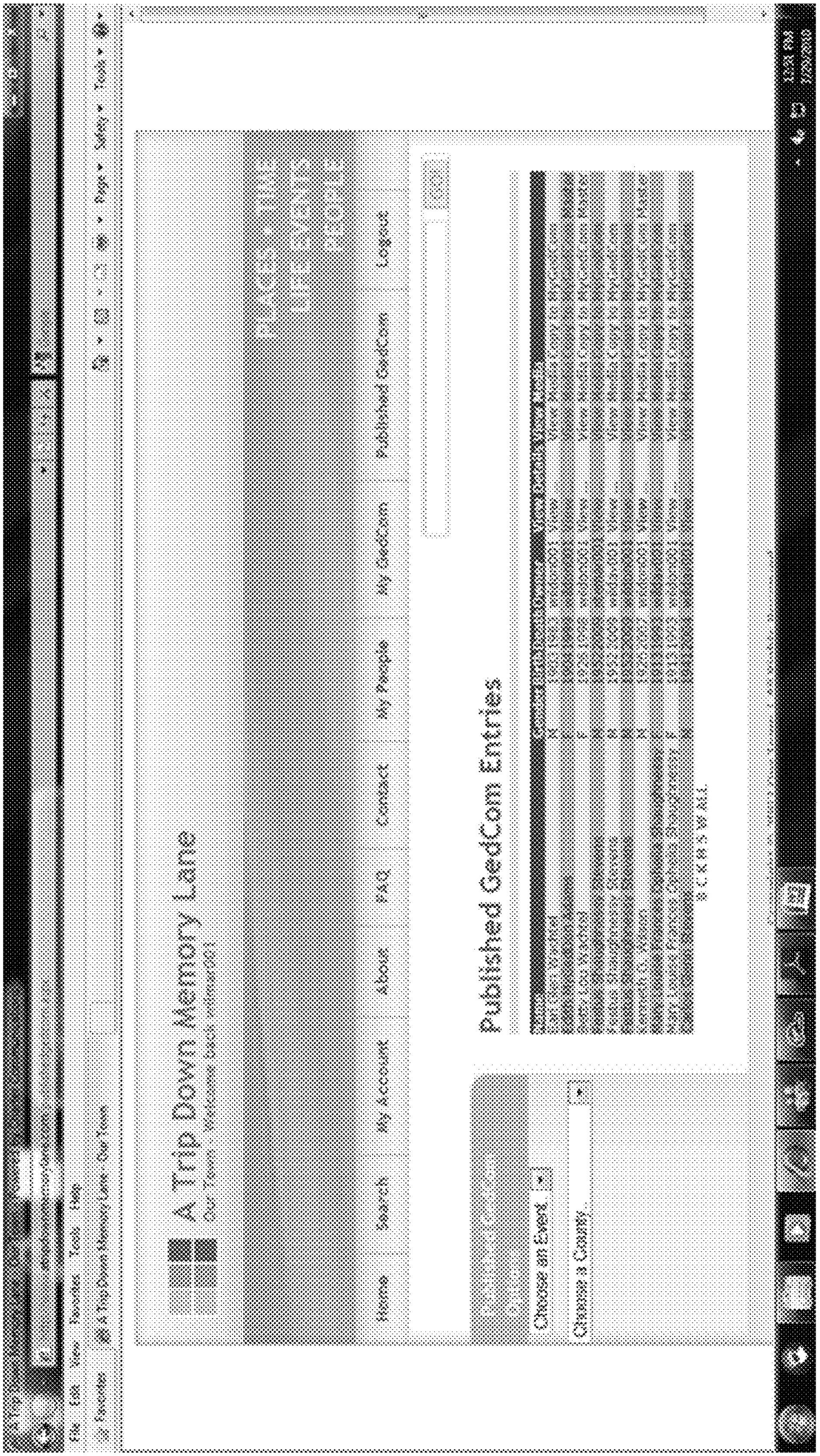
Figure 49D:
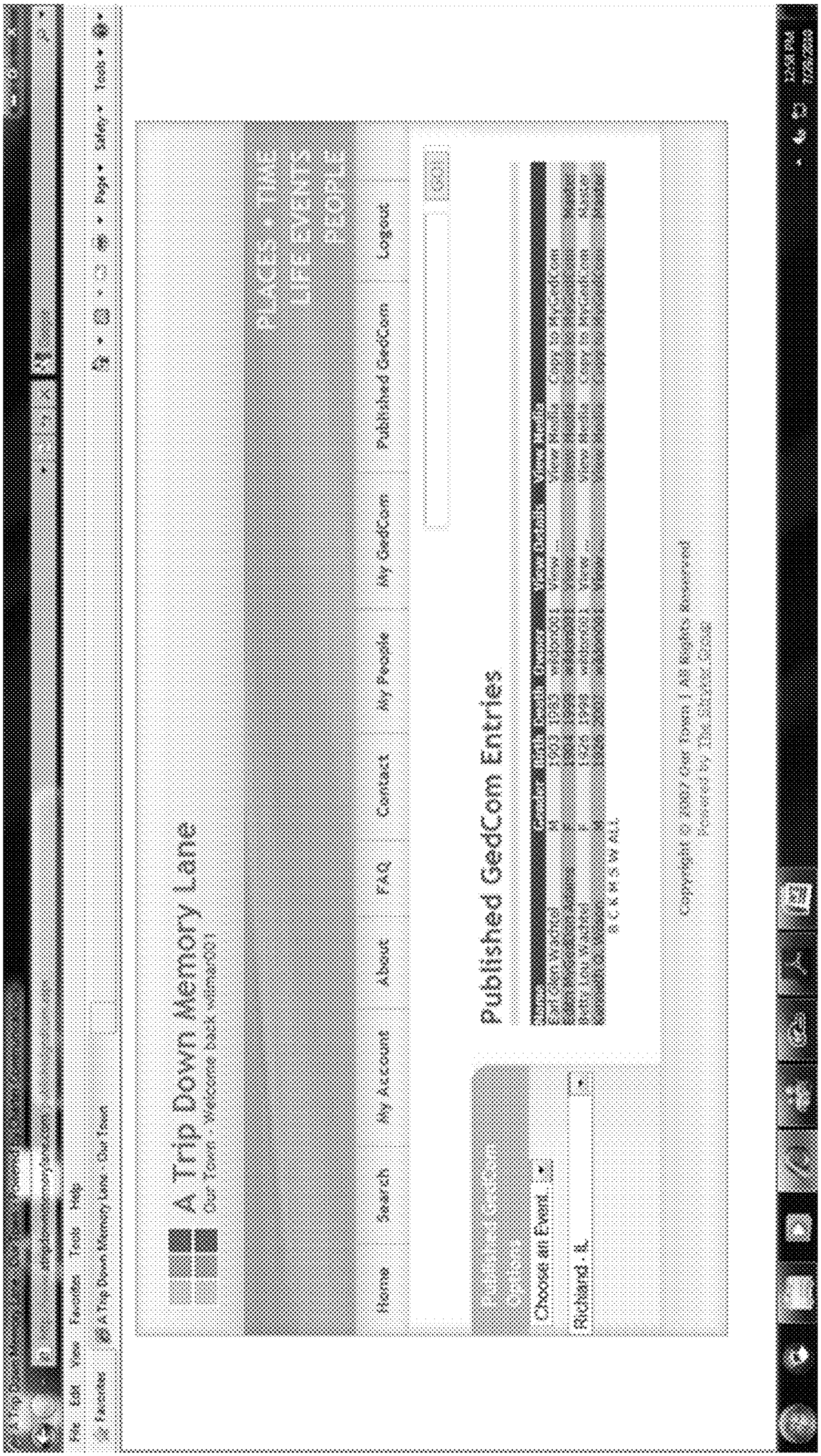
Figure 49E:
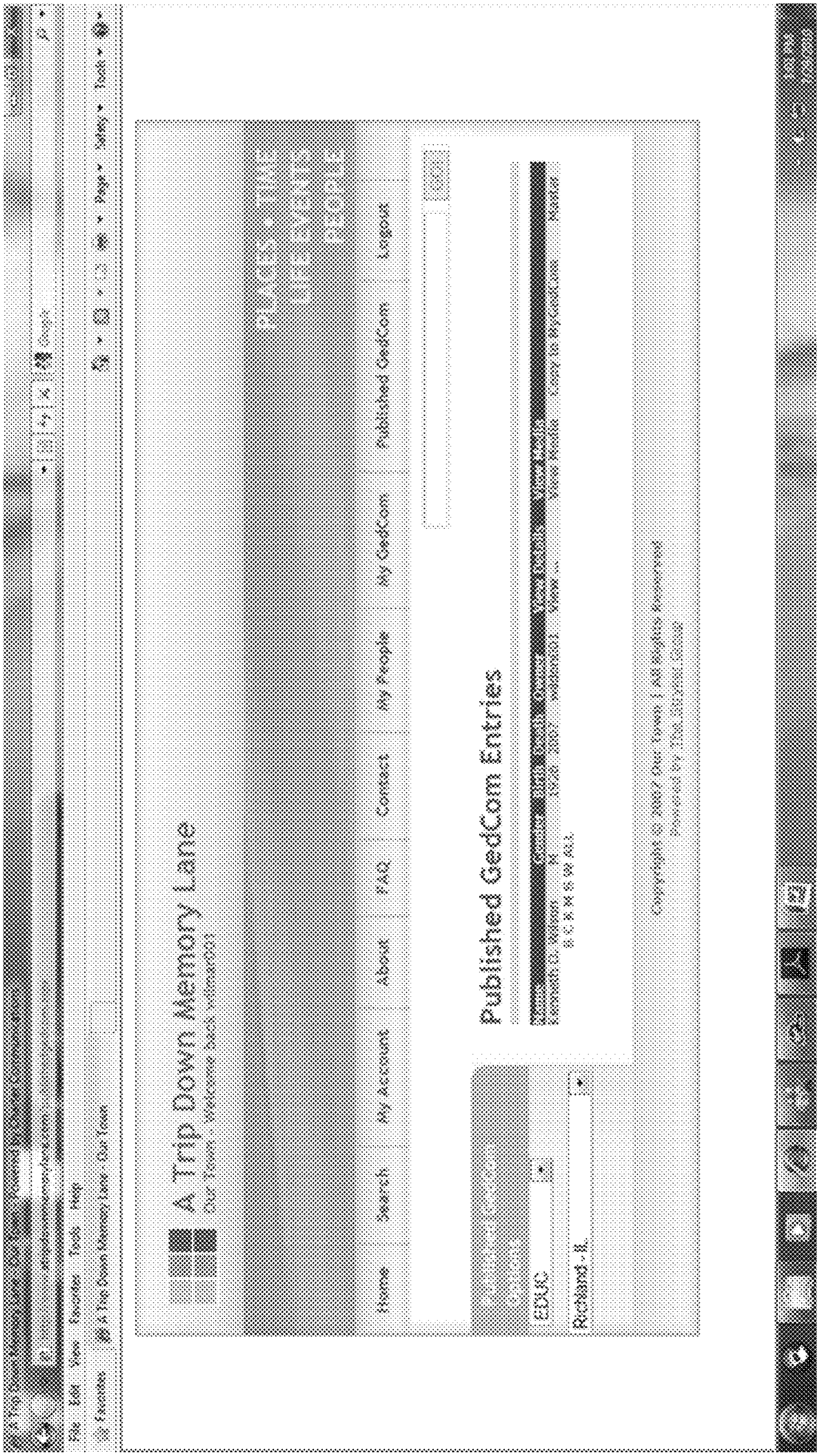
Figure 49F:
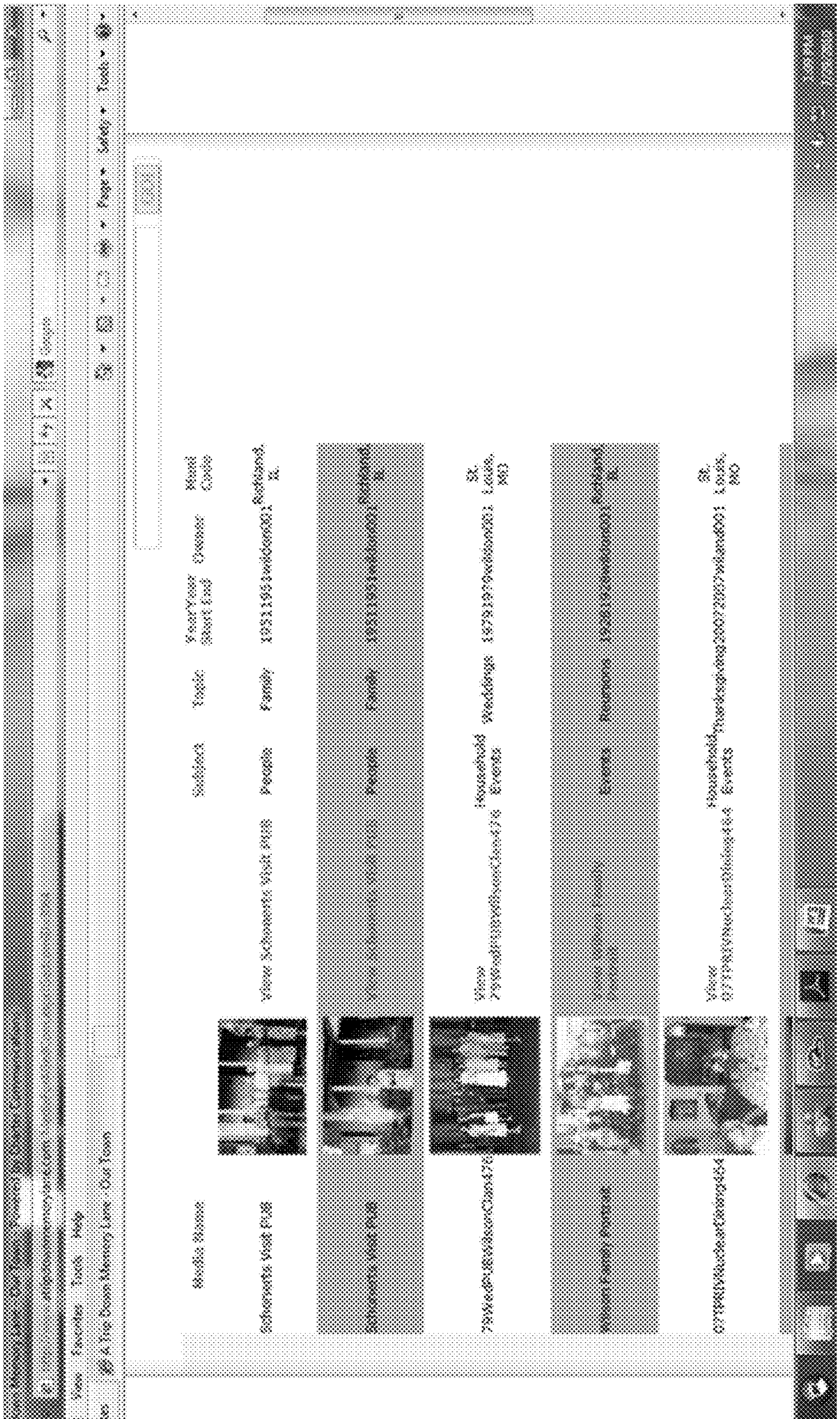
Figure 49G:
Figure 49H:
Figure 50A:
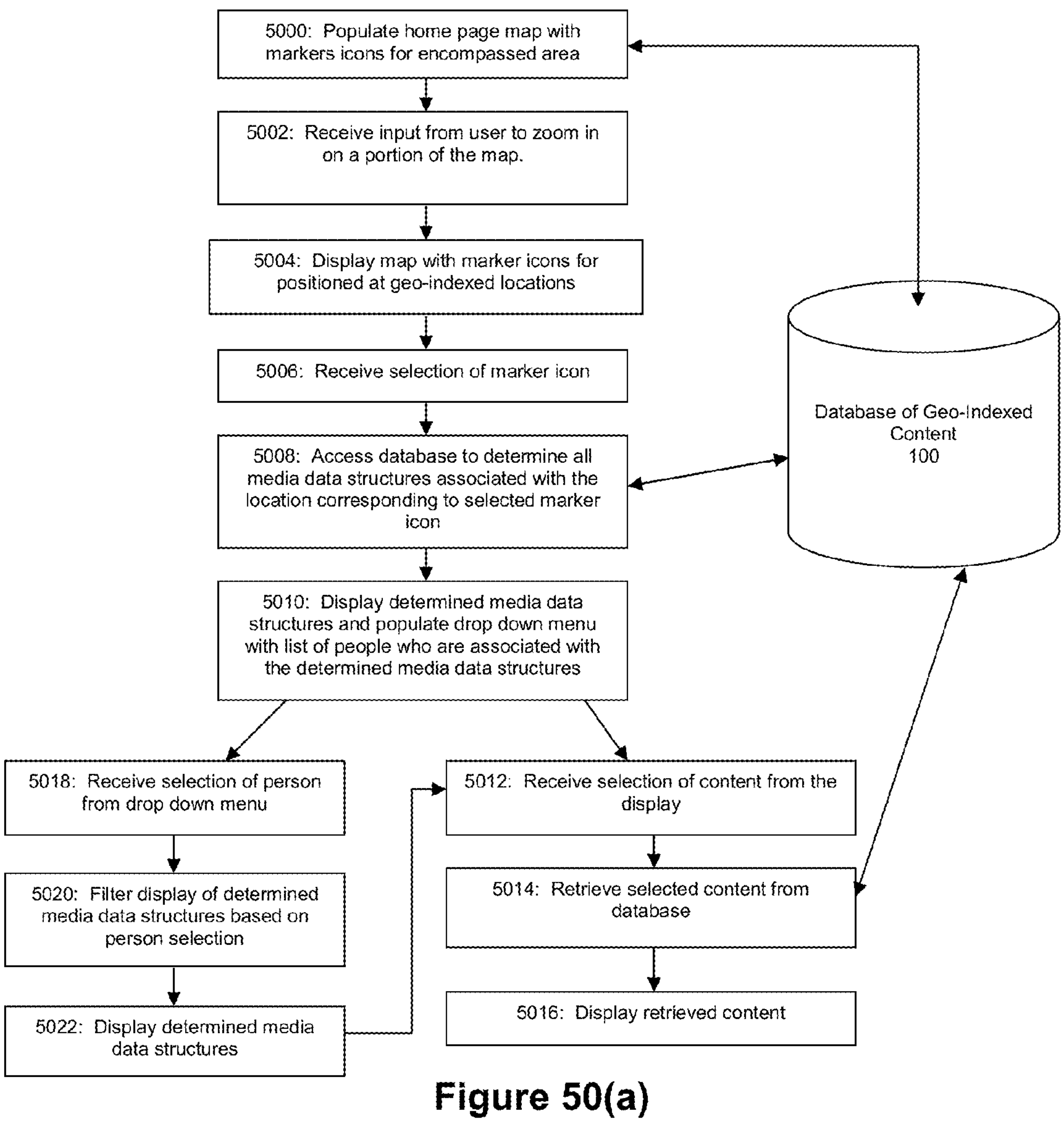
FIGS. 50(*a*)-(*f*) illustrate an exemplary process flow and associated screenshots for finding all content associated a location.
Figure 50B:
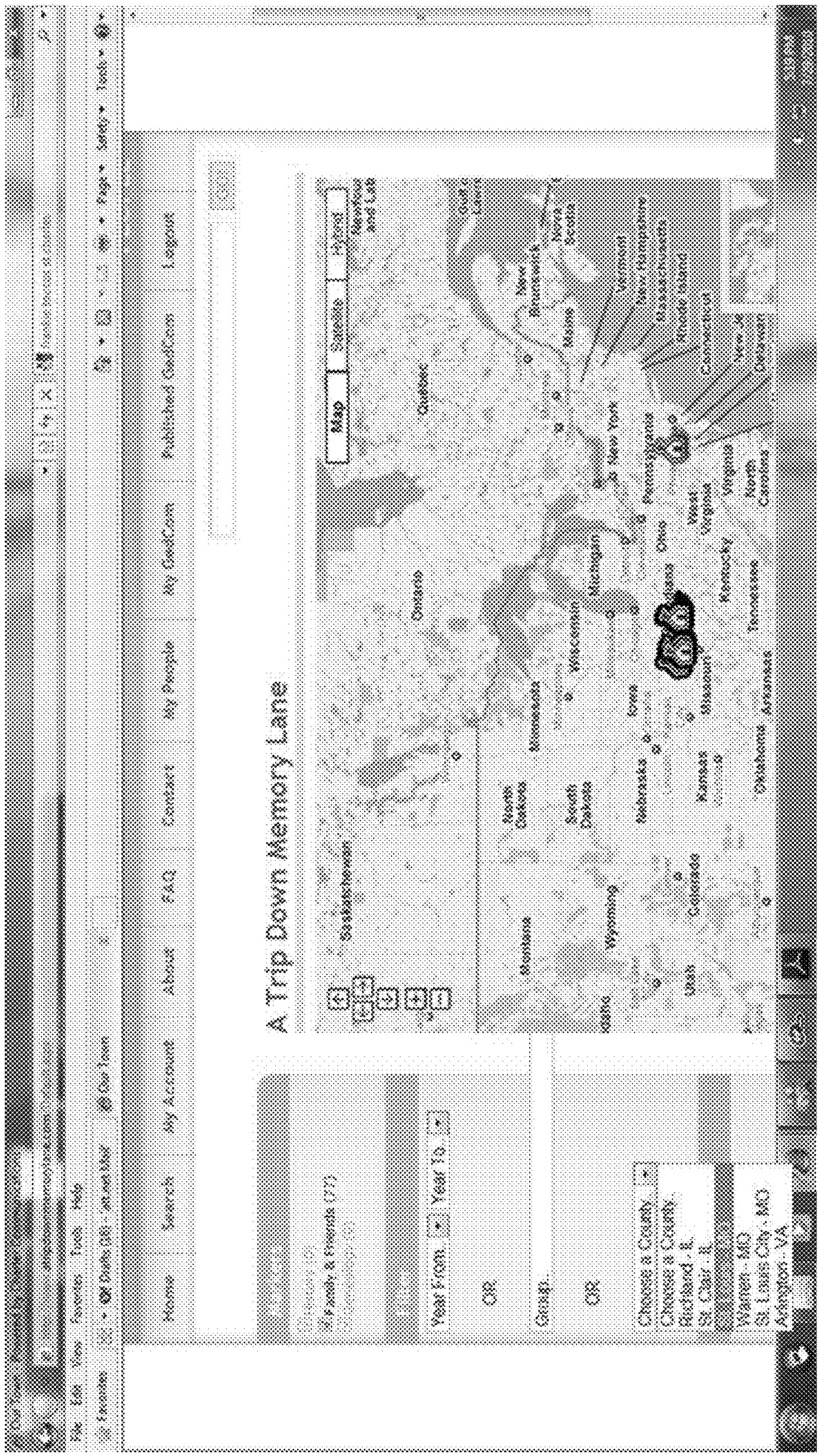
Figure 50C:
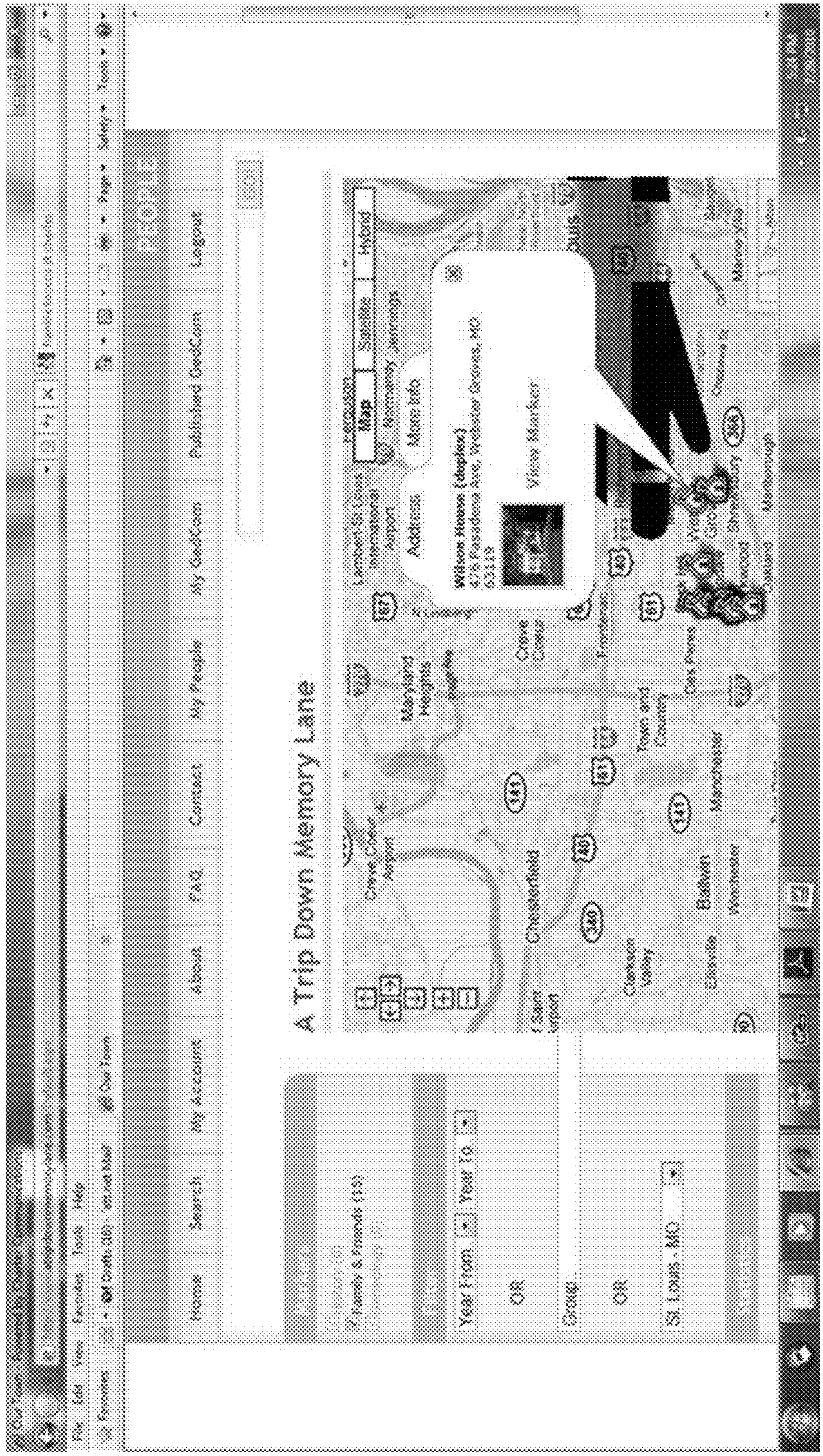
Figure 50D:
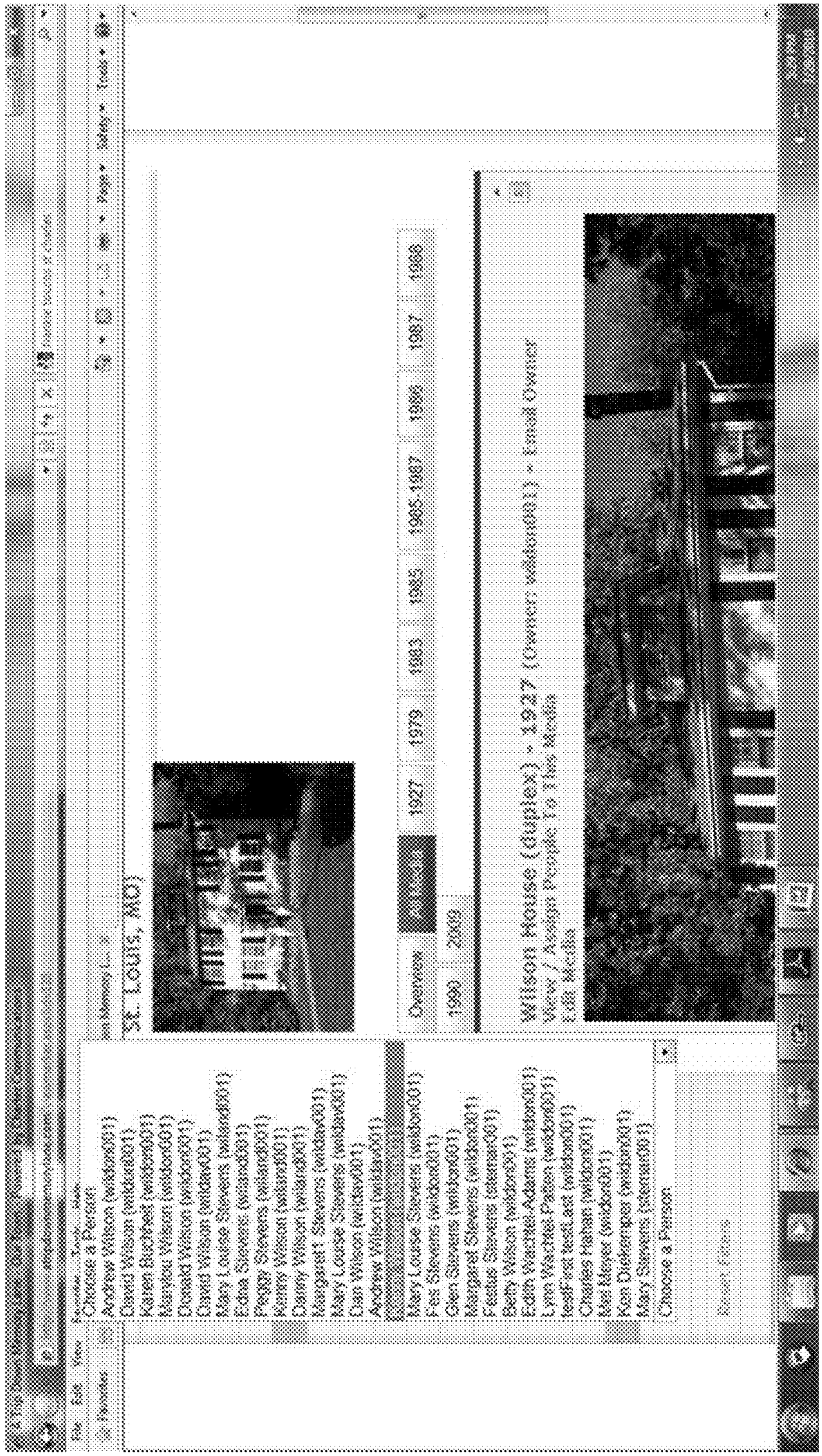
Figure 50E:
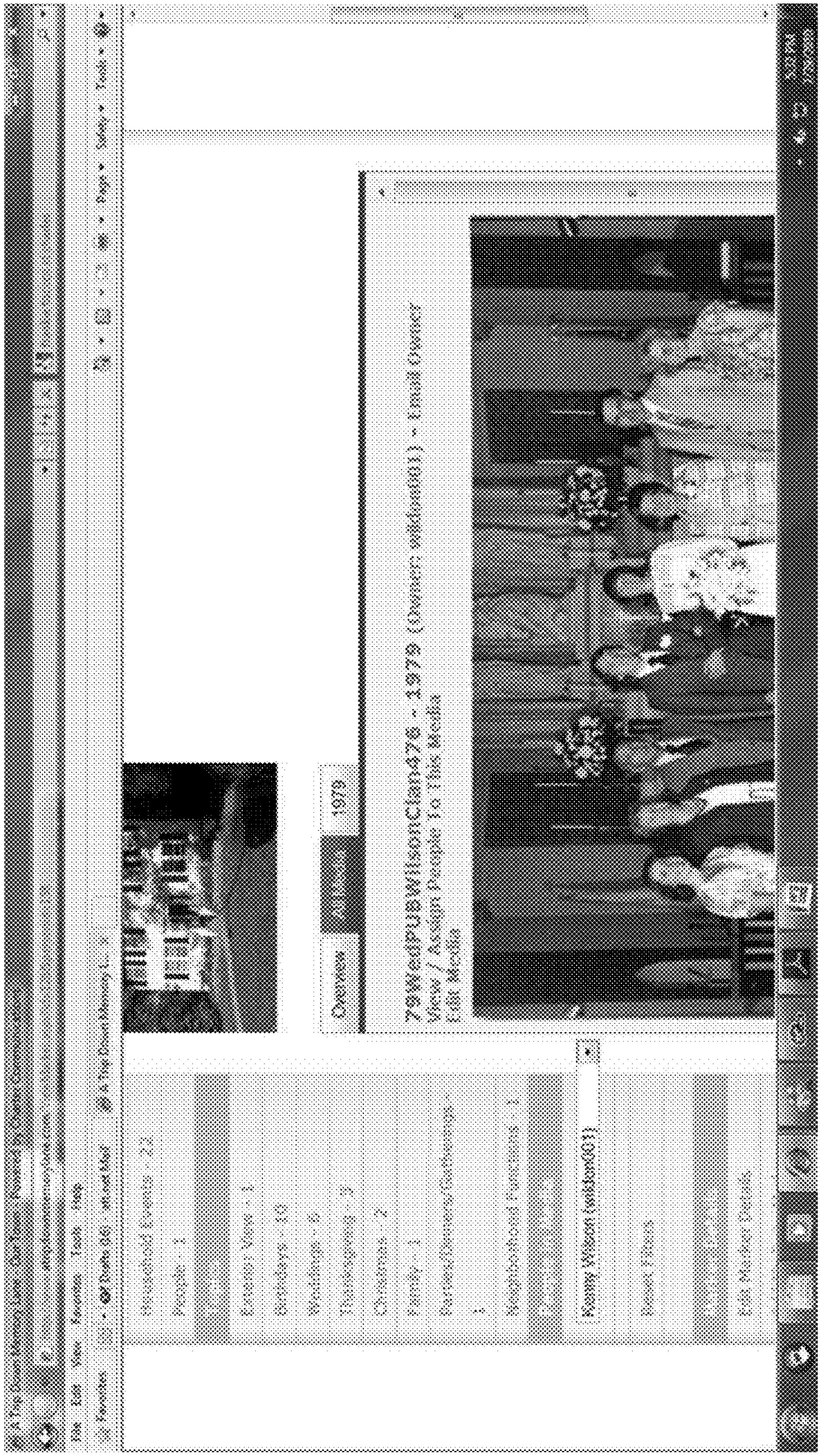
Figure 50F:
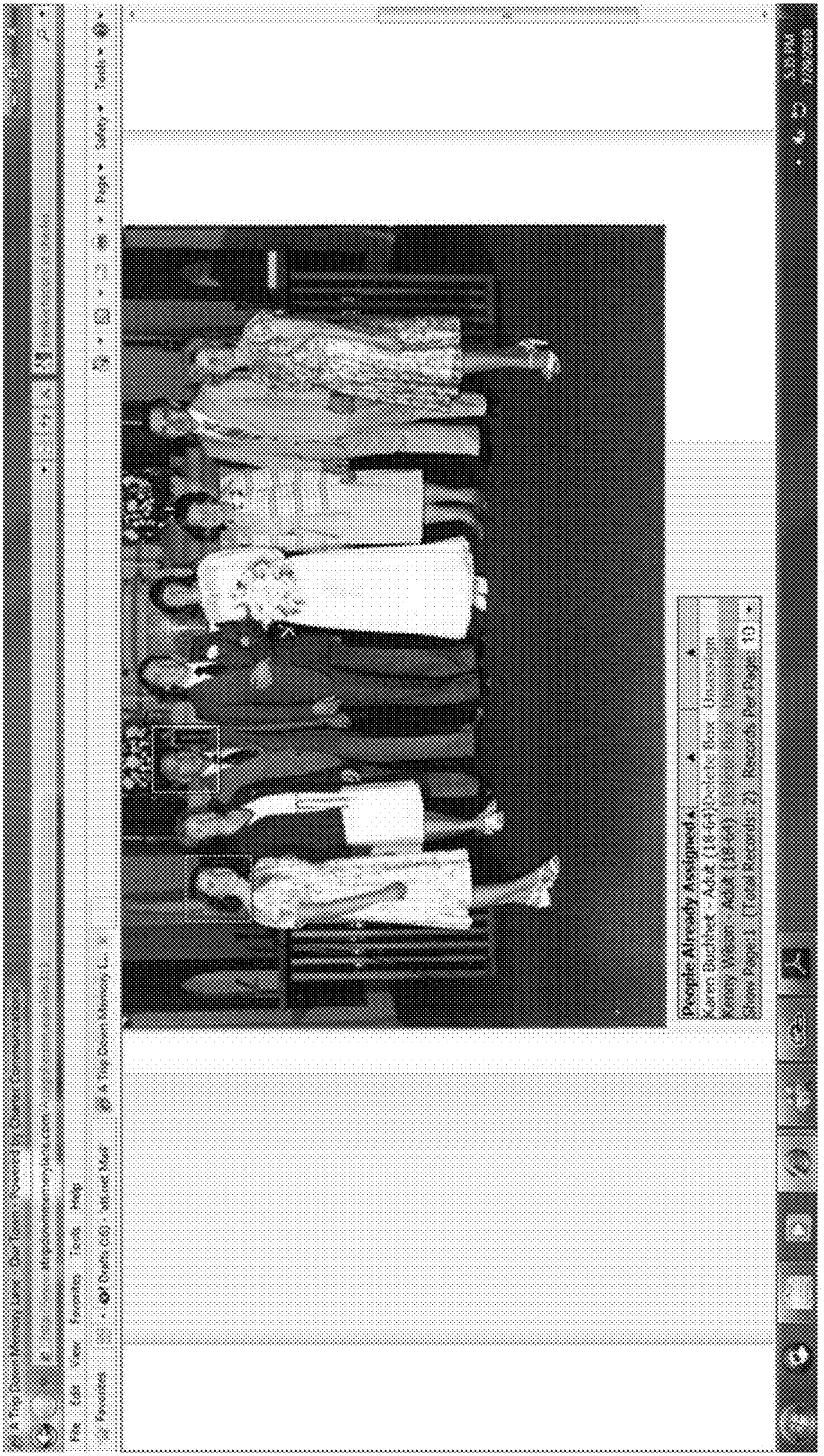
Figure 51A:
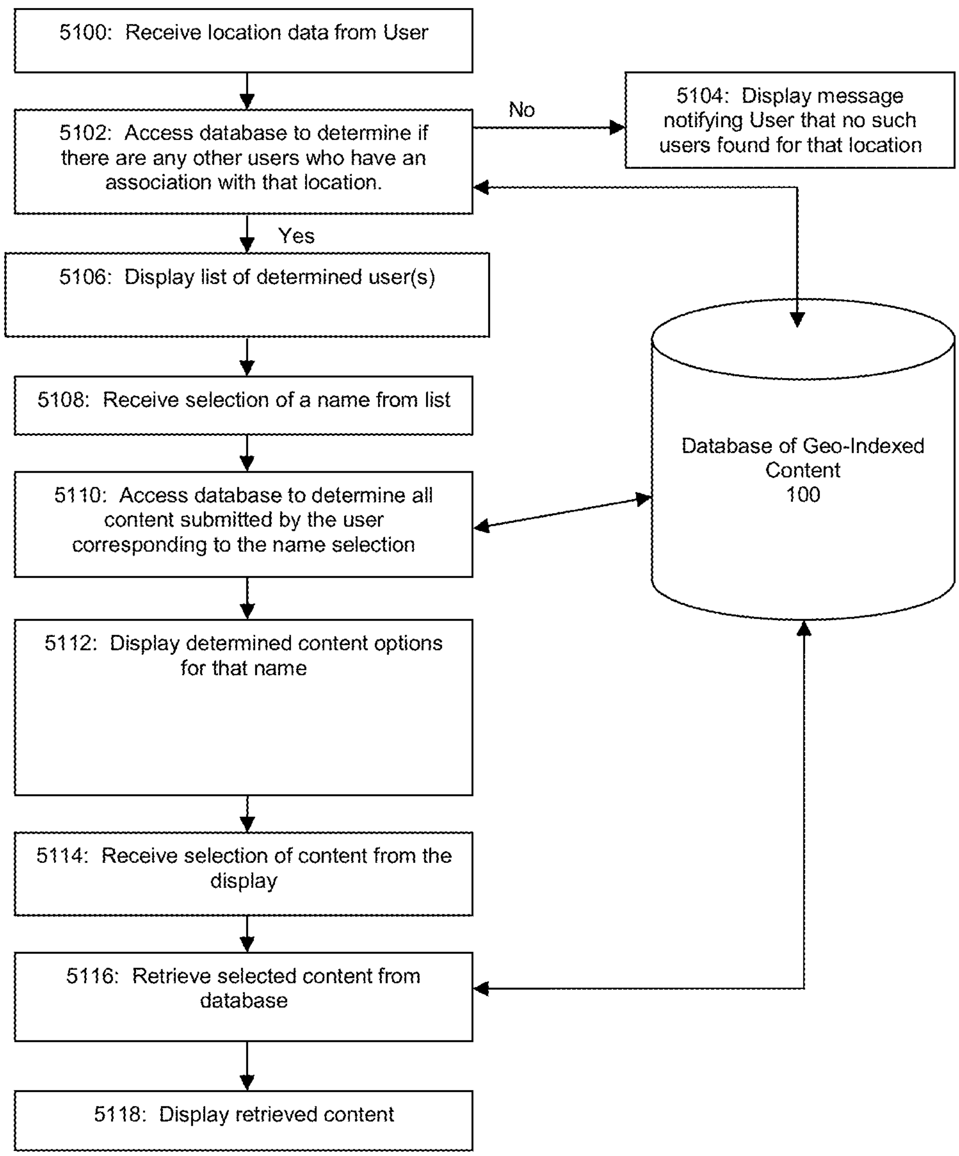
FIGS. 51(*a*)-(*e*) illustrate an exemplary process flow and associated screenshots for finding other users who have posted data in association with a particular location.
Figure 51B:
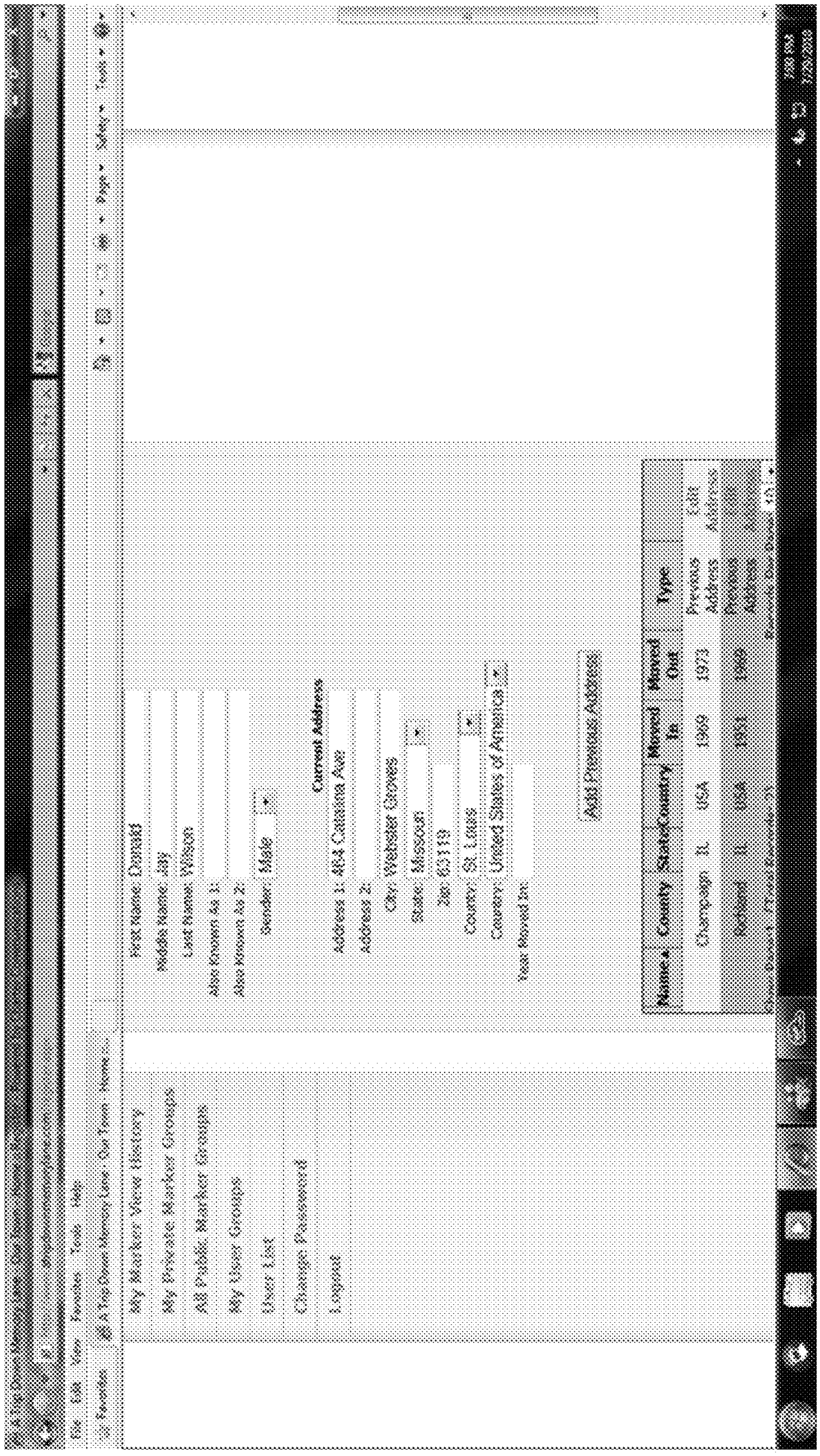
Figure 51C:
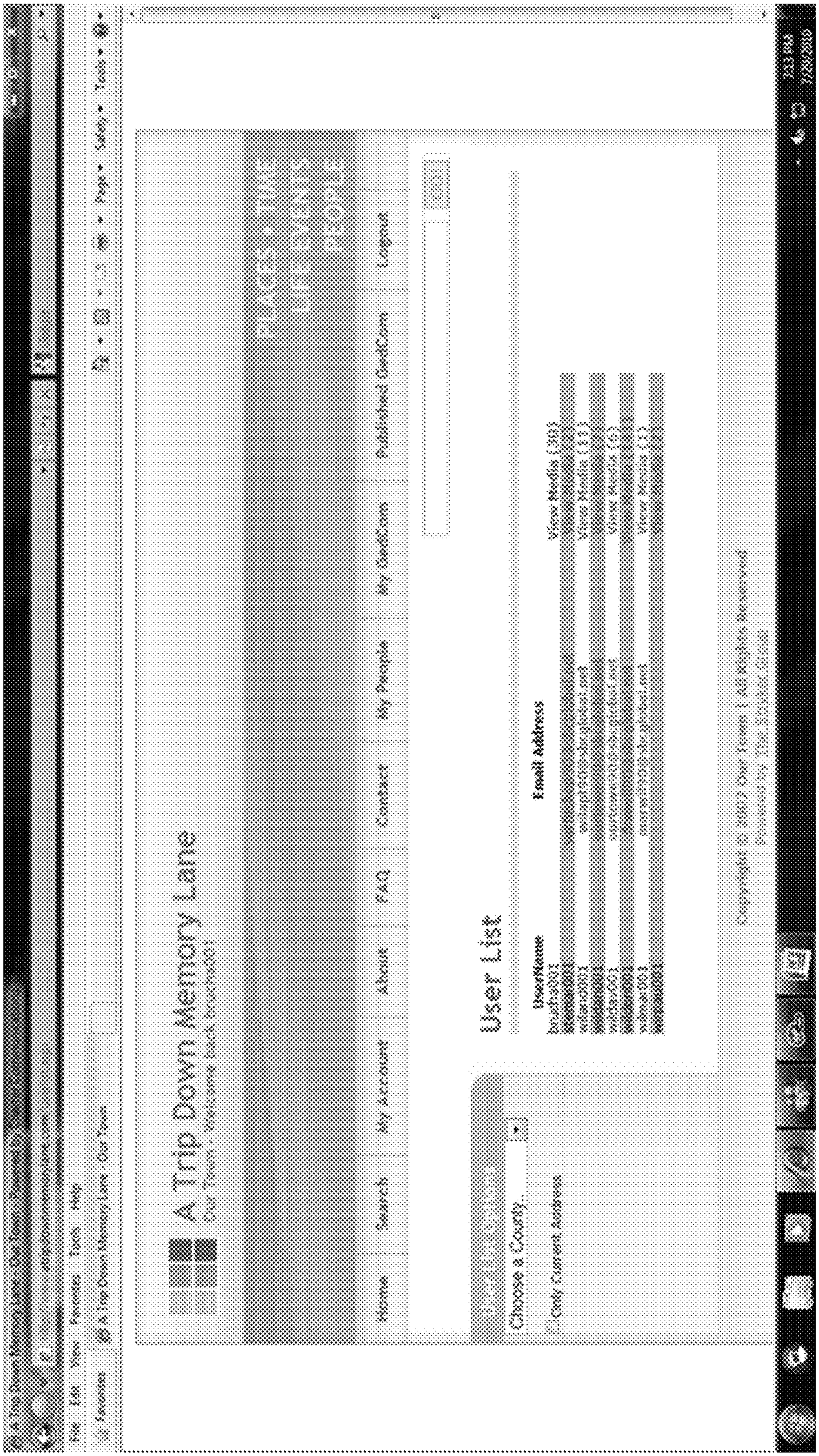
Figure 51D:
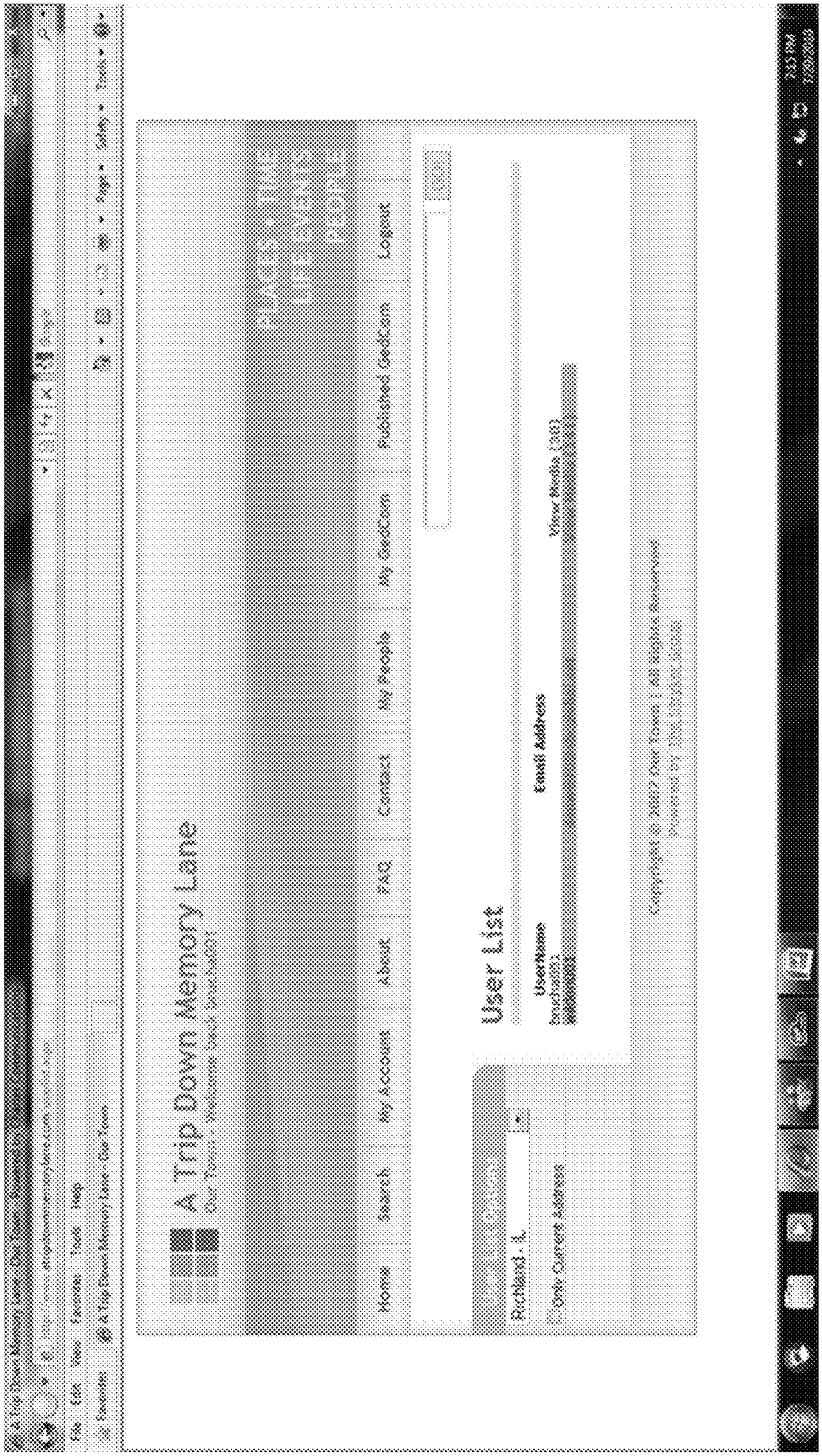
Figure 51E:
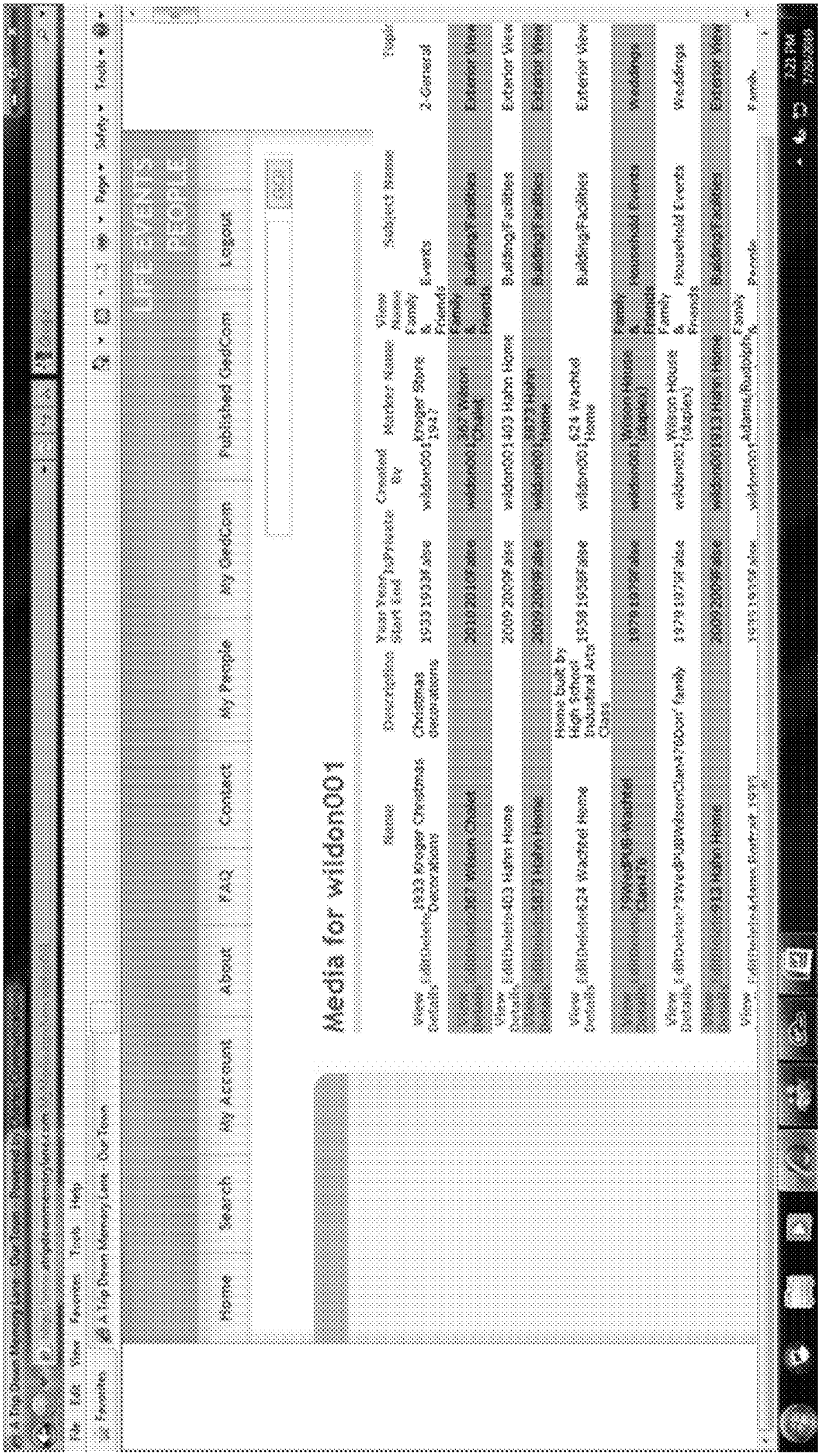

In response to administrator selection of the "Edit Media Per User" link, the administrator can initiate the process of editing the media items associated with a particular user. FIGS. 47(*a*) and (*b*) illustrate exemplary GUIs for editing media items on a per user basis. The administrator can select the particular user from a drop down menu (see FIG. 47(*a*)) to cause that user's media items to be listed (see FIG. 47(*b*)). From there, the administrator can make edits to that user's media items as desired. As can be seen in FIG. 47(*a*), the administrator has an option to select the "Set All Media to Private" to automatically change the privacy setting to "private" for all of the selected user's media items.

In response to administrator selection of the "Announcements" link, the administrator can initiate the process of sending a system-wide announcement. FIGS. 48(*a*) and (*b*) illustrate exemplary GUIs for initiating system announcements. After an announcement has been made, when a user logs in to the website (see FIG. 48(*c*)), a GUI can be displayed that notifies the user of the announcement (see FIG. 48(*d*)).

In response to administrator selection of the "Advanced Search/Export" link, an administrator can access functionality such as that described below in connection with FIG. 54(*a*).

Thus, the efficient and flexible website and database design discussed above can be leveraged to provide a wide array of useful functions. Examples of some of these functions follow.

Learning Ancestors' Life Context:

The website can allow a User to "go to" a location in the past where his ancestors lived and where other users have recorded life events in media of the same person of interest (e.g., via a Published Gedcom record). These other users (who may be relatives or friends of the person of interest) may have contributed data to the database that was previously unknown to the User. For example, the User may have never lived or visited the ancestral location, but other users who currently live in the location may have access to historical information in the area and about past residents, both public and private documents and media, and they may have submitted this information to the database.

FIG. 49(*a*) illustrates an exemplary process flow for learning the life context of a person of interest. At step 4900, a user such as User X submits a life event for a person to the database in association with a location such as Location Q. An example of a GUI for doing so is shown in FIG. 49(*b*). This life event data can be stored in the database in association with a people data structure such as a genealogical data structure. At step 4902, another user, User Y, wants to see people that have life events stored in the database in association with Location Q. Through a GUI (see for example FIG. 49(*c*)), User Y can specify a location such as a county to filter the list of people records (such as Gedcom entries) to only people having life events in association with the specified location (Location Q). At step 4904, the website accesses the database 100 to determine all people associated with Location Q in response to User Y's request. At step 4906, the website displays a list of the determined people for that location (see FIG. 49(*d*) which illustrates a filtering operation performed with respect to Richland County, Ill.). It should also be noted that if User Y wants to further filter the displayed records, he/she could also perform a filtering operation by life event type (see for example, FIG. 49(*e*) which filters the people list to only people having education events at Location Q). At step 4908, the website receives a selection from User Y of a name from the list. At step 4910, the website accesses the database to determine all content associated with the selected person. Then, at step 4912, the website displays the determined content options (see FIG. 49(*f*)). These options can be presented as a list on a map or a table. At step 4914, the website receives a selection of one of the content options, retrieves the selected content from the database (step 4916), and displays the retrieved content through a GUI (step 4918; see FIG. 49(*g*)). In this manner, the User can learn about life events of a person of interest such as an ancestor of which he/she was previously unaware as a result of the power of location-based content sharing through the database. Moreover, if the content is a photograph and User Y recognizes one or more people in the photograph, he/she can tag the photograph with the names of those people to further enhance the information available through the database (see FIG. 49(*h*)).

Virtual Visits to the "Old Neighborhood":

Users can also use the mapping features of the website to "go to" their "old neighborhood" or childhood home(s) and drill down into other user-contributed public media on specific residences. Via a marker data structure (e.g., a marker corresponding to a residence known to the User) the User can search the database for a list of all media associated with that residence's location in a dropdown list (see FIGS. 37(*a*) and (*b*)), and if desired further search for all media associated with people associated with that location, where such people may be mutual friends/family/acquaintances. Then the user can browse the public media trail of this long lost friend.

FIG. 50(*a*) illustrates an exemplary process flow for this feature. At step 5000, the website populates a home page with a map display having a plurality of marker icons positioned appropriately within the encompassed area (see FIG. 50(*b*)). At step 5002, the website zooms in on a portion of the map in response to user input, and the map is re-displayed (step 5004; see FIG. 50(*c*)) on the zoomed-in scale with marker icons within the encompassed area positioned appropriately on the map. At step 5006, the website receives a selection from the user of a marker icon on the map. In response to this selection, at step 5008, the website accesses the database to identify all media data structures associated with the location corresponding to the selected marker icon. At step 5010, the website provides a GUI to the user computer for display thereon that lists the identified media data structures (see FIG. 50(*d*)). The website can also populate a drop down menu on this GUI with a list of all people associated with the listed media data structures. If desired, the user has the option of further accessing a list of all people who are associated with the listed media data structures via a drop down menu as shown in FIG. 50(*d*). Should the user choose this course and select one of the listed people options (step 5018), the website can further filter the displayed media items to only those for media data structures associated with the selected person at the subject location. It should be understood that other filters could also or alternatively be provided such as filtering capabilities corresponding to any subjects, topics, or other defined data fields for association with the media data structures. FIG. 50(*e*) illustrates an exemplary GUI which can be displayed (step 5022) that depicts all media data structures for a selected person (where this person was originally presented to the user due to an association with the location of interest). However, it should be understood that a user need not utilize this people filtering option.

Regardless of whether the people filtering option is selected, the user has the option of selecting a listed media data structure (from either the FIG. 59(*d*) or 50(*f*) GUIs) (step 5012) to access the database to retrieve the selected media data structure (step 5014) and cause that retrieved media data structure to be displayed to the user (step 5016; see FIG. 50(*f*)). Once again, if the displayed media data structure is a photograph, the user may recognize one or more people in the photograph and tag them as appropriate to identify them (see FIG. 50(*f*)). Should any people in the photograph already be identified, a table identifying the people assigned to the photograph can be listed below as shown in FIG. 50(*f*).

To further enhance the reach of the website, a practitioner may choose to include a "View All Media" link or the like in associated with an identified assigned person that is user-selectable to further access all media data structures associated with that assigned person regardless of location. In response to selection of such a link, the system would access the database to determine all media data structures associated with the person of interest regardless of location. These determined media data structures can then be presented to the user in a GUI. Such a feature would provide users with yet more options for running down interesting leads for finding content of interest.

Finding People with Interests in the Same Location:

The User can find another user(s) who currently or previously resided in a location of mutual interest (USA, State, or County) by municode filter(s), as exemplified in the FIG. 21(*a*) screenshot. This allows the User to find media posted by other user(s) in or from a location of interest (e.g., Richland County, Ill.) that represent shared "life events" that have long been forgotten as a recorded public event.

FIG. 51(*a*) illustrates an exemplary process flow for this feature. At step 5100, the website receives location data from the User. This information can be received via the user's account registration information or through other means (e.g., an address input, a mouse click on a map, etc.). FIG. 51(*b*) illustrates an exemplary user registration GUI that identifies a plurality of locations for user in the form of current and former addresses. At step 5102, the website accesses the database to determine if there are any other users who an association with the location of interest. This association can be based on the current and former addresses in other user's account information and/or based on locations associated with content the user has posted to the database. If there are no such users, the user can be so notified (step 5104). Otherwise, at step 5106, the website displays a list of the determined other users (see FIG. 51(*c*)). In situations where the location of interest is based on the user's current and former addresses, it may be the case that the user list produced by step 5106 has multiple locations taken into consideration. If the User wants to further filter the user list shown in FIG. 51(*c*) to a specific location, the user can do so via a drop down menu that is populated with the different locations associated with the users on the user list. The result of such a location filtering operation can be seen in FIG. 51(*d*). At step 5108, the User makes a selection from the user list. Then, at step 5110, the website accesses the database to identify all data structures submitted by the selected other user. These identified data structures are then displayed as selectable options to the user (step 5112; see FIG. 51(*e*)). It should be understood that several display options exist with respect to how these media structures are presented to the user. For example, the data structures can be displayed as lists in textual, marker, silo, thumbnail or map formats. It should be further noted that these display options are available for other GUIs that display lists of data structures. At step 5114, the website receives a selection of one of the listed data structure options. Then, the website retrieves the selected data structure (step 5116) and displays the retrieved data structure in a GUI for review by the User.

Learning Ancestors' Life Events:

The website can be used to network the life events of one's ancestors. As an example, one can search the database to find the people who share the most associations with a person of interest such as an ancestor. If some referenced people are still alive, the User may be able to connect with them (possibly through the user who added the media to the website) to find out more about one's ancestor from the living memories (stories) of such people and their saved photographs. Such discovery may lead to more treasured content being archived in the database.

Figure 52:
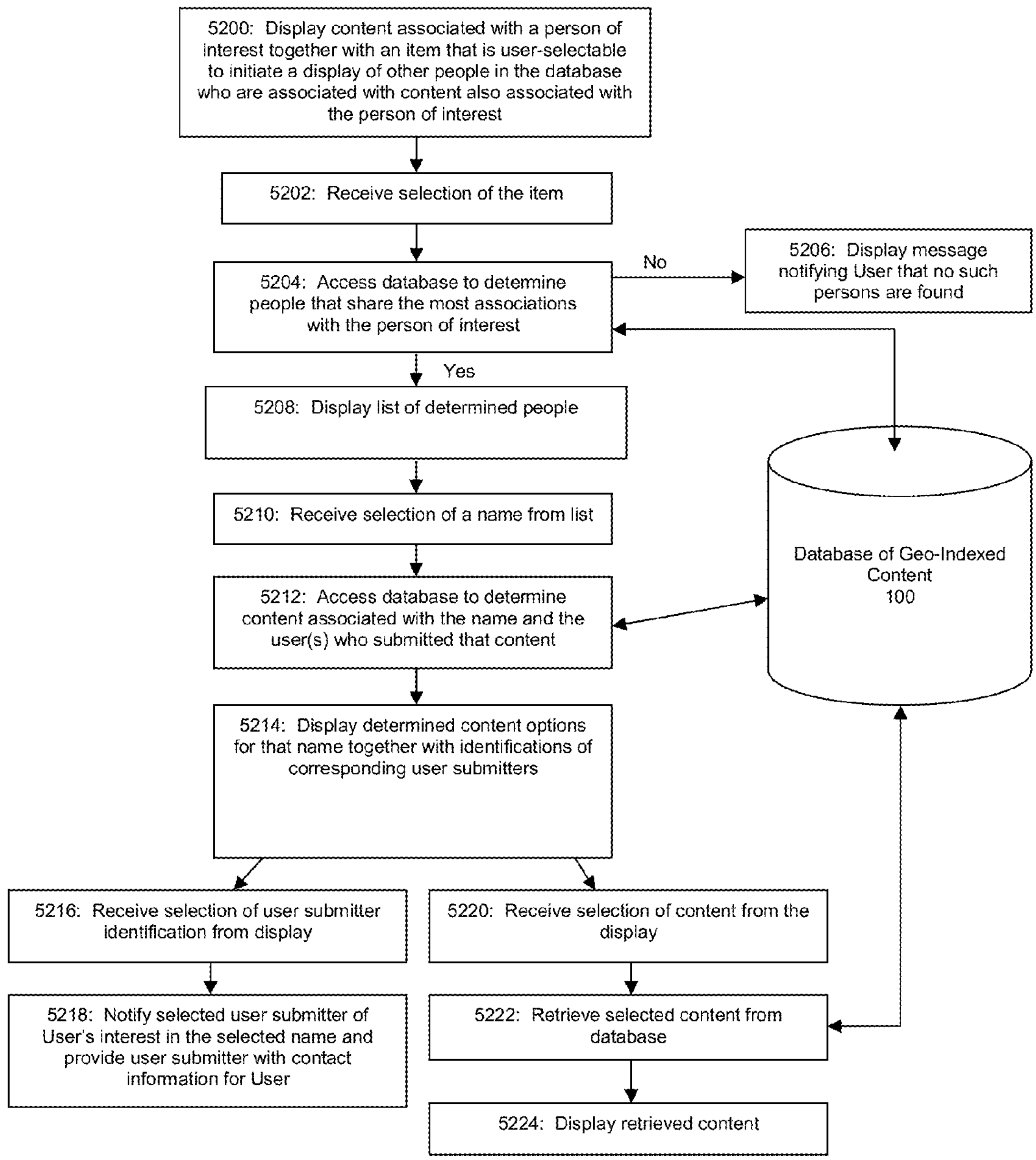
FIG. 52 illustrates an exemplary process flow for finding people who share associations with a person of interest.

FIG. 52 illustrates an exemplary process flow for this feature. At step 5200, the website displays content associated with a person of interest together with a selectable option to initiate a display of other people in the database who are associated with content that is also associated with the person of interest. In short, which people in the database share connections with the person of interest, as discovered through common associations with data structures in the database.

In response to receiving selection of this option (step 5202), the website accesses the database to determine the people that share associations with the person of interest (step 5204). As indicated, this determination can be performed by searching for people data structures in the database that share associations with the people data structure for the person of interest (whether directly or indirectly through shared associations with media data structures). If no such people are found, then the user can be so notified (step 5206). Otherwise, at step 5208, the website lists the determined people. This list can be presented in any of a number of ways. For example, the list can sort the determined people such that the people with the most common associations with the person of interest are placed higher on the list. The website may also employ thresholds to govern which people appear on the list (e.g., only people who share at least 2 associations with the person of interest should be listed).

At step 5210, the website receives a selection corresponding to a person on the list, and at step 5212, the website accesses the database to identify the data structures associated with the selected person. At step 5214, the website informs the user of the identified data structures together with an identification of the users who created those data structures.

Should the user select a user creator for one of the identified data structures (step 5216), the website can notify the selected user creator of the User's interest and provide the selected user creator with contact information for the User (step 5218). This may permit the User to learn more about the person of interest.

Should the user select one of the identified data structures (step 5220), the website can retrieve the selected data structure from the database (step 5222) and display the retrieved data structure via a GUI (step 5224).

Figure 53A:
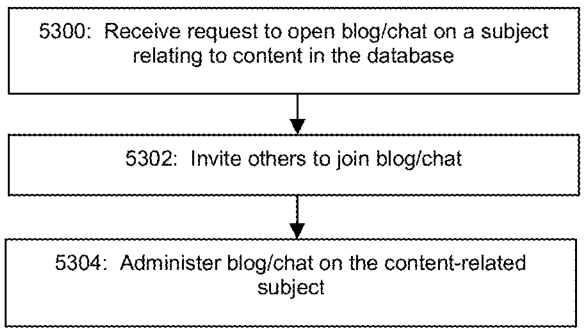
FIGS. 53(*a*) and (*b*) illustrate an exemplary process flow and associated screenshot for opening a blog or chat on a content-related subject.
Figure 53B:
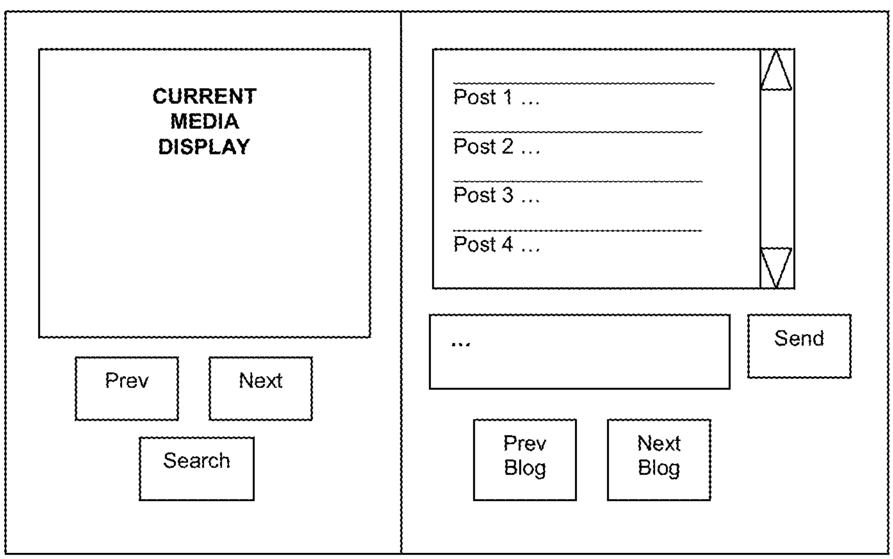
Figure 54A:
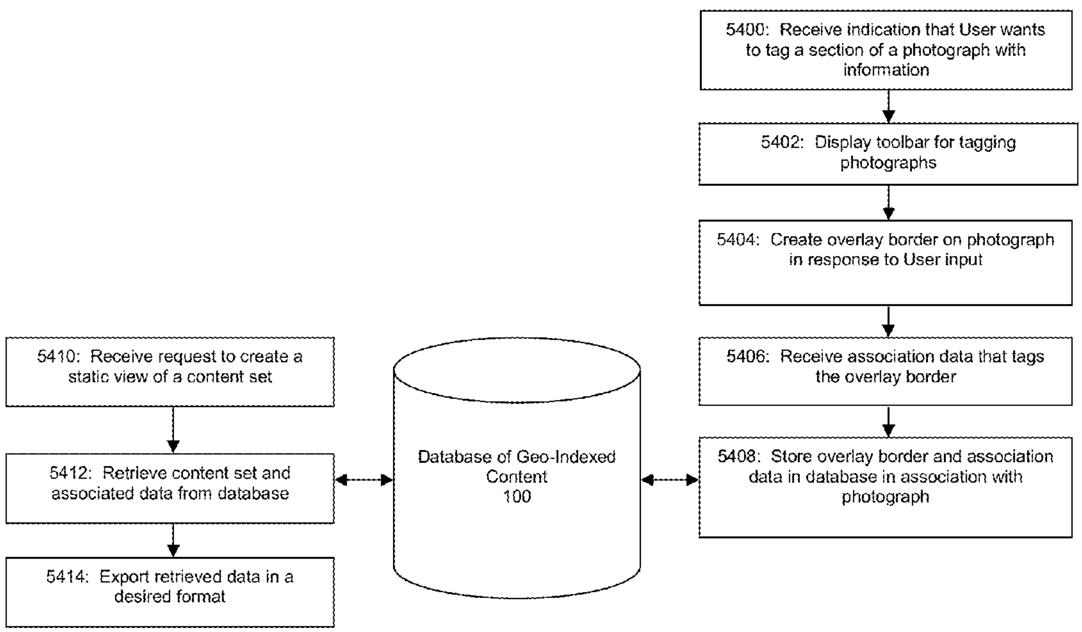
FIGS. 54(*a*)-(*g*) illustrate an exemplary process flow and associated screenshots demonstrating how static data publications can be generated from the dynamic content of the database.
Figure 54B:
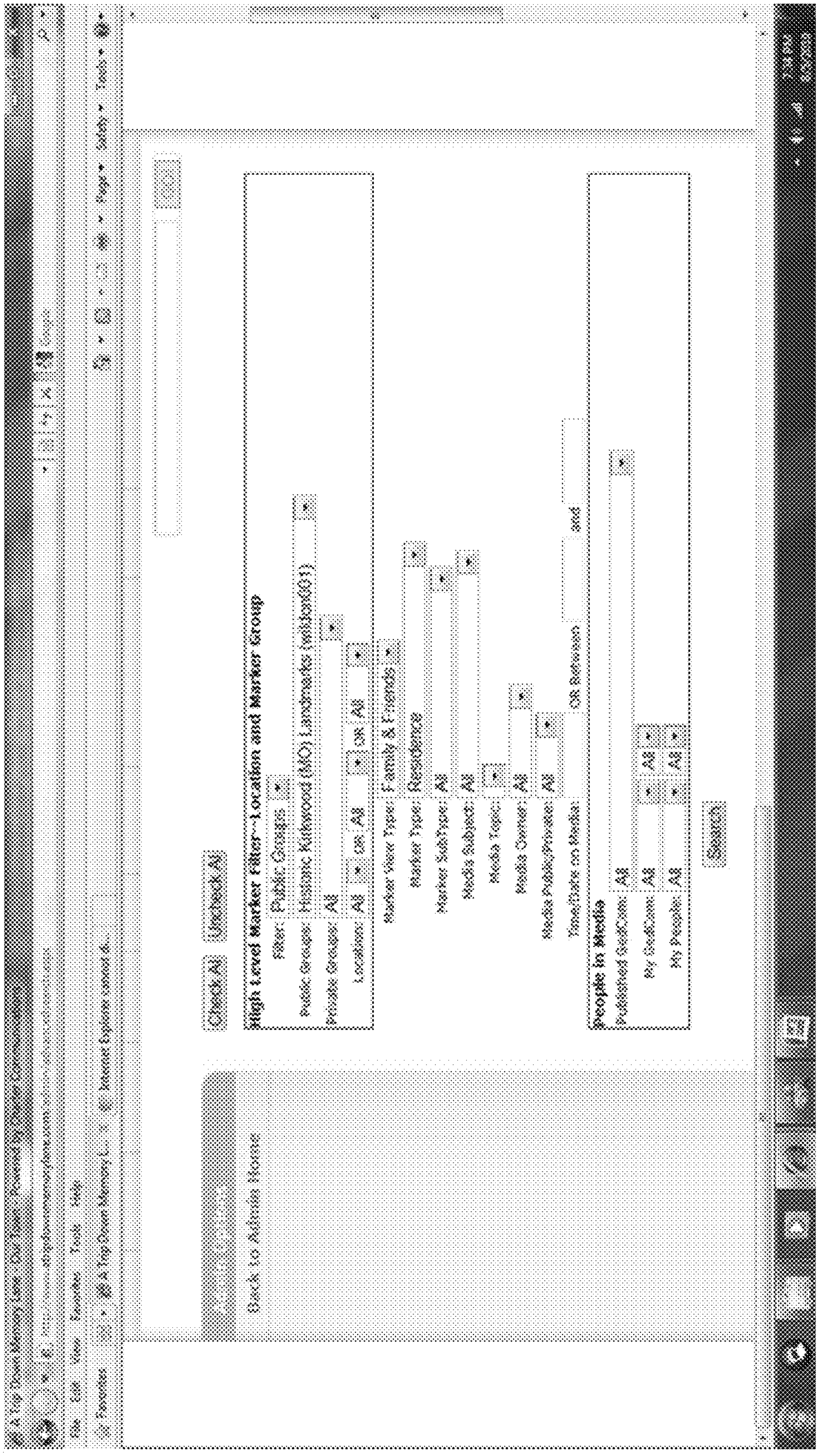
Figure 54C:
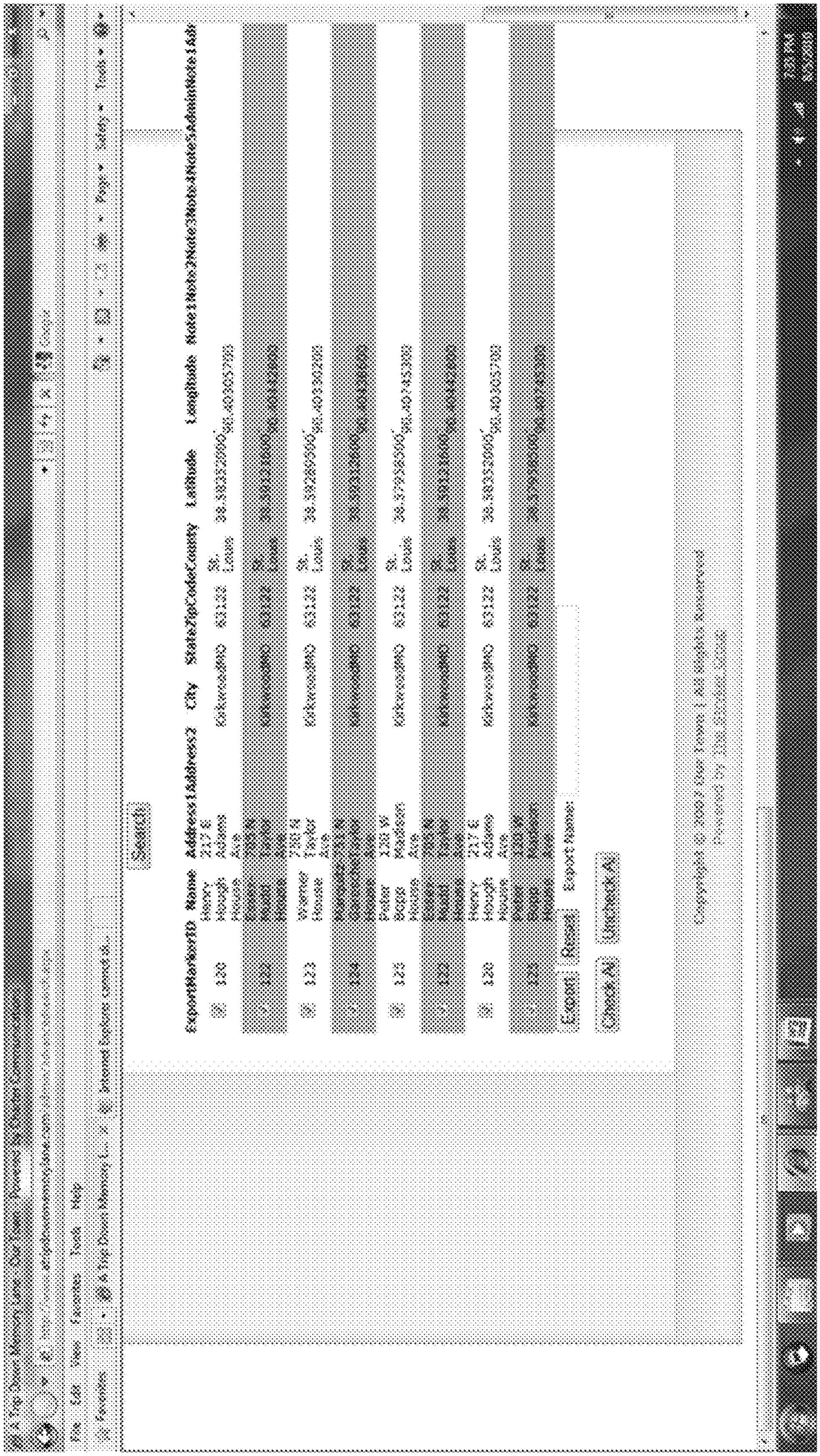
Figure 54D:
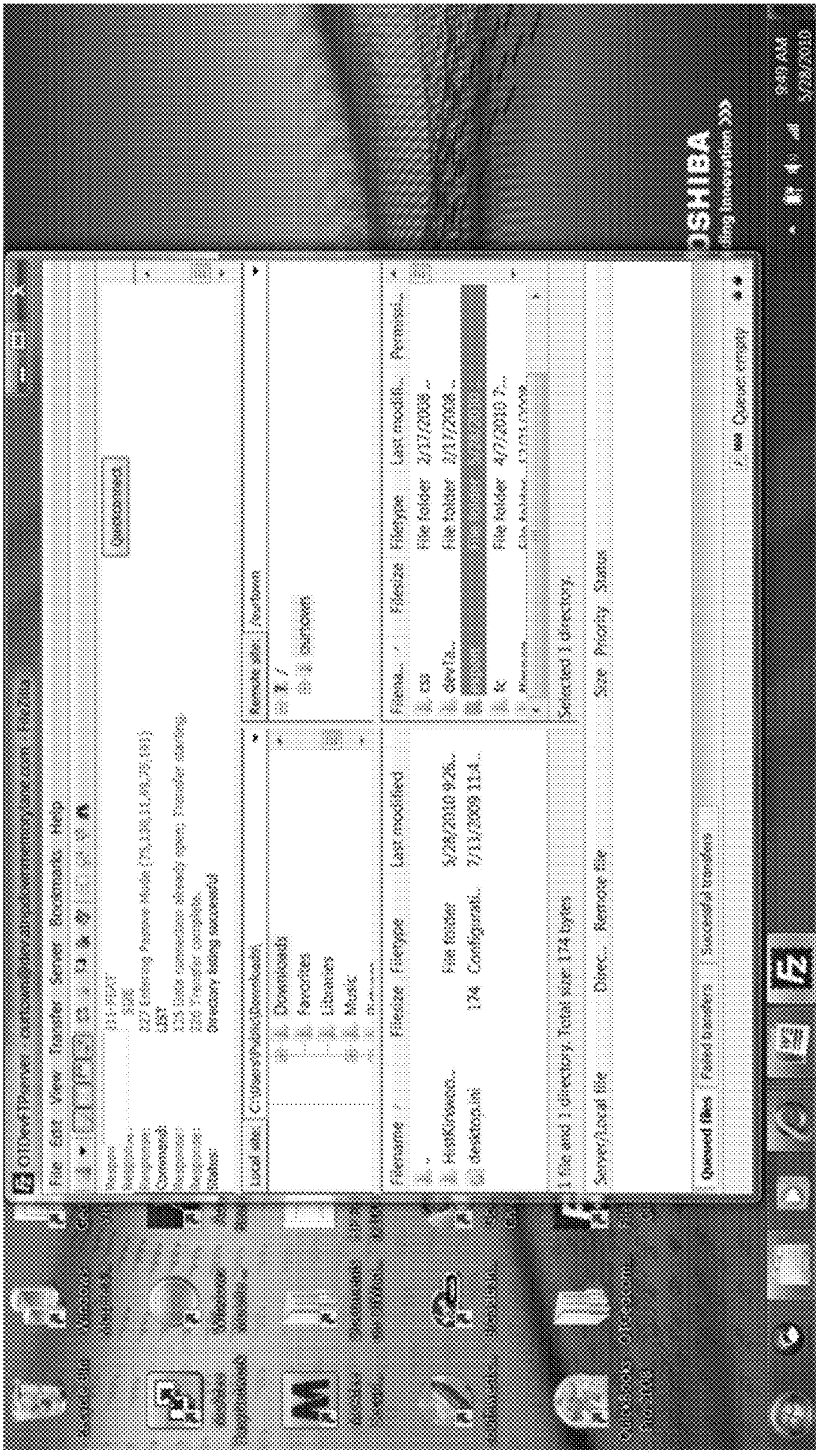
Figure 54E:
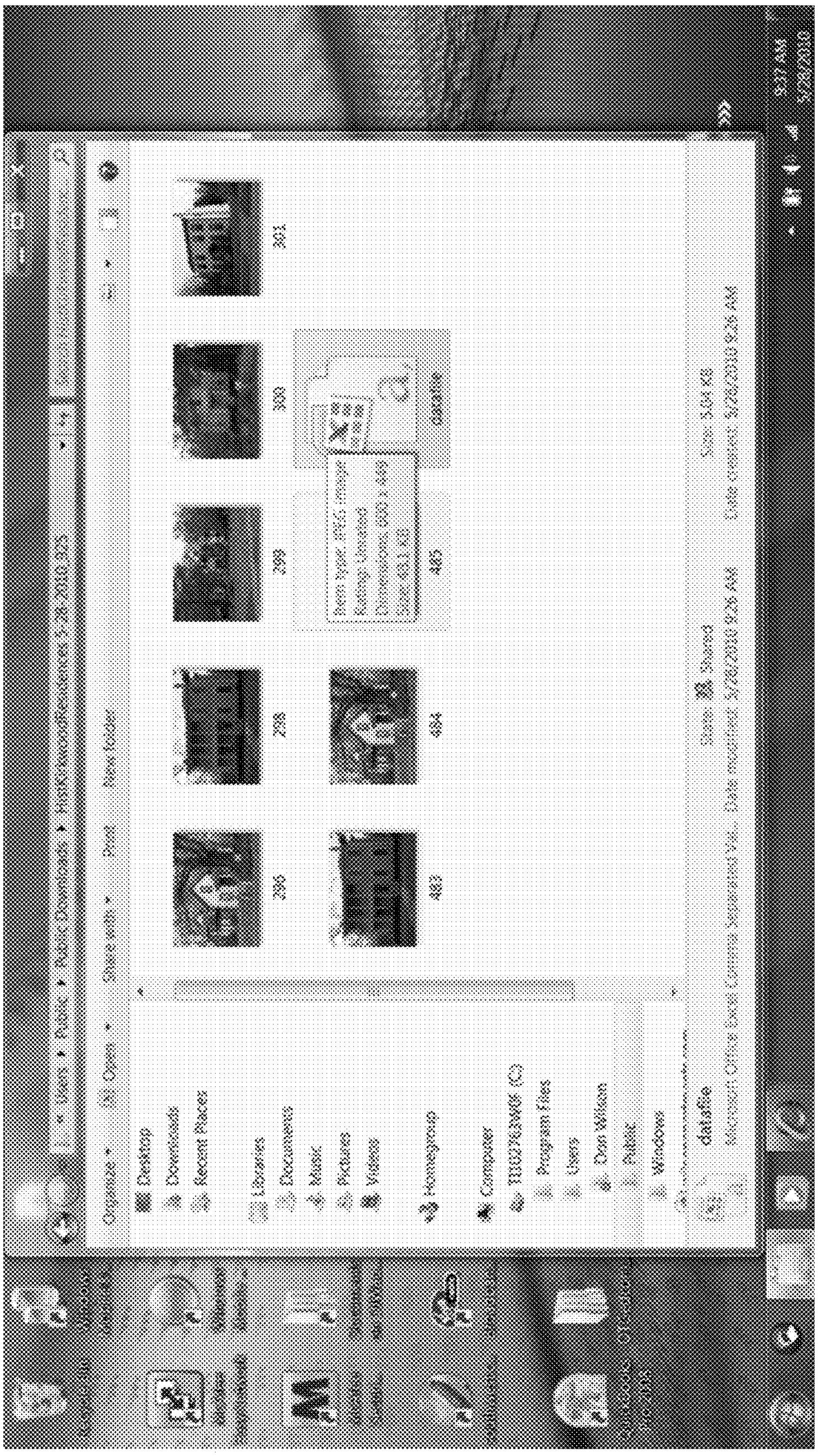
Figure 54F:
Figure 54G:

Virtual Networking:

The website can be configured to permit users join together in a virtual meeting to review and discuss selected media online. FIG. 53(*a*) illustrates an exemplary process flow for this feature. At step 5300, the website receives a request from a User to open a blog or chat on a subject relating to a data structure in the database. At step 5302, the website invites others to join this blog/chat. The invitee list can be defined by the User. However, the website can also be configured to automatically generate an invitee list based on which users have a connection in the database with respect to the data structure that is the subject of the blog/chat. Then, at step 5304, the website administers the blog/chat on the relevant subject. FIG. 53(*b*) illustrates an exemplary GUI that could be accessed by users during such blogs/chats.

A process flow such as the one shown in FIG. 54(*a*) can be employed to define the selected media for online discussion, optionally including where selected media can be searched for and exported to other users who wish to participate in the virtual discussion.

Identifying People Associated with Content:

The website can be used to create a layer of overlaid boxes with respect to media items such as images and assign people information to these boxes (as described above) to be exported with the media to the database, which can then be used by book publishers, scrap bookers, and album creators. The exemplary process flow of FIG. 54(*a*) illustrates this feature. At step 5400, the website receives an indication that a User wants to tag a section of a media file (e.g., a photograph) with information. At step 5402, the website provides a GUI with a toolbar that permits such tagging. Then, at step 5404, the website creates an overlay border on the media file in response to user input. At step 5406, the website receives association data that tags the border (and thus the media file) with information (e.g., an identification of a people data structure to be associated with the media file). Then, at step 5408, the overlay border and the association data are stored in the database in association with the media file.

Publishing Static Albums of Content:

The website content is expected to be dynamic and changing often over time. Some users may have an interest in periodically generating static snapshots of a group's associated content. The software can be configured to format a groups' content as it exists at a user-specified point in time for publication in an album (a physical or virtual album), and such created albums can be published for historians, genealogists, and networks of groups of family and friends as appropriate. Supplements can always be updated and published. FIG. 54(*a*) also illustrates an exemplary process flow for this feature. At step 5410, the website receives a request to create a static view of a set of data structures in the database. At step 5412, the website retrieves the data structure set, and then the website exports the retrieved data structure set in a desired format suitable for publication (e.g., in a format recognized by known scrapbooking software applications). FIGS. 54(*b*)-(*g*) illustrate exemplary GUIs for carrying these operations out.

The exemplary GUIs of FIGS. 54(*b*) and (*c*) are configured to permit the user to selectively search for and identify various data structures that are to be included in the static data set for publication.

Once the static data set is defined, a software program such as a file transfer protocol (FTP) tool (e.g., the open source Filezilla tool) can be executed to export the data structures of the static data set to a user-defined destination (e.g., a folder on the user's desktop). FIG. 54(*d*) illustrates an exemplary GUI for this process. Preferably, the media files for the media data structures are exported as a set of individual files to the destination in a format appropriate to the media (e.g., jpeg for image media, etc.) while the text data within the various data structures are exported in a file format (such as a spreadsheet file format (e.g., Microsoft Excel)). FIG. 54(*e*) depicts an exemplary destination folder after the files of the static data set have been exported.

An exemplary spreadsheet file as read through a spreadsheet program is depicted in FIG. 54(*f*). Rows in the spreadsheet can be configured to correspond to different exported media files or markers. A file name or number assigned by the export program to each media file can be identified in appropriate rows. Furthermore, desired text information associated with a media item can be included in the spreadsheet rows to provide context information for media files (e.g., caption date for any resultant albums).

A desktop publisher application can then be executed to process the spreadsheet file and other files in the destination folder to generate a publication proof such as the example shown in FIG. 54(*g*).

Figure 55:
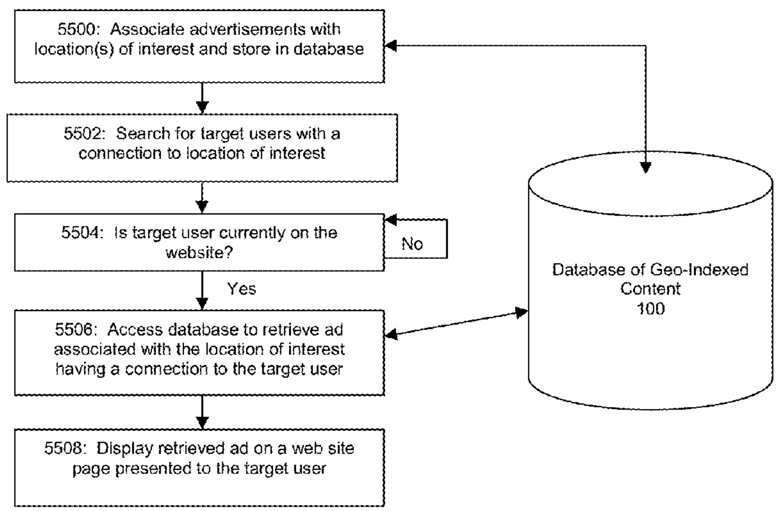
FIG. 55 illustrates an exemplary process flow for targeting advertising to users via the website.

Targeted Advertising to Attract New Users:

The website can be configured to advertise directly to those users who are residents or prior residents of a location (e.g., municode) recorded in a user profile at registration. This permits an advertiser to conduct an advertising campaign roughly along the lines of: "Hey, you know me (retailer), you used to live here, and I now have a web site to serve you just like when you lived here". This allows targeted advertising by local merchants to specifically advertise to prior residents of the local community via the user profiles. FIG. 55 described below illustrates an exemplary process flow that can be used to implement such an advertising strategy.

Targeted Advertising for Community/Family Functions:

Advertisers can also target advertisements to users who frequent a specific location (e.g., municode) via the website. Such advertisements can not only be advertisements for products but also advertisements for events such as high school reunions, founder's day celebrations, etc.

FIG. 55 also illustrates an exemplary process flow for implementing this advertising strategy. At step 5500, the advertisements are stored in the database 100 in association with a plurality of locations of interest. For example, a company that sells a hometown brand of a particular product may create an association with data corresponding to the hometown's geographic area (e.g., the municode for the county within which the hometown resides). Or, a company can implement a more general advertising strategy that associates the advertisements with geographic identifiers for its primary markets (or a new market the company wants to reach).

Then, at step 5502, the system searches for target users registered with the website who have a connection to a particular location of interest. For example, this connection can be based on the current or any previous addresses known for the target user via the target user's account. As another example, it can be a location that the target user's viewing history indicates the user has a relation to. If such a target user is currently visiting the website (step 5504), the website can access the database to retrieve the advertisement associated with that location of interest (step 5506) and display the retrieved advertisement on a GUI page presented to the target user (step 5508).

Linking to Community Registries for Additional Content:

Genealogy markers can be location (e.g., municode) specific and allow the website to electronically link with centralized repositories of content (particularly genealogical content) such as church registries, cemeteries, etc. (if maintained by the institution online). Specified Published Gedcoms can be traced back to the last known or oldest location and event in the Gedcom record and compared to these repositories linked to the website. In this way, a user may be able to uncover new leads for gaining additional information about further extending a family tree (of filling in gaps within a family tree). For example, a family tree may trace back to its oldest member who was born in 1850 in Springfield, USA. Someone in Springfield, USA may operate a repository of information that would be useful to genealogical researches (e.g., a person who manages a cemetery, church, etc.) If this repository is tied to a website, the person can create a marker data structure associated with Springfield USA that is also associated with a Uniform Resource Locator (URL) for the repository website. By configuring the website to permit users to easily discovery such a repository website URL when investigating a family tree, users may be able to uncover additional information about their ancestors.

Figure 56:
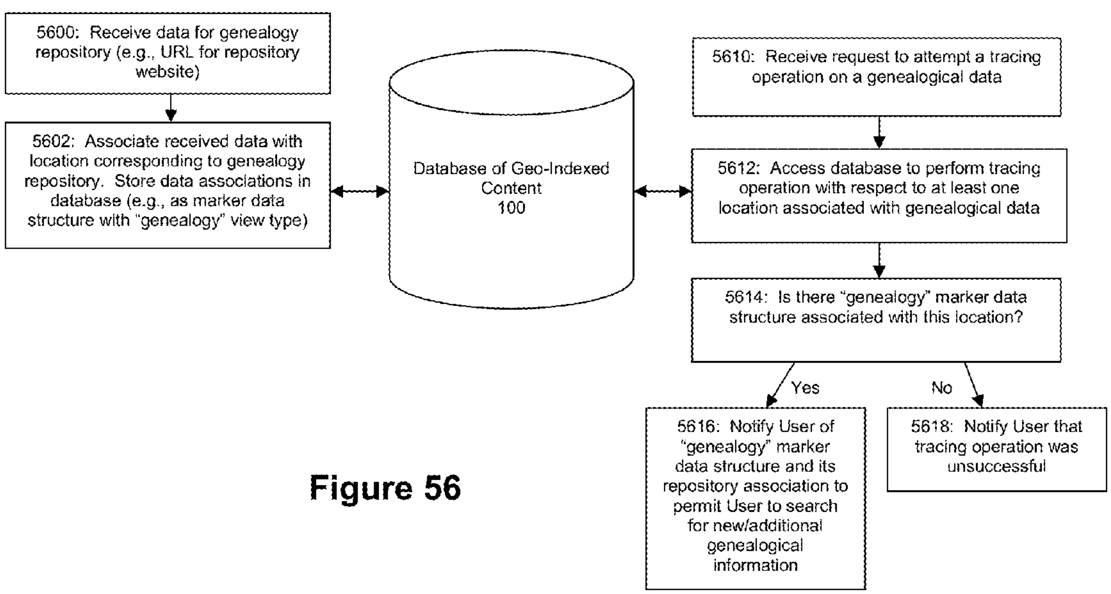
FIG. 56 illustrates an exemplary process flow for using the website to seek leads on gathering additional information for a family tree.

FIG. 56 illustrates an exemplary process flow for this feature. At step 5600, the website receives data (e.g., website URL data) for a repository of genealogical information. As discussed, preferably the repository maintains a website through which genealogy information can be searched. However, it may be the case that the repository is not online but wishes to publicize its existence, in which case the repository can provide data such as contact information (address, telephone number, etc.). At step 5602 the website associates this repository data (preferably a repository website URL) with a geographic location and this association data is stored in the database 100. Preferably, the system creates a marker data structure having a view type of "genealogy" for the subject location, where this marker data structure further includes the repository website URL. Then, at step 5610, the website receives a request to attempt a tracing operation on a genealogical data structure. At step 5612, the website accesses the database to perform this tracing operation. It should be understood that any of a number of tracing operations can be performed. For example, the website can be configured to determine the oldest known location associated with a member of a family tree defines by linked genealogical data structures such as the oldest member of the family tree. Then, at step 5614, the website checks the database to see if there is a marker data structure having a view type of "genealogy" associated with that location. If not, the user is so notified (step 5618). Otherwise, the user is provided with access to the genealogy-related marker data structure to thereby inform the user of a new lead for genealogical research. If the subject marker data structure includes a repository website URL, the user can then access this website to perform research.

It may also be the case that the keeper of records for the repository chooses to create media data structures or people data structures for some or all of that keeper's records. The keeper can associate these media data structures or people data structures with the genealogy-related marker data structure for that location. In such a circumstance, upon discovering the genealogy-related marker data structure, the user can search through associated data structures to conduct additional research.

As examples of other types of tracing operations that can be performed in this manner, the website could also be configured to search for any genealogy-related marker data structures associated with any location among the locations of all members of a family tree. The website could also be configured to search for any genealogy-related marker data structures associated with a location corresponding to the location of a genealogical data structure that has incomplete information.

Outlet for Community "Historians" to Publish their Content:

Individuals who are "self appointed" or by default the unofficial repository of books, registries, lists etc of small churches, non active cemeteries, etc. (i.e. the church historian) who have nowhere to post their information can do so via the website at the location of the cemetery or church on a Genealogy Marker as explained above and link it to a web site or media file (which may take the form of just an MS Office spreadsheet, DB or word document). This permits such an individual to share community history with others via the website.

Preserving and Discovering "Lost Information":

Similar to the above, the website can also be a preservation vehicle for potentially "lost information" as people pass away whereby their heirs will have an outlet to archive information and media that may otherwise be thrown away or otherwise lost. Through the power of the website, other users may be able to contribute information to such media, for example by identifying people in photographs who the heirs are unaware of but could be interested in knowing.

Increased Reliability for Identifying Family/Network Connections:

Media posting date for content uploaded to the website can be compared to Gedcom date information, thus providing a reasonability test of the right person, right time, right place, for media postings, portraits in My People, and assignments of Mypeople to media.

Associating Family Trees with Master User Control of Linkages:

The website may also be used as a vehicle through which a User can identify an existing genealogical data structure that should be associated with another genealogical data structure because of the presence of shared ancestors. Similarly, other users can contribute media or other information to the database in association with members of the User's family. This powerful feature permits users to expand their knowledge of their family histories. However, to provide control over such a process, the website can employ master user controls where consent of the master user is needed to create database associations with a data structure under the control of the master user.

Figure 57:
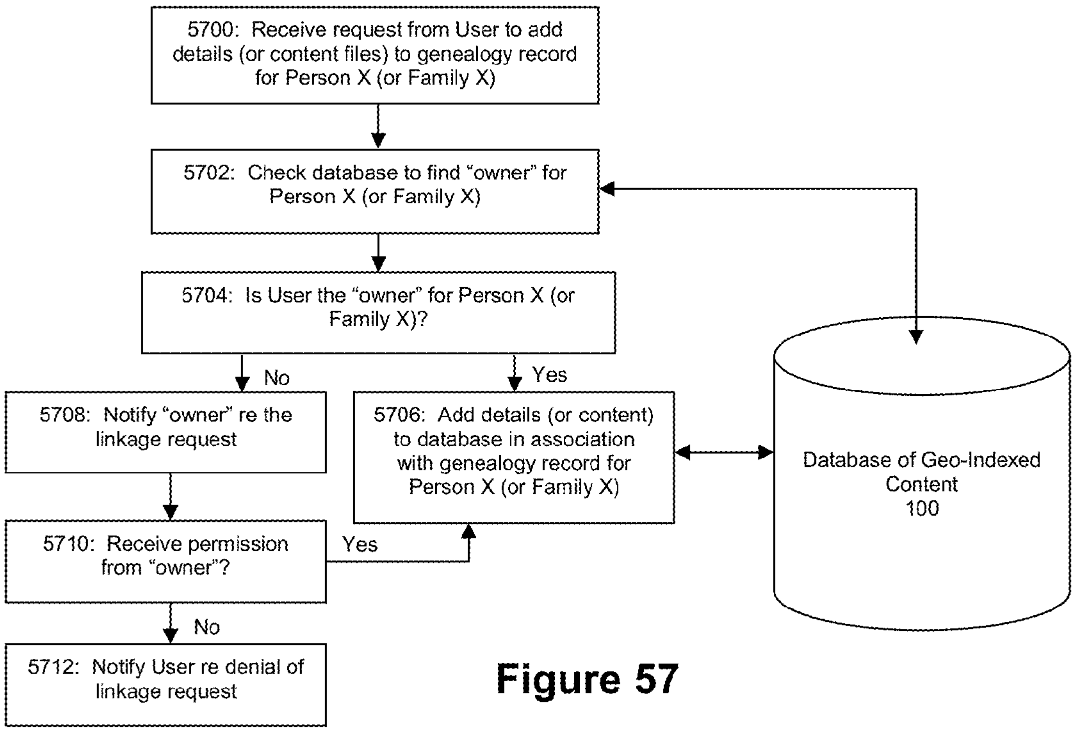
FIG. 57 illustrates an exemplary process flow for controlling how family tree information is associated with other family tree information.
Figure 58A:
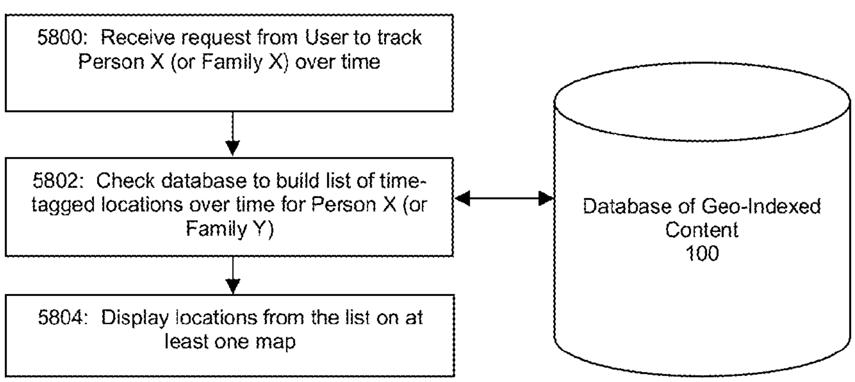
FIGS. 58(*a*)-(*i*) illustrate an exemplary process flow and associated screenshots for tracking a person of interest (or family of interest) over time.
Figure 58B:
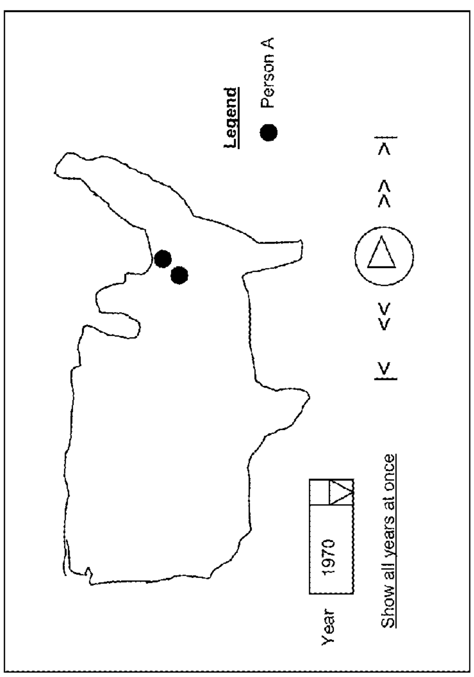
Figure 58C:
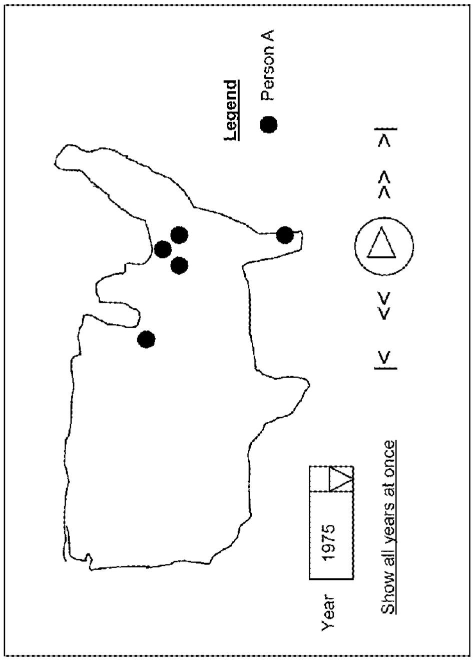
Figure 58D:
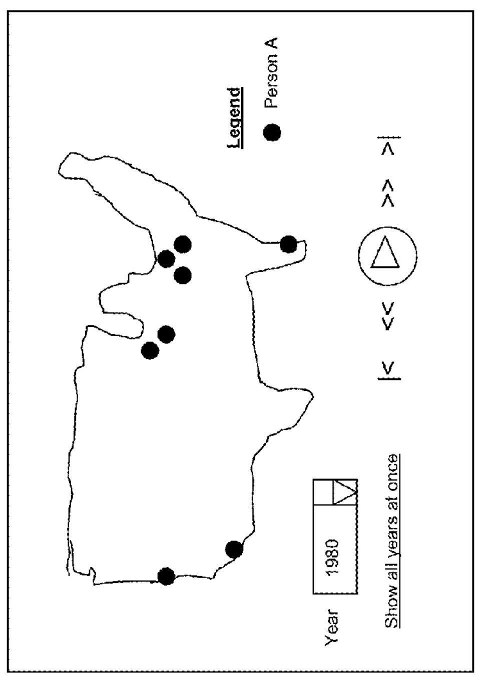
Figure 58E:
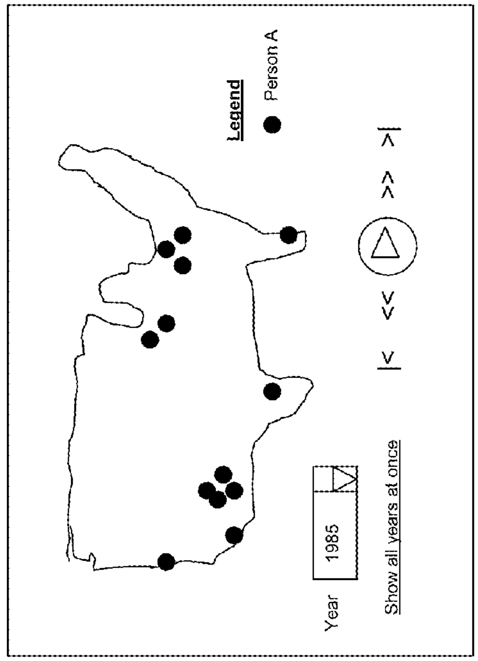
Figure 58F:
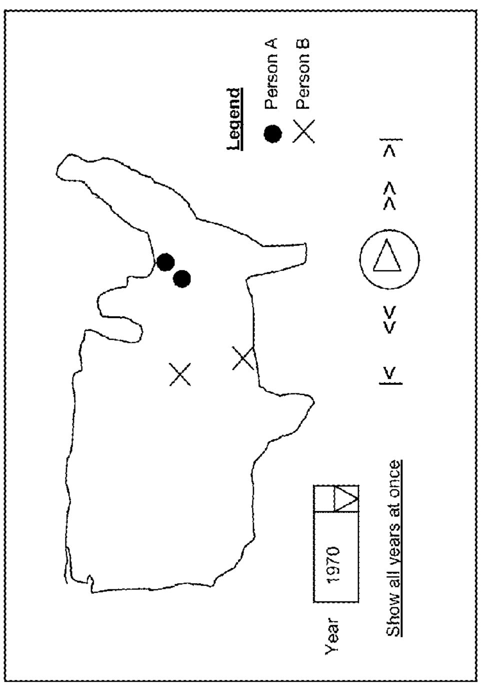
Figure 58G:
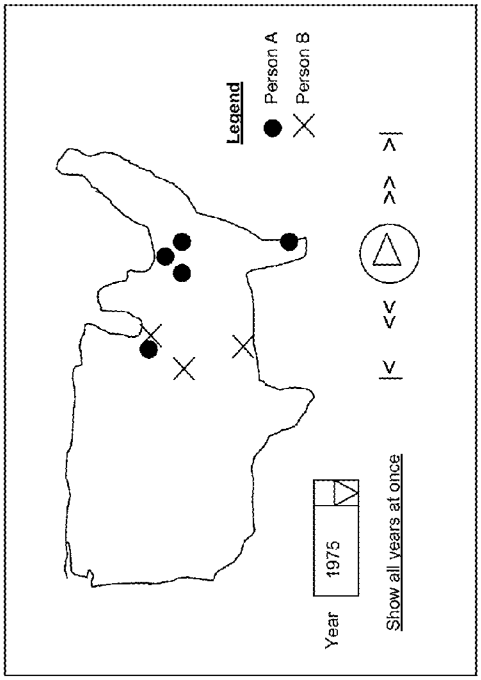
Figure 58H:
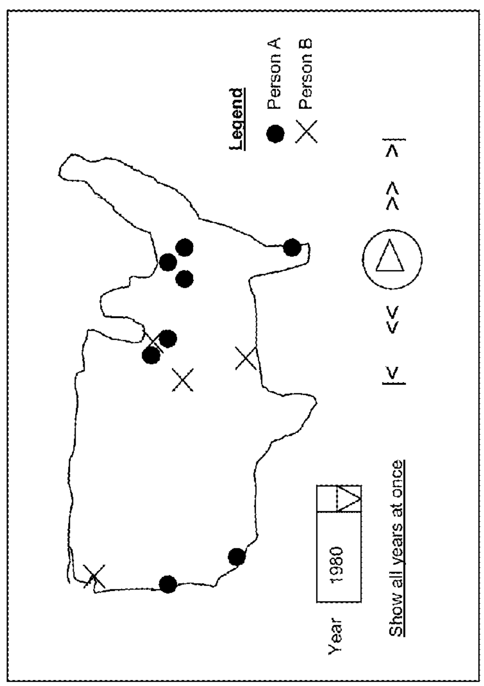
Figure 58I:
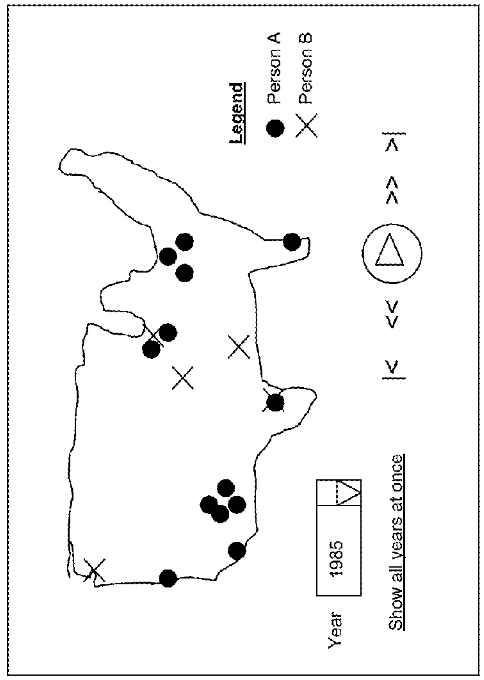
Figure 59A:
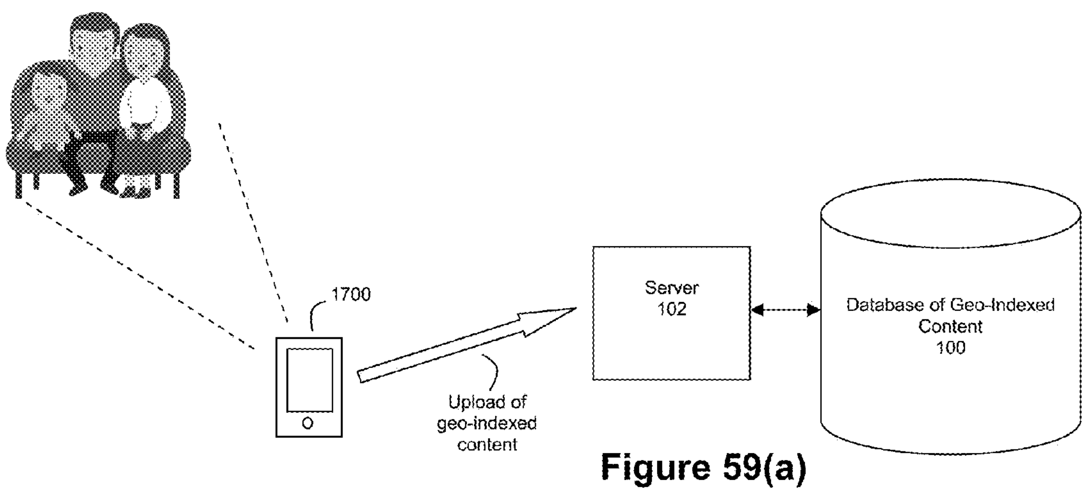
FIGS. 59(*a*)-(*e*) illustrate examples of how the website can be accessed and used from mobile devices.
Figure 59B:
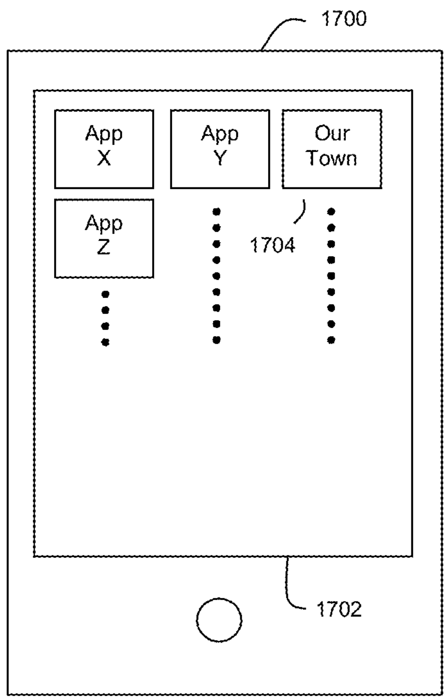
Figure 59C:
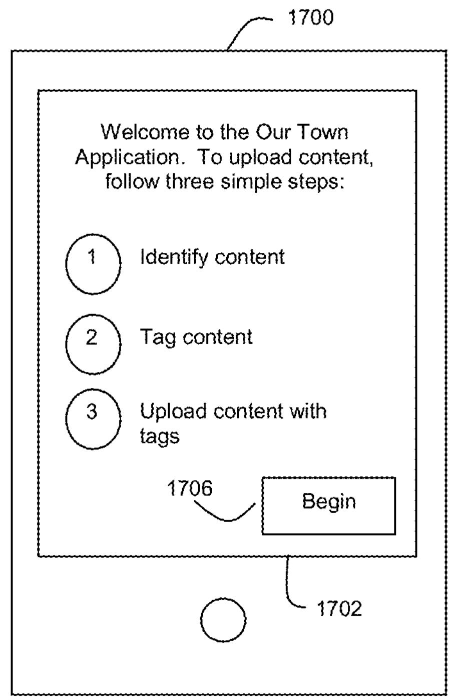
Figure 59D:
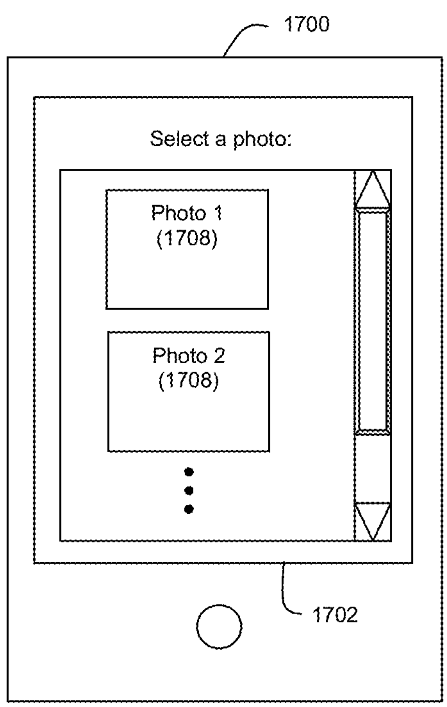
Figure 59E:
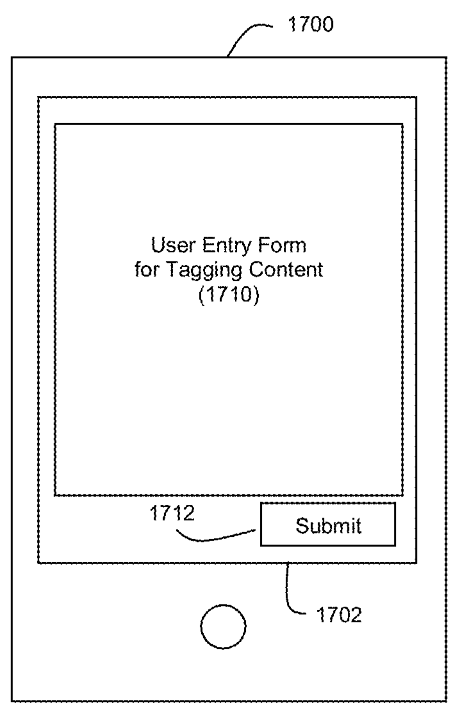

FIG. 57 illustrates an exemplary process flow for this feature. At step 5700, the website receives a request from a User to add information or media to a data structure for person X (e.g., a genealogical data structure for which person X is a member). At step 5702, the website checks the database to find the "owner" for data structure corresponding to person X. This "owner" will serves as the master user. If the User is the "owner" in question (as determined at step 5704), then the website updates the database in accordance with the received request (step 5706). Otherwise, the website notifies the "owner" in question about the linkage request (step 5708) and awaits permission/consent from the "owner" (step 5710). If permission/consent is received, then step 5706 is performed. If not, then at step 5712, the website informs the User re the denial of the linkage request.

Tracking People and Families Over Time:

Another useful feature that an exemplary embodiment can implement is a feature whereby the website tracks a person or family of interest over time with respect to their location associations. This can be an informative way of placing the person or family's history in context. For example, it may be interesting for a user to see a family's migration patterns over time. This location tracking can be presented to the use via a map interface where marker icons are placed on a map at positions corresponding to associated locations of a person or family over time.

FIG. 58(*a*) illustrates an exemplary process flow for this feature. At step 5800, the website receives a request from the User to track Person X or Family X over time. Then, at step 5802, the website accesses the database to determine and build a list of all locations associated with Person X or Family X in the database. This can be performed by checking all location associations for the people data structure associated with Person X or the genealogical data structures associated with Family X. Next, at step 5804, the website provides a GUI for display on the User's user computer that presents a map upon which marker icons for the determined locations are displayed at appropriate geographic locations. This map can be presented in a variety of ways. For example, preferably the locations comprise time-tagged locations in that the locations also have a time association (e.g., a year or range of years) associated therewith. The map display can be provided as a time-elapsed map such that the map is presented in conjunction with a virtual passage of time such that appropriate marker icons are added to the map at geographically appropriate locations when the time passage reaches a time corresponding to the time association of the location in question. Furthermore, this map display can present the marker icons in a cumulative fashion such that the map at time Q will display all marker icons for locations with associated times corresponding to time Q and all times in the past (e.g., Time Q–i). An example of such a cumulative time-elapse map display is shown in FIGS. 58(*b*)-(*e*). The map can also present the marker icons in a non-cumulative fashion such that marker icons have an associated time or time range will be removed from the map once the passage of time exceeds the associated time or time range of the location in question.

Moreover, when the tracking is performed with respect to a family of interest, the marker icons can be coordinated with respect to different members of Family X. For example, the location marker icons for Member A of Family X can have a first shape (or first color) while the location marker icons for Member B of Family X can have a second shape (or second color). A legend and be displayed on the GUI that translates the different marker icons to family members. FIGS. 58(*f*)-(*i*) illustrate an exemplary cumulative time-elapse map display for a family of Person A and Person B.

Further still, this location tracking people could be applied to any plurality of people in the database. In this way, a user can track two or more people to see if their paths ever crossed. The resultant GUI display would be similar to the exemplary displays of FIGS. 58(*f*)-(*i*). For example, this display would show that Person A and Person B may have crossed paths in 1975 around Chicago and again in 1985 around Texas.

Animation controls can be provided on the GUI display to provide users with control over how the display progresses. Furthermore, as should be understood, the displayed marker icons are preferably selectable by the user to access any media or other data structures associated therewith for the subject person(s).

It should be further understood that such tracking display features can be applied to not only people and families but also to other data structures such as marker data structures having user-specified characteristics and media data structures having user-specified characteristics. For example, a tracking display of data structures having an association with a user-specified subject or topic could be performed using the general process flow of FIG. 58(*a*). Further still, comparative tracking displays such as the one shown by FIGS. 58(*f*)-(*i*) could be employed with these other data structures. For example, one could use the general process flow of FIG. 58(*a*) to generate a tracking display that shows marker data structures associated with "Boy Scout Camps" versus "Girl Scout Camps" over a user-specified time period, with further filtering possible to further restrict the display only specified-subclassifications of those classifications (e.g., particular awards ceremonies within the Boy and Girl Scout organizations.

Interfacing Smart Phones with the Website:

Another feature that a preferred embodiment can implement is a feature where the user computers that access the website can be smart phone devices or the like. As is well-known, many smart phones now have powerful data processing, Internet connectivity and media generation (e.g., photos, videos) capabilities. Examples of smart phones include devices such as the Apple iPhone, various Blackberry devices, the Google Droid, etc. Some smart phones also have the ability to take GPS-associated photographs. That is, the smart phone will associate the GPS position of the phone at a given time with a photograph produced by the phone at that time. This capability makes smart phones a potential source for media data structures to be stored in the database 100.

FIG. 59(*a*) illustrates an exemplary system diagram for such an embodiment. A smart phone device 1700 can be used to produce geo-indexed content such as photograph with an associated geographic location. The smart phone 1700 can then interface with server 102 to upload the geo-indexed content to database 100.

To aid this process, application software, often referred to in the shorthand as an "app" can be loaded into the smartphone, where this application software can be executed to guide a user through the process of uploading data to the database 100. FIG. 59(*b*) illustrates an exemplary smart phone display screen (preferably a touch screen) 1702 that includes a user-selectable application 1704 for uploading content to the database 100. In response to user selection of the application 1704, the application can execute to display a welcome screen such as that shown in FIG. 59(*c*). To begin the process of uploading geo-indexed content, the user can select the "Begin" button 1706. As a first step in this process, the user identifies the content to be uploaded to the database. This step can be performed in any of a number of ways. For example, the user could be given a menu option of initiating the phone's camera functions to take a new photograph or video. Also (or alternatively), the phone can provide a scrollable list of photographs 1708 already stored in the phone, as shown in FIG. 59(*d*). In response to user selection of a listed photograph 1708, the phone display 1702 may present a GUI form 1710 similar in nature to the GUI shown in FIG. 8(*b*). Through this GUI form, the user can tag the photograph with additional information for association with the photograph in the database. In response to user selection of the "Submit" button 1712, the phone can upload a media data structure corresponding to the photograph (together with its location and other data associations) to database 100 for storage therein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should further be understood that the embodiments disclosed herein include any and all combinations of features as disclosed herein and/or described in any of the dependent claims.

What is claimed is:

1. A system comprising:

a database configured to store a plurality of accessible data structures, a first plurality of the data structures comprising people data structures, a second plurality of the data structures comprising media data structures corresponding to a plurality of media items, and a third plurality of the data structures comprising marker data structures corresponding to geographic locations, a plurality of the people data structures being associated with a plurality of the media data structures, a plurality of the media data structures being associated with a plurality of the marker data structures such that each of a plurality of the media data structures are associated with marker data structures corresponding to geographic locations where the media items corresponding to those media data structures were generated, wherein at least a plurality of the media data structures associated with a marker data structure are also associated with a people data structure; and a processor for communication with the database, the processor configured to host a website, the website for providing a plurality of user computers with access to the database via a network, the website configured to provide a plurality of graphical user interfaces (GUIs) to the user computers for display thereon, at least a plurality of the GUIs configured to receive input from the user computers to update the database with additional people, media and geographic location data structures and create associations between a plurality of the people, media and geographic location data structures;

wherein the processor is further configured to (1) provide a map interface for presentation to a user via a GUI, (2) receive a user-specified geographic location as input through the map interface, (3) search the database for a media data structure having an association with the user-specified geographic location, (4) based on the search, identify a media data structure that is associated with the user-specified geographic location, and (5) provide a resultant map interface for presentation to the user via a GUI, wherein the resultant map interface is configured to display a marker icon corresponding to a marker data structure associated with the identified media data structure such that the marker icon is positioned on the resultant map interface in accordance with its corresponding geographic location; and wherein the processor is further configured to (1) receive input from the user indicative of a selection of the identified media data structure, (2) present the media item corresponding to the selected media data structure for display to the user via a GUI, the GUI being configured to (i) identify a person corresponding to a people data structure associated with that media data structure and (ii) display a user-selectable link, wherein the user-selectable link is associated with the people data structure that is associated with that media data structure, (3) receive input from the user indicative of a selection of the user-selectable link, and (4) in response to selection of the user-selectable link (i) search the database for a media data structure associated with the people data structure that is associated with the user-selected link regardless of the geographic locations associated with the media data structures, (ii) based on the search, identify a media data structure that is associated with the people data structure associated with the user-selected link, and (iii) present the identified media data structure that is associated with the people data structure associated with the user-selected link for display to the user via a GUI.

2. The system of claim 1 wherein the processor comprises a server.

3. The system of claim 1 wherein the database further comprises a plurality of user data structures associated with a plurality of users, wherein a first people data structure is associated with a first user data structure and a second people data structure is associated with a second user data structure, wherein the first people data structure is the people data structure corresponding to the identified person, and wherein the second people data structure corresponds to the same person as the first people data structure; and wherein the processor is further configured to (1) receive association input from a user that is indicative of a request to create an association between (i) the first people data structure and (ii) the second people data structure, and (2) create an association in the database in accordance with the received association input.

4. The system of claim 1 wherein the database further comprises a plurality of user data structures associated with a plurality of users, wherein a first people data structure is associated with a first user data structure and a second people data structure is associated with a second user data structure, wherein the first people data structure is the people data structure corresponding to the identified person, and wherein the second people data structure corresponds to the same identified person; and wherein the processor is further configured to (1) receive association input from a user that is indicative of a request to create an association between (i) the identified media data structure that is associated with the people data structure associated with the user-selected link and (ii) the second people data structure, and (2) create an association in the database in accordance with the received association input.

5. A system comprising:

a database configured to store a plurality of accessible data structures, a first plurality of the data structures comprising people data structures, a second plurality of the data structures comprising media data structures, and a third plurality of the data structures comprising data structures corresponding to geographic locations, a plurality of the people data structures being associated with a plurality of the media data structures, a plurality of the media data structures being associated with a plurality of the geographic location data structures, wherein at least a plurality of the media data structures associated with a geographic location data structure are also associated with a people data structure, wherein each of a plurality of the media data structures that are associated with a people data structure comprises a photograph and is associated with a geographic location data structure corresponding to a geographic location for where that photograph was taken; and a processor for communication with the database, the processor configured to host a website, the website for providing a plurality of user computers with access to the database via a network, the website configured to provide a plurality of graphical user interfaces (GUIs) to the user computers for display thereon, at least a plurality of the GUIs configured to receive input from the user computers to update the database with additional people, media and geographic location data structures and create associations between a plurality of the people, media and geographic location data structures; and wherein the processor is further configured to (1) receive input from a user indicative of a request to track a person of interest over time, (2) access the database to determine a plurality of geographic locations associated with the people data structure corresponding to the person of interest via (i) any geographic location data structures that are directly associated with the people data structure corresponding to the person of interest, and (ii) any geographic location data structures that are associated with media data structures that are associated with the people data structure corresponding to the person of interest, and (3) provide a GUI for display on the user's user computer that displays a map, the map having a plurality of marker icons placed thereon at positions corresponding the determined geographic locations.

6. The system of claim 5 wherein each determined geographic location has an associated time, and wherein the GUI is configured to display the map in a time lapse format such that marker icons are added to the map sequentially with respect to the times associated with the geographic locations.

7. The system of claim 6 wherein the GUI is configured to display the map in a time lapse cumulative format such that at the end of the time lapse all of the added marker icons are displayed together on the map.

8. The system of claim 5 wherein the received input is indicative of a request to track a plurality of people of interest over time, and wherein the processor is further configured to (1) access the database to determine a plurality of geographic locations associated with the people data structures corresponding to the people of interest via (1) any geographic location data structures that are directly associated with the people data structures corresponding to the people of interest, and (2) any geographic location data structures that are associated with media data structures that are associated with the people data structures corresponding to the people of interest, and (2) populate the map with a plurality of marker icons placed thereon at positions corresponding the determined geographic locations with respect to the people of interest.

9. The system of claim 8 wherein each determined geographic location has an associated time, and wherein the GUI is configured to display the map in a time lapse format such that marker icons are added to the map sequentially with respect to the times associated with the geographic locations.

10. The system of claim 9 wherein the GUI is configured to display the map in a time lapse cumulative format such that at the end of the time lapse all of the added marker icons are displayed together on the map.

11. The system of claim 9 wherein the marker icons have a plurality of graphic formats, and wherein the GUI is configured to coordinate the different marker icon graphic formats with respect to the people of interest.

12. The system of claim 9 wherein the people of interest comprise members of a family of interest as defined by a plurality of people data structures having genealogy information.

13. A system comprising:

a database configured to store (1) a plurality of accessible data structures, and (2) a plurality of historical maps that are associated with a plurality of times from the past and which depict geographic areas as those geographic areas existed at around the associated past times, a first plurality of the data structures comprising people data structures, a second plurality of the data structures comprising media data structures, and a third plurality of the data structures comprising data structures corresponding to geographic locations, a plurality of the people data structures being associated with a plurality of the media data structures, a plurality of the media data structures being associated with a plurality of the geographic location data structures, wherein at least a plurality of the media data structures associated with a geographic location data structure are also associated with a people data structure, and wherein at least a plurality of the data structures are associated with temporal data; and a processor for communication with the database, the processor configured to host a website, the website for providing a plurality of user computers with access to the database via a network, the website configured to provide a plurality of graphical user interfaces (GUIs) to the user computers for display thereon, at least a plurality of the GUIs configured to receive input from the user computers to update the database with additional people, media and geographic location data structures and create associations between a plurality of the people, media and geographic location data structures; and wherein the processor is further configured to (1) receive data corresponding to a geographic location and a time from the past from a user computer through at least one of the GUIs, (2) access the database to determine whether any data structures are associated with the received geographic location data and past time, (3) in response to a determination that at least one of the data structures is associated with the received geographic location data and time, (i) provide a historical map from the database to a user computer for display thereon through at least one of the GUIs, wherein the provided historical map corresponds to the received past time and depicts a geographic area that encompasses the geographic location corresponding to the received data as it existed around the received past time, wherein the provided historical map is configured to display a marker icon that is placed on the map at a position corresponding to the geographic location with which the at least one determined data structure is associated, (ii) receive a selection of the marker icon from the user computer, and (iii) provide another of the GUIs to the user computer for display thereon that displays data corresponding to the at least one determined data structure.

14. The system of claim 13 wherein the historical maps comprise satellite maps.

15. The system of claim 13 wherein the historical maps comprise older maps that have been scaled and geo-referenced for overlay over geographic coordinates corresponding to current maps.

16. A computer-implemented method comprising:

maintaining a database comprising a plurality of accessible marker data structures, a plurality of accessible people data structures, a plurality of accessible media data structures corresponding to a plurality of media items and a plurality of accessible genealogical data structures, wherein each of at least a plurality of the marker data structures are associated with a geographic location such that a plurality of the marker data structures are associated with a plurality of geographic locations in the aggregate, and wherein at least a plurality of the marker data structures, people data structures, media data structures and genealogical data structures share associations with each other in the database such that each of a plurality of the media data structures are associated with marker data structures corresponding to geographic locations where the media items corresponding to those media data structures were generated; and executing a software application on a processor that (1) provides a user computer with access to the database, (2) provides a plurality of graphical user interfaces (GUIs) to the user computer for display thereon to create new data structures for storage in the database, modify the data structures stored in the database, create new associations between the data structures stored in the database, and modify the associations between the data structures in the database; and wherein the executing step further comprises:

the processor receiving input from a user computer through a map interface, the received input corresponding to a geographic location, wherein the geographic location corresponding to the received input is associated with a first people data structure and a first media data structure, but where the first people data structure is not directly associated with the first media data structure;

the processor searching the database for media data structures that are associated with the geographic location corresponding to the received input;

based on the searching, the processor identifying the first media data structure as being associated with the geographic location corresponding to the received input;

the processor communicating the identified first media data structure to the user computer for display thereon through the map interface, wherein the map interface includes a marker icon at a location on the map interface corresponding to the geographic location associated with the identified first media data structure;

the processor receiving a request from the user computer to create an association between the first media data structure and the first people data structure; and in response to the received request, the processor creating a direct association in the database between the first media data structure and the first people data structure.

17. The method of claim 16 wherein the geographic location corresponding to the received input is directly associated with a second media data structure, the second media data structure being directly associated with the first people data structure such that the first people data structure's association with the geographic location corresponding to the received input is an indirect association via the second media data structure.

18. The method of claim 16 wherein the executing step further comprises tracking a plurality of geographic locations associated with at least one member of the group consisting of (1) a people data structure, (2) a genealogical data structure, (3) a plurality of people data structures, (4) a plurality of genealogical data structures and (5) a people data structure and a genealogical data structure and displaying the tracked geographic locations on a map.

19. The method of claim 16 wherein the first media data structure is associated with a second people data structure, the second people data structure also being associated with a second media data structure, and wherein the executing step further comprises:

the processor receiving second input from the user computer through a GUI that displays the first media data structure, the second input being indicative of a request to search the database for any additional media data structures that are associated with the second people data structure;

the processor searching the database in accordance with the received second input;

based on the searching in accordance with the received second input, the processor identifying the second media data structure;

the processor communicating the identified second media data structure to the user computer for display thereon through a GUI;

the processor receiving a request from the user computer to create an association between the second media data structure and the first people data structure; and in response to the received request to create an association between the second media data structure and the first people data structure, the processor creating a direct association in the database between the second media data structure and the first people data structure.

20. The method of claim 19 wherein the second media data structure is associated with a different geographic location than the geographic location corresponding to the received input, and wherein the creating step causes the first people data structure to become associated with a new geographic location corresponding to the different geographic location.

21. The method of claim 16 wherein the map interface GUI is configured to permit the user to filter a display of data structures on the map according to a plurality of criteria.

22. The method of claim 16 wherein the first media data structure is associated with a second people data structure, wherein the first and second people data structures correspond to the same person, and wherein the executing step further comprises:

the processor receiving a request from the user computer to create an association between the first people data structure and the second people data structure; and in response to the received request to create an association between the first people data structure and the second people data structure, the processor creating a direct association in the database between the first people data structure and the second people data structure.

23. The method of claim 16 wherein the first media data structure is associated with a second people data structure, wherein the first and second people data structures correspond to the same person, wherein the second people data structure is also associated with a second media data structure, and wherein the received request comprises a request to create an association between the first people data structure and both the first and second media data structures, and wherein the creating step comprises the processor creating direct associations in the database between the first people data structure and both the first and second media data structures.

24. The method of claim 23 wherein the second media data structure is associated with a different geographic location than the geographic location corresponding to the received input, and wherein the creating step causes the first people data structure to become associated with a new geographic location corresponding to the different geographic location.

25. A computer-implemented method comprising:

receiving content from a user;

receiving data from the user that associates the content with a geographic location and a time;

storing the received content and associated data;

storing data for a plurality of historical maps, the historical map data being indexed by geographic location and time, each historical map represented by the historical map data corresponding to a geographic area and depicting the corresponding geographic area as it existed around its indexed time; and providing access over a network to the stored content and the historical map data through a graphical user interface (GUI), the GUI being configured to (1) receive time data and geographic location data from a user, (2) select historical map data from the database based on the received time and geographic location, and (3) display the historical map corresponding to the selected historical map data, wherein the displayed historical map comprises a plurality of user-selectable identifiers for stored content that is associated with the geographic area and time corresponding to the displayed historical map, the displayed historical map including each user-selectable identifier at a geographic location on the historical map corresponding to that identifier's content, the identifier being user-selectable to display the content associated with that geographic location.

26. The method of claim 25 further comprising:

permitting a user to scroll through time via the GUI to access and display a plurality of the historical maps and stored content associated with geographic locations encompassed by the displayed historical maps.

27. The method of claim 25 wherein the historical map data is indexed by a range of dates such that the historical maps represented by the historical map data depict geographic areas as they existed at some point during the date range with which the historical map data is indexed.

28. The method of claim 25 wherein the content comprises at least one member selected from the group consisting of images, genealogical information, video and audio.

29. The method of claim 25 wherein the stored historical map data comprises satellite map data such that the displayed historical map comprises a satellite map.

30. The method of claim 25 wherein the stored historical map data comprises data from older maps that has been scaled and geo-referenced for overlay over geographic coordinates corresponding to current maps.

31. A system comprising:

a server configured to (1) receive content from a user, (2) receive data from the user that associates the content with a geographic location and a time, (3) store the received content and associated data, (4) store data for a plurality of historical maps, the historical map data being indexed by geographic location and time, each historical map represented by the historical map data corresponding to a geographic area and depicting the corresponding geographic area as it existed around its indexed time, and (5) provide access over a network to the stored content and the historical map data through a graphical user interface (GUI), the GUI being configured to (1) receive time data and geographic location data from a user, (2) select historical map data from the database based on the received time and geographic location, and (3) display the historical map corresponding to the selected historical map data, wherein the displayed historical map comprises a plurality of user-selectable identifiers for stored content that is associated with the geographic area and time corresponding to the displayed historical map, the displayed historical map including each user-selectable identifier at a geographic location on the historical map corresponding to that identifier's content, the identifier being user-selectable to display the content associated with that geographic location.

32. The system of claim 31 wherein the server comprises a web server and a database server.

33. The system of claim 31 wherein the stored historical map data comprises satellite map data such that the displayed historical map comprises a satellite map.

34. The system of claim 31 wherein the stored historical map data comprises data from older maps that has been scaled and geo-referenced for overlay over geographic coordinates corresponding to current maps.

35. A computer program product comprising:

code executable by a processor and resident on a non-transitory computer-readable storage medium, the code, upon execution by the processor, configured to cause the processor to (1) receive content from a user, (2) receive data from the user that associates the content with a geographic location and a time, (3) store the received content and associated data, (4) store data for a plurality of historical maps, the historical map data being indexed by geographic location and time, each historical map represented by the historical map data corresponding to a geographic area and depicting the corresponding geographic area as it existed around its indexed time, and (5) provide access over a network to the stored content and the historical map data through a graphical user interface (GUI), the GUI being configured to (1) receive time data and geographic location data from a user, (2) select historical map data from the database based on the received time and geographic location, and (3) display the historical map corresponding to the selected historical map data, wherein the displayed historical map comprises a plurality of user-selectable identifiers for stored content that is associated with the geographic area and time corresponding to the displayed historical map, the displayed historical map including each user-selectable identifier at a geographic location on the historical map corresponding to that identifier's content, the identifier being user-selectable to display the content associated with that geographic location.

36. The computer program product of claim 35 wherein the stored historical map data comprises satellite map data such that the displayed historical map comprises a satellite map.

37. The computer program product of claim 35 wherein the stored historical map data comprises data from older maps that has been scaled and geo-referenced for overlay over geographic coordinates corresponding to current maps.

* * * * *